United States Patent
Genung et al.

(10) Patent No.: US 12,522,595 B2
(45) Date of Patent: Jan. 13, 2026

(54) BICYCLIC ETHER O-GLYCOPROTEIN-2-ACETAMIDO-2-DEOXY-3-D-GLUCOPYRANOSIDASE INHIBITORS

(71) Applicant: BIOGEN MA INC., Cambridge, MA (US)

(72) Inventors: Nathan Genung, Charlestown, MA (US); Kevin M. Guckian, Northborough, MA (US); Jeffrey Vessels, Marlborough, MA (US); Lei Zhang, Westford, MA (US); Ryan Gianatassio, Everett, MA (US); Edward Yin Shiang Lin, Ashland, MA (US); Zhili Xin, Lexington, MA (US)

(73) Assignee: BIOGEN MA INC., Cambridge, MA (US)

( * ) Notice: Subject to any disclaimer, the term of this patent is extended or adjusted under 35 U.S.C. 154(b) by 982 days.

(21) Appl. No.: 17/428,323

(22) PCT Filed: Feb. 3, 2020

(86) PCT No.: PCT/US2020/016318
§ 371 (c)(1),
(2) Date: Aug. 4, 2021

(87) PCT Pub. No.: WO2020/163193
PCT Pub. Date: Aug. 13, 2020

(65) Prior Publication Data
US 2022/0106305 A1    Apr. 7, 2022

Related U.S. Application Data

(60) Provisional application No. 62/800,827, filed on Feb. 4, 2019.

(51) Int. Cl.
| | |
|---|---|
| *C07D 417/14* | (2006.01) |
| *C07D 471/04* | (2006.01) |
| *C07D 487/04* | (2006.01) |
| *C07D 491/04* | (2006.01) |
| *C07D 491/048* | (2006.01) |
| *C07D 495/04* | (2006.01) |
| *A61K 31/416* | (2006.01) |
| *A61K 31/423* | (2006.01) |
| *A61K 31/427* | (2006.01) |
| *A61K 31/433* | (2006.01) |
| *A61K 31/4355* | (2006.01) |
| *A61K 31/4365* | (2006.01) |
| *A61K 31/437* | (2006.01) |
| *A61K 31/4375* | (2006.01) |
| *A61K 31/4709* | (2006.01) |
| *A61K 31/4725* | (2006.01) |
| *A61K 31/498* | (2006.01) |
| *A61K 31/4985* | (2006.01) |
| *A61K 31/502* | (2006.01) |
| *A61K 31/5025* | (2006.01) |
| *A61K 31/517* | (2006.01) |
| *A61K 31/519* | (2006.01) |
| *A61K 31/53* | (2006.01) |
| *A61P 25/28* | (2006.01) |

(52) U.S. Cl.
CPC .......... *C07D 417/14* (2013.01); *C07D 471/04* (2013.01); *C07D 487/04* (2013.01); *C07D 491/048* (2013.01); *C07D 495/04* (2013.01)

(58) Field of Classification Search
CPC .. C07D 417/14; C07D 471/04; C07D 487/04; C07D 491/048; C07D 495/04; C07D 491/04; A61K 31/416; A61K 31/423; A61K 31/427; A61K 31/433; A61K 31/4355; A61K 31/4365; A61K 31/437; A61K 31/4375; A61K 31/4709; A61K 31/4725; A61K 31/498; A61K 31/4985; A61K 31/502; A61K 31/5025; A61K 31/517; A61K 31/519; A61K 31/53; A61P 25/28
See application file for complete search history.

(56) References Cited

FOREIGN PATENT DOCUMENTS

| | | |
|---|---|---|
| WO | 2016/030443 A1 | 3/2016 |
| WO | 2018/109202 A1 | 6/2018 |
| WO | 2018/140299 A1 | 8/2018 |
| WO | WO-2018154133 A1 * | 8/2018 ........... C07D 471/04 |

OTHER PUBLICATIONS

International Search Report and Written Opinion for Application No. PCT/US2020/016318, dated Jun. 9, 2020, 9 pages.

* cited by examiner

*Primary Examiner* — Bruck Kifle
*Assistant Examiner* — Kevin S Martin
(74) *Attorney, Agent, or Firm* — McCarter & English, LLP; Xin Zhang; Zhongyu Wang

(57) ABSTRACT

Described herein are compounds represented by formula (I) or a pharmaceutically acceptable salt thereof, pharmaceutical compositions comprising the same and methods of preparing and using the same. The variables Ar, X, $R^1$, $R^3$, $R^4$, $Y^1$, $Y^2$, n and p are as defined herein.

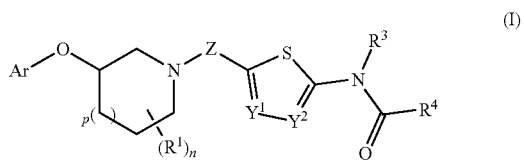

11 Claims, No Drawings

BICYCLIC ETHER O-GLYCOPROTEIN-2-ACETAMIDO-2-DEOXY-3-D-GLUCOPYRANOSIDASE INHIBITORS

RELATED APPLICATIONS

This application is a 35 U.S.C. § 371 national stage filing of International Application No. PCT/US2020/016318, filed on Feb. 3, 2020, which in turn claims the benefit of the filing date, under 35 U.S.C. § 119(e), of U.S. Provisional Application No. 62/800,827, filed on Feb. 4, 2019. The entire contents of the aforementioned applications which are incorporated herein by reference.

BACKGROUND

A wide range of cellular proteins, both nuclear and cytoplasmic, are post-translationally modified by the addition of the monosaccharide 2-acetamido-2-deoxy-β-D-glucopyranoside (β-N-acetyl glucosamine) which is attached via an O-glycosidic linkage. This monosaccharide is generally referred to as O-linked N-acetylglucosamine or O-GlcNAc. The enzyme responsible for post-translationally linking β-N-acetylglucosamine (GlcNAc) to specific serine and threonine residues of numerous nucleocytoplasmic proteins is O-GlcNAc transferase (OGTase). A second enzyme, known as 0-glycoprotein-2-acetamido-2-deoxy-3-D-glucopyranosidase or O-GlcNAcase or OGA, removes this post-translational modification to liberate proteins, making the O-GlcNAc-modification a dynamic cycle occurring several times during the lifetime of a protein.

O-GlcNAc-modified proteins regulate a wide range of vital cellular functions including, e.g., transcription, proteasomal degradation and cellular signaling. O-GlcNAc is also found on many structural proteins, including the cytoskeletal protein "tau" which is responsible for stabilizing a key cellular network of microtubules that is essential for distributing proteins and nutrients within neurons. Importantly, tau has been clearly implicated in the etiology of several diseases including tauopathies, Alzheimer's disease, Parkinson's disease, dementia and cancer.

It is well established that Alzheimer's disease and a number of related tauopathies including Progressive Supranuclear Palsy (PSP) and amyotrophic lateral sclerosis (ALS) are characterized, in part, by the development of neurofibrillary tangles (NFTs). These NFTs are aggregates of paired helical filaments (PHFs) and are composed of an abnormal form of tau. In AD patients, tau becomes hyperphosphorylated, thereby disrupting its normal function, forming PHFs and ultimately aggregating to form NFTs.

Six isoforms of tau are found in the human brain. In AD patients, all six isoforms of tau are found in NFTs, and all are markedly hyperphosphorylated. Tau in healthy brain tissue bears only 2 or 3 phosphate groups, whereas those found in the brains of AD patients bear, on average, 8 phosphate groups.

It has recently emerged that increases in phosphorylation levels result in decreased O-GlcNAc levels and conversely, increased O-GlcNAc levels correlate with decreased phosphorylation levels. It has been shown that decreased glucose availability in brain leads to tau hyperphosphorylation. The gradual impairment of glucose transport and metabolism leads to decreased O-GlcNAc and hyperphosphorylation of tau (and other proteins). Accordingly, the inhibition of O-GlcNAcase, which prevents hyperphosphorylation of tau by preventing removal of O-GlcNac from tau, should compensate for the age-related impairment of glucose metabolism within the brains of health individuals as well as patients suffering from Alzheimer's disease or related neurodegenerative diseases.

However, a major challenge in developing inhibitors for blocking the function of mammalian glycosidases, including O-GlcNAcase, is the large number of functionally related enzymes present in tissues of higher eukaryotes. Accordingly, the use of non-selective inhibitors in studying the cellular and organismal physiological role of one particular enzyme is complicated because complex phenotypes arise from the concomitant inhibition of such functionally related enzymes. In the case of β-N-acetylglucosaminidases, existing compounds that act to block O-GlcNAcase function are non-specific and act potently to inhibit the lysosomal β-hexosaminidases.

In view of foregoing technical challenge, and given the potential for regulation of O-GlcNAcase for treatment of AD, tauopathies and other neurological diseases, there remains a need for development of potent and selective O-GlcNAcase inhibitors.

SUMMARY

Described herein are compounds that are useful treating various diseases, disorders and medical conditions, including but not limited to those associated with proteins that are modified by O-GlcNAcase.

A first embodiment of a compound of the present invention is represented by the following structural formula:

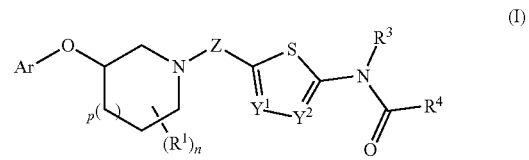

(I)

or a pharmaceutically acceptable salt thereof, wherein:
Ar is an optionally substituted bicyclic aryl, an optionally substituted bicyclic heteroaryl, an optionally substituted bicyclic cycloaliphatic, or an optionally substituted bicyclic heterocyclyl;
$Y^1$ and $Y^2$ are each $CR^c$ or N, wherein at least one of $Y^1$ or $Y^2$ is N;
Z is $CR^2R^2$, $C(=O)$, $(CR^2R^2)_2$, or $—CH_2C(=O)$;
$R^c$ is —H, halo, $C_1$-$C_4$ alkyl, or $C_1$-$C_4$ haloalkyl;
p is 0 or 1;
n is 0 or an integer from 1 to 8;
when n is other than 0, $R^1$, for each occurrence, is independently halo, $C_1$-$C_4$ alkyl, $C_1$-$C_4$ haloalkyl, or $C_1$-$C_4$ alkoxy;
$R^2$, for each occurrence, is independently —H, halo, $C_1$-$C_4$ alkyl, $C_1$-$C_4$ haloalkyl, $C_3$-$C_{10}$ cycloalkyl, or $C_3$-$C_{10}$ halocycloalkyl; or alternatively two $R^2$ together with the carbon atom to which they are attached form a $C_3$-$C_{10}$ cycloalkyl;
$R^3$ is —H or $C_1$-$C_4$ alkyl; and
$R^4$ is —H, $C_1$-$C_4$ alkyl, $C_1$-$C_4$ haloalkyl, or $C_3$-$C_6$ cycloalkyl; or alternatively $R^3$ and $R^4$ taken together with their intervening atoms form an optionally substituted 5- to 7-membered heterocyclyl.

Provided is a pharmaceutical composition comprising at least one compound described herein, or a pharmaceutically acceptable salt thereof, and at least one pharmaceutically acceptable excipient.

Also provided is a method of treating a subject with a disease or condition selected from a neurodegenerative disease, a tauopathy, diabetes, cancer and stress, comprising administering to the subject an effective amount of the compound described herein, or a pharmaceutically acceptable salt thereof, or an effective amount of a pharmaceutical composition comprising at least one compound described herein, or a pharmaceutically acceptable salt thereof, and at least one pharmaceutically acceptable excipient.

Also provided is a method of inhibiting O-GlcNAcase in a subject in need thereof, comprising administering to the subject an effective amount of the compound described herein, or a pharmaceutically acceptable salt thereof, or an effective amount of a pharmaceutical composition comprising at least one compound described herein, or a pharmaceutically acceptable salt thereof, and at least one pharmaceutically acceptable excipient.

Also provided is a method of treating a disease or condition characterized by hyperphosphorylation of tau in the brain, comprising administering to the subject an effective amount of the compound described herein, or a pharmaceutically acceptable salt thereof, or an effective amount of a pharmaceutical composition comprising at least one compound described herein, or a pharmaceutically acceptable salt thereof, and at least one pharmaceutically acceptable excipient. In one embodiment, the disease or condition characterized by hyperphosphorylation of tau in the brain is Alzheimer's disease.

DETAILED DESCRIPTION

Described herein are compounds that are useful treating various diseases, disorders and medical conditions, including but not limited to those associated with proteins that are modified by O-GlcNAcase.

In a first embodiment, a compound of the present invention is represented by the following structural formula (I):

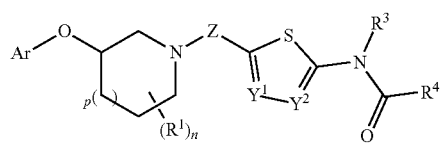

(I)

or a pharmaceutically acceptable salt thereof, wherein the variables are as defined above in the summary for a compound represented by formula (I) or a pharmaceutically acceptable salt thereof.

In a second embodiment, a compound of the present invention is represented by one of the following structural formula (II):

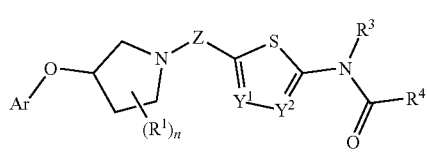

(II)

or a pharmaceutically acceptable salt thereof; wherein the remaining variables are as defined above for the first embodiment.

In a third embodiment, a compound of the invention is represented by the following structural formula (III):

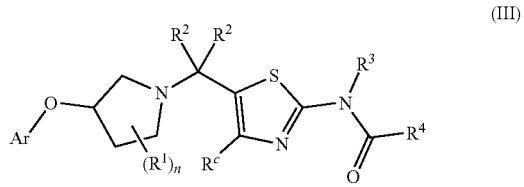

(III)

or a pharmaceutically acceptable salt thereof; wherein the remaining variables are as defined above for the first or second embodiments.

In a fourth embodiment, a compound of the invention is represented by the following structural formula (IV):

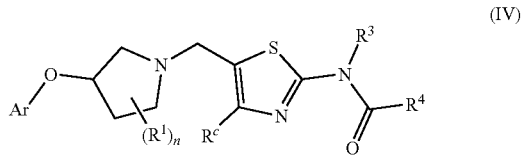

(IV)

or a pharmaceutically acceptable salt thereof; wherein the remaining variables are as defined in the first, second, or third embodiments.

In a fifth embodiment, a compound of the invention is represented by the following structural formula (IVA):

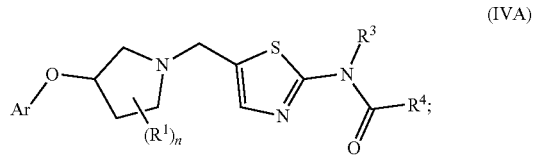

(IVA)

or a pharmaceutically acceptable salt thereof, wherein the remaining variables are as defined in the fourth embodiment.

In a sixth embodiment, a compound of the invention is represented by the following structural formula (IVB):

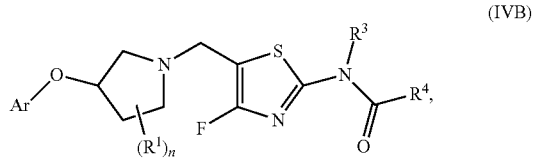

(IVB)

or a pharmaceutically acceptable salt thereof, wherein the remaining variables are as defined in the fourth embodiment.

In a seventh embodiment, a compound of the invention is represented by the following structural formula (V):

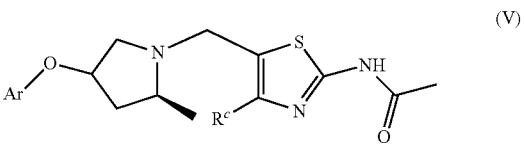

(V)

In an eighth embodiment, a compound of the invention is represented by the following structural formula (VA):

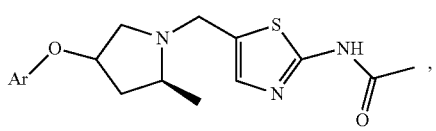
(VA)

or a pharmaceutically acceptable salt thereof, wherein the remaining variables are as defined in the seventh embodiment.

In a ninth embodiment, a compound of the invention is represented by the following structural formula (VB):

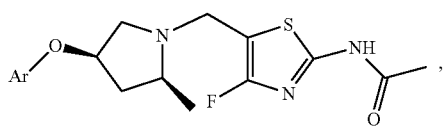
(VB)

or a pharmaceutically acceptable salt thereof, wherein the remaining variables are as defined in the seventh embodiment.

In a tenth embodiment, a compound of the invention is represented by the following structural formula (VI):

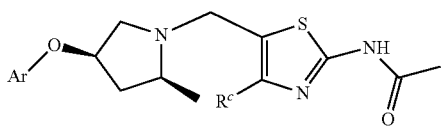
(VI)

or a pharmaceutically acceptable salt thereof; wherein the remaining variables are as defined in the first, second, third, fourth, or seventh embodiments.

In an eleventh embodiment, a compound of the invention is represented by the following structural formula (VIA):

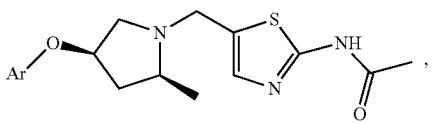
(VIA)

or a pharmaceutically acceptable salt thereof, wherein the remaining variables are as defined in the tenth embodiment.

In a twelfth embodiment, a compound of the invention is represented by the following structural formula (VIB):

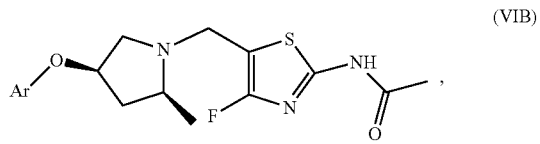
(VIB)

or a pharmaceutically acceptable salt thereof, wherein the remaining variables are as defined in the tenth embodiment.

In a thirteenth embodiment, in a compound of the invention in accordance to the first, second, or third embodiments or a pharmaceutically acceptable salt thereof, $R^2$, for each occurrence, is independently —H or $C_1$-$C_4$ alkyl; wherein the remaining variables are as defined in the first, second, or third embodiments.

In a fourteenth embodiment, in a compound of the invention in accordance to the thirteenth embodiment or a pharmaceutically acceptable salt thereof, $R^2$, for each occurrence, is independently —H; wherein the remaining variables are as defined in the thirteenth embodiment.

In a fifteenth embodiment, in a compound of the invention in accordance to the first, second, third, fourth, thirteenth, or fourteenth embodiments, or a pharmaceutically acceptable salt thereof, $R^1$ is halo or $C_1$-$C_4$ alkyl; $R^c$ is —H or halo; $R^4$ is —H or $C_1$-$C_4$ alkyl; wherein the remaining variables are as defined in the first, second, third, fourth, thirteenth, or fourteenth embodiments.

In a sixteenth embodiment, in a compound of the invention in accordance to the first, second, third, fourth, thirteenth, fourteenth, or fifteenth embodiments, or a pharmaceutically acceptable salt thereof, $R^c$ is preferably —H or fluoro; wherein the remaining variables are as defined in the first, second, third, fourth, thirteenth, fourteenth, or fifteenth embodiments.

In a seventeenth embodiment, in a compound of the invention in accordance to the first, second, third, fourth, fifth, sixth, seventh, eighth, ninth, tenth, eleventh, twelfth, thirteenth, fourteenth, fifteenth, or sixteenth embodiments or a pharmaceutically acceptable salt thereof, Ar is an optionally substituted bicyclic heteroaryl; wherein the remaining variables are as defined in the first, second, third, fourth, fifth, sixth, seventh, eighth, ninth, tenth, eleventh, twelfth, thirteenth, fourteenth, fifteenth, or sixteenth embodiments.

In an eighteenth embodiment, in a compound of the invention in accordance to the first, second, third, fourth, fifth, sixth, seventh, eighth, ninth, tenth, eleventh, twelfth, thirteenth, fourteenth, fifteenth, sixteenth, or seventeenth embodiments or a pharmaceutically acceptable salt thereof, the bicyclic heteroaryl is a monocyclic heteroaryl fused to another monocyclic heteroaryl; a monocyclic heteroaryl fused to a phenyl; or a monocyclic heteroaryl fused to a cycloalkyl; wherein the remaining variables are as defined in the first, second, third, fourth, fifth, sixth, seventh, eighth, ninth, tenth, eleventh, twelfth, thirteenth, fourteenth, fifteenth, sixteenth, or seventeenth embodiments.

In a nineteenth embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, or eighteenth embodiments or a pharmaceutically acceptable salt thereof, Ar is optionally substituted thienopyridinyl, optionally substituted quinolinyl, optionally substituted imidazopyridinyl, optionally substituted imidazopyrimidinyl, optionally substituted furopyridinyl, optionally substituted pyrazolopyrazinyl, optionally substituted isoquinolinyl, optionally substituted thienopyrimidinyl, optionally substituted quinoxalinyl, optionally substituted tetrahydroquinazolinyl, optionally substituted pyrazolopyridinyl, triazolopyridazinyl, tetrahydroquinolinyl, triazolopyrimidinyl, optionally substituted quinazolinyl, optionally substituted indazolyl, optionally substituted benzo[d]oxazolyl, optionally substituted furopyrimidinyl, optionally substituted pyrazolopyrimidinyl, optionally substituted triazolopyridinyl, optionally substituted triazolopyrazinyl, optionally substituted naphthyridinyl, optionally substituted tetrazolopyridinyl, optionally substituted phthalazinyl, optionally substituted benzo[d]isoxazole, optionally substituted oxazolopyridinyl, optionally substituted imidazothiadiazolyl, optionally substituted imidazopyrazinyl, optionally substituted imidazopyridazinyl, optionally substituted pyridopyrimidinyl, optionally substituted pyridopyrazinyl, optionally substituted pyrrolopyrimidinyl, optionally substituted pyrrolopyridinyl, optionally substituted pyrrolotriazinyl, optionallys substituted purinyl, optionally substituted furopyrimidinyl, optionally substituted quinolinyl, or optionally substituted thiazolopyrimidinyl; wherein the remaining variables are as defined in the first, second, third, fourth, fifth, sixth, seventh, eighth, ninth, tenth, eleventh, twelfth, thirteenth, fourteenth, fifteenth, sixteenth, seventeenth, or eighteenth embodiments.

In a twentieth embodiment, in a compound of the invention in accordance to the nineteenth embodiment, or a pharmaceutically acceptable salt thereof, Ar is optionally substituted thienopyridinyl, optionally substituted quinolinyl, optionally substituted imidazopyridinyl, optionally substituted imidazopyrimidinyl, optionally substituted furopyridinyl, optionally substituted pyrazolopyrazinyl, optionally substituted isoquinolinyl, optionally substituted thienopyrimidinyl, optionally substituted quinoxalinyl, optionally substituted tetrahydroquinazolinyl, optionally substituted pyrazolopyridinyl, triazolopyridazinyl, tetrahydroquinolinyl, triazolopyrimidinyl, optionally substituted quinazolinyl, optionally substituted indazolyl, optionally substituted benzo[d]oxazolyl, or optionally substituted furopyrimidinyl; wherein the remaining variables are as defined in the nineteenth embodiment.

In a twenty-first embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments or a pharmaceutically acceptable salt thereof, Ar is optionally substituted

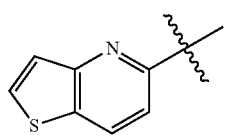

, optionally substituted

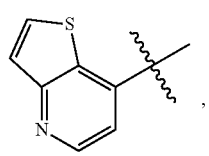 [SMILES: *c1ccnc2ccsc12]

, optionally substituted

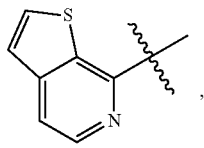 [SMILES: *c1nccc2ccsc12]

, optionally substituted

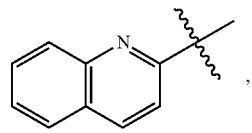 [SMILES: *c1ccc2ccccc2n1]

, optionally substituted

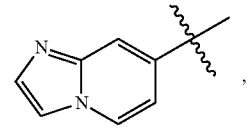 [SMILES: *c1ccn2ccnc2c1]

, optionally substituted

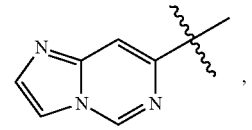 [SMILES: *c1cc2nccn2cn1]

, optionally substituted

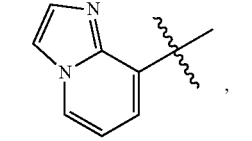 [SMILES: *c1cccn2ccnc12]

, optionally substituted

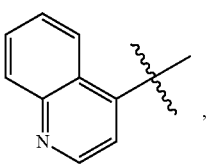 [SMILES: *c1ccnc2ccccc12]

, optionally substituted

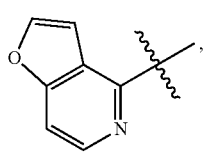 [SMILES: *c1nccc2occc12]

, optionally substituted
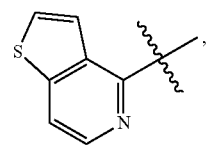
optionally substituted
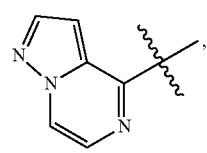 [SMILES: *c1nccn2nccc12]
optionally substituted
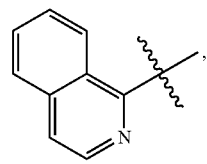
optionally substituted
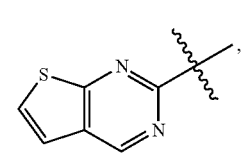 [SMILES: *c1ncc2ccsc2n1]
optionally substituted
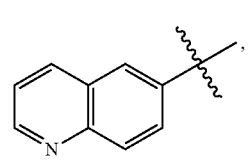 [SMILES: *c1ccc2ncccc2c1]
optionally substituted
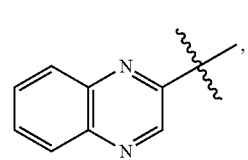 [SMILES: *c1cnc2ccccc2n1]
optionally substituted
optionally substituted
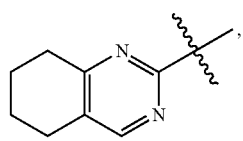 [SMILES: *c1ncc2c(n1)CCCC2]
optionally substituted
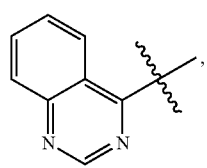 [SMILES: *c1ncnc2ccccc12]
optionally substituted
optionally substituted
optionally substituted
optionally substituted
optionally substituted
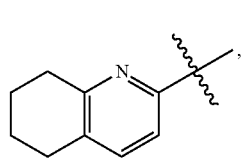

optionally substituted

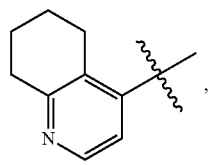 [SMILES: *c1ccnc2c1CCCC2], optionally substituted

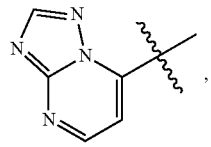, optionally substituted

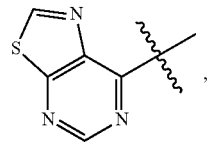 [SMILES: *c1ncnc2scnc12], optionally substituted

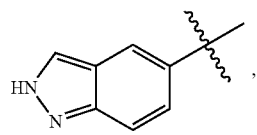 [SMILES: *c1ccc2n[nH]cc2c1], optionally substituted

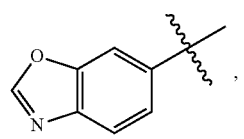 [SMILES: *c1ccc2ncoc2c1], optionally substituted

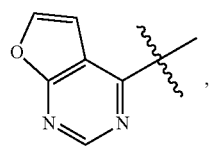, optionally substituted

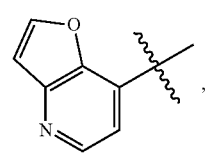 [SMILES: *c1ccnc2ccoc12], optionally substituted

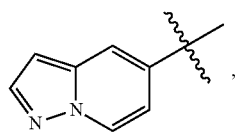 [SMILES: *c1ccn2nccc2c1], or optionally substituted

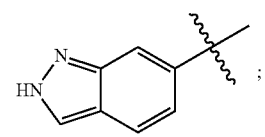 [SMILES: *c1ccc2c[nH]nc2c1];

wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments.

In a twenty-second embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments or a pharmaceutically acceptable salt thereof, Ar is optionally substituted

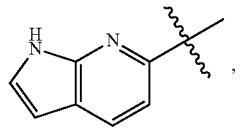 [SMILES: *c1ccc2cc[nH]c2n1], optionally substituted

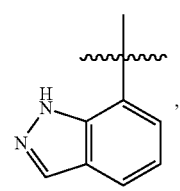
, optionally substituted

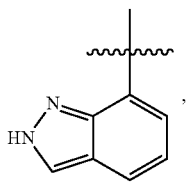 [SMILES: *c1cccc2c[nH]nc12], optionally substituted
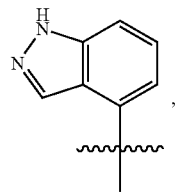,
optionally substituted
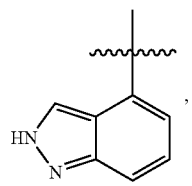,
optionally substituted
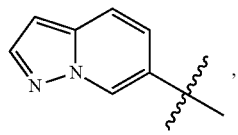 [SMILES: *c1ccc2ccnn2c1],
optionally substituted
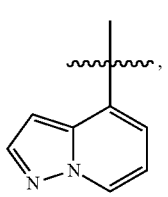 [SMILES: *c1cccn2nccc12],
optionally substituted
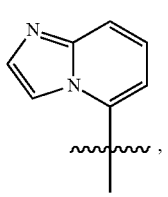 [SMILES: *c1cccc2nccn12],
optionally substituted
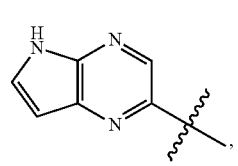,
optionally substituted
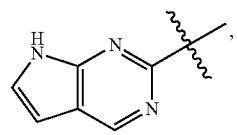 [SMILES: *c1ncc2cc[nH]c2n1],
optionally substituted
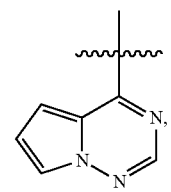 [SMILES: *c1ncnn2cccc12],
optionally substituted
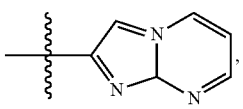,
optionally substituted
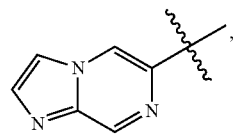 [SMILES: *c1cn2ccnc2cn1],
optionally substituted
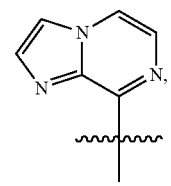 [SMILES: *c1nccn2ccnc12],
optionally substituted
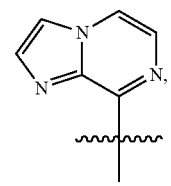 [SMILES: *c1nccn2ccnc12], optionally substituted
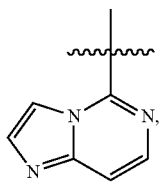 [SMILES: *c1nccc2nccn12]
optionally substituted
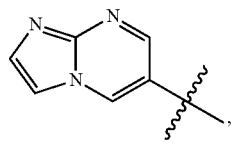 [SMILES: *c1cnc2nccn2c1]
optionally substituted
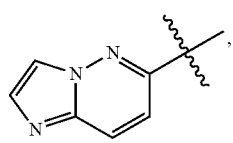 [SMILES: *c1ccc2nccn2n1]
optionally substituted
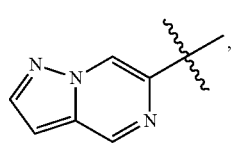 [SMILES: *c1cn2nccc2cn1]
optionally substituted
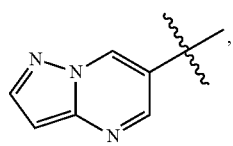 [SMILES: *c1cnc2ccnn2c1]
optionally substituted
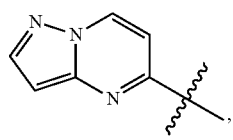 [SMILES: *c1ccn2nccc2n1]
optionally substituted
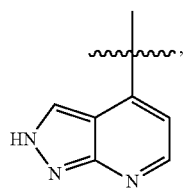
optionally substituted
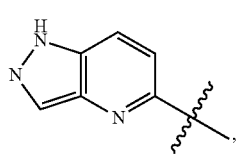
optionally substituted
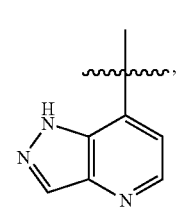
optionally substituted
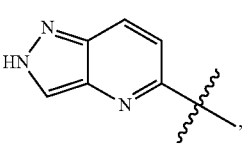 [SMILES: *c1ccc2n[nH]cc2n1]
optionally substituted
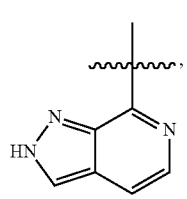
optionally substituted
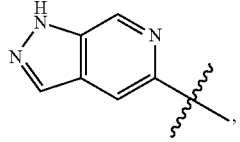 [SMILES: *c1cc2cn[nH]c2cn1]

optionally substituted
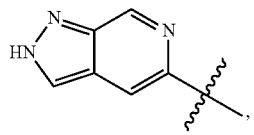 [SMILES: *c1cc2c[nH]nc2cn1],
optionally substituted
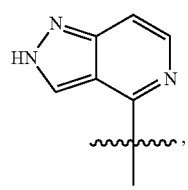,
optionally substituted
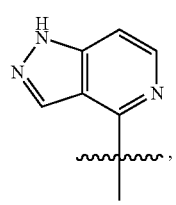,
optionally substituted
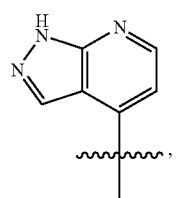,
optionally substituted
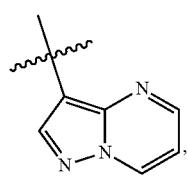 [SMILES: *c1cnn2cccnc12],
optionally substituted
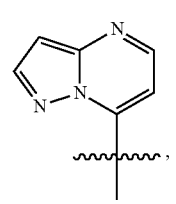 [SMILES: *c1ccnc2ccnn12],
optionally substituted
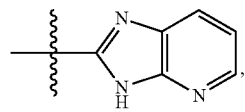 [SMILES: *c1nc2cccnc2[nH]1],
optionally substituted
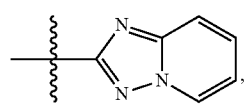 [SMILES: *c1nc2ccccn2n1],
optionally substituted
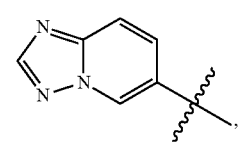 [SMILES: *c1ccc2ncnn2c1],
optionally substituted
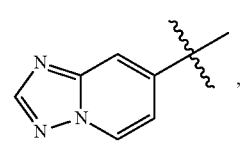 [SMILES: *c1ccn2ncnc2c1],
optionally substituted
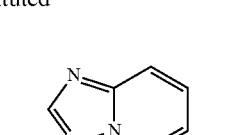,
optionally substituted
,
optionally substituted
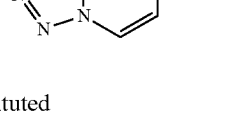,
optionally substituted
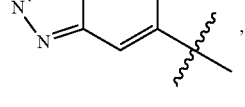, optionally substituted
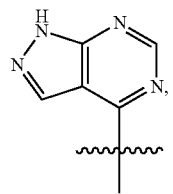
optionally substituted
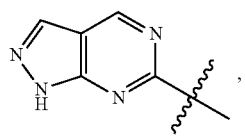 [SMILES: *c1ncc2cn[nH]c2n1]
optionally substituted
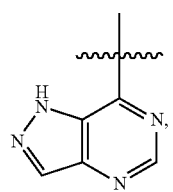
optionally substituted
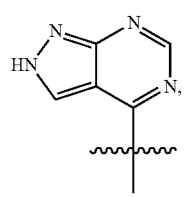 [SMILES: *c1ncnc2n[nH]cc12]
optionally substituted
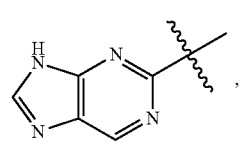 [SMILES: *c1ncc2nc[nH]c2n1]
optionally substituted
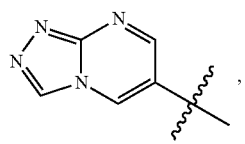 [SMILES: *c1cnc2nncn2c1]
optionally substituted
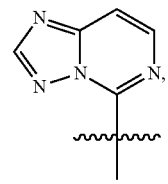 [SMILES: *c1nccc2ncnn12]
optionally substituted
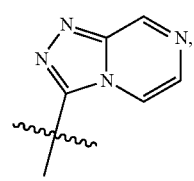 [SMILES: *c1nnc2cnccn12]
optionally substituted
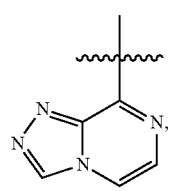
optionally substituted
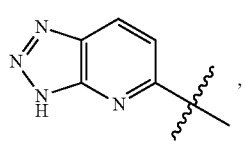 [SMILES: *c1ccc2nn[nH]c2n1]
optionally substituted
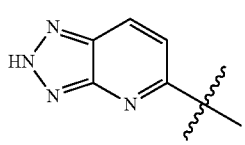
optionally substituted
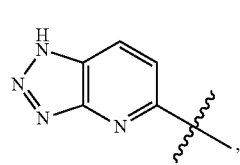

optionally substituted
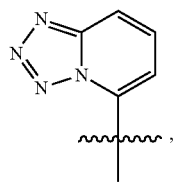
optionally substituted
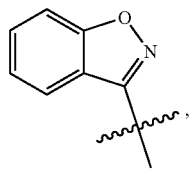 [SMILES: *c1noc2ccccc12]
optionally substituted
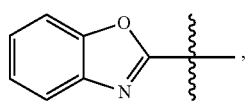
optionally substituted
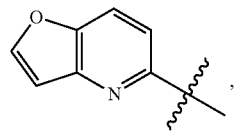 [SMILES: *c1ccc2occc2n1]
optionally substituted
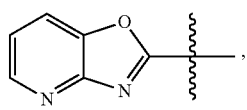 [SMILES: *c1nc2ncccc2o1]
optionally substituted
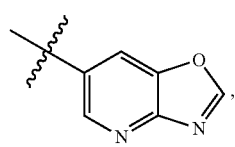 [SMILES: *c1cnc2ncoc2c1]
optionally substituted
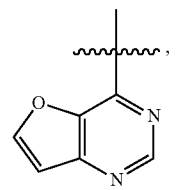 [SMILES: *c1ncnc2ccoc12]
optionally substituted
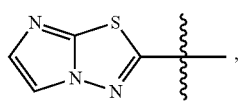
optionally substituted
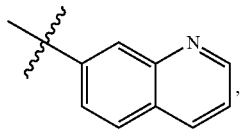 [SMILES: *c1ccc2cccnc2c1]
optionally substituted
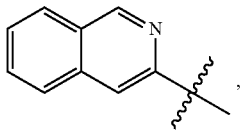 [SMILES: *c1cc2ccccc2cn1]
optionally substituted
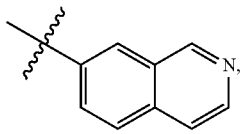 [SMILES: *c1ccc2ccncc2c1]
optionally substituted
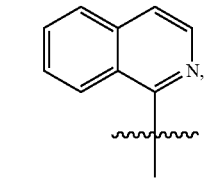 [SMILES: *c1nccc2ccccc12]
optionally substituted
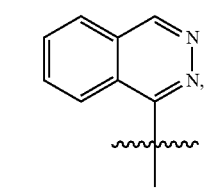 [SMILES: *c1nncc2ccccc12]

optionally substituted

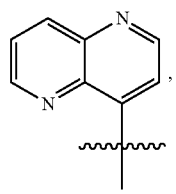 [SMILES: *c1ccnc2cccnc12]

optionally substituted

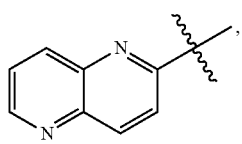 [SMILES: *c1ccc2ncccc2n1]

optionally substituted

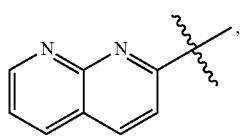 [SMILES: *c1ccc2cccnc2n1]

optionally substituted

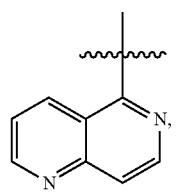 [SMILES: *c1nccc2ncccc12]

optionally substituted

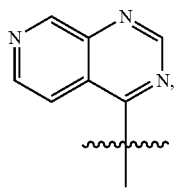 [SMILES: *c1ncnc2cnccc12]

optionally substituted

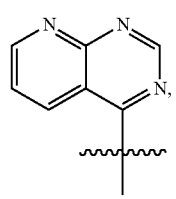 [SMILES: *c1ncnc2ncccc12]

optionally substituted

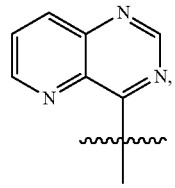 [SMILES: *c1ncnc2cccnc12]

optionally substituted

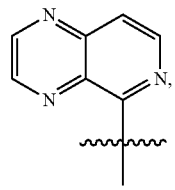 [SMILES: *c1nccc2nccnc12]

or optionally substituted

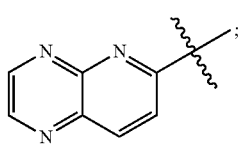 [SMILES: *c1ccc2nccnc2n1]

wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments.

In a twenty-third embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments or a pharmaceutically acceptable salt thereof, Ar is optionally substituted

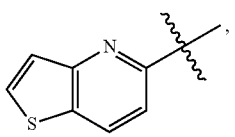

optionally substituted

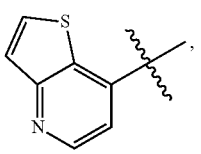 [SMILES: *c1ccnc2ccsc12]

optionally substituted
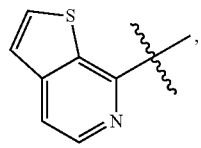 [SMILES: *c1nccc2ccsc12]
optionally substituted
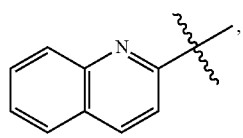 [SMILES: *c1ccc2ccccc2n1]
optionally substituted
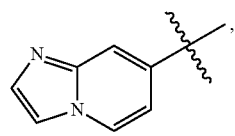 [SMILES: *c1ccn2ccnc2c1]
optionally substituted
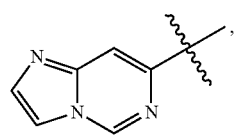 [SMILES: *c1cc2nccn2cn1]
optionally substituted
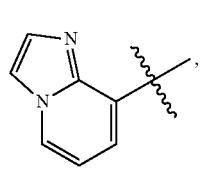 [SMILES: *c1cccn2ccnc12]
optionally substituted
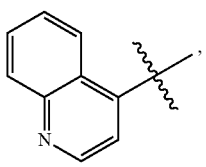 [SMILES: *c1ccnc2ccccc12]
optionally substituted
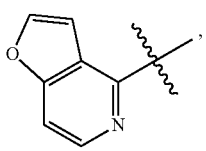 [SMILES: *c1nccc2occc12]
optionally substituted
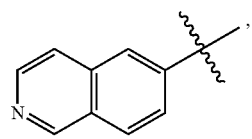 [SMILES: *c1ccc2cnccc2c1]
optionally substituted
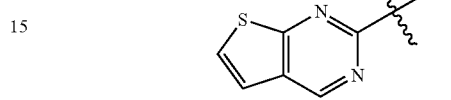
optionally substituted
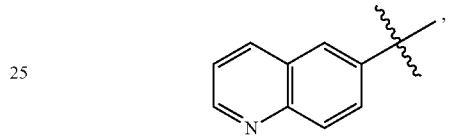
optionally substituted
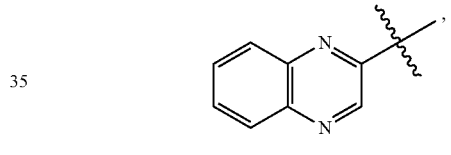
optionally substituted
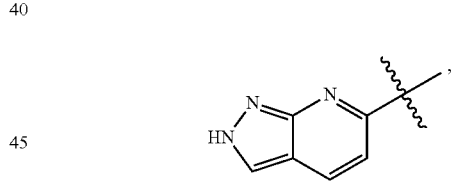
optionally substituted
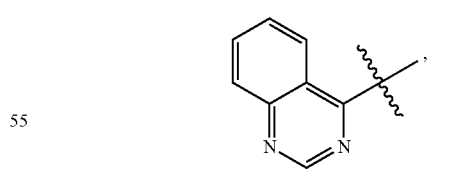
optionally substituted
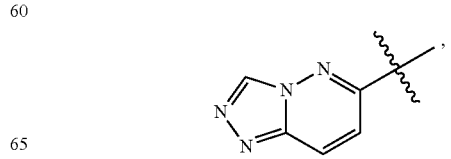

optionally substituted

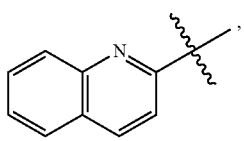

optionally substituted

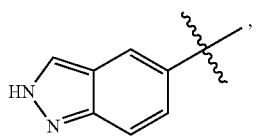

optionally substituted

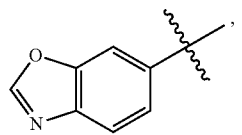 [SMILES: *c1ccc2ncoc2c1]

optionally substituted

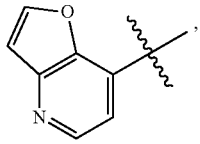 [SMILES: *c1ccnc2ccoc12]

optionally substituted

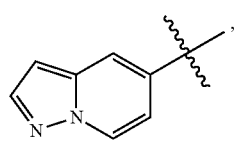 [SMILES: *c1ccn2nccc2c1]

or optionally substituted

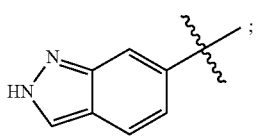 [SMILES: *c1ccc2c[nH]nc2c1]

;

wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, or nineteenth embodiments.

In a twenty-fourth embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, or twenty-third embodiments or a pharmaceutically acceptable salt thereof, Ar is optionally substituted with one or more selected from $C_1$-$C_4$ alkyl, $C_1$-$C_4$ haloalkyl, $C_3$-$C_6$ cycloalkyl, $C_3$-$C_6$ heterocyclyl, halo, —CN, —NO$_2$, —OR$^z$, —SR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^y$, —O(C=S)R$^x$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O)NR$^x$R$^y$, —NR$^x$(C=S)NR$^x$R$^y$, —C(=S)R$^x$, —C(=O)R$^x$ phenyl and monocyclic heteroaryl;

wherein:
the $C_1$-$C_4$ alkyl substituent on Ar is optionally substituted with —CN, —NO$_2$, —OR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^x$, —O(C=S)R$^x$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O)NR$^x$R$^y$, —NR$^x$(C=S)NR$^x$R$^y$, —C(=S)R$^x$, and —C(=O)R$^y$, $C_3$-$C_6$ cycloalkyl (optionally substituted with one or more groups selected from —CH$_3$, halomethyl, halo, methoxy and halomethoxy), monocyclic heteroaryl (optionally substituted with one or more groups selected from —CH$_3$, halomethyl, halo, methoxy or halomethoxy) and phenyl (optionally substituted with one or more groups selected from —CH$_3$, halomethyl, halo, methoxy and halomethoxy);

the $C_3$-$C_6$ cycloalkyl, $C_3$-$C_6$ heterocyclyl, phenyl or monocyclic heteroaryl substituent on Ar is optionally and independently substituted with $C_1$-$C_4$ alkyl, $C_1$-$C_4$ haloalkyl, halo, —CN, —NO$_2$, —OR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^x$, —O(C=S)R$^y$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O)NR$^x$R$^y$, —NR$^x$(C=S)NR$^x$R$^y$, —C(=S)R$^x$, and —C(=O)R$^x$;

each R$^x$ and each R$^y$ is independently —H, $C_1$-$C_4$ alkyl, or $C_3$-$C_8$ cycloalkyl; wherein the $C_1$-$C_4$ alkyl or $C_3$-$C_8$ cycloalkyl represented by R$^x$ or R$^y$ is optionally substituted with one or more substituents selected from halo, hydroxyl, $C_3$-$C_6$ cycloalkyl and phenyl (optionally substituted with one or more groups selected from —CH$_3$, halomethyl, halo, methoxy or halomethoxy);

R$^z$ is —H, $C_1$-$C_4$ alkyl, $C_1$-$C_4$ alkoxy, $C_3$-$C_8$ cycloalkyl, or $C_3$-$C_8$ heterocyclyl; wherein the $C_1$-$C_4$ alkyl or $C_3$-$C_8$ cycloalkyl group represented by R$^z$ is optionally substituted with one or more substituents selected from —CN, halo, hydroxyl, $C_1$-$C_4$ alkyl, $C_1$-$C_4$ alkoxy, $C_3$-$C_6$ cycloalkyl and phenyl (optionally substituted with one or more groups selected from —CH$_3$, halomethyl, halo, methoxy and halomethoxy); and i is 0, 1, or 2;

wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, or twenty-third embodiments.

In a twenty-fifth embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, or twenty-fourth embodiments or a pharmaceutically acceptable salt thereof, Ar is optionally substituted with one or more selected from $C_1$-$C_4$ alkyl, $C_1$-$C_4$ haloalkyl, halo, —CN, —$NO_2$, —$OR^z$, —$SR^z$, —$NR^xS(O)_i$ $R^y$, —C(=O)$OR^x$, —OC(=O)$OR^x$, —C(=S)$OR^y$, —O(C=S)$R^x$, —C(=O)$NR^xR^y$, —C(=S)$NR^xR^y$, —$NR^xC$(=S)$R^y$, —$NR^x$(C=O)$OR^y$, —O(C=O)$NR^xR^y$, —$NR^x$(C=S)$OR^y$, —O(C=S)$NR^xR^y$, —$NR^x$(C=O)$NR^xR^y$, —$NR^x$(C=S)$NR^xR^y$, —C(=S)$R^x$, and —C(=O)$R^x$; wherein each $R^x$, each $R^y$ and $R^z$ each is independently —H or $C_1$-$C_4$ alkyl; wherein each $R^x$, each $R^y$ and $R^z$ each is independently —H or $C_1$-$C_4$ alkyl; and wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, or twenty-fourth embodiments.

In a twenty-sixth embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, or twenty-fifth embodiments, or a pharmaceutically acceptable salt thereof, Ar is optionally substituted with one or more selected from $C_1$-$C_4$ alkyl, $C_1$-$C_4$ haloalkyl, halo, —$OR^z$, —C(=O)$NR^xR^y$ and —CN; wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, or twenty-fifth embodiments.

In a twenty-seventh embodiment, in a compound of the invention in accordance to the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, twenty-fifth, or twenty-sixth embodiments, or a pharmaceutically acceptable salt thereof, Ar is optionally substituted with one or more selected from —$CH_3$, —$CH_2CH_3$, —$CF_3$, —$CHF_2$, —F, —Cl, —$OCHF_2$, —$CONH_2$, —CN, and $OCH_3$; wherein the remaining variables are as defined in the first, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, twenty-fifth, or twenty-sixth embodiments.

In a twenty-eighth embodiment, in a compound of the invention in accordance to the twenty-seventh embodiment, or a pharmaceutically acceptable salt thereof, Ar is optionally substituted with one or more selected from —$CH_3$, —$CH_2CH_3$, —$CF_3$, —$CHF_2$, —F, —Cl, —$OCHF_2$, —$CONH_2$, —CN and —$OCH_3$; wherein the remaining variables are as defined in the twenty-seventy embodiment.

In a twenty-ninth embodiment, a compound or a pharmaceutically acceptable salt thereof of the invention which is selected from:

N-(5-(((2S,4R)-4-((1-chloroisoquinolin-6-yl)oxy)-2-methylpyrrolidin-1-yl)methyl)thiazol-2-yl)acetamide,
2-(((3R,5S)-1-((2-acetamidothiazol-5-yl)methyl)-5-methylpyrrolidin-3-yl)oxy)quinoline-6-carboxamide,
N-(5-(((2S,4R)-2-methyl-4-((5-methylthieno[2,3-d]pyrimidin-2-yl)oxy)pyrrolidin-1-yl)methyl)thiazol-2-yl)acetamide,
N-(5-(((2S,4R)-2-methyl-4-(thieno[3,2-b]pyridin-5-yloxy)pyrrolidin-1-yl)methyl)thiazol-2-yl)acetamide,
N-(5-(((2S,4R)-2-methyl-4-(thieno[3,2-b]pyridin-7-yloxy)pyrrolidin-1-yl)methyl)thiazol-2-yl)acetamide,
N-(5-(((2S,4R)-4-((7-fluoroquinolin-2-yl)oxy)-2-methylpyrrolidin-1-yl)methyl)thiazol-2-yl)acetamide,
N-(5-(((2S,4R)-4-((4-chloro-7-fluoroquinolin-6-yl)oxy)-2-methylpyrrolidin-1-yl)methyl)thiazol-2-yl)acetamide,
N-(5-(((2S,4R)-2-methyl-4-(quinolin-2-yloxy)pyrrolidin-1-yl)methyl)thiazol-2-yl)acetamide,
N-(5-(((2S,4R)-4-((6,7-difluoroquinoxalin-2-yl)oxy)-2-methylpyrrolidin-1-yl)methyl)thiazol-2-yl)acetamide,
N-(5-(((2S,4R)-2-methyl-4-((5,6,7,8-tetrahydroquinazolin-2-yl)oxy)pyrrolidin-1-yl)methyl)thiazol-2-yl)acetamide,
N-(5-(((2S,4R)-2-methyl-4-(thieno[2,3-c]pyridin-7-yloxy)pyrrolidin-1-yl)methyl)thiazol-2-yl)acetamide,
N-(5-(((2S,4R)-2-methyl-4-((2-methyl-4-(trifluoromethyl)-2H-pyrazolo[3,4-b]pyridin-6-yl)oxy)pyrrolidin-1-yl)methyl)thiazol-2-yl)acetamide,
N-(5-(((2S,4R)-2-methyl-4-((2-methylquinolin-4-yl)oxy)pyrrolidin-1-yl)methyl)thiazol-2-yl)acetamide,
N-(5-(((2S,4R)-4-((7-(difluoromethoxy)quinazolin-4-yl)oxy)-2-methylpyrrolidin-1-yl)methyl)thiazol-2-yl)acetamide,
N-(5-(((2S,4R)-4-((2-ethylfuro[3,2-c]pyridin-4-yl)oxy)-2-methylpyrrolidin-1-yl)methyl)thiazol-2-yl)acetamide,
N-(5-(((2S,4R)-2-methyl-4-((2-methylfuro[3,2-c]pyridin-4-yl)oxy)pyrrolidin-1-yl)methyl)thiazol-2-yl)acetamide,
N-(5-(((2S,4R)-4-((7-fluoroquinolin-4-yl)oxy)-2-methylpyrrolidin-1-yl)methyl)thiazol-2-yl)acetamide,
N-(5-(((2S,4R)-2-methyl-4-((3-(trifluoromethyl)-[1,2,4]triazolo[4,3-b]pyridazin-6-yl)oxy)pyrrolidin-1-yl)methyl)thiazol-2-yl)acetamide,
N-(5-(((2S,4R)-2-methyl-4-(quinolin-4-yloxy)pyrrolidin-1-yl)methyl)thiazol-2-yl)acetamide,
N-(5-(((2S,4R)-4-((7,8-dimethyl-3-(trifluoromethyl)-[1,2,4]triazolo[4,3-b]pyridazin-6-yl)oxy)-2-methylpyrrolidin-1-yl)methyl)thiazol-2-yl)acetamide,
4-(((3R,5S)-1-((2-acetamidothiazol-5-yl)methyl)-5-methylpyrrolidin-3-yl)oxy)quinoline-2-carboxamide,
N-(5-(((2S,4R)-4-(furo[3,2-c]pyridin-4-yloxy)-2-methylpyrrolidin-1-yl)methyl)thiazol-2-yl)acetamide,
N-(5-(((2S,4R)-2-methyl-4-((6-methylquinolin-4-yl)oxy)pyrrolidin-1-yl)methyl)thiazol-2-yl)acetamide,
N-(5-(((2S,4R)-2-methyl-4-(thieno[3,2-c]pyridin-4-yloxy)pyrrolidin-1-yl)methyl)thiazol-2-yl)acetamide,
4-(((3R,5S)-1-((2-acetamidothiazol-5-yl)methyl)-5-methylpyrrolidin-3-yl)oxy)furo[3,2-c]pyridine-2-carboxamide,
N-(5-(((2S,4R)-4-(isoquinolin-1-yloxy)-2-methylpyrrolidin-1-yl)methyl)thiazol-2-yl)acetamide,
N-(5-(((2S,4R)-4-((6-fluoroisoquinolin-1-yl)oxy)-2-methylpyrrolidin-1-yl)methyl)thiazol-2-yl)acetamide,
N-(5-(((2S,4R)-2-methyl-4-((2-(trifluoromethyl)pyrazolo[1,5-a]pyrazin-4-yl)oxy)pyrrolidin-1-yl)methyl)thiazol-2-yl)acetamide,
N-(5-(((2S,4R)-2-methyl-4-((3-methylquinolin-2-yl)oxy)pyrrolidin-1-yl)methyl)thiazol-2-yl)acetamide,
N-(5-(((2S,4R)-2-methyl-4-((7-methylisoquinolin-1-yl)oxy)pyrrolidin-1-yl)methyl)thiazol-2-yl)acetamide,
N-(5-(((2S,4R)-4-((2-cyanoquinolin-3-yl)oxy)-2-methylpyrrolidin-1-yl)methyl)thiazol-2-yl)acetamide,
N-(5-(((2S,4R)-4-((3-cyano-5,6,7,8-tetrahydroquinolin-2-yl)oxy)-2-methylpyrrolidin-1-yl)methyl)thiazol-2-yl)acetamide,
N-(5-(((2S,4R)-2-methyl-4-((5,6,7,8-tetrahydroquinolin-4-yl)oxy)pyrrolidin-1-yl)methyl)thiazol-2-yl)acetamide,
N-(5-(((2S,4R)-2-methyl-4-((2-(trifluoromethyl)-[1,2,4]triazolo[1,5-a]pyrimidin-7-yl)oxy)pyrrolidin-1-yl)methyl)thiazol-2-yl)acetamide, N-(5-(((2S,4R)-4-((6,7-difluoroquinazolin-4-yl)oxy)-2-methylpyrrolidin-1-yl)methyl)thiazol-2-yl)acetamide,
N-(5-(((2S,4R)-4-((2-(difluoromethyl)thiazolo[5,4-d]pyrimidin-7-yl)oxy)-2-methylpyrrolidin-1-yl)methyl)thiazol-2-yl)acetamide,
N-(5-(((2S,4R)-4-((3-cyanoquinolin-2-yl)oxy)-2-methylpyrrolidin-1-yl)methyl)thiazol-2-yl)acetamide,
N-(5-(((2S,4R)-4-((7-chloroimidazo[1,2-a]pyridin-8-yl)oxy)-2-methylpyrrolidin-1-yl)methyl)thiazol-2-yl)acetamide,
N-(5-(((2S,4R)-4-(imidazo[1,2-c]pyrimidin-7-yloxy)-2-methylpyrrolidin-1-yl)methyl)thiazol-2-yl)acetamide,
N-(5-(((2S,4R)-2-methyl-4-((2-methylimidazo[1,2-c]pyrimidin-7-yl)oxy)pyrrolidin-1-yl)methyl)thiazol-2-yl)acetamide,
N-(5-(((2S,4R)-2-methyl-4-((2-(trifluoromethyl)imidazo[1,2-c]pyrimidin-7-yl)oxy)pyrrolidin-1-yl)methyl)thiazol-2-yl)acetamide,
N-(5-(((2S,4R)-4-(imidazo[1,2-a]pyridin-7-yloxy)-2-methylpyrrolidin-1-yl)methyl)thiazol-2-yl)acetamide,
N-(4-fluoro-5-(((2S,4R)-4-(imidazo[1,2-a]pyridin-7-yloxy)-2-methylpyrrolidin-1-yl)methyl)thiazol-2-yl)acetamide,
N-(5-(((2S,4R)-2-methyl-4-((2-methyl-2H-indazol-5-yl)oxy)pyrrolidin-1-yl)methyl)thiazol-2-yl)acetamide,
N-(5-(((2S,4R)-4-(benzo[d]oxazol-6-yloxy)-2-methylpyrrolidin-1-yl)methyl)thiazol-2-yl)acetamide,
N-(5-(((2S,4R)-4-(furo[2,3-d]pyrimidin-4-yloxy)-2-methylpyrrolidin-1-yl)methyl)thiazol-2-yl)acetamide,
N-(4-fluoro-5-(((2S,4R)-4-(furo[3,2-b]pyridin-7-yloxy)-2-methylpyrrolidin-1-yl)methyl)thiazol-2-yl)acetamide,
N-(5-(((2S,4R)-4-(furo[3,2-b]pyridin-7-yloxy)-2-methylpyrrolidin-1-yl)methyl)thiazol-2-yl)acetamide,
N-(4-fluoro-5-(((2S,4R)-2-methyl-4-(pyrazolo[1,5-a]pyridin-5-yloxy)pyrrolidin-1-yl)methyl)thiazol-2-yl)acetamide,
N-(4-fluoro-5-(((2S,4R)-2-methyl-4-((2-methyl-2H-indazol-5-yl)oxy)pyrrolidin-1-yl)methyl)thiazol-2-yl)acetamide,
N-(4-fluoro-5-(((2S,4R)-2-methyl-4-((2-methyl-2H-indazol-6-yl)oxy)pyrrolidin-1-yl)methyl)thiazol-2-yl)acetamide,
N-(5-(((2S,4R)-2-methyl-4-((2-methyl-2H-indazol-6-yl)oxy)pyrrolidin-1-yl)methyl)thiazol-2-yl)acetamide,
N-(5-(((2S,4R)-2-methyl-4-((2-methylpyrazolo[1,5-a]pyrazin-6-yl)oxy)pyrrolidin-1-yl)methyl)thiazol-2-yl)acetamide,
N-(4-fluoro-5-(((2S,4R)-2-methyl-4-(pyrazolo[1,5-a]pyridin-6-yloxy)pyrrolidin-1-yl)methyl)thiazol-2-yl)acetamide,
N-(5-(((2S,4R)-2-methyl-4-((2-methyl-2H-indazol-6-yl)oxy)pyrrolidin-1-yl)methyl)thiazol-2-yl)acetamide,
N-(4-fluoro-5-(((2S,4R)-2-methyl-4-((2-methyl-2H-indazol-6-yl)oxy)pyrrolidin-1-yl)methyl)thiazol-2-yl)acetamide,
N-(5-(((2S,4R)-2-methyl-4-((2-methyl-2H-indazol-5-yl)oxy)pyrrolidin-1-yl)methyl)thiazol-2-yl)acetamide,
N-(4-fluoro-5-(((2S,4R)-2-methyl-4-((2-methyl-2H-indazol-5-yl)oxy)pyrrolidin-1-yl)methyl)thiazol-2-yl)acetamide,
N-(5-(((2S,4R)-2-methyl-4-(pyrazolo[1,5-a]pyridin-5-yloxy)pyrrolidin-1-yl)methyl)thiazol-2-yl)acetamide,
N-(4-fluoro-5-(((2S,4R)-2-methyl-4-(pyrazolo[1,5-a]pyridin-5-yloxy)pyrrolidin-1-yl)methyl)thiazol-2-yl)acetamide,
N-(5-(((2S,4R)-2-methyl-4-(pyrazolo[1,5-a]pyrimidin-5-yloxy)pyrrolidin-1-yl)methyl)thiazol-2-yl)acetamide,
N-(4-fluoro-5-(((2S,4R)-2-methyl-4-(pyrazolo[1,5-a]pyrimidin-5-yloxy)pyrrolidin-1-yl)methyl)thiazol-2-yl)acetamide,
N-(5-(((2S,4R)-4-(imidazo[1,2-a]pyridin-5-yloxy)-2-methylpyrrolidin-1-yl)methyl)thiazol-2-yl)acetamide,
N-(4-fluoro-5-(((2S,4R)-4-(imidazo[1,2-a]pyridin-5-yloxy)-2-methylpyrrolidin-1-yl)methyl)thiazol-2-yl)acetamide,
N-(5-(((2S,4R)-4-(furo[3,2-b]pyridin-5-yloxy)-2-methylpyrrolidin-1-yl)methyl)thiazol-2-yl)acetamide,
N-(4-fluoro-5-(((2S,4R)-4-(furo[3,2-b]pyridin-5-yloxy)-2-methylpyrrolidin-1-yl)methyl)thiazol-2-yl)acetamide,
N-(5-(((2S,4R)-4-(furo[3,2-b]pyridin-7-yloxy)-2-methylpyrrolidin-1-yl)methyl)thiazol-2-yl)acetamide,
N-(4-fluoro-5-(((2S,4R)-4-(furo[3,2-b]pyridin-7-yloxy)-2-methylpyrrolidin-1-yl)methyl)thiazol-2-yl)acetamide,
N-(5-(((2S,4R)-4-(furo[3,2-c]pyridin-4-yloxy)-2-methylpyrrolidin-1-yl)methyl)thiazol-2-yl)acetamide,
N-(4-fluoro-5-(((2S,4R)-4-(furo[3,2-c]pyridin-4-yloxy)-2-methylpyrrolidin-1-yl)methyl)thiazol-2-yl)acetamide,
N-(5-(((2S,4R)-4-(furo[3,2-d]pyrimidin-4-yloxy)-2-methylpyrrolidin-1-yl)methyl)thiazol-2-yl)acetamide,
N-(4-fluoro-5-(((2S,4R)-4-(furo[3,2-d]pyrimidin-4-yloxy)-2-methylpyrrolidin-1-yl)methyl)thiazol-2-yl)acetamide,
N-(5-(((2S,4R)-4-(furo[2,3-d]pyrimidin-4-yloxy)-2-methylpyrrolidin-1-yl)methyl)thiazol-2-yl)acetamide,
N-(4-fluoro-5-(((2S,4R)-4-(furo[2,3-d]pyrimidin-4-yloxy)-2-methylpyrrolidin-1-yl)methyl)thiazol-2-yl)acetamide,
N-(5-(((2S,4R)-4-(benzo[d]oxazol-6-yloxy)-2-methylpyrrolidin-1-yl)methyl)thiazol-2-yl)acetamide,
N-(5-(((2S,4R)-4-(benzo[d]oxazol-6-yloxy)-2-methylpyrrolidin-1-yl)methyl)-4-fluorothiazol-2-yl)acetamide,
N-(5-(((2S,4R)-2-methyl-4-(quinolin-2-yloxy)pyrrolidin-1-yl)methyl)thiazol-2-yl)acetamide,
N-(4-fluoro-5-(((2S,4R)-2-methyl-4-(quinolin-2-yloxy)pyrrolidin-1-yl)methyl)thiazol-2-yl)acetamide,
N-(5-(((2S,4R)-4-((7-methoxyquinolin-2-yl)oxy)-2-methylpyrrolidin-1-yl)methyl)thiazol-2-yl)acetamide,
N-(4-fluoro-5-(((2S,4R)-4-((7-methoxyquinolin-2-yl)oxy)-2-methylpyrrolidin-1-yl)methyl)thiazol-2-yl)acetamide,
N-(5-(((2S,4R)-4-((1,8-naphthyridin-2-yl)oxy)-2-methylpyrrolidin-1-yl)methyl)thiazol-2-yl)acetamide,
N-(5-(((2S,4R)-4-((1,8-naphthyridin-2-yl)oxy)-2-methylpyrrolidin-1-yl)methyl)-4-fluorothiazol-2-yl)acetamide,
N-(5-(((2S,4R)-2-methyl-4-((2-methyl-2H-indazol-4-yl)oxy)pyrrolidin-1-yl)methyl)thiazol-2-yl)acetamide,
N-(4-fluoro-5-(((2S,4R)-2-methyl-4-((2-methyl-2H-indazol-4-yl)oxy)pyrrolidin-1-yl)methyl)thiazol-2-yl)acetamide,
N-(5-(((2S,4R)-2-methyl-4-((2-methyl-2H-pyrazolo[3,4-b]pyridin-4-yl)oxy)pyrrolidin-1-yl)methyl)thiazol-2-yl)acetamide,
N-(4-fluoro-5-(((2S,4R)-2-methyl-4-((2-methyl-2H-pyrazolo[3,4-b]pyridin-4-yl)oxy)pyrrolidin-1-yl)methyl)thiazol-2-yl)acetamide,
N-(5-(((2S,4R)-2-methyl-4-((2-methyl-2H-pyrazolo[3,4-c]pyridin-5-yl)oxy)pyrrolidin-1-yl)methyl)thiazol-2-yl)acetamide,
N-(5-(((2S,4R)-2-methyl-4-((1-methyl-1H-pyrazolo[3,4-c]pyridin-5-yl)oxy)pyrrolidin-1-yl)methyl)thiazol-2-yl)acetamide,
N-(4-fluoro-5-(((2S,4R)-2-methyl-4-((2-methyl-2H-pyrazolo[3,4-c]pyridin-5-yl)oxy)pyrrolidin-1-yl)methyl)thiazol-2-yl)acetamide, N-(4-fluoro-5-(((2S,4R)-2-methyl-4-((1-methyl-1H-pyrazolo[3,4-c]pyridin-5-yl)oxy)pyrrolidin-1-yl)methyl)thiazol-2-yl)acetamide, N-(5-(((2S,4R)-2-methyl-4-((3-methyl-3H-imidazo[4,5-b]pyridin-2-yl)oxy)pyrrolidin-1-yl)methyl)thiazol-2-yl)acetamide, N-(4-fluoro-5-(((2S,4R)-4-(imidazo[1,2-a]pyrimidin-2-yloxy)-2-methylpyrrolidin-1-yl)methyl)thiazol-2-yl)acetamide, N-(5-(((2S,4R)-4-(furo[3,2-d]pyrimidin-4-yloxy)-2-methylpyrrolidin-1-yl)methyl)thiazol-2-yl)acetamide, N-(4-fluoro-5-(((2S,4R)-4-(furo[3,2-d]pyrimidin-4-yloxy)-2-methylpyrrolidin-1-yl)methyl)thiazol-2-yl)acetamide, N-(5-(((2S,4R)-4-(imidazo[1,2-a]pyrazin-8-yloxy)-2-methylpyrrolidin-1-yl)methyl)thiazol-2-yl)acetamide, N-(4-fluoro-5-(((2S,4R)-4-(imidazo[1,2-a]pyrazin-8-yloxy)-2-methylpyrrolidin-1-yl)methyl)thiazol-2-yl)acetamide, N-(5-(((2S,4R)-4-(imidazo[1,2-c]pyrimidin-5-yloxy)-2-methylpyrrolidin-1-yl)methyl)thiazol-2-yl)acetamide, N-(4-fluoro-5-(((2S,4R)-4-(imidazo[1,2-c]pyrimidin-5-yloxy)-2-methylpyrrolidin-1-yl)methyl)thiazol-2-yl)acetamide, N-(5-(((2S,4R)-4-(imidazo[1,2-a]pyrazin-5-yloxy)-2-methylpyrrolidin-1-yl)methyl)thiazol-2-yl)acetamide, N-(4-fluoro-5-(((2S,4R)-4-(imidazo[1,2-a]pyrazin-5-yloxy)-2-methylpyrrolidin-1-yl)methyl)thiazol-2-yl)acetamide, N-(5-(((2S,4R)-4-([1,2,4]triazolo[4,3-a]pyrazin-8-yloxy)-2-methylpyrrolidin-1-yl)methyl)-4-fluorothiazol-2-yl)acetamide, N-(5-(((2S,4R)-4-([1,2,4]triazolo[1,5-a]pyridin-5-yloxy)-2-methylpyrrolidin-1-yl)methyl)-4-fluorothiazol-2-yl)acetamide, N-(4-fluoro-5-(((2S,4R)-2-methyl-4-((2-methylimidazo[1,2-a]pyrazin-8-yl)oxy)pyrrolidin-1-yl)methyl)thiazol-2-yl)acetamide, N-(4-fluoro-5-(((2S,4R)-2-methyl-4-(pyrazolo[1,5-a]pyrimidin-7-yloxy)pyrrolidin-1-yl)methyl)thiazol-2-yl)acetamide, N-(4-fluoro-5-(((2S,4R)-2-methyl-4-((5-methyl-[1,2,4]triazolo[1,5-a]pyridin-6-yl)oxy)pyrrolidin-1-yl)methyl)thiazol-2-yl)acetamide, N-(4-fluoro-5-(((2S,4R)-2-methyl-4-(pyrrolo[2,1-f][1,2,4]triazin-4-yloxy)pyrrolidin-1-yl)methyl)thiazol-2-yl)acetamide, N-(5-(((2S,4R)-4-([1,2,4]triazolo[1,5-a]pyridin-7-yloxy)-2-methylpyrrolidin-1-yl)methyl)-4-fluorothiazol-2-yl)acetamide, N-(4-fluoro-5-(((2S,4R)-4-(imidazo[1,2-b]pyridazin-6-yloxy)-2-methylpyrrolidin-1-yl)methyl)thiazol-2-yl)acetamide, N-(4-fluoro-5-(((2S,4R)-2-methyl-4-((5-methyl-5H-pyrrolo[2,3-b]pyrazin-2-yl)oxy)pyrrolidin-1-yl)methyl)thiazol-2-yl)acetamide, N-(4-fluoro-5-(((2S,4R)-2-methyl-4-((7-methyl-7H-pyrrolo[2,3-d]pyrimidin-2-yl)oxy)pyrrolidin-1-yl)methyl)thiazol-2-yl)acetamide, N-(4-fluoro-5-(((2S,4R)-4-(imidazo[2,1-b][1,3,4]thiadiazol-2-yloxy)-2-methylpyrrolidin-1-yl)methyl)thiazol-2-yl)acetamide, N-(4-fluoro-5-(((2S,4R)-2-methyl-4-((2-methylpyrazolo[1,5-a]pyrimidin-5-yl)oxy)pyrrolidin-1-yl)methyl)thiazol-2-yl)acetamide, N-(4-fluoro-5-(((2S,4R)-2-methyl-4-((9-methyl-9H-purin-2-yl)oxy)pyrrolidin-1-yl)methyl)thiazol-2-yl)acetamide, N-(5-(((2S,4R)-4-((1,6-naphthyridin-5-yl)oxy)-2-methylpyrrolidin-1-yl)methyl)-4-fluorothiazol-2-yl)acetamide, N-(4-fluoro-5-(((2S,4R)-2-methyl-4-(pyrido[3,4-b]pyrazin-5-yloxy)pyrrolidin-1-yl)methyl)thiazol-2-yl)acetamide, N-(4-fluoro-5-(((2S,4R)-2-methyl-4-(pyrido[3,2-d]pyrimidin-4-yloxy)pyrrolidin-1-yl)methyl)thiazol-2-yl)acetamide, N-(4-fluoro-5-(((2S,4R)-2-methyl-4-(pyrido[2,3-b]pyrazin-6-yloxy)pyrrolidin-1-yl)methyl)thiazol-2-yl)acetamide, N-(4-fluoro-5-(((2S,4R)-2-methyl-4-(pyrido[3,4-d]pyrimidin-4-yloxy)pyrrolidin-1-yl)methyl)thiazol-2-yl)acetamide, N-(4-fluoro-5-(((2S,4R)-2-methyl-4-(pyrido[2,3-d]pyrimidin-4-yloxy)pyrrolidin-1-yl)methyl)thiazol-2-yl)acetamide, N-(5-(((2S,4R)-4-((1,6-naphthyridin-2-yl)oxy)-2-methylpyrrolidin-1-yl)methyl)-4-fluorothiazol-2-yl)acetamide, N-(4-fluoro-5-(((2S,4R)-4-((6-methoxypyrazolo[1,5-a]pyrimidin-3-yl)oxy)-2-methylpyrrolidin-1-yl)methyl)thiazol-2-yl)acetamide, N-(4-fluoro-5-(((2S,4R)-4-((8-fluoroquinazolin-4-yl)oxy)-2-methylpyrrolidin-1-yl)methyl)thiazol-2-yl)acetamide, N-(4-fluoro-5-(((2S,4R)-4-((6-fluoroquinazolin-4-yl)oxy)-2-methylpyrrolidin-1-yl)methyl)thiazol-2-yl)acetamide, N-(4-fluoro-5-(((2S,4R)-4-((5-fluoroquinazolin-4-yl)oxy)-2-methylpyrrolidin-1-yl)methyl)thiazol-2-yl)acetamide, N-(4-fluoro-5-(((2S,4R)-4-((7-fluoro-6-methoxyquinazolin-4-yl)oxy)-2-methylpyrrolidin-1-yl)methyl)thiazol-2-yl)acetamide, N-(4-fluoro-5-(((2S,4R)-4-((6-fluorobenzo[d]isoxazol-3-yl)oxy)-2-methylpyrrolidin-1-yl)methyl)thiazol-2-yl)acetamide, N-(4-fluoro-5-(((2S,4R)-4-((4-fluorobenzo[d]oxazol-2-yl)oxy)-2-methylpyrrolidin-1-yl)methyl)thiazol-2-yl)acetamide, N-(4-fluoro-5-(((2S,4R)-4-((7-fluoro-6-methoxyquinolin-4-yl)oxy)-2-methylpyrrolidin-1-yl)methyl)thiazol-2-yl)acetamide, N-(4-fluoro-5-(((2S,4R)-4-((7-fluoro-1,5-naphthyridin-4-yl)oxy)-2-methylpyrrolidin-1-yl)methyl)thiazol-2-yl)acetamide, N-(4-fluoro-5-(((2S,4R)-4-((6-fluoro-7-methoxyisoquinolin-3-yl)oxy)-2-methylpyrrolidin-1-yl)methyl)thiazol-2-yl)acetamide, N-(4-fluoro-5-(((2S,4R)-4-((6-fluoro-1-methoxyisoquinolin-3-yl)oxy)-2-methylpyrrolidin-1-yl)methyl)thiazol-2-yl)acetamide, N-(5-(((2S,4R)-4-((1-chloro-6-methoxyisoquinolin-7-yl)oxy)-2-methylpyrrolidin-1-yl)methyl)-4-fluorothiazol-2-yl)acetamide, N-(4-fluoro-5-(((2S,4R)-4-((6-fluorophthalazin-1-yl)oxy)-2-methylpyrrolidin-1-yl)methyl)thiazol-2-yl)acetamide, N-(4-fluoro-5-(((2S,4R)-2-methyl-4-((2-methyl-2H-pyrazolo[4,3-b]pyridin-7-yl)oxy)pyrrolidin-1-yl)methyl)thiazol-2-yl)acetamide, N-(4-fluoro-5-(((2S,4R)-2-methyl-4-((1-methyl-1H-pyrazolo[4,3-b]pyridin-7-yl)oxy)pyrrolidin-1-yl)methyl)thiazol-2-yl)acetamide, N-(4-fluoro-5-(((2S,4R)-2-methyl-4-((2-methyl-2H-pyrazolo[4,3-c]pyridin-4-yl)oxy)pyrrolidin-1-yl)methyl)thiazol-2-yl)acetamide, N-(4-fluoro-5-(((2S,4R)-2-methyl-4-((2-methyl-2H-pyrazolo[3,4-c]pyridin-7-yl)oxy)pyrrolidin-1-yl)methyl)thiazol-2-yl)acetamide, N-(4-fluoro-5-(((2S,4R)-2-methyl-4-((1-methyl-1H-pyrazolo[4,3-c]pyridin-4-yl)oxy)pyrrolidin-1-yl)methyl)thiazol-2-yl)acetamide,
N-(4-fluoro-5-(((2S,4R)-2-methyl-4-((1-methyl-1H-pyrazolo[3,4-b]pyridin-4-yl)oxy)pyrrolidin-1-yl)methyl)thiazol-2-yl)acetamide,
N-(4-fluoro-5-(((2S,4R)-2-methyl-4-((2-methyl-2H-pyrazolo[3,4-b]pyridin-4-yl)oxy)pyrrolidin-1-yl)methyl)thiazol-2-yl)acetamide,
N-(4-fluoro-5-(((2S,4R)-2-methyl-4-(pyrazolo[1,5-a]pyridin-4-yloxy)pyrrolidin-1-yl)methyl)thiazol-2-yl)acetamide,
N-(4-fluoro-5-(((2S,4R)-2-methyl-4-((1-methyl-1H-pyrazolo[3,4-d]pyrimidin-6-yl)oxy)pyrrolidin-1-yl)methyl)thiazol-2-yl)acetamide,
N-(4-fluoro-5-(((2S,4R)-2-methyl-4-((1-methyl-1H-pyrazolo[3,4-d]pyrimidin-4-yl)oxy)pyrrolidin-1-yl)methyl)thiazol-2-yl)acetamide,
N-(4-fluoro-5-(((2S,4R)-2-methyl-4-((2-methyl-[1,2,4]triazolo[1,5-a]pyridin-6-yl)oxy)pyrrolidin-1-yl)methyl)thiazol-2-yl)acetamide,
N-(5-(((2S,4R)-4-([1,2,4]triazolo[1,5-c]pyrimidin-5-yloxy)-2-methylpyrrolidin-1-yl)methyl)-4-fluorothiazol-2-yl)acetamide,
N-(5-(((2S,4R)-4-([1,2,4]triazolo[4,3-a]pyridin-7-yloxy)-2-methylpyrrolidin-1-yl)methyl)-4-fluorothiazol-2-yl)acetamide,
N-(4-fluoro-5-(((2S,4R)-2-methyl-4-(tetrazolo[1,5-a]pyridin-5-yloxy)pyrrolidin-1-yl)methyl)thiazol-2-yl)acetamide,
N-(4-fluoro-5-(((2S,4R)-4-((8-methoxy-[1,2,4]triazolo[1,5-a]pyridin-2-yl)oxy)-2-methylpyrrolidin-1-yl)methyl)thiazol-2-yl)acetamide,
N-(5-(((2S,4R)-4-([1,2,3]triazolo[1,5-a]pyridin-5-yloxy)-2-methylpyrrolidin-1-yl)methyl)-4-fluorothiazol-2-yl)acetamide,
N-(4-fluoro-5-(((2S,4R)-2-methyl-4-((3-methyl-3H-[1,2,3]triazolo[4,5-b]pyridin-5-yl)oxy)pyrrolidin-1-yl)methyl)thiazol-2-yl)acetamide,
N-(4-fluoro-5-(((2S,4R)-2-methyl-4-((2-methyl-2H-[1,2,3]triazolo[4,5-b]pyridin-5-yl)oxy)pyrrolidin-1-yl)methyl)thiazol-2-yl)acetamide,
N-(4-fluoro-5-(((2S,4R)-2-methyl-4-((1-methyl-1H-[1,2,3]triazolo[4,5-b]pyridin-5-yl)oxy)pyrrolidin-1-yl)methyl)thiazol-2-yl)acetamide,
N-(5-(((2S,4R)-4-((1-(difluoromethyl)-1H-pyrazolo[4,3-b]pyridin-5-yl)oxy)-2-methylpyrrolidin-1-yl)methyl)-4-fluorothiazol-2-yl)acetamide,
N-(5-(((2S,4R)-4-((2-(difluoromethyl)-2H-pyrazolo[4,3-b]pyridin-5-yl)oxy)-2-methylpyrrolidin-1-yl)methyl)-4-fluorothiazol-2-yl)acetamide,
N-(5-(((2S,4R)-2-methyl-4-(pyrazolo[1,5-a]pyridin-6-yloxy)pyrrolidin-1-yl)methyl)thiazol-2-yl)acetamide,
N-(5-(((2S,4R)-4-(imidazo[1,2-a]pyridin-8-yloxy)-2-methylpyrrolidin-1-yl)methyl)thiazol-2-yl)acetamide,
N-(4-fluoro-5-(((2S,4R)-4-(imidazo[1,2-a]pyridin-8-yloxy)-2-methylpyrrolidin-1-yl)methyl)thiazol-2-yl)acetamide,
N-(4-fluoro-5-(((2S,4R)-2-methyl-4-(oxazolo[4,5-b]pyridin-2-yloxy)pyrrolidin-1-yl)methyl)thiazol-2-yl)acetamide,
N-(5-(((2S,4R)-2-methyl-4-((2-methyl-2H-indazol-7-yl)oxy)pyrrolidin-1-yl)methyl)thiazol-2-yl)acetamide,
N-(5-(((2S,4R)-2-methyl-4-((1-methyl-1H-indazol-7-yl)oxy)pyrrolidin-1-yl)methyl)thiazol-2-yl)acetamide,
N-(4-fluoro-5-(((2S,4R)-2-methyl-4-((2-methyl-2H-indazol-7-yl)oxy)pyrrolidin-1-yl)methyl)thiazol-2-yl)acetamide,
N-(5-(((2S,4R)-2-methyl-4-((1-methyl-1H-pyrrolo[2,3-b]pyridin-6-yl)oxy)pyrrolidin-1-yl)methyl)thiazol-2-yl)acetamide,
N-(4-fluoro-5-(((2S,4R)-2-methyl-4-((1-methyl-1H-pyrrolo[2,3-b]pyridin-6-yl)oxy)pyrrolidin-1-yl)methyl)thiazol-2-yl)acetamide,
N-(4-fluoro-5-(((2S,4R)-4-(imidazo[1,2-a]pyrimidin-6-yloxy)-2-methylpyrrolidin-1-yl)methyl)thiazol-2-yl)acetamide,
N-(5-(((2S,4R)-4-([1,2,4]triazolo[4,3-a]pyrimidin-6-yloxy)-2-methylpyrrolidin-1-yl)methyl)-4-fluorothiazol-2-yl)acetamide,
N-(5-(((2S,4R)-4-((7-methoxy-1,8-naphthyridin-2-yl)oxy)-2-methylpyrrolidin-1-yl)methyl)thiazol-2-yl)acetamide,
N-(4-fluoro-5-(((2S,4R)-4-((7-methoxy-1,8-naphthyridin-2-yl)oxy)-2-methylpyrrolidin-1-yl)methyl)thiazol-2-yl)acetamide,
N-(5-(((2S,4R)-2-Methyl-4-((2-methyloxazolo[4,5-b]pyridin-6-yl)oxy)pyrrolidin-1-yl)methyl)thiazol-2-yl)acetamide,
N-(4-Fluoro-5-(((2S,4R)-2-methyl-4-((2-methyloxazolo[4,5-b]pyridin-6-yl)oxy)pyrrolidin-1-yl)methyl)thiazol-2-yl)acetamide,
N-(4-fluoro-5-(((2S,4R)-2-methyl-4-(pyrazolo[1,5-a]pyrimidin-6-yloxy)pyrrolidin-1-yl)methyl)thiazol-2-yl)acetamide,
N-(4-fluoro-5-(((2S,4R)-2-methyl-4-(pyrazolo[1,5-a]pyrazin-6-yloxy)pyrrolidin-1-yl)methyl)thiazol-2-yl)acetamide,
N-(5-(((2S,4R)-4-([1,2,4]triazolo[1,5-a]pyridin-6-yloxy)-2-methylpyrrolidin-1-yl)methyl)-4-fluorothiazol-2-yl)acetamide,
N-(4-fluoro-5-(((2S,4R)-2-methyl-4-((2-methyl-[1,2,4]triazolo[1,5-a]pyridin-7-yl)oxy)pyrrolidin-1-yl)methyl)thiazol-2-yl)acetamide, and
N-(5-(((2S,4R)-4-([1,2,4]triazolo[4,3-a]pyrazin-3-yloxy)-2-methylpyrrolidin-1-yl)methyl)-4-fluorothiazol-2-yl)acetamide.

In a thirtieth embodiment, a compound of the invention is selected from embodiment twenty-nine in a neutral form.

As used herein, the term "alkyl" refers to a fully saturated branched or straight chained hydrocarbon moiety. Unless otherwise specified, the alkyl comprises 1 to 12 carbon atoms, preferably 1 to 8 carbon atoms, more preferably 1 to 6 carbon atoms or most preferably 1 to 4 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl and n-hexyl.

As used herein, the term "alkoxy" refers to the group —OR, in which R is an alkyl or a cycloalkyl, as that term is defined above. Non-limiting examples of alkoxy groups include: —OCH$_3$, —OCH$_2$CH$_3$, —OCH$_2$CH$_2$CH$_3$, —OCH(CH$_3$)$_2$, —OCH(CH$_2$)$_2$, —O-cyclopropyl, —O-cyclobutyl, —O-cyclopentyl and —O-cyclohexyl.

As used herein, the terms "aryl", "aryl group", "aryl ring", "aromatic group" and "aromatic ring" are used interchangeably to refer to an aromatic 5- to 12-membered monocyclic or bicyclic carbon ring system (e.g., fused, spiro or bridged). Examples of monocyclic aromatic ring systems include, but are not limited to, phenyl, and the like. Examples of bicyclic aromatic ring systems include, but are not limited to, naphthyl, and the like. As used herein, a bicyclic aryl or a bicyclic aromatic ring system includes bicyclic ring systems where a monocyclic aryl fused to another monocyclic aryl, and bicyclic ring systems where a monocyclic aryl is fused to a monocyclic cycloaliphatic ring.

The number of carbon atoms in a group is specified herein by the prefix "$C_{x\text{-}xx}$", wherein x and xx are integers. For example, "$C_{1\text{-}4}$ alkyl" is an alkyl group which has from 1 to 4 carbon atoms.

As used herein, the term "halogen" or "halo" may be fluoro, chloro, bromo or iodo.

As used herein, the term "haloalkyl" refers to an alkyl, as defined herein, that is substituted by one or more halo groups as defined herein.

As used herein, the terms "cycloaliphatic", "cycloaliphatic group" or "cycloaliphatic ring" are used interchangeably to refer to a saturated (i.e., a cycloalkyl that is also defined below), unsaturated non-aromatic, monocyclic or bicyclic (e.g., fused, spiro or bridged) carbon ring system which has 3- to 12-ring members. Examples of monocyclic cycloaliphatic ring systems include, but are not limited to, cyclopropyl, cyclopentenyl, and the like. Examples of bicyclic cycloaliphatic ring systems include, but are not limited to octahydronapthalenyl, decalinyl, and the like.

As used herein, the terms "heterocyclyl", "heterocyclyl group", "heterocyclic" and "heterocyclic ring" are used interchangeably to refer to a saturated, unsaturated non-aromatic, monocyclic or bicyclic (e.g., fused, spiro or bridged) ring system which has from 3- to 12-ring members, or in particular 3- to 6-ring members or 5- to 7-ring members, at least one of which is a heteroatom, and up to 4 (e.g., 1, 2, 3 or 4) of which may be heteroatoms, wherein the heteroatoms are independently selected from O, S and N, and wherein C can be oxidized (e.g., C(=O)), N can be oxidized (e.g., N(O)) or quaternized (e.g. $N^+$), and S can be optionally oxidized to sulfoxide and sulfone. Examples of monocyclic heterocyclic ring systems include aziridinyl, azetidinyl, oxetanyl, thietanyl, pyrrolidinyl, tetrahydrofuranyl, thiolanyl, imidazolidinyl, pyrazolidinyl, isoxazolidinyl, isothiazolidinyl, piperidinyl, tetrahydropyranyl, thianyl, piperazinyl, morpholinyl, thiomorpholinyl, dioxanyl, dithianyl, azepanyl, oxepanyl, thiepanyl, dihydrofuranyl, imidazolinyl, dihydropyranyl, hydantoinyl, pyrrolidinonyl, tetrahydrothiopyranyl, tetrahydropyridinyl, and thiopyranyl, and the like. Examples of bicyclic heterocyclic ring systems include benzo[1,3]dioxolyl, tetrahydroindolyl, and 2-azaspiro[3.3]heptanyl, and the like. As used herein, a bicyclic heterocyclyl or a bicyclic heterocyclic ring system includes bicyclic ring systems where a monocyclic heterocyclyl is fused to another monocyclic heterocyclyl; bicyclic ring systems where a monocyclic heterocyclyl is fused to a cycloaliphatic ring, and bicyclic ring systems where a monocyclic heterocyclyl is fused to a phenyl ring.

As used herein, the terms "heteroaryl", "heteroaryl group", "heteroaromatic" and "heteroaromatic ring" are used interchangeably to refer to an aromatic 5- to 12-membered monocyclic or bicyclic ring system (e.g., fused, spiro or bridged), having 1 to 4 heteroatoms independently selected from O, S and N, and wherein N can be oxidized (e.g., N(O)) or quaternized, and S can be optionally oxidized to sulfoxide and sulfone. "Heteroaryl" includes a heteroaromatic ring that is fused to another heteroaromatic ring, a heteroaromatic ring that is fused to a phenyl ring, a heteroaromatic ring that is fused to a cycloaliphatic ring, or a heteroaromatic ring that is fused to non-aromatic heterocyclic ring such as tetrahydrofuran, pyran, pyrrolidine, piperidine, and the like. As used herein, the heteroaryl group Ar can be attached to the rest of a compound of the invention at any ring that has an open valency. Non-limiting examples of monocyclic heteroaromatic ring systems includepyrrolyl, furanyl, imidazolyl, pyrazolyl, oxazolyl, isoxazolyl, thiazolyl, isothiazolyl, oxadiazolyl, thiadiazolyl, triazolyl, tetrazolyl, pyridyl, pyrazinyl, pyrimidyl, pyridazinyl, triazinyl, tetrazinyl, 1-oxo-pyridyl, thienyl, etc. Non-limiting examples of bicyclic heteroaromatic ring systems include azaindolyl, benzimidazolyl, benzofuryl, benzoisoxazolyl, benzoisothiazolyl, benzothiadiazolyl, benzothiazolyl, benzothienyl, benzotriazolyl, benzoxadiazolyl, benzoxazolyl, cyclopentaimidazolyl, cyclopentatriazolyl, furopyridinyl, imidazopyridyl, imidazopyrimidinyl, indazolyl, indolizinyl, indolyl, isoquinolinyl, oxazolopyridinyl, purinyl, pyrazolopyrimidinyl, pyrazolopyrazinyl, pyridopyazinyl, pyridopyrimidinyl, pyrrolo[2,3]pyrimidinyl, pyrrolopyrazolyl, pyrroloimidazolyl, pyrrolotriazolyl, quinazolinyl, quinoxalinyl, quinolinyl, isoquinolinyl, thiazolopyridinyl, thienopyridinyl, thienopyrimidinyl, thienopyrazinyl, napthyridyl, and the like.

As used herein, the term "cycloalkyl" refers to completely saturated monocyclic or bicyclic (e.g., fused, spiro or bridged) cycloaliphatic groups of 3-12 carbon atoms, 3-6 carbon atoms or 5-7 carbon atoms.

As used herein, the term "halocycloalkyl" refers to a cycloalkyl, as defined herein, that is substituted by one or more halo groups as defined herein.

The term "fused" referring to a bicyclic ring system as used herein, is a bicyclic ring system that has a carbocyclyl or heterocyclyl ring wherein two adjacent atoms of the ring are connected (bridged) by one or more (preferably from one to three) atoms selected from C, N, O or S. A fused ring system may have from 4-10 ring members.

The term "spiro" referring to a bicyclic ring system as used herein, is a bicyclic ring system that has two rings each of which are independently selected from a carbocyclyl or a heterocyclyl, wherein the two ring structures having one ring atom in common. Spiro ring systems have from 5 to 7 ring members. Exemplary sprio ring carbocyclyl groups include spiro[2.2]pentanyl and spiro[3.3]heptanyl.

The term "bridged" referring to a bicyclic ring system as used herein, is a bicyclic ring system that has a carbocyclyl or heterocyclyl ring wherein two non-adjacent atoms of the ring are connected (bridged) by one or more (preferably from one to three) atoms selected from C, N, O or S. A bridged ring system may have 6-12 ring members. Exemplary bridged carbocyclyl groups include decahydro-2,7-methanonaphthyl, bicyclo[2.2.1]heptyl, bicyclo[2.1.1]hexyl, bicyclo[2.2.1]heptenyl, tricyclo[2.2.1.0$^{2,6}$]heptanyl, 6,6-dimethylbicyclo[3.1.1]heptyl, and 2,6,6-trimethylbicyclo[3.1.1]heptyl. Exemplary bridged heterocyclyl groups include heterobicyclo[2.2.1]heptenyl and heterobicyclo[3.2.1]octenyl. The specific examples of the bridged heterocyclyl groups include (1S,4R)-2-azabicyclo[2.2.1]hept-5-enyl, (4S)-2-azabicyclo[2.2.1]hept-5-enyl, and (1R,5S)-8-azabicyclo[3.2.1]oct-2-enyl.

A substituted alkyl, phenyl, heteroaryl, non-aromatic heterocyclyl or heterocyclyl group is an alkyl, phenyl, heteroaryl, non-aromatic heterocyclyl or heterocyclyl group that has one or more substituents. Suitable substituents are those that do not significantly decrease the O-GlcNAcase inhibitory activity of a compound of formula (I), (II), (III), (IV), (IVA), (IVB), (V), (VA), (VB), (VI), (VIA), or (VIB) (hereinafter collectively a compound of any one of formulas (I) through (VIB)), or a pharmaceutically acceptable salt thereof. Examples of suitable substituents for an alkyl, phenyl, heteroaryl, non-aromatic heterocyclyl or heterocyclyl group include but are not limited to $C_1$-$C_4$ alkyl, $C_1$-$C_4$ haloalkyl, $C_3$-$C_6$ cycloalkyl, halo, —CN, —NO$_2$, —OR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^y$, —O(C=S) R$^x$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O) NR$^x$R$^y$, —NR$^x$(C=S)NR$^x$R$^y$, —C(=S)R$^x$, —C(=O)R$^x$, phenyl and monocyclic heteroaryl. The C$_1$-C$_4$ alkyl group substituent is optionally substituted with —CN, —NO$_2$, —OR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^x$, —O(C=S)R$^x$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O)NR$^x$R$^y$, —NR$^x$(C=S)NR$^x$R$^y$, —C(=S)R$^x$, and —C(=O)R$^y$, C$_3$-C$_6$ cycloalkyl (optionally substituted with one or more groups selected from —CH$_3$, halomethyl, halo, methoxy and halomethoxy), monocyclic heteroaryl (optionally substituted with one or more groups selected from —CH$_3$, halomethyl, halo, methoxy or halomethoxy) and phenyl (optionally substituted with one or more groups selected from —CH$_3$, halomethyl, halo, methoxy and halomethoxy). The C$_3$-C$_6$ cycloalkyl, phenyl and monocyclic heteroaryl group substituents are optionally and independently substituted with C$_1$-C$_4$ alkyl, C$_1$-C$_4$ haloalkyl, halo, —CN, —NO$_2$, —OR$^z$, —NR$^x$R$^y$, —S(O)$_i$R$^x$, —NR$^x$S (O)$_i$R$^y$, —S(O)$_i$NR$^x$R$^y$, —C(=O)OR$^x$, —OC(=O)OR$^x$, —C(=S)OR$^x$, —O(C=S)R$^y$, —C(=O)NR$^x$R$^y$, —NR$^x$C (=O)R$^y$, —C(=S)NR$^x$R$^y$, —NR$^x$C(=S)R$^y$, —NR$^x$(C=O) OR$^y$, —O(C=O)NR$^x$R$^y$, —NR$^x$(C=S)OR$^y$, —O(C=S) NR$^x$R$^y$, —NR$^x$(C=O)NR$^x$R$^y$, —NR$^x$(C=S)NR$^x$R$^y$, —C(=S)R$^x$, and —C(=O)R$^x$. In these substituents, each R$^x$ and each R$^y$ is independently —H, C$_1$-C$_4$ alkyl, or C$_3$-C$_8$ cycloalkyl, where the C$_1$-C$_4$ alkyl or C$_3$-C$_8$ cycloalkyl represented by R$^x$ or R$^y$ is optionally substituted with one or more substituents selected from halo, hydroxyl, C$_3$-C$_6$ cycloalkyl and phenyl (optionally substituted with one or more groups selected from —CH$_3$, halomethyl, halo, methoxy or halomethoxy). In these substituents, R$^z$ is —H, C$_1$-C$_4$ alkyl, or C$_3$-C$_8$ cycloalkyl, where the C$_1$-C$_4$ alkyl or C$_3$-C$_8$ cycloalkyl group represented by R$^z$ is optionally substituted with one or more substituents selected from halo, hydroxyl, C$_3$-C$_6$ cycloalkyl and phenyl (optionally substituted with one or more groups selected from —CH$_3$, halomethyl, halo, methoxy and halomethoxy). In these substituents, i is 0, 1, or 2.

Pharmaceutically acceptable salts of the compounds disclosed herein are also included in the invention. In cases where a compound provided herein is sufficiently basic or acidic to form stable nontoxic acid or base salts, preparation and administration of the compounds as pharmaceutically acceptable salts may be appropriate. Examples of pharmaceutically acceptable salts are organic acid addition salts formed with acids which form a physiologically acceptable anion, for example, tosylate, methanesulfonate, acetate, citrate, malonate, tartarate, succinate, benzoate, ascorbate, α-ketoglutarate or α-glycerophosphate. Inorganic salts may also be formed, including hydrochloride, sulfate, nitrate, bicarbonate and carbonate salts.

Pharmaceutically acceptable salts may be obtained using standard procedures well known in the art, for example by reacting a sufficiently basic compound such as an amine with a suitable acid; affording a physiologically acceptable anion. Alkali metal (for example, sodium, potassium or lithium) or alkaline earth metal (for example calcium) salts of carboxylic acids can also be made.

Pharmaceutically acceptable base addition salts can be prepared from inorganic and organic bases. Suitable bases include but are not limited to alkali metal hydroxides, alkaline earth metal hydroxides, carbonates, bicarbonates, and the like.

Some of the disclosed compounds, or pharmaceutically acceptable salts thereof, contain one or more asymmetric centers in the molecule. In accordance with the present disclosure any structure that does not designate the stereochemistry is to be understood as embracing all the various stereoisomers (e.g., diastereomers and enantiomers) in pure or substantially pure form, as well as mixtures thereof (such as a racemic mixture, or an enantiomerically enriched mixture). It is well known in the art how to prepare such optically active forms (for example, resolution of the racemic form by recrystallization techniques, synthesis from optically-active starting materials, by chiral synthesis or chromatographic separation using a chiral stationary phase). The disclosed compounds may exist in tautomeric forms and mixtures and separate individual tautomers are contemplated. In addition, some compounds may exhibit polymorphism.

When a particular stereoisomer (e.g., enantiomer, diastereomer, etc.) of a compound used in the disclosed methods is depicted by name or structure, the stereochemical purity of the compounds is at least 60%, 70%, 80%, 90%, 95%, 97%, 99%, 99.5% or 99.9%. "Stereochemical purity" means the weight percent of the desired stereoisomer relative to the combined weight of all stereoisomers.

When the stereochemistry of a disclosed compound is named or depicted by structure, and the named or depicted structure encompasses more than one stereoisomer (e.g., as in a diastereomeric pair), it is to be understood that one of the encompassed stereoisomers or any mixture of the encompassed stereoisomers are included. It is to be further understood that the stereoisomeric purity of the named or depicted stereoisomers at least 60%, 70%, 80%, 90%, 99% or 99.9% by weight. The stereoisomeric purity in this case is determined by dividing the total weight in the mixture of the stereoisomers encompassed by the name or structure by the total weight in the mixture of all of the stereoisomers.

In one embodiment, any position occupied by hydrogen is meant to include enrichment by deuterium above the natural abundance of deuterium as well. For example, one or more hydrogen atoms are replaced with deuterium at an abundance that is at least 3340 times greater than the natural abundance of deuterium, which is 0.015% (i.e., at least 50.1% incorporation of deuterium), at least 3500 (52.5% deuterium incorporation at each designated deuterium atom), at least 4000 (60% deuterium incorporation), at least 4500 (67.5% deuterium incorporation), at least 5000 (75% deuterium), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). In one embodiment, hydrogen is present at all positions at its natural abundance. The compounds or pharmaceutically acceptable salts thereof as described herein, may exist in tautomeric forms and mixtures and separate individual tautomers are contemplated.

One aspect of the invention includes a method for inhibiting a glycosidase and/or a glycosidase signaling pathway in a cell, the method comprising contacting the cell with an effective amount of a compound of any one of formulas (I) through (VIB), or a pharmaceutically acceptable salt thereof. The glycosidase is preferably a glycoside hydrolase, more preferably a family 84 glycoside hydrolase, even more preferably O-glycoprotein-2-acetamido-2-deoxy-3-D-glucopyranosidase (O-GlcNAcase or OGA), most preferably a mammalian O-GlcNAcase. In one embodiment, the cell is contacted in vitro or in vivo. In one embodiment, contacting the cell includes administering the compound to a subject.

One aspect of the invention includes a method for inhibiting a glycosidase and/or a glycosidase signaling pathway in a subject in need thereof, the method comprising administering to the subject, a therapeutically effective amount of a compound of any one of formulas (I) through (VIB), or a pharmaceutically acceptable salt thereof, thereby activating the glycosidase in the subject. The glycosidase is preferably a glycoside hydrolase, more preferably a family 84 glycoside hydrolase, even more preferably O-glycoprotein-2-acetamido-2-deoxy-3-D-glucopyranosidase (O-GlcNAcase or OGA), most preferably a mammalian O-GlcNAcase.

One aspect of the invention includes a method for promoting survival of a eukaryotic cell (e.g., a mammalian cell) or increasing the lifespan of the cell, the method comprising administering to the subject a therapeutically effective amount of a compound of any one of formulas (I) through (VIB), or a pharmaceutically acceptable salt thereof, thereby promoting survival of the eukaryotic cell or increasing the lifespan of the cell.

One aspect of the invention includes a method for treating a disease or a condition that is caused, mediated and/or propagated by O-GlcNAcase activity in a subject, the method comprising administering to the subject a therapeutically effective amount of a compound of any one of formulas (I) through (VIB), or a pharmaceutically acceptable salt thereof. Preferably, the disease or condition is a neurological disorder, diabetes, cancer or stress. More preferably, the disease or condition is a neurological disorder. In one embodiment, the neurological disorder is one or more tauopathies selected from Acute ischemic stroke (AIS), Alzheimer's disease, Dementia, Amyotrophic lateral sclerosis (ALS), Amyotrophic lateral sclerosis with cognitive impairment (ALSci), Argyrophilic grain dementia, Bluit disease, Corticobasal degeneration (CBP), Dementia pugilistica, Diffuse neurofibrillary tangles with calcification, Down's syndrome, epilepsy, Familial British dementia, Familial Danish dementia, Frontotemporal dementia with parkinsonism linked to chromosome 17 (FTDP-17), Gerstmann-Straussler-Scheinker disease, Guadeloupean parkinsonism, Hallevorden-Spatz disease (neurodegeneration with brain iron accumulation type 1), ischemic stroke, mild cognitive impairment (MCI), Multiple system atrophy, Myotonic dystrophy, Niemann-Pick disease (type C), Pallido-ponto-nigral degeneration, Parkinsonism-dementia complex of Guam, Pick's disease (PiD), Postencephalitic parkinsonism (PEP), Prion diseases (including Creutzfeldt-Jakob Disease (GJD), Variant Creutzfeldt-Jakob Disease (vCJD), Fatal Familial Insomnia, Kuru, Progressive supercortical gliosis, Progressive supranuclear palsy (PSP), Steele-Richardson-Olszewski syndrome, Subacute sclerosing panencephalitis, Tangle-only dementia, Huntington's disease, and Parkinson's disease. In another embodiment, the neurological disorder is one or more tauopathies selected from Acute ischemic stroke (AIS), Alzheimer's disease, Dementia, Amyotrophic lateral sclerosis (ALS), Amyotrophic lateral sclerosis with cognitive impairment (ALSci), Argyrophilic grain dementia, epilepsy, mild cognitive impairment (MCI), Huntington's disease, and Parkinson's disease. In yet another embodiment, the neurological disorder is Alzheimer's disease.

One aspect of the invention includes a method for treating a disease or a condition that is characterized by hyperphosphorylation of tau (e.g., hyperphosphorylation of tau in the brain) in a subject, the method comprising administering to the subject a therapeutically effective amount of a compound of any one of formulas (I) through (VIB), or a pharmaceutically acceptable salt thereof. In one embodiment, the disease or condition is selected from Acute ischemic stroke (AIS), Alzheimer's disease, Dementia, Amyotrophic lateral sclerosis (ALS), Amyotrophic lateral sclerosis with cognitive impairment (ALSci), Argyrophilic grain dementia, Bluit disease, Corticobasal degeneration (CBP), Dementia pugilistica, Diffuse neurofibrillary tangles with calcification, Down's syndrome, epilepsy, Familial British dementia, Familial Danish dementia, Frontotemporal dementia with parkinsonism linked to chromosome 17 (FTDP-17), Gerstmann-Straussler-Scheinker disease, Guadeloupean parkinsonism, Hallevorden-Spatz disease (neurodegeneration with brain iron accumulation type 1), ischemic stroke, mild cognitive impairment (MCI), Multiple system atrophy, Myotonic dystrophy, Niemann-Pick disease (type C), Pallido-ponto-nigral degeneration, Parkinsonism-dementia complex of Guam, Pick's disease (PiD), Postencephalitic parkinsonism (PEP), Prion diseases (including Creutzfeldt-Jakob Disease (GJD), Variant Creutzfeldt-Jakob Disease (vCJD), Fatal Familial Insomnia, Kuru, Progressive supercortical gliosis, Progressive supranuclear palsy (PSP), Steele-Richardson-Olszewski syndrome, Subacute sclerosing panencephalitis, Tangle-only dementia, Huntington's disease, and Parkinson's disease. In another embodiment, the disease or condition is selected from Acute ischemic stroke (AIS), Alzheimer's disease, Dementia, Amyotrophic lateral sclerosis (ALS), Amyotrophic lateral sclerosis with cognitive impairment (ALSci), Argyrophilic grain dementia, epilepsy, ischemic stroke, mild cognitive impairment (MCI), Huntington's disease, and Parkinson's disease. In yet another embodiment, the disease or condition is Alzheimer's disease.

As used herein, the term "subject" and "patient" may be used interchangeably, and means a mammal in need of treatment, e.g., companion animals (e.g., dogs, cats and the like), farm animals (e.g., cows, pigs, horses, sheep, goats and the like) and laboratory animals (e.g., rats, mice, guinea pigs and the like). Typically, the subject is a human in need of treatment.

As used herein, the term "treating" or "treatment" refers to obtaining desired pharmacological and/or physiological effect. The effect can be therapeutic, which includes achieving, partially or substantially, one or more of the following results: reducing the extent of the disease, disorder or syndrome; ameliorating or improving a clinical symptom or indicator associated with the disorder; and inhibiting or decreasing the likelihood of the progression of the disease, disorder or syndrome.

The term "an effective amount" means an amount of a compound of any one of formulas (I) through (VIB), or a pharmaceutically acceptable salt thereof, e.g., 0.1 mg to 1000 mg/kg body weight, when administered to a subject, which results in beneficial or desired results, including clinical results, i.e., reversing, alleviating, inhibiting, reducing or slowing the progression of a disease or condition treatable by a compound of any one of formulas (I) through (VIB), or a pharmaceutically acceptable salt thereof, reducing the likelihood of recurrence of a disease or condition treatable by a compound of any one of formulas (I) through (VIB), or a pharmaceutically acceptable salt thereof or one or more symptoms thereof, e.g., as determined by clinical symptoms, compared to a control. The expression "an effective amount" also encompasses the amounts which are effective for increasing normal physiological function, for example, between 0.01 mg/kg per day to 500 mg/kg per day.

Another embodiment of the present invention is a pharmaceutical composition comprising at least one compound described herein, or a pharmaceutically acceptable salt thereof, and at least one pharmaceutically acceptable carrier.

Also included are the use of a compound of any one of formulas (I) through (VIB), or a pharmaceutically acceptable salt thereof in the manufacture of a medicament for the treatment of one or more diseases or conditions described herein. Also included herein are pharmaceutical compositions comprising a compound of any one of formulas (I) through (VIB), or a pharmaceutically acceptable salt thereof optionally together with a pharmaceutically acceptable carrier, in the manufacture of a medicament for the treatment of one or more diseases or conditions described herein. Also included is a compound of any one of formulas (I) through (VIB), or a pharmaceutically acceptable salt thereof for use the treatment of a subject with one or more diseases or conditions described herein. Further included are pharmaceutical compositions comprising a compound of any one of formulas (I) through (VIB), or a pharmaceutically acceptable salt thereof, optionally together with a pharmaceutically acceptable carrier, for use in the treatment of one or more diseases or conditions described herein.

The term "pharmaceutically acceptable carrier" refers to a non-toxic carrier, diluent, adjuvant, vehicle or excipient that does not adversely affect the pharmacological activity of the compound with which it is formulated, and which is also safe for human use. Pharmaceutically acceptable carriers that may be used in the compositions of this disclosure include, but are not limited to, ion exchangers, alumina, aluminum stearate, magnesium stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances (e.g., microcrystalline cellulose, hydroxypropyl methylcellulose, lactose monohydrate, sodium lauryl sulfate, and crosscarmellose sodium), polyethylene glycol, sodium carboxymethylcellulose, polyacrylates, waxes, polyethylene-polyoxypropylene-block polymers, polyethylene glycol and wool fat.

Other excipients, such as flavoring agents; sweeteners; and preservatives, such as methyl, ethyl, propyl and butyl parabens, can also be included. More complete listings of suitable excipients can be found in the Handbook of Pharmaceutical Excipients (5th Ed., a Pharmaceutical Press (2005)). A person skilled in the art would know how to prepare formulations suitable for various types of administration routes. Conventional procedures and ingredients for the selection and preparation of suitable formulations are described, for example, in Remington's Pharmaceutical Sciences (2003, 20th edition) and in The United States Pharmacopeia: The National Formulary (USP 24 NF19) published in 1999.

A compound of any one of formulas (I) through (VIB), or a pharmaceutically acceptable salt thereof, or the compositions of the present teachings may be administered, for example, by oral, parenteral, sublingual, topical, rectal, nasal, buccal, vaginal, transdermal, patch, pump administration or via an implanted reservoir, and the pharmaceutical compositions would be formulated accordingly. Parenteral administration includes intravenous, intraperitoneal, subcutaneous, intramuscular, transepithelial, nasal, intrapulmonary, intrathecal, rectal and topical modes of administration. Parenteral administration can be by continuous infusion over a selected period of time.

Other forms of administration included in this disclosure are as described in WO 2013/075083, WO 2013/075084, WO 2013/078320, WO 2013/120104, WO 2014/124418, WO 2014/151142, and WO 2015/023915, the contents of which are incorporated herein by reference.

Useful dosages of a compound or pharmaceutically acceptable salt thereof as described herein can be determined by comparing their in vitro activity and in vivo activity in animal models. Methods for the extrapolation of effective dosages in mice and other animals, to humans are known to the art; for example, see U.S. Pat. No. 4,938,949, which is incorporated by reference in its entirety.

EXEMPLIFICATIONS

General Methods

Chromatography on silica gel was carried out using 20-40 uM (particle size), 250-400 mesh, or 400-632 mesh silica gel using either a Teledyne ISCO Combiflash RF or a Grace Reveleris X2 with ELSD purification systems.

Analytical HPLC

Acidic HPLC: Conducted on a Shimadzu 20A instrument with an Ultimate C18 3.0×50 mm, 3 um column eluting with 2.75 mL/4 L TFA in water (solvent A) and 2.5 mL/4 L TFA in acetonitrile (solvent B) by the following methods:

Method A: using the following elution gradient 0%-60% (solvent B) over 6 minutes and holding at 60% for 2 minutes at a flow rate of 1.2 ml/minutes. Wavelength: UV 220 nm, 215 nm and 254 nm.

Method B: using the following elution gradient 10%-80% (solvent B) over 6 minutes and holding at 60% for 2 minutes at a flow rate of 1.2 ml/minutes. Wavelength: UV 220 nm, 215 nm and 254 nm.

Method C: using the following elution gradient 30%-90% (solvent B) over 6 minutes and holding at 60% for 2 minutes at a flow rate of 1.2 ml/minutes. Wavelength: UV 220 nm, 215 nm and 254 nm.

Basic HPLC: Conducted on a Shimadzu 20A instrument with Xbrige Shield RP-18, Sum, 2.1×50 mm column eluting with 2 mL/4 L $NH_3H_2O$ in water (solvent A) and acetonitrile (solvent B), by the following methods:

Method D: using the following elution gradient 0%-60% (solvent B) over 4.0 minutes and holding at 60% for 2 minutes at a flow rate of 1.2 ml/minutes.

Method E: using the following elution gradient 10%-80% (solvent B) over 4.0 minutes and holding at 60% for 2 minutes at a flow rate of 1.2 ml/minutes.

Method F: using the following elution gradient 30%-90% (solvent B) over 4.0 minutes and holding at 60% for 2 minutes at a flow rate of 1.2 ml/minutes.

Analytical LCMS

Acidic LCMS: Conducted on a Shimadzu 2010 Series, Shimadzu 020 Series, or Waters Acquity UPLC BEH. (MS ionization: ESI) instrument equipped with a C18 column (2.1 mm×30 mm, 3.0 mm or 2.1 mm×50 mm, C18, 1.7 um), eluting with 1.5 mL/4 L TFA in water (solvent A) and 0.75 mL/4 L TFA in acetonitrile (solvent B) using the methods below:

1.5 Minute Methods:

General method: using the following elution gradient 5%-95% (solvent B) over 0.7 minutes and holding at 95% for 0.4 minutes at a flow rate of 1.5 ml/minutes. Wavelength: UV 220 nm and 254 nm.

2 Minute Methods:
Method A: using the following elution gradient 0%-60% (solvent B) over 0.9 minutes and holding at 60% for 0.6 minutes at a flow rate of 1.2 ml/minutes. Wavelength: UV 220 nm and 254 nm.
Method B: using the following elution gradient 10%-80% (solvent B) over 0.9 minutes and holding at 60% for 0.6 minutes at a flow rate of 1.2 ml/minutes. Wavelength: UV 220 nm and 254 nm.
Method C: using the following elution gradient 30%-90% (solvent B) over 0.9 minutes and holding at 60% for 0.6 minutes at a flow rate of 1.2 ml/minutes. Wavelength: UV 220 nm and 254 nm.

3.5 Minute Method:
Initial conditions, solvent A—95%:solvent B—5%; hold at initial from 0.0-0.1 min; Linear Ramp to solvent A—5%:solvent B—95% between 0.1-3.25 min; hold at solvent A—5%:solvent B—95% between 3.25-3.5 min. Diode array/MS detection.

4 Minute Methods:
Method A: using the following elution gradient 0%-60% (solvent B) over 3 minutes and holding at 60% for 0.5 minutes at a flow rate of 0.8 ml/minutes. Wavelength: UV 220 nm and 254 nm.
Method B: using the following elution gradient 10%-80% (solvent B) over 3 minutes and holding at 60% for 0.5 minutes at a flow rate of 0.8 ml/minutes. Wavelength: UV 220 nm and 254 nm.
Method C: using the following elution gradient 30%-90% (solvent B) over 3 minutes and holding at 60% for 0.5 minutes at a flow rate of 0.8 ml/minutes. Wavelength: UV 220 nm and 254 nm.

7 Minute Methods:
Method A: using the following elution gradient 0%-60% (solvent B) over 6 minutes and holding at 60% for 0.5 minutes at a flow rate of 0.8 ml/minutes. Wavelength: UV 220 nm and 254 nm.
Method B: using the following elution gradient 10%-80% (solvent B) over 6 minutes and holding at 60% for 0.5 minutes at a flow rate of 0.8 ml/minutes. Wavelength: UV 220 nm and 254 nm.
Method C: using the following elution gradient 30%-900% (solvent B) over 6 minutes and holding at 60% for 0.5 minutes at a flow rate of 0.8 ml/minutes. Wavelength: UV 220 nm and 254 nm.

Basic LCMS:
Conducted on a Shimadzu 2020 Series or Waters Acquity UPLC BEH (MS ionization: ESI) instrument equipped with XBridge Shield RP18, Sum column (2.1 mm×30 mm, 3.0 mm i.d.) or 2.1 mm×50 mm, C18, 1.7 um column, eluting with 2 mL/4 L $NH_3 \cdot H_2O$ in water (solvent A) and acetonitrile (solvent B) using the methods below:

3 Minute Methods:
Method A: using the following elution gradient 0%-60% (solvent B) over 2 minutes and holding at 60% for 0.48 minutes at a flow rate of 1 ml/minutes. Wavelength: UV 220 nm and 254 nm.
Method B: using the following elution gradient 10%-80% (solvent B) over 2 minutes and holding at 60% for 0.48 minutes at a flow rate of 1 ml/minutes. Wavelength: UV 220 nm and 254 nm.
Method C: using the following elution gradient 30%-90% (solvent B) over 2 minutes and holding at 60% for 0.48 minutes at a flow rate of 1 ml/minutes. Wavelength: UV 220 nm and 254 nm.

3.5 Minute Method:
Initial conditions, solvent A—95%:solvent B—5%; hold at initial from 0.0-0.1 min; Linear Ramp to solvent A—5%:solvent B—95% between 0.1-3.25 min; hold at solvent A—5%:solvent B—95% between 3.25-3.5 min. Diode array/MS detection.

7 Minute Methods:
Method A: using the following elution gradient 0%-60% (solvent B) over 6 minutes and holding at 60% for 0.5 minutes at a flow rate of 0.8 ml/minutes. Wavelength: UV 220 nm and 254 nm.
Method B: using the following elution gradient 10%-80% (solvent B) over 6 minutes and holding at 60% for 0.5 minutes at a flow rate of 0.8 ml/minutes. Wavelength: UV 220 nm and 254 nm.
Method C: using the following elution gradient 30%-90% (solvent B) over 6 minutes and holding at 60% for 0.5 minutes at a flow rate of 0.8 ml/minutes. Wavelength: UV 220 nm and 254 nm.

SFC Analytical Separation
Instrument: Waters UPC2 analytical SFC (SFC-H). Column: ChiralCel OJ, 150×4.6 mm I.D., 3 μm. Mobile phase: A for $CO_2$ and B for Ethanol (0.05% DEA). Gradient: B 40%. Flow rate: 2.5 mL/min. Back pressure: 100 bar. Column temperature: 35° C. Wavelength: 220 nm Preparative HPLC Purification
General Method: Preparative HPLC was performed on a Gilson UV/VIS-156 with UV detection at 220/254 nm Gilson 281 automatic collection.
Acidic condition: Two acid grading systems used: Hydrochloride acid and Formic acid.
Method A: Hydrochloride acid: YMC-Actus Triart C18 150×30 mm×5 um, Gradient used 0-100% acetonitrile with water and corresponding acid (0.05% HCl).
Method B: Formic acid: Phenomenex Synergi C18 150×30 mm×4 um, Gradient used 0-100% acetonitrile with water and corresponding acid (0.225% formic acid), the gradient shape was optimized for individual separations.
Neutral condition: Xtimate C18 150×25 mm×5 um, Gradient used 0-100% (water (10 mM $NH_4HCO_3$)-ACN), the gradient shape was optimized for individual separations.
Basic condition: Waters Xbridge Prep OBD C18 150×30 10 um, Gradient used 0-100% water (0.04% $NH_3H_2O$+10 mM $NH_4HCO_3$)-acetonitrile, the gradient shape was optimized for individual separations.

Preparative HPLC-MS Purification
Columns Used:
Acid: Waters SunFire Prep, C18 5 um, OBD 19×100 mm
Base: Waters XSelect CSH Prep C18 5 um OBD 19×100 mm
Gradient Profile: 12 min Run: Initial conditions: A—95%:B—5%; hold at initial from 0.0-0.5 min; linear ramp from A—5% to variable B—% (typical range is from B—40% to B—75%) between 0.5-7.5 min; linear ramp from B—% to B—95% from 7.5-8.0 min; hold at A—5%:B—95% between 8.0-10.0 min; end of DAD/MS detection; linear ramp down to initial conditions between 10.0-10.5 min and hold at initial for 1.5 min.
Mobile Phase: Acid: A: 0.1% trifluoroacetic acid in water (v/v); Mobile phase B: 0.1% trifluoroacetic acid in acetonitrile (v/v). Base: A: 0.1% ammonia in water (v/v); Mobile phase B: 0.1% ammonia in acetonitrile (v/v)

Preparative SFC Purification
Instrument: MG III preparative SFC (SFC-1). Column: ChiralCel OJ, 250×30 mm I.D., 5 μm. Mobile phase: A for $CO_2$ and B for Ethanol (0.1% $NH_3H_2O$). Gradient: B 50%.

Flow rate: 40 mL/min. Back pressure: 100 bar. Column temperature: 38° C. Wavelength: 220 nm. Cycle time: ~8 min.

¹H-NMR

The NMR spectra were recorded on Bruker Avance III HD 500 MHz, Bruker Avance III 500 MHz, Bruker Avance III 400 MHz, Varian UNITYplus 400, Varian-400 VNMRS, or Varian-400 MR. Chemical shifts are expressed in parts per million (ppm) units. Coupling constants (J) are in units of hertz (Hz). Splitting patterns describe apparent multiplicities and are designated as s (single), d (double), t (triplet), dd (double doublet), dt (double triplet), dq (double quartet), m (multiplet), br (broad).

The following general reaction Schemes 1, 2, 3, and 4 provide useful details for preparing the instant compounds. The requisite intermediates are in some cases commercially available or can be prepared according to literature procedures. The illustrative reaction schemes are not limited by the compounds listed or by any particular substituents employed for illustrative purposes substituent labeling (i.e. R groups) as shown in the reaction schemes do not necessarily correlate to that used in the claims and often, for clarity, a single substituent is shown attached to the compound where multiple substituents are allowed under the definitions of Formula (I) hereinabove.

General Procedures

Intermediate 1

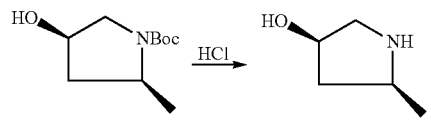

(3R,5S)-5-methylpyrrolidin-3-ol hydrochloride: tert-butyl (2S,4R)-4-hydroxy-2-methyl-pyrrolidine-1-carboxylate (5.00 g, 24.8 mmol) was treated with HCl (4 M in dioxane, 48.0 mL) and stirred at room temperature for 16 h. The reaction was concentrated to afford the title compound (4.24 g) LCMS (ESI): [M+H] 366. ¹HNMR: (500 MHz, D₂O) δ 4.61 (ddt, J=4.9, 3.7, 2.4 Hz, 1H), 3.74-3.92 (m, 1H), 3.26-3.37 (m, 2H), 2.52 (ddd, J=14.3, 8.2, 6.1 Hz, 1H), 1.64-1.72 (m, 1H), 1.42-1.48 ppm (m, 3H).

Intermediate 2

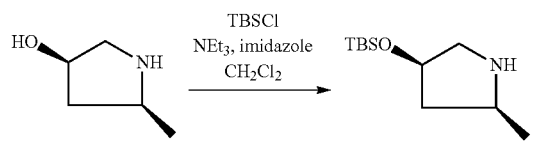

(2S,4R)-4-((tert-butyldimethylsilyl)oxy)-2-methylpyrrolidine: (3R,5S)-5-methylpyrrolidin-3-ol (4.24 g, 30.8 mmol, hydrochloride) was dissolved in CH₂Cl₂ (100 mL) and triethylamine (3.12 g, 30.8 mmol) and stirred for 10 min. Imidazole (503.4 mg, 7.39 mmol) and tert-butylchlorodimethylsilane (5.57 g, 37.0 mmol) were added and the reaction was stirred for 16 h at room temperature. The reaction was diluted with CH₂Cl₂ and saturated NaHCO₃ was added. The layers were separated, and the aqueous layer was extracted with CH₂Cl₂. The organics were dried over sodium sulfate, filtered and concentrated to obtain the title compound (6.64 g). The material was carried directly to the next step without purification. LCMS (ESI): [M+H] 216.

Intermediate 3

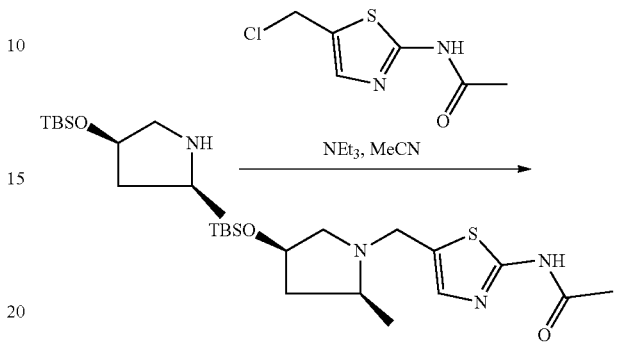

N-(5-(((2S,4R)-4-((tert-butyldimethylsilyl)oxy)-2-methylpyrrolidin-1-yl)methyl)thiazol-2-yl)acetamide: (2S,4R)-4-((tert-butyldimethylsilyl)oxy)-2-methylpyrrolidine (7.0 g, 27.8 mmol) was dissolved in acetonitrile (100 mL) and triethylamine (11.25 g, 111.2 mmol) at room temperature. N-[5-(chloromethyl)thiazol-2-yl]acetamide (5.30 g, 27.8 mmol) was added and the reaction was stirred at room temperature for 16 h. The reaction was filtered through celite and concentrated. The residue was purified by column chromatography over silica gel [EtOAc/EtOH (3:1):heptane (0 to 50%)] to obtain the title compound (7.2 g). LCMS (ESI): [M+H] 370. ¹HNMR: (500 MHz, CDCl₃) δ 7.21 (s, 1H), 4.25 (br d, J=6.7 Hz, 1H), 4.03-4.08 (m, 1H), 3.61 (d, J=14.7 Hz, 1H), 2.89 (dd, J=10.1, 2.1 Hz, 1H), 2.45-2.59 (m, 1H), 2.32 (s, 3H), 2.25 (dd, J=7.0, 5.8 Hz, 1H), 1.47 (s, 1H), 1.24-1.33 (m, 2H), 1.20 (d, J=6.1 Hz, 3H), 0.90 (d, J=6.7 Hz, 2H), 0.87 (s, 9H), 0.00-0.03 ppm (m, 6H).

Intermediate 4

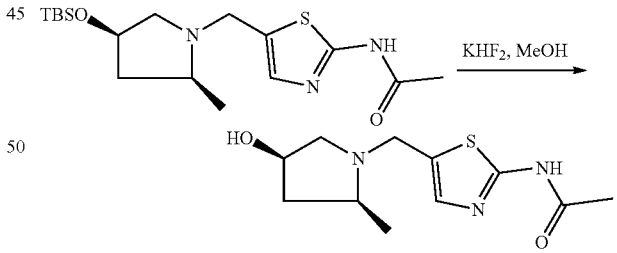

N-[5-[[(2S,4R)-4-hydroxy-2-methyl-pyrrolidin-1-yl]methyl]thiazol-2-yl]acetamide: N-[5-[[(2S,4R)-4-[tert-butyl(dimethyl)silyl]oxy-2-methyl-pyrrolidin-1-yl]methyl]thiazol-2-yl]acetamide (11.05 g, 29.9 mmol) was dissolved in MeOH (119.6 mL) and KHF₂ (5.84 g, 74.7 mmol) was added. The reaction was stirred at 60° C. for 16 h. The reaction was filtered through celite and concentrated. The residue was purified by column chromatography over silica gel [EtOAc/EtOH (3:1):heptane (0 to 100%)] to obtain the title compound (5.30 g, 69% yield). LCMS (ESI): [M+H] 256. ¹HNMR: (500 MHz, METHANOL-d₄) δ 7.24 (s, 1H), 4.20 (dddd, J=7.6, 6.0, 4.4, 1.5 Hz, 1H), 4.06-4.10 (m, 1H), 3.48 (d, J=14.0 Hz, 1H), 2.89 (d, J=10.4 Hz, 1H), 2.34-2.49 (m, 3H), 2.19 (s, 3H), 1.39-1.46 (m, 1H), 1.21 (d, J=6.1 Hz, 3H).

Scheme 1

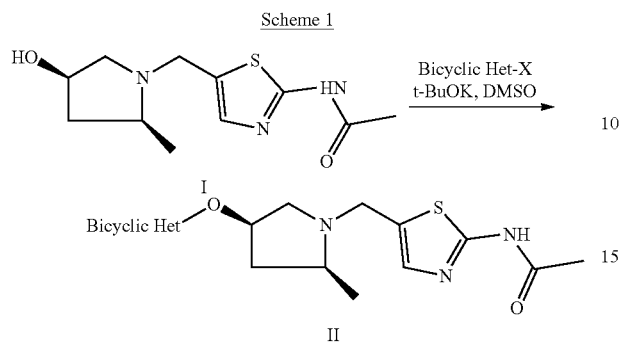

General Procedure 1 tert-butyl (2S,4R)-4-hydroxy-2-methyl-pyrrolidine-1-carboxylate (1 equiv.) was dissolved in DMSO (0.5 ml), and tBuOK (1.2 equiv.) was then added and the mixture was stirred at room temperature for 30-40 minutes. The corresponding bicyclic Het-X (1.2 equiv) was added and the mixture was stirred at 60° C. for 16-72 hours. The mixture was neutralized by addition of AcOH (1.5 equiv.) and product was purified by C18 prep-HPLC (gradient mixture MeOH/H₂O) to afford the desired compound.

Example 1

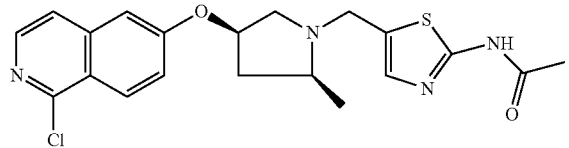 [SMILES: CC(=O)Nc1ncc(CN2C[C@H](Oc3ccc4c(Cl)nccc4c3)C[C@@H]2C)s1]

N-(5-(((2S,4R)-4-((1-chloroisoquinolin-6-yl)oxy)-2-methylpyrrolidin-1-yl)methyl)thiazol-2-yl)acetamide: The title compound was prepared in an analogous manner of that in scheme 1 (general procedure 1) from 1-chloro-6-fluoroisoquinoline and N-(5-(((2S,4R)-4-hydroxy-2-methylpyrrolidin-1-yl)methyl)thiazol-2-yl)acetamide. LCMS (APCI): [M+H] 417. ¹HNMR: (400 MHz, CDCl₃) δ 11.60-11.35 (m, 1H), 8.16 (dd, J=14.6, 7.4 Hz, 2H), 7.41 (d, J=5.7 Hz, 1H), 7.26 (d, J=2.4 Hz, 1H), 7.21 (s, 1H), 6.89 (d, J=2.5 Hz, 1H), 4.88-4.76 (m, 1H), 4.14 (d, J=14.3 Hz, 1H), 3.62 (d, J=14.3 Hz, 1H), 3.24 (d, J=11.0 Hz, 1H), 2.69-2.62 (m, 1H), 2.62-2.53 (m, 2H), 2.27 (s, 3H), 1.82-1.74 (m, 1H), 1.26 (d, J=5.4 Hz, 3H).

Example 2

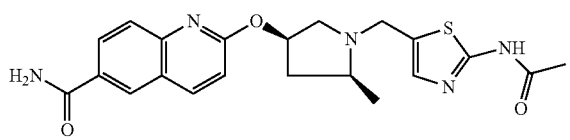 [SMILES: CC(=O)Nc1ncc(CN2C[C@H](Oc3ccc4cc(C(N)=O)ccc4n3)C[C@@H]2C)s1]

2-(((3R,5S)-1-((2-acetamidothiazol-5-yl)methyl)-5-methylpyrrolidin-3-yl)oxy)quinoline-6-carboxamide: The title compound was prepared in an analogous manner of that in scheme 1 (general procedure 1) from 2-chloroquinoline-6-carbonitrile and N-(5-(((2S,4R)-4-hydroxy-2-methylpyrrolidin-1-yl)methyl)thiazol-2-yl)acetamide. LCMS (APCI): [M+H] 426.

Example 3

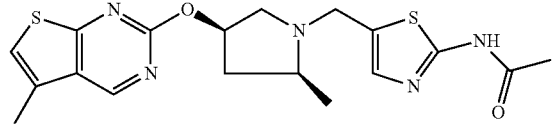 [SMILES: CC(=O)Nc1ncc(CN2C[C@H](Oc3ncc4c(C)csc4n3)C[C@@H]2C)s1]

N-(5-(((2S,4R)-2-methyl-4-((5-methylthieno[2,3-d]pyrimidin-2-yl)oxy)pyrrolidin-1-yl)methyl)thiazol-2-yl)acetamide: The title compound was prepared in an analogous manner of that in scheme 1 (general procedure 1) from 2-chloro-5-methylthieno[2,3-d]pyrimidine and N-(5-(((2S,4R)-4-hydroxy-2-methylpyrrolidin-1-yl)methyl)thiazol-2-yl)acetamide. LCMS (APCI): [M+H] 404.

Example 4

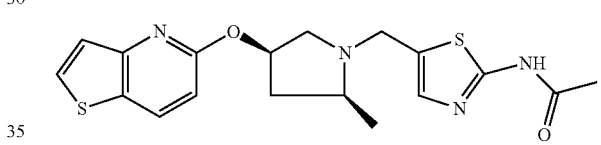

N-(5-(((2S,4R)-2-methyl-4-(thieno[3,2-b]pyridin-5-yloxy)pyrrolidin-1-yl)methyl)thiazol-2-yl)acetamide: The title compound was prepared in an analogous manner of that in scheme 1 (general procedure 1) from 5-chlorothieno[3,2-b]pyridine and N-(5-(((2S,4R)-4-hydroxy-2-methylpyrrolidin-1-yl)methyl)thiazol-2-yl)acetamide. LCMS (APCI): [M+H] 389. ¹HNMR: (400 MHz, DMSO+CCl₄) δ 11.80 (s, 1H), 8.08 (d, J=8.8 Hz, 1H), 7.77 (d, J=5.4 Hz, 1H), 7.26 (d, J=5.5 Hz, 1H), 7.12 (s, 1H), 6.73 (d, J=8.8 Hz, 1H), 5.45-5.36 (m, 1H), 4.04 (d, J=14.1 Hz, 1H), 3.46 (d, J=13.9 Hz, 1H), 3.08-3.03 (m, 1H), 2.66-2.50 (m, 3H), 2.10 (s, 3H), 1.68-1.56 (m, 1H), 1.23 (d, J=5.5 Hz, 3H).

Example 5

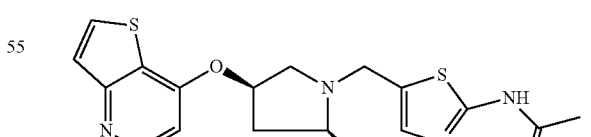

N-(5-(((2S,4R)-2-methyl-4-(thieno[3,2-b]pyridin-7-yloxy)pyrrolidin-1-yl)methyl)thiazol-2-yl)acetamide: The title compound was prepared in an analogous manner of that in scheme 1 (general procedure 1) from 7-bromothieno[3,2-b]pyridine and N-(5-(((2S,4R)-4-hydroxy-2-methylpyrrolidin-1-yl)methyl)thiazol-2-yl)acetamide. LCMS (APCI): [M+H]

389. ¹HNMR: (400 MHz, DMSO+CCl₄) δ 11.83 (s, 1H), 8.40 (d, J=5.3 Hz, 1H), 7.81 (d, J=5.4 Hz, 1H), 7.40 (d, J=5.4 Hz, 1H), 7.15 (s, 1H), 6.71 (d, J=5.4 Hz, 1H), 5.07-4.98 (m, 1H), 4.05 (d, J=14.1 Hz, 1H), 3.58 (d, J=14.2 Hz, 1H), 3.12 (d, J=11.0 Hz, 1H), 2.73 (dd, J=11.2, 6.3 Hz, 1H), 2.68-2.56 (m, 2H), 2.11 (s, 3H), 1.81-1.63 (m, 1H), 1.24 (d, J=5.2 Hz, 3H).

Example 6

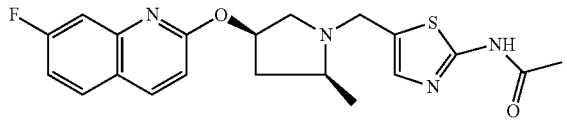 [SMILES: CC(=O)Nc1ncc(CN2C[C@H](Oc3ccc4ccc(F)cc4n3)C[C@@H]2C)s1]

N-(5-(((2S,4R)-4-((7-fluoroquinolin-2-yl)oxy)-2-methylpyrrolidin-1-yl)methyl)thiazol-2-yl)acetamide: The title compound was prepared in an analogous manner of that in scheme 1 (general procedure 1) from 2-chloro-7-fluoroquinoline and N-(5-(((2S,4R)-4-hydroxy-2-methylpyrrolidin-1-yl)methyl)thiazol-2-yl)acetamide. LCMS (APCI): [M+H] 401. ¹HNMR: (400 MHz, CDCl₃) δ 12.34 (s, 1H), 7.89 (d, J=8.8 Hz, 1H), 7.67-7.58 (m, 1H), 7.37 (d, J=10.3 Hz, 1H), 7.20 (s, 1H), 7.09 (td, J=8.8, 8.7, 2.6 Hz, 1H), 6.83 (d, J=8.9 Hz, 1H), 5.56-5.45 (m, 1H), 4.13 (d, J=14.3 Hz, 1H), 3.58 (d, J=14.3 Hz, 1H), 3.19 (d, J=11.2 Hz, 1H), 2.68-2.49 (m, 3H), 2.28 (s, 3H), 1.78-1.70 (m, 1H), 1.25 (d, J=5.8 Hz, 3H)

Example 7

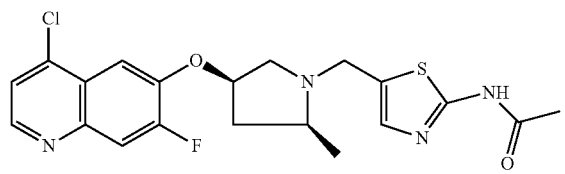 [SMILES: CC(=O)Nc1ncc(CN2C[C@H](Oc3cc4c(Cl)ccnc4cc3F)C[C@@H]2C)s1]

N-(5-(((2S,4R)-4-((4-chloro-7-fluoroquinolin-6-yl)oxy)-2-methylpyrrolidin-1-yl)methyl)thiazol-2-yl)acetamide: The title compound was prepared in an analogous manner of that in scheme 1 (general procedure 1) from 4-chloro-6,7-difluoroquinoline and N-(5-(((2S,4R)-4-hydroxy-2-methylpyrrolidin-1-yl)methyl)thiazol-2-yl)acetamide. LCMS (APCI): [M+H] 435.

Example 8

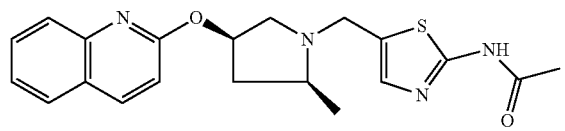 [SMILES: CC(=O)Nc1ncc(CN2C[C@H](Oc3ccc4ccccc4n3)C[C@@H]2C)s1]

N-(5-(((2S,4R)-2-methyl-4-(quinolin-2-yloxy)pyrrolidin-1-yl)methyl)thiazol-2-yl)acetamide: The title compound was prepared in an analogous manner of that in scheme 1 (general procedure 1) from 2-chloroquinoline and N-(5-(((2S,4R)-4-hydroxy-2-methylpyrrolidin-1-yl)methyl)thiazol-2-yl)acetamide. LCMS (APCI): [M+H] 383. ¹HNMR:

(400 MHz, DMSO+CCl₄) δ 11.79 (s, 1H), 8.05 (d, J=8.8 Hz, 1H), 7.72 (d, J=8.0 Hz, 1H), 7.67 (d, J=8.3 Hz, 1H), 7.55 (t, J=7.7, 7.7 Hz, 1H), 7.32 (t, J=7.5, 7.5 Hz, 1H), 7.13 (s, 1H), 6.90 (d, J=8.8 Hz, 1H), 5.55-5.49 (m, 1H), 4.05 (d, J=14.0 Hz, 1H), 3.47 (d, J=14.0 Hz, 1H), 3.07 (d, J=11.0 Hz, 1H), 2.68-2.51 (m, 3H), 2.10 (s, 3H), 1.71-1.59 (m, 1H), 1.24 (d, J=5.7 Hz, 3H).

Example 9

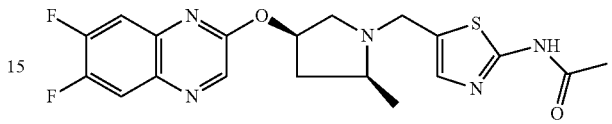

N-(5-(((2S,4R)-4-((6,7-difluoroquinoxalin-2-yl)oxy)-2-methylpyrrolidin-1-yl)methyl)thiazol-2-yl)acetamide: The title compound was prepared in an analogous manner of that in scheme 1 (general procedure 1) from 2-chloro-6,7-difluoroquinoxaline and N-(5-(((2S,4R)-4-hydroxy-2-methylpyrrolidin-1-yl)methyl)thiazol-2-yl)acetamide. LCMS (APCI): [M+H] 420. ¹HNMR: (400 MHz, CDCl₃) δ 12.09 (s, 1H), 7.83 (s, 1H), 7.17 (s, 1H), 6.86 (s, 1H), 5.49-5.44 (m, 1H), 4.13 (s, 3H), 3.55 (d, J=14.3 Hz, 1H), 3.19 (d, J=11.3 Hz, 1H), 2.67-2.58 (m, 2H), 2.55-2.49 (m, 1H), 2.28 (s, 3H), 1.78-1.67 (m, 2H), 1.24 (d, J=5.9 Hz, 3H).

Example 10

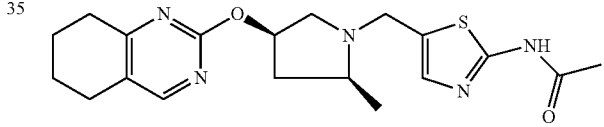

N-(5-(((2S,4R)-2-methyl-4-((5,6,7,8-tetrahydroquinazolin-2-yl)oxy)pyrrolidin-1-yl)methyl)thiazol-2-yl)acetamide: The title compound was prepared in an analogous manner of that in scheme 1 (general procedure 1) from 2-chloro-5,6,7,8-tetrahydroquinazoline and N-(5-(((2S,4R)-4-hydroxy-2-methylpyrrolidin-1-yl)methyl)thiazol-2-yl)acetamide. LCMS (APCI): [M+H] 388.

Example 11

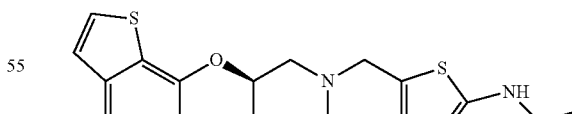

N-(5-(((2S,4R)-2-methyl-4-(thieno[2,3-c]pyridin-7-yloxy)pyrrolidin-1-yl)methyl)thiazol-2-yl)acetamide: The title compound was prepared in an analogous manner of that in scheme 1 (general procedure 1) from 7-bromothieno[2,3-c]pyridine and N-(5-(((2S,4R)-4-hydroxy-2-methylpyrrolidin-1-yl)methyl)thiazol-2-yl)acetamide. LCMS (APCI): [M+H] 389. ¹HNMR: (400 MHz, DMSO+CCl₄) δ 11.80 (s, 1H), 7.89 (d, J=5.6 Hz, 1H), 7.81 (d, J=5.3 Hz, 1H), 7.37 (d, J=5.3 Hz, 1H), 7.30 (d, J=5.6 Hz, 1H), 7.13 (s, 1H), 5.53-5.46 (m, 1H), 4.04 (d, J=14.0 Hz, 1H), 3.53 (d, J=14.0 Hz, 1H), 3.09 (d, J=11.1 Hz, 1H), 2.75-2.66 (m, 1H), 2.61-2.51 (m, 2H), 2.10 (s, 3H), 1.79-1.68 (m, 1H), 1.25 (d, J=5.4 Hz, 3H).

Example 12

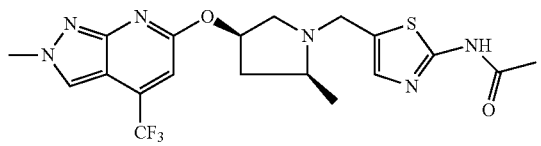 [SMILES: CC(=O)Nc1ncc(CN2C[C@H](Oc3cc(C(F)(F)F)c4cn(C)nc4n3)C[C@@H]2C)s1]

N-(5-(((2S,4R)-2-methyl-4-((2-methyl-4-(trifluoromethyl)-2H-pyrazolo[3,4-b]pyridin-6-yl)oxy)pyrrolidin-1-yl)methyl)thiazol-2-yl)acetamide: The title compound was prepared in an analogous manner of that in scheme 1 (general procedure 1) from 6-chloro-2-methyl-4-(trifluoromethyl)-2H-pyrazolo[3,4-b]pyridine and N-(5-(((2S,4R)-4-hydroxy-2-methylpyrrolidin-1-yl)methyl)thiazol-2-yl)acetamide. LCMS (APCI): [M+H] 455. ¹HNMR: (400 MHz, CDCl₃) δ 12.09 (s, 1H), 7.83 (s, 1H), 7.17 (s, 1H), 6.86 (s, 1H), 5.49-5.44 (m, 1H), 4.13 (s, 3H), 3.55 (d, J=14.3 Hz, 1H), 3.19 (d, J=11.3 Hz, 1H), 2.67-2.58 (m, 2H), 2.55-2.49 (m, 1H), 2.28 (s, 3H), 1.78-1.67 (m, 2H), 1.24 (d, J=5.9 Hz, 3H).

Example 13

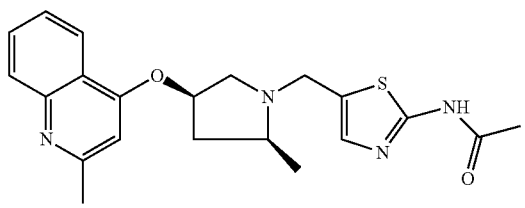 [SMILES: CC(=O)Nc1ncc(CN2C[C@H](Oc3cc(C)nc4ccccc34)C[C@@H]2C)s1]

N-(5-(((2S,4R)-2-methyl-4-((2-methylquinolin-4-yl)oxy)pyrrolidin-1-yl)methyl)thiazol-2-yl)acetamide: The title compound was prepared in an analogous manner of that in scheme 1 (general procedure 1) from 4-chloro-2-methylquinoline and N-(5-(((2S,4R)-4-hydroxy-2-methylpyrrolidin-1-yl)methyl)thiazol-2-yl)acetamide. LCMS (APCI): [M+H] 397. ¹HNMR: (400 MHz, CDCl₃) δ 12.20 (br s, 1H), 8.14 (d, J=8.4 Hz, 1H), 7.88 (d, J=8.4 Hz, 1H), 7.61 (t, J=7.5, 7.5 Hz, 1H), 7.40 (t, J=7.5, 7.5 Hz, 1H), 7.21 (s, 1H), 6.40 (s, 1H), 4.92-4.82 (m, 1H), 4.12 (d, J=14.3 Hz, 1H), 3.60 (d, J=14.4 Hz, 1H), 3.28 (d, J=11.0 Hz, 1H), 2.71 (dd, J=11.0, 6.2 Hz, 1H), 2.63 (s, 3H), 2.62-2.56 (m, 2H), 2.26 (s, 3H), 1.90-1.81 (m, 1H), 1.26 (d, J=5.4 Hz, 3H).

Example 14

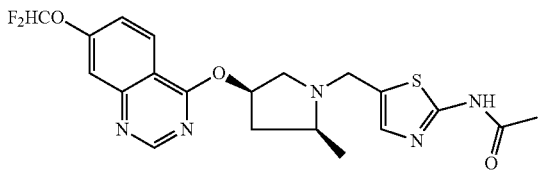 [SMILES: CC(=O)Nc1ncc(CN2C[C@H](Oc3ncnc4cc(OC(F)F)ccc34)C[C@@H]2C)s1]

N-(5-(((2S,4R)-4-((7-(difluoromethoxy)quinazolin-4-yl)oxy)-2-methylpyrrolidin-1-yl)methyl)thiazol-2-yl)acetamide: The title compound was prepared in an analogous manner of that in scheme 1 (general procedure 1) from 4-chloro-7-(difluoromethoxy)quinazoline and N-(5-(((2S,4R)-4-hydroxy-2-methylpyrrolidin-1-yl)methyl)thiazol-2-yl)acetamide. LCMS (APCI): [M+H] 450. ¹HNMR: (400 MHz, DMSO+CCl₄) δ 11.81 (s, 1H), 8.62 (s, 1H), 8.21 (d, J=8.9 Hz, 1H), 7.54-7.50 (m, 1H), 7.48-7.19 (m, 2H), 7.14 (s, 1H), 5.60-5.55 (m, 1H), 4.06 (d, J=14.1 Hz, 1H), 3.53 (d, J=14.1 Hz, 1H), 3.14 (d, J=11.3 Hz, 1H), 2.68 (dd, J=11.4, 6.2 Hz, 1H), 2.65-2.56 (m, 2H), 2.10 (s, 3H), 1.78-1.70 (m, 1H), 1.26 (d, J=5.6 Hz, 3H).

Example 15

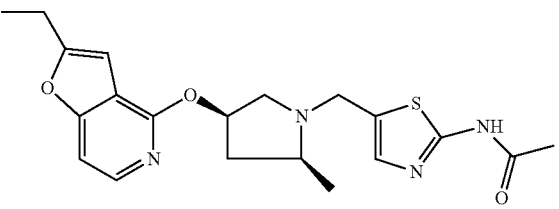 [SMILES: CCc1cc2c(O[C@@H]3C[C@H](C)N(Cc4cnc(NC(C)=O)s4)C3)nccc2o1]

N-(5-(((2S,4R)-4-((2-ethylfuro[3,2-c]pyridin-4-yl)oxy)-2-methylpyrrolidin-1-yl)methyl)thiazol-2-yl)acetamide: The title compound was prepared in an analogous manner of that in scheme 1 (general procedure 1) from 4-chloro-2-ethylfuro[3,2-c]pyridine and N-(5-(((2S,4R)-4-hydroxy-2-methylpyrrolidin-1-yl)methyl)thiazol-2-yl)acetamide. LCMS (APCI): [M+H] 401. ¹HNMR: (400 MHz, CDCl₃) δ 12.25 (s, 1H), 7.82 (d, J=5.9 Hz, 1H), 7.19 (s, 1H), 6.94 (d, J=5.9 Hz, 1H), 6.45 (s, 1H), 5.50-5.42 (m, 1H), 4.11 (d, J=14.2 Hz, 1H), 3.55 (d, J=14.2 Hz, 1H), 3.19 (d, J=11.1 Hz, 1H), 2.75 (q, J=7.6, 7.6, 7.5 Hz, 2H), 2.67 (dd, J=11.2, 6.7 Hz, 1H), 2.60-2.49 (m, 2H), 2.27 (s, 3H), 1.78-1.73 (m, 1H), 1.29 (t, J=7.5, 7.5 Hz, 3H), 1.25 (d, J=5.4 Hz, 3H).

Example 16

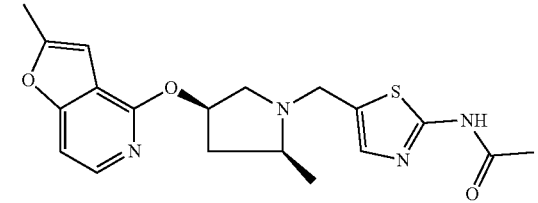 [SMILES: CC(=O)Nc1ncc(CN2C[C@H](Oc3nccc4oc(C)cc34)C[C@@H]2C)s1]

N-(5-(((2S,4R)-2-methyl-4-((2-methylfuro[3,2-c]pyridin-4-yl)oxy)pyrrolidin-1-yl)methyl)thiazol-2-yl)acetamide: The title compound was prepared in an analogous manner of that in scheme 1 (general procedure 1) from 4-chloro-2-methylfuro[3,2-c]pyridine and N-(5-(((2S,4R)-4-hydroxy-2-methylpyrrolidin-1-yl)methyl)thiazol-2-yl)acetamide. LCMS (APCI): [M+H] 387. ¹HNMR: (400 MHz, DMSO+CCl₄) δ 11.79 (s, 1H), 7.78 (d, J=5.9 Hz, 1H), 7.12 (s, 1H), 6.96 (d, J=5.8 Hz, 1H), 6.49 (s, 1H), 5.46-5.39 (m, 1H), 4.03 (d, J=13.9 Hz, 1H), 3.49 (d, J=14.0 Hz, 1H), 3.08-3.01 (m, 2H), 2.67-2.60 (m, 1H), 2.59-2.47 (m, 4H), 2.10 (s, 3H), 1.71-1.60 (m, 1H), 1.23 (d, J=5.3 Hz, 3H).

Example 17

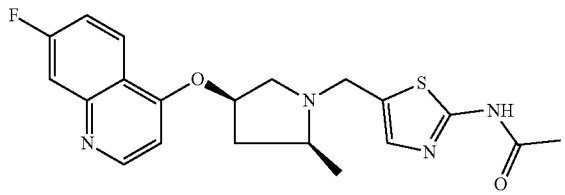 [SMILES: CC(=O)Nc1ncc(CN2C[C@H](Oc3ccnc4cc(F)ccc34)C[C@@H]2C)s1]

N-(5-(((2S,4R)-4-((7-fluoroquinolin-4-yl)oxy)-2-methylpyrrolidin-1-yl)methyl)thiazol-2-yl)acetamide: The title compound was prepared in an analogous manner of that in scheme 1 (general procedure 1) from 4-chloro-7-fluoroquinoline and N-(5-(((2S,4R)-4-hydroxy-2-methylpyrrolidin-1-yl)methyl)thiazol-2-yl)acetamide. LCMS (APCI): [M+H] 401. $^1$HNMR: (400 MHz, DMSO+CCl$_4$) δ 11.83 (s, 1H), 8.60 (d, J=5.1 Hz, 1H), 8.23 (dd, J=9.2, 6.2 Hz, 1H), 7.50 (dd, J=10.4, 2.6 Hz, 1H), 7.30 (td, J=8.8, 8.7, 2.6 Hz, 1H), 7.15 (s, 1H), 6.73 (d, J=5.1 Hz, 1H), 5.05-4.96 (m, 1H), 4.06 (d, J=14.1 Hz, 1H), 3.57 (d, J=14.1 Hz, 1H), 3.17 (d, J=11.1 Hz, 1H), 2.74-2.59 (m, 3H), 2.11 (s, 3H), 1.77-1.68 (m, 1H), 1.25 (d, J=5.3 Hz, 3H).

Example 18

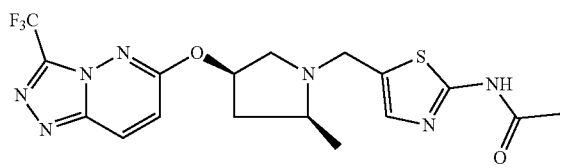 [SMILES: CC(=O)Nc1ncc(CN2C[C@H](Oc3ccc4nnc(C(F)(F)F)n4n3)C[C@@H]2C)s1]

N-(5-(((2S,4R)-2-methyl-4-((3-(trifluoromethyl)-[1,2,4]triazolo[4,3-b]pyridazin-6-yl)oxy)pyrrolidin-1-yl)methyl)thiazol-2-yl)acetamide: The title compound was prepared in an analogous manner of that in scheme 1 (general procedure 1) from 6-chloro-3-(trifluoromethyl)-[1,2,4]triazolo[4,3-b]pyridazine and N-(5-(((2S,4R)-4-hydroxy-2-methylpyrrolidin-1-yl)methyl)thiazol-2-yl)acetamide. LCMS (APCI): [M+H] 442.

Example 19

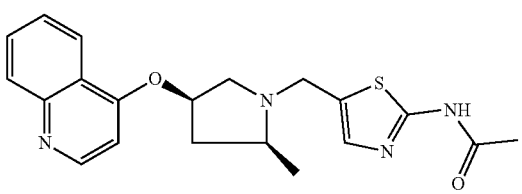 [SMILES: CC(=O)Nc1ncc(CN2C[C@H](Oc3ccnc4ccccc34)C[C@@H]2C)s1]

N-(5-(((2S,4R)-2-methyl-4-(quinolin-4-yloxy)pyrrolidin-1-yl)methyl)thiazol-2-yl)acetamide: The title compound was prepared in an analogous manner of that in scheme 1 (general procedure 1) from 4-fluoroquinoline and N-(5-(((2S,4R)-4-hydroxy-2-methylpyrrolidin-1-yl)methyl)thiazol-2-yl)acetamide. LCMS (APCI): [M+H] 383. $^1$HNMR: (400 MHz, DMSO+CCl$_4$) δ 11.83 (s, 1H), 8.59 (d, J=5.1 Hz, 1H), 8.18 (d, J=8.3 Hz, 1H), 7.87 (d, J=8.4 Hz, 1H), 7.64 (t, J=7.5, 7.5 Hz, 1H), 7.47 (t, J=7.6, 7.6 Hz, 1H), 7.16 (s, 1H), 6.73 (d, J=5.2 Hz, 1H), 5.04-4.96 (m, 1H), 4.07 (d, J=14.1 Hz, 1H), 3.59 (d, J=14.1 Hz, 1H), 3.19-3.16 (m, 1H), 2.79-2.71 (m, 1H), 2.70-2.58 (m, 2H), 2.11 (s, 3H), 1.80-1.66 (m, 1H), 1.26 (d, J=5.2 Hz, 3H).

Example 20

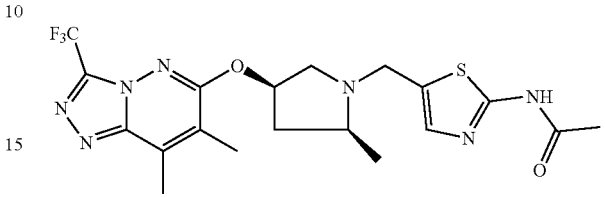

N-(5-(((2S,4R)-4-((7,8-dimethyl-3-(trifluoromethyl)-[1,2,4]triazolo[4,3-b]pyridazin-6-yl)oxy)-2-methylpyrrolidin-1-yl)methyl)thiazol-2-yl)acetamide: The title compound was prepared in an analogous manner of that in scheme 1 (general procedure 1) from 6-chloro-7,8-dimethyl-3-(trifluoromethyl)-[1,2,4]triazolo[4,3-b]pyridazine and N-(5-(((2S,4R)-4-hydroxy-2-methylpyrrolidin-1-yl)methyl)thiazol-2-yl)acetamide. LCMS (APCI): [M+H] 470.

Example 21

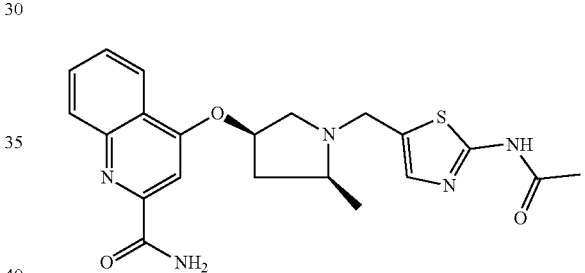

4-(((3R,5S)-1-((2-acetamidothiazol-5-yl)methyl)-5-methylpyrrolidin-3-yl)oxy)quinoline-2-carboxamide: The title compound was prepared in an analogous manner of that in scheme 1 (general procedure 1) from 4-chloroquinoline-2-carbonitrile and N-(5-(((2S,4R)-4-hydroxy-2-methylpyrrolidin-1-yl)methyl)thiazol-2-yl)acetamide. LCMS (APCI): [M+H] 426. $^1$HNMR: (400 MHz, DMSO+CCl$_4$) δ 11.82 (s, 1H), 8.24 (d, J=8.3 Hz, 1H), 7.96 (d, J=8.5 Hz, 1H), 7.95-7.89 (m, 1H), 7.73 (t, J=7.5, 7.5 Hz, 1H), 7.62-7.55 (m, 2H), 7.43 (s, 1H), 7.17 (s, 1H), 5.16-5.09 (m, 1H), 4.08 (d, J=14.2 Hz, 1H), 3.57 (d, J=14.2 Hz, 1H), 3.22 (d, J=11.2 Hz, 1H), 2.79-2.68 (m, 2H), 2.68-2.61 (m, 1H), 2.11 (s, 3H), 1.81-1.71 (m, 1H), 1.26 (d, J=5.9 Hz, 3H).

Example 22

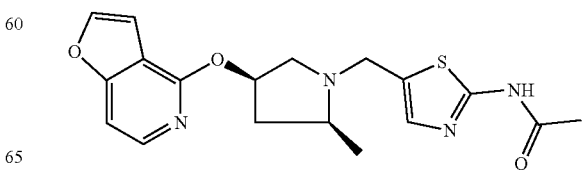

N-(5-(((2S,4R)-4-(furo[3,2-c]pyridin-4-yloxy)-2-methylpyrrolidin-1-yl)methyl)thiazol-2-yl)acetamide: The title compound was prepared in an analogous manner of that in scheme 1 (general procedure 1) from 4-fluorofuro[3,2-c]pyridine and N-(5-(((2S,4R)-4-hydroxy-2-methylpyrrolidin-1-yl)methyl)thiazol-2-yl)acetamide. LCMS (APCI): [M+H] 373. ¹HNMR: (400 MHz, DMSO+CCl₄) δ 11.80 (s, 1H), 7.87 (d, J=5.9 Hz, 1H), 7.74 (d, J=2.2 Hz, 1H), 7.13 (s, 1H), 7.08 (d, J=5.9 Hz, 1H), 6.88 (d, J=2.1 Hz, 1H), 5.48-5.43 (m, 1H), 4.04 (d, J=13.9 Hz, 1H), 3.50 (d, J=14.1 Hz, 1H), 3.07 (d, J=11.3 Hz, 1H), 2.70-2.62 (m, 1H), 2.58-2.52 (m, 2H), 2.10 (s, 3H), 1.73-1.66 (m, 1H), 1.24 (d, J=5.4 Hz, 3H).

Example 23

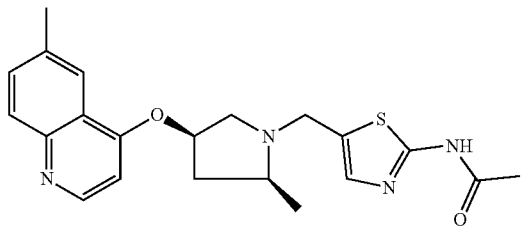 [SMILES: CC(=O)Nc1ncc(CN2C[C@H](Oc3ccnc4ccc(C)cc34)C[C@@H]2C)s1]

N-(5-(((2S,4R)-2-methyl-4-((6-methylquinolin-4-yl)oxy)pyrrolidin-1-yl)methyl)thiazol-2-yl)acetamide: The title compound was prepared in an analogous manner of that in scheme 1 (general procedure 1) from 4-chloro-6-methylquinoline and N-(5-(((2S,4R)-4-hydroxy-2-methylpyrrolidin-1-yl)methyl)thiazol-2-yl)acetamide. LCMS (APCI): [M+H] 397. ¹HNMR: (400 MHz, DMSO+CCl₄) δ 11.82 (s, 1H), 8.51 (d, J=5.1 Hz, 1H), 7.91 (s, 1H), 7.76 (d, J=8.6 Hz, 1H), 7.46 (dd, J=8.6, 2.1 Hz, 1H), 7.16 (s, 1H), 6.66 (d, J=5.2 Hz, 1H), 5.00-4.92 (m, 1H), 4.07 (d, J=14.2 Hz, 1H), 3.58 (d, J=14.1 Hz, 1H), 3.17 (d, J=11.0 Hz, 1H), 2.73 (dd, J=11.1, 6.3 Hz, 1H), 2.68-2.59 (m, 2H), 2.54 (s, 3H), 2.11 (s, 3H), 1.81-1.70 (m, 1H), 1.26 (d, J=5.4 Hz, 3H).

Example 24

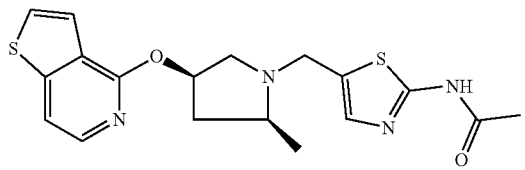 [SMILES: CC(=O)Nc1ncc(CN2C[C@H](Oc3nccc4sccc34)C[C@@H]2C)s1]

N-(5-(((2S,4R)-2-methyl-4-(thieno[3,2-c]pyridin-4-yloxy)pyrrolidin-1-yl)methyl)thiazol-2-yl)acetamide: The title compound was prepared in an analogous manner of that in scheme 1 (general procedure 1) from 4-chlorothieno[3,2-c]pyridine and N-(5-(((2S,4R)-4-hydroxy-2-methylpyrrolidin-1-yl)methyl)thiazol-2-yl)acetamide. LCMS (APCI): [M+H] 389. ¹HNMR: (400 MHz, CDCl₃) δ 12.27 (s, 1H), 7.88 (d, J=5.7 Hz, 1H), 7.50 (d, J=5.5 Hz, 1H), 7.33-7.28 (m, 2H), 7.20 (s, 1H), 5.52-5.43 (m, 1H), 4.11 (d, J=14.2 Hz, 1H), 3.56 (d, J=14.2 Hz, 1H), 3.22 (d, J=11.1 Hz, 1H), 2.71 (dd, J=11.2, 6.7 Hz, 1H), 2.60-2.52 (m, 2H), 2.26 (s, 3H), 1.85-1.78 (m, 1H), 1.26 (d, J=5.3 Hz, 3H).

Example 25

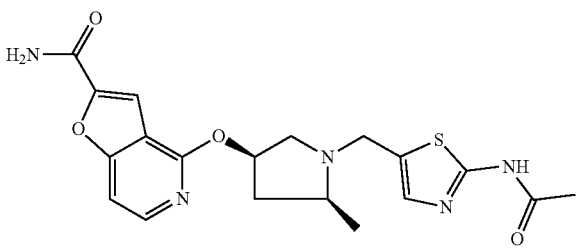 [SMILES: CC(=O)Nc1ncc(CN2C[C@H](Oc3nccc4oc(C(N)=O)cc34)C[C@@H]2C)s1]

4-(((3R,5S)-1-((2-acetamidothiazol-5-yl)methyl)-5-methylpyrrolidin-3-yl)oxy)furo[3,2-c]pyridine-2-carboxamide: The title compound was prepared in an analogous manner of that in scheme 1 (general procedure 1) from 4-chlorofuro[3,2-c]pyridine-2-carbonitrile and N-(5-(((2S,4R)-4-hydroxy-2-methylpyrrolidin-1-yl)methyl)thiazol-2-yl)acetamide. LCMS (APCI): [M+H] 416.

Example 26

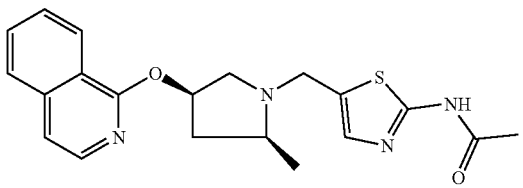 [SMILES: CC(=O)Nc1ncc(CN2C[C@H](Oc3nccc4ccccc34)C[C@@H]2C)s1]

N-(5-(((2S,4R)-4-(isoquinolin-1-yloxy)-2-methylpyrrolidin-1-yl)methyl)thiazol-2-yl)acetamide: The title compound was prepared in an analogous manner of that in scheme 1 (general procedure 1) from 1-bromoisoquinoline and N-(5-(((2S,4R)-4-hydroxy-2-methylpyrrolidin-1-yl)methyl)thiazol-2-yl)acetamide. LCMS (APCI): [M+H] 383. ¹HNMR: (400 MHz, CDCl₃) δ 12.38 (s, 1H), 8.26 (d, J=8.3 Hz, 1H), 7.89 (d, J=5.9 Hz, 1H), 7.67 (d, J=8.2 Hz, 1H), 7.61 (t, J=7.6, 7.6 Hz, 1H), 7.50 (t, J=7.4, 7.4 Hz, 1H), 7.20 (s, 1H), 7.14 (d, J=5.9 Hz, 1H), 5.56-5.48 (m, 1H), 4.12 (d, J=14.2 Hz, 1H), 3.57 (d, J=14.2 Hz, 1H), 3.26 (d, J=11.2 Hz, 1H), 2.74 (dd, J=11.2, 6.7 Hz, 1H), 2.66-2.55 (m, 2H), 2.26 (s, 3H), 1.88-1.80 (m, 1H), 1.27 (d, J=5.4 Hz, 3H).

Example 27

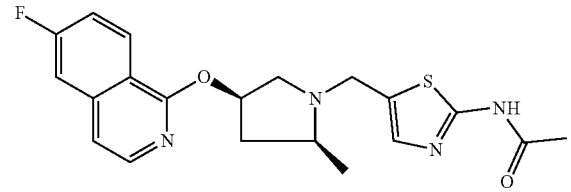 [SMILES: CC(=O)Nc1ncc(CN2C[C@H](Oc3nccc4cc(F)ccc34)C[C@@H]2C)s1]

N-(5-(((2S,4R)-4-((6-fluoroisoquinolin-1-yl)oxy)-2-methylpyrrolidin-1-yl)methyl)thiazol-2-yl)acetamide: The title compound was prepared in an analogous manner of that in scheme 1 (general procedure 1) from 1-chloro-6-fluoroisoquinoline and N-(5-(((2S,4R)-4-hydroxy-2-methylpyrrolidin-1-yl)methyl)thiazol-2-yl)acetamide. LCMS (APCI):

[M+H] 401. ¹HNMR: (400 MHz, DMSO+CCl₄) δ 11.80 (s, 1H), 8.29 (dd, J=9.2, 5.7 Hz, 1H), 7.88 (d, J=5.9 Hz, 1H), 7.44 (dd, J=9.6, 2.5 Hz, 1H), 7.33 (td, J=8.7, 8.7, 2.1 Hz, 1H), 7.19 (d, J=5.9 Hz, 1H), 7.14 (s, 1H), 5.54-5.45 (m, 1H), 4.05 (d, J=14.1 Hz, 1H), 3.53 (d, J=14.2 Hz, 1H), 3.11 (d, J=10.8 Hz, 1H), 2.73-2.65 (m, 1H), 2.63-2.54 (m, 2H), 2.10 (s, 3H), 1.79-1.67 (m, 1H), 1.26 (d, J=5.3 Hz, 3H).

Example 28

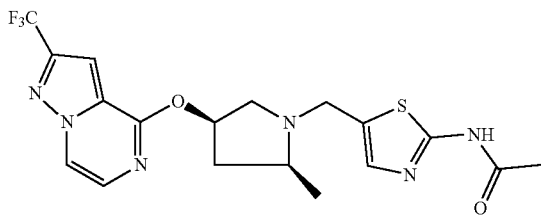 [SMILES: CC(=O)Nc1ncc(CN2C[C@H](Oc3nccn4nc(C(F)(F)F)cc34)C[C@@H]2C)s1]

N-(5-(((2S,4R)-2-methyl-4-((2-(trifluoromethyl)pyrazolo[1,5-a]pyrazin-4-yl)oxy)pyrrolidin-1-yl)methyl)thiazol-2-yl)acetamide: The title compound was prepared in an analogous manner of that in scheme 1 (general procedure 1) from 4-chloro-2-(trifluoromethyl)pyrazolo[1,5-a]pyrazine and N-(5-(((2S,4R)-4-hydroxy-2-methylpyrrolidin-1-yl)methyl)thiazol-2-yl)acetamide. LCMS (APCI): [M+H] 441.

Example 29

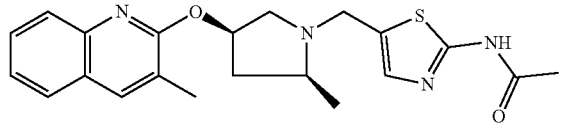 [SMILES: CC(=O)Nc1ncc(CN2C[C@H](Oc3nc4ccccc4cc3C)C[C@@H]2C)s1]

N-(5-(((2S,4R)-2-methyl-4-((3-methylquinolin-2-yl)oxy)pyrrolidin-1-yl)methyl)thiazol-2-yl)acetamide: The title compound was prepared in an analogous manner of that in scheme 1 (general procedure 1) from 2-chloro-3-methylquinoline and N-(5-(((2S,4R)-4-hydroxy-2-methylpyrrolidin-1-yl)methyl)thiazol-2-yl)acetamide. LCMS (APCI): [M+H] 397. ¹HNMR: (400 MHz, DMSO+CCl₄) δ 11.78 (s, 1H), 7.81 (s, 1H), 7.63 (d, J=8.2 Hz, 2H), 7.47 (t, J=7.8, 7.8 Hz, 1H), 7.28 (t, J=7.5, 7.5 Hz, 1H), 7.13 (s, 1H), 5.56-5.50 (m, 1H), 4.04 (d, J=14.0 Hz, 1H), 3.52 (d, J=14.1 Hz, 1H), 3.07 (d, J=11.2 Hz, 1H), 2.72 (dd, J=11.2, 6.8 Hz, 1H), 2.63-2.53 (m, 2H), 2.33 (s, 3H), 2.10 (s, 3H), 1.74-1.63 (m, 1H), 1.24 (d, J=5.3 Hz, 3H).

Example 30

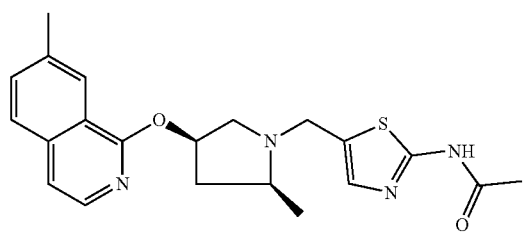 [SMILES: CC(=O)Nc1ncc(CN2C[C@H](Oc3nccc4ccc(C)cc34)C[C@@H]2C)s1]

N-(5-(((2S,4R)-2-methyl-4-((7-methylisoquinolin-1-yl)oxy)pyrrolidin-1-yl)methyl)thiazol-2-yl)acetamide: The title compound was prepared in an analogous manner of that in scheme 1 (general procedure 1) from 1-chloro-7-methylisoquinoline and N-(5-(((2S,4R)-4-hydroxy-2-methylpyrrolidin-1-yl)methyl)thiazol-2-yl)acetamide. LCMS (APCI): [M+H] 397. ¹HNMR: (400 MHz, DMSO+CCl₄) δ 11.79 (s, 1H), 7.97 (s, 1H), 7.79 (d, J=5.8 Hz, 1H), 7.63 (d, J=8.3 Hz, 1H), 7.48 (d, J=8.7 Hz, 1H), 7.15-7.11 (m, 2H), 5.51-5.44 (m, 1H), 4.05 (d, J=14.0 Hz, 1H), 3.53 (d, J=14.1 Hz, 1H), 3.11 (d, J=11.2 Hz, 1H), 2.70 (dd, J=11.0, 6.8 Hz, 1H), 2.64-2.55 (m, 2H), 2.54 (s, 3H), 2.09 (s, 3H), 1.80-1.69 (m, 1H), 1.27 (d, J=5.3 Hz, 3H).

Example 31

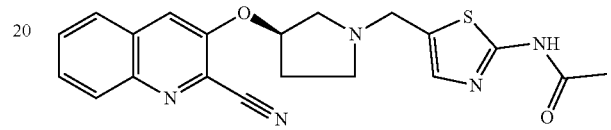

N-(5-(((2S,4R)-4-((2-cyanoquinolin-3-yl)oxy)-2-methylpyrrolidin-1-yl)methyl)thiazol-2-yl)acetamide: The title compound was prepared in an analogous manner of that in scheme 1 (general procedure 1) from 3-bromoquinoline-2-carbonitrile and N-(5-(((2S,4R)-4-hydroxy-2-methylpyrrolidin-1-yl)methyl)thiazol-2-yl)acetamide. LCMS (APCI): [M+H] 408.

Example 32

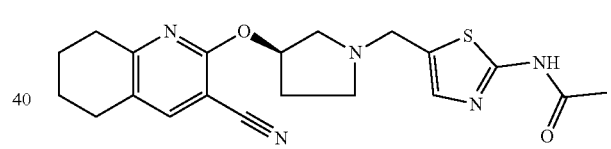

N-(5-(((2S,4R)-4-((3-cyano-5,6,7,8-tetrahydroquinolin-2-yl)oxy)-2-methylpyrrolidin-1-yl)methyl)thiazol-2-yl)acetamide: The title compound was prepared in an analogous manner of that in scheme 1 (general procedure 1) from 2-chloro-5,6,7,8-tetrahydroquinoline-3-carbonitrile and N-(5-(((2S,4R)-4-hydroxy-2-methylpyrrolidin-1-yl)methyl)thiazol-2-yl)acetamide. LCMS (APCI): [M+H] 412.

Example 33

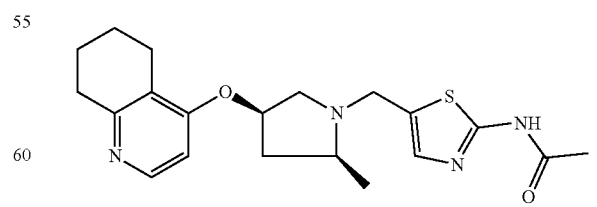

N-(5-(((2S,4R)-2-methyl-4-((5,6,7,8-tetrahydroquinolin-4-yl)oxy)pyrrolidin-1-yl)methyl)thiazol-2-yl)acetamide: The title compound was prepared in an analogous manner of that in scheme 1 (general procedure 1) from 4-chloro-5,6,7,8- tetrahydroquinoline and N-(5-(((2S,4R)-4-hydroxy-2-methylpyrrolidin-1-yl)methyl)thiazol-2-yl)acetamide. LCMS (APCI): [M+H] 387. ¹HNMR: (400 MHz, DMSO+CCl₄) δ 11.81 (s, 1H), 8.03 (d, J=5.6 Hz, 1H), 7.12 (s, 1H), 6.47 (d, J=5.6 Hz, 1H), 4.77-4.72 (m, 1H), 4.00 (d, J=14.1 Hz, 1H), 3.54 (d, J=14.2 Hz, 1H), 3.00-2.94 (m, 2H), 2.75-2.70 (m, 2H), 2.68-2.55 (m, 4H), 2.11 (s, 3H), 1.81-1.70 (m, 4H), 1.62-1.52 (m, 1H), 1.21 (d, J=5.5 Hz, 3H).

Example 34

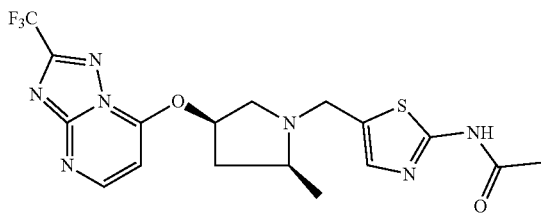

N-(5-(((2S,4R)-2-methyl-4-((2-(trifluoromethyl)-[1,2,4]triazolo[1,5-a]pyrimidin-7-yl)oxy)pyrrolidin-1-yl)methyl)thiazol-2-yl)acetamide: The title compound was prepared in an analogous manner of that in scheme 1 (general procedure 1) from 7-chloro-2-(trifluoromethyl)-[1,2,4]triazolo[1,5-a]pyrimidine and N-(5-(((2S,4R)-4-hydroxy-2-methylpyrrolidin-1-yl)methyl)thiazol-2-yl)acetamide. LCMS (APCI): [M+H] 442.

Example 35

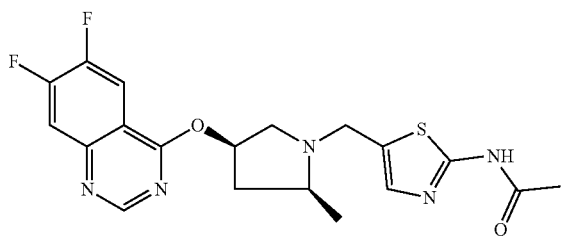 [SMILES: CC(=O)Nc1ncc(CN2C[C@H](Oc3ncnc4cc(F)c(F)cc34)C[C@@H]2C)s1]

N-(5-(((2S,4R)-4-((6,7-difluoroquinazolin-4-yl)oxy)-2-methylpyrrolidin-1-yl)methyl)thiazol-2-yl)acetamide: The title compound was prepared in an analogous manner of that in scheme 1 (general procedure 1) from 4-chloro-6,7-difluoroquinazoline and N-(5-(((2S,4R)-4-hydroxy-2-methylpyrrolidin-1-yl)methyl)thiazol-2-yl)acetamide. LCMS (APCI): [M+H] 420.

Example 36

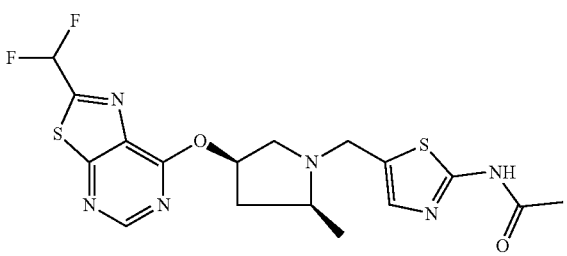 [SMILES: CC(=O)Nc1ncc(CN2C[C@H](Oc3ncnc4sc(C(F)F)nc34)C[C@@H]2C)s1]

N-(5-(((2S4R)-4-((2-difluoromethyl)thiazolo[5,4-d]pyrimidin-7-yl)oxy)-2-methylpyrrolidin-1-yl)methyl)thiazol-2-yl)acetamide: The title compound was prepared in an analogous manner of that in scheme 1 (general procedure 1) from 7-chloro-2-(difluoromethyl)thiazolo[5,4-d]pyrimidine and N-(5-(((2S,4R)-4-hydroxy-2-methylpyrrolidin-1-yl)methyl)thiazol-2-yl)acetamide. LCMS (APCI): [M+H] xxx. ¹HNMR: (500 MHz, CDCl₃) δ 441.

Example 37

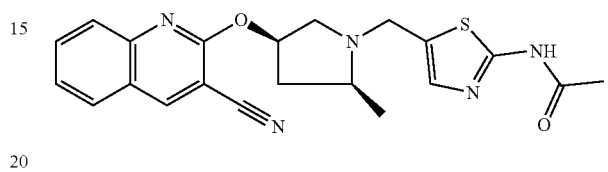

N-(5-(((2S,4R)-4-((3-cyanoquinolin-2-yl)oxy)-2-methylpyrrolidin-1-yl)methyl)thiazol-2-yl)acetamide: The title compound was prepared in an analogous manner of that in scheme 1 (general procedure 1) from 2-chloroquinoline-3-carbonitrile and N-(5-(((2S,4R)-4-hydroxy-2-methylpyrrolidin-1-yl)methyl)thiazol-2-yl)acetamide. LCMS (APCI): [M+H] 408. ¹HNMR: (400 MHz, DMSO+CCl₄) δ 11.81 (s, 1H), 8.81 (s, 1H), 7.90 (d, J=8.1 Hz, 1H), 7.77-7.72 (m, 2H), 7.49-7.44 (m, 1H), 7.15 (s, 1H), 5.61-5.52 (m, 1H), 4.06 (d, J=14.4 Hz, 1H), 3.58 (d, J=14.2 Hz, 1H), 3.13 (d, J=11.1 Hz, 1H), 2.83-2.74 (m, 1H), 2.67-2.58 (m, 2H), 2.10 (s, 3H), 1.81-1.70 (m, 1H), 1.27 (d, J=5.4 Hz, 3H).

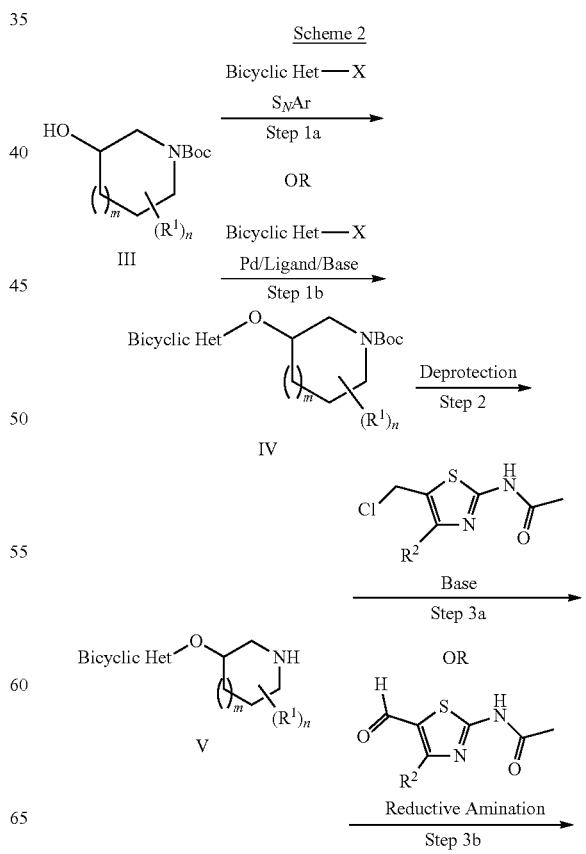

-continued

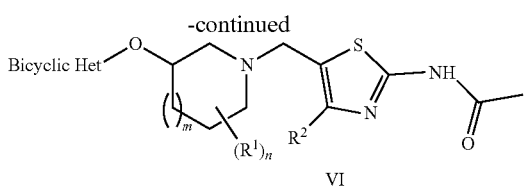

VI

Intermediate 5

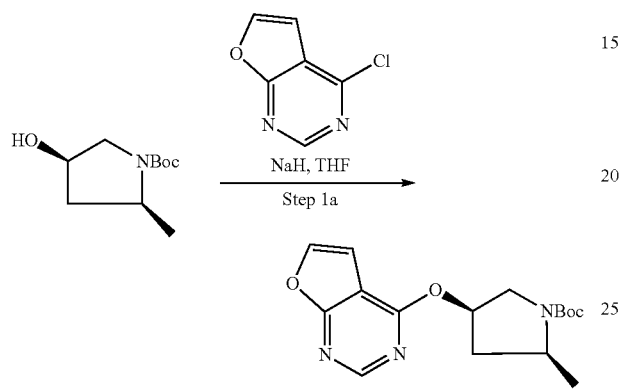

tert-butyl (2S,4R)-4-(furo[2,3-d]pyrimidin-4-yloxy)-2-methylpyrrolidine-1-carboxylate: To a solution of tert-butyl (2S,4R)-4-hydroxy-2-methylpyrrolidine-1-carboxylate (0.2 g, 0.99 mmol) in THF (5.0 mL) was added sodium hydride (79.5 mg, 1.99 mmol, 60% dispersion) at 0° C. The reaction was stirred at 20° C. for 0.5 hour. 4-chlorofuro[2,3-d]pyrimidine (0.153 g, 0.99 mmol) was added and the reaction was stirred at 20° C. for 2 hours. The reaction was quenched with saturated aq. NH$_4$Cl (2 mL) and extracted with EtOAc. The combined organic layer was washed with brine, dried over Na$_2$SO$_4$, filtered, and concentrated in vacuo. The residue was purified by column chromatography over silica gel (petroleum ether/EtOAc: 3:1) to provide the title compound (0.201 g, 63% yield). $^1$HNMR: (500 MHz, METHANOL-d$_4$) δ 8.52 (s, 1H), 7.84 (d, J=2.5 Hz, 1H), 6.95 (d, J=2.5 Hz, 1H), 5.81-5.83 (m, 1H), 4.07-4.08 (m, 1H), 3.84-3.86 (m, 1H), 3.63-3.66 (m, 1H), 2.52-2.53 (m, 1H), 2.05-2.08 (m, 1H), 1.48 (s, 9H), 1.38 (d, J=6.5 Hz, 3H).

Intermediate 6

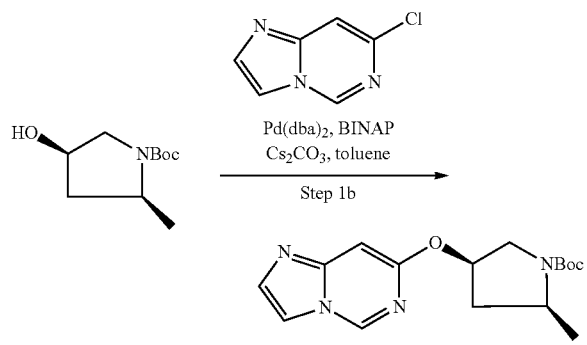

tert-Butyl (2S,4R)-4-(imidazo[1,2-c]pyrimidin-7-yloxy)-2-methylpyrrolidine-1-carboxylate: To a solution of 7-chloro-imidazo[1,2-c]pyrimidine (0.2 g, 1.30 mmol) and tert-butyl (2S,4R)-4-hydroxy-2-methylpyrrolidine-1-carboxylate (0.341 mg, 1.69 mmol) in toluene (6.0 mL) were added Pd$_2$(dba)$_3$ (0.120 mg, 0.13 mmol), BINAP (55.3 mg, 0.13 mmol) and Cs$_2$CO$_3$ (0.848 g, 2.60 mmol). The mixture was stirred at 110° C. for 15 hours under N$_2$. The reaction mixture was filtered, and the filtrate was concentrated in vacuo. The residue was purified by column chromatography over silica gel (petroleum ether/EtOAc: 10:1 to 1:2) to provide the title compound (86.00 mg, 21% yield). LCMS (ESI): [M+H] 391.

Intermediate 7

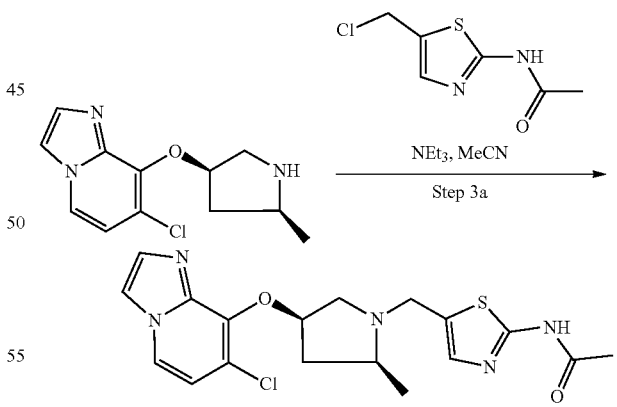

7-(((3R,5S)-5-methylpyrrolidin-3-yl)oxy)imidazo[1,2-c]pyrimidine: To a solution of tert-Butyl (2S,4R)-4-(imidazo[1,2-c]pyrimidin-7-yloxy)-2-methylpyrrolidine-1-carboxylate (86.0 mg, 0.270 mmol) in CH$_2$Cl$_2$ (5.0 mL) was added TFA (1.0 mL). The mixture was stirred at 20° C. for 15 hours. The mixture was adjusted to pH 8 with NH$_4$OH (aq) then diluted with H$_2$O (4.0 mL) and extracted with CH$_2$Cl$_2$. The organic phase was dried over Na$_2$SO$_4$, filtered and concentrated in vacuo to provide the title compound (53.0 mg, 90% yield).

Example 38

N-(5-(((2S,4R)-4-((7-chloroimidazo[1,2-a]pyridin-8-yl)oxy)-2-methylpyrrolidin-1-yl)methyl)thiazol-2-yl)acetamide: To a suspension of 7-chloro-8-[(3R,5S)-5-methylpyrrolidin-3-yl]oxy-imidazo[1,2-a]pyridine (0.190 g, 0.66 mmol, hydrochloride) and N-[5-(chloromethyl)thiazol-2-yl]acetamide (0.132 g, 0.69 mmol) in acetonitrile (3.30 mL) was added triethylamine (0.20 g, 1.98 mmol); which was subsequently warmed to 55° C. overnight. The mixture was cooled to room temperature, diluted with EtOAc, and washed with aqueous NH₄Cl. The organics were dried over MgSO₄, filtered, and concentrated in vacuo. The residue was purified over silica gel (12 g, 0-100% EtOAc:iPrOH (3:1 v/v)-heptane) to provide the title compound (16.00 mg, 6% yield). LCMS (ESI): [M+H] 407. ¹HNMR: (500 MHz, CDCl₃) δ 11.67 (br s, 1H), 7.78 (d, J=6.71 Hz, 1H), 7.48-7.58 (m, 2H), 7.23 (s, 1H), 6.76 (d, J=7.32 Hz, 1H), 5.86-5.94 (m, 1H), 4.11 (d, J=14.65 Hz, 1H), 3.61 (d, J=14.04 Hz, 1H), 3.31 (d, J=10.99 Hz, 1H), 2.55-2.67 (m, 2H), 2.43-2.53 (m, 1H), 2.30 (s, 3H), 1.85-1.95 (m, 1H), 1.30 (d, J=6.10 Hz, 3H).

Example 39

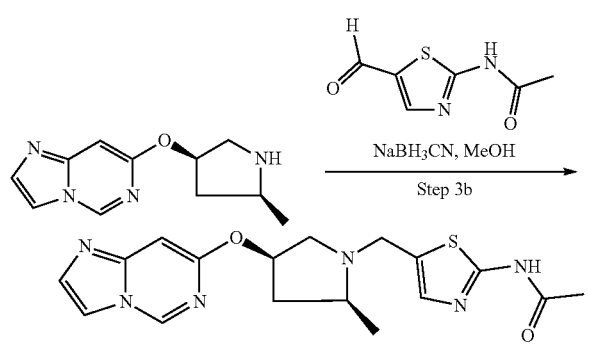

N-(5-(((2S,4R)-4-(imidazo[1,2-c]pyrimidin-7-yloxy)-2-methylpyrrolidin-1-yl)methyl)thiazol-2-yl)acetamide: To a solution of 7-(((3R,5S)-5-methylpyrrolidin-3-yl)oxy)imidazo[1,2-c]pyrimidine (53.0 mg, 0.243 mmol) in MeOH (10.0 mL) was added N-(5-formylthiazol-2-yl)acetamide (74.4 mg, 0.437 mmol). The mixture was stirred at 30° C. for 0.5 hour. Sodium cyanoborohydride (30.5 mg, 0.487 mmol) was added and the mixture was stirred at 30° C. for 3 hours. The reaction mixture was purified via HPLC (Column: Agela Durashell C18 150*30 5 u; Condition: Water-ACN; Begin B: 19; End B: 49; Gradient Time (min): 10; 100% B Hold Time (min): 2; FlowRate (ml/min): 25) to provide the title compound (3.2 mg, 3.5% yield). LCMS (ESI): [M+H] 373. ¹HNMR: (500 MHz, CDCl₃) δ 10.64 (br s, 1H), 8.75 (s, 1H), 7.50-7.54 (m, 2H), 7.21 (s, 1H), 6.74 (s, 1H), 5.10-5.13 (m, 1H), 4.10-4.13 (m, 1H), 3.59-3.62 (m, 1H), 3.18-3.20 (m, 1H), 2.64-2.66 (m, 1H), 2.52-2.55 (m, 2H), 2.29 (s, 3H), 1.83-1.85 (m, 1H), 1.26 (d, J=6.0 Hz, 3H).

Intermediate 8

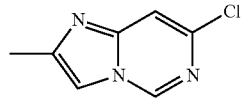

7-chloro-2-methylimidazo[1,2-c]pyrimidine: A solution of 6-chloropyrimidin-4-amine (2.0 g, 15.4 mmol) and 1-chloropropan-2-one (18.0 g, 194.5 mmol, 15.5 mL) in acetonitrile (35.0 mL) was stirred at 120° C. for 6 h. The reaction mixture was concentrated in vacuo and the residue was purified by column chromatography over silica gel (petroleum ether/EtOAc: 5:1 to 1:1) to provide the title compound (0.410 g, 16% yield). ¹HNMR: (400 MHz, CDCl₃) δ 8.78 (s, 1H), 7.52 (s, 1H), 7.44 (s, 1H), 2.46 (s, 3H).

Example 40

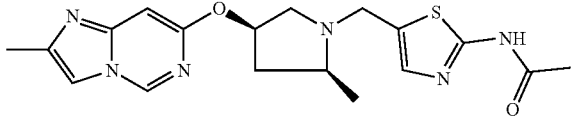 [SMILES: CC(=O)Nc1ncc(CN2C[C@H](Oc3cc4nc(C)cn4cn3)C[C@@H]2C)s1]

N-(5-(((2S,4R)-2-methyl-4-((2-methylimidazo[1,2-c]pyrimidin-7-yl)oxy)pyrrolidin-1-yl)methyl)thiazol-2-yl)acetamide: The title compound was prepared in an analogous manner of that in scheme 2 from 7-chloro-2-methylimidazo[1,2-c]pyrimidine, tert-butyl (2S,4R)-4-hydroxy-2-methylpyrrolidine-1-carboxylate, and N-(5-formylthiazol-2-yl)acetamide. LCMS (ESI): [M+H] 387.1. ¹HNMR: (500 MHz, CDCl₃) δ 11.12 (br.s, 1H), 8.63 (s, 1H), 7.23 (s, 1H), 7.20 (s, 1H), 6.63 (s, 1H), 5.09-5.13 (m, 1H), 4.09-4.13 (m, 1H), 3.58-3.62 (m, 1H), 3.16-3.19 (m, 1H), 2.61-2.65 (m, 1H), 2.49-2.57 (m, 2H), 2.39 (s, 3H), 2.28 (s, 3H), 1.72-1.76 (m, 1H), 1.25 (d, J=5.5 Hz, 3H).

Intermediate 9

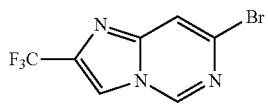 [SMILES: FC(F)(F)c1cn2cnc(Br)cc2n1]

7-bromo-2-(trifluoromethyl)imidazo[1,2-c]pyrimidine: To a solution of 6-chloropyrimidin-4-amine (1.0 g, 7.72 mmol) in dioxane (50.0 mL) was added 4 Å molecular sieves (1.0 g), 3-bromo-1,1,1-trifluoropropan-2-one (10.3 g, 54.0 mmol) and the mixture was stirred at 90° C. for 2 h. The mixture was filtered, and the filtrate was washed with saturated aqueous Na₂CO₃ (10 mL). The organic layer was dried over anhydrous Na₂SO₄, filtered and concentrated in vacuo. The residue was purified by column chromatography over silica gel (petroleum ether/EtOAc: 10:1) to provide the title compound (0.420 g). ¹HNMR: (400 MHz, CDCl₃) δ 8.96 (s, 1H), 7.98 (s, 1H), 7.64 (s, 1H).

Example 41

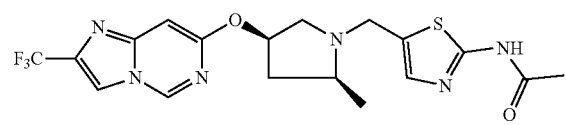 [SMILES: CC(=O)Nc1ncc(CN2C[C@H](Oc3cc4nc(C(F)(F)F)cn4cn3)C[C@@H]2C)s1]

N-(5-(((2S,4R)-2-methyl-4-((2-(trifluoromethyl)imidazo[1,2-c]pyrimidin-7-yl)oxy)pyrrolidin-1-yl)methyl)thiazol-2-yl)acetamide: The title compound was prepared in an analogous manner of that in scheme 2 from 7-bromo-2-(trifluoromethyl)imidazo[1,2-c]pyrimidine, tert-butyl (2S,4R)-4-hydroxy-2-methylpyrrolidine-1-carboxylate, and N-(5-formylthiazol-2-yl)acetamide. LCMS (ESI): [M+H] 441.1. ¹HNMR: (400 MHz, Methanol-d₄) δ 9.13 (s, 1H), 8.24 (s, 1H), 7.27 (s, 1H), 6.74 (s, 1H), 5.22-5.25 (m, 1H), 4.13-4.17 (m, 1H), 3.55-3.59 (m, 1H), 3.13-3.20 (m, 1H), 2.30-2.71 (m, 3H), 2.19 (s, 3H), 1.68-1.74 (m, 1H), 1.27 (d, J=6.0 Hz, 3H).

Example 42

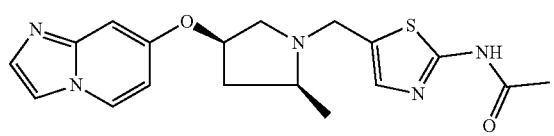 [SMILES: CC(=O)Nc1ncc(CN2C[C@H](Oc3ccn4ccnc4c3)C[C@@H]2C)s1]

N-(5-((((2S,4R)-4-(imidazo[1,2-a]pyridin-7-yloxy)-2-methylpyrrolidin-1-yl)methyl)thiazol-2-yl)acetamide: The title compound was prepared in an analogous manner of that in scheme 2 from 7-bromoimidazo[1,2-a]pyridine, tert-butyl (2S,4R)-4-hydroxy-2-methylpyrrolidine-1-carboxylate, and N-(5-formylthiazol-2-yl)acetamide. LCMS (ESI): [M+H] 372.0. $^1$HNMR: (500 MHz, CDCl$_3$) δ 11.34 (br.s, 1H), 7.93 (d, J=8.0 Hz, 1H), 7.47 (s, 1H), 7.40 (s, 1H), 7.21 (s, 1H), 6.86 (s, 1H), 6.60 (d, J=5.5 Hz, 1H), 4.65-4.76 (m, 1H), 4.12-4.16 (m, 1H), 3.56-3.60 (m, 1H), 3.21-3.24 (m, 1H), 2.49-2.64 (m, 3H), 2.29 (s, 3H), 1.69-1.77 (m, 1H), 1.26 (d, J=5.5 Hz, 3H).

Example 43

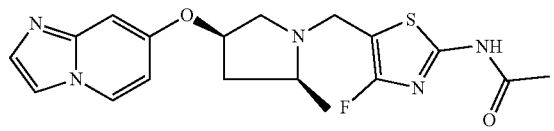 [SMILES: CC(=O)Nc1nc(F)c(CN2C[C@H](Oc3ccn4ccnc4c3)C[C@@H]2C)s1]

N-(4-fluoro-5-(((2S,4R)-4-(imidazo[1,2-a]pyridin-7-yloxy)-2-methylpyrrolidin-1-yl)methyl)thiazol-2-yl)acetamide: The title compound was prepared in an analogous manner of that in scheme 2 from 7-bromoimidazo[1,2-a]pyridine, tert-butyl (2S,4R)-4-hydroxy-2-methylpyrrolidine-1-carboxylate, and N-(4-fluoro-5-formylthiazol-2-yl)acetamide. LCMS (ESI): [M+H] 390.1. $^1$HNMR: (400 MHz, Methanol-d$_4$) δ 8.15-8.23 (m, 1H), 7.61 (s, 1H), 7.36 (s, 1H), 6.69 (d, J=2.0 Hz, 1H), 6.57-6.60 (m, 1H), 4.60-4.61 (m, 1H), 3.96-4.00 (m, 1H), 3.56-3.63 (m, 1H), 3.19-3.21 (m, 1H), 2.61-2.71 (m, 3H), 2.16 (s, 3H), 1.61-1.67 (m, 1H), 1.24 (d, J=5.6 Hz, 3H).

Example 44

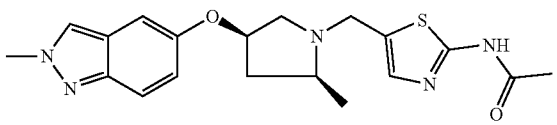 [SMILES: CC(=O)Nc1ncc(CN2C[C@H](Oc3ccc4nn(C)cc4c3)C[C@@H]2C)s1]

N-(5-(((2S,4R)-2-methyl-4-((2-methyl-2H-indazol-5-yl)oxy)pyrrolidin-1-yl)methyl)thiazol-2-yl)acetamide: The title compound was prepared in an analogous manner of that in scheme 2 from 5-bromo-2-methyl-2H-indazole, tert-butyl (2S,4R)-4-hydroxy-2-methylpyrrolidine-1-carboxylate, and N-(5-formylthiazol-2-yl)acetamide. LCMS (ESI): [M+H] 386.0. $^1$HNMR: (400 MHz, CDCl$_3$) δ 10.75-10.79 (br, 1H), 7.72 (s, 1H), 7.55-7.58 (m, 1H), 7.26-7.28 (m, 1H), 6.96-7.00 (m, 1H), 6.67-6.77 (m, 1H), 4.70-4.71 (m, 1H), 4.12- 4.16 (s, 3H), 4.15-4.16 (m, 1H), 3.60-3.70 (m, 1H), 3.26-3.28 (m, 1H), 2.58-2.67 (m, 3H), 2.29 (s, 3H), 1.48-1.59 (m, 1H), 1.23-1.24 (m, 3H).

Example 45

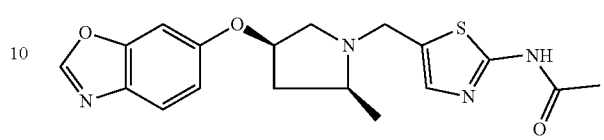

N-(5-(((2S,4R)-4-(benzo[d]oxazol-6-yloxy)-2-methylpyrrolidin-1-yl)methyl)thiazol-2-yl)acetamide: The title compound was prepared in an analogous manner of that in scheme 2 from 6-chlorobenzo[d]oxazole, tert-butyl (2S,4R)-4-hydroxy-2-methylpyrrolidine-1-carboxylate, and N-(5-formylthiazol-2-yl)acetamide. LCMS (ESI): [M+H] 373. $^1$HNMR: (400 MHz, METHANOL-d$_4$) δ 8.32 (s, 1H), 7.58 (d, J=8.8 Hz, 1H), 7.28 (s, 1H), 7.16 (d, J=2.4 Hz, 1H), 6.97 (dd, J=2.4, 8.8 Hz, 1H), 4.81-4.84 (m, 1H), 4.13-4.17 (m, 1H), 3.56-3.60 (m, 1H), 3.15-3.18 (m, 1H), 2.60-2.68 (m, 3H), 2.19 (s, 3H), 1.64-1.70 (m, 1H), 1.26 (d, J=6.0 Hz, 3H).

Example 46

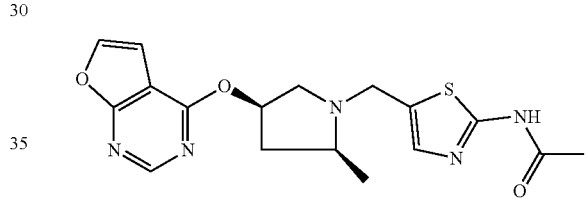

N-(5-(((2S,4R)-4-(furo[2,3-d]pyrimidin-4-yloxy)-2-methylpyrrolidin-1-yl)methyl)thiazol-2-yl)acetamide: The title compound was prepared in an analogous manner of that in scheme 2 from 4-chlorofuro[2,3-d]pyrimidine, tert-butyl (2S,4R)-4-hydroxy-2-methylpyrrolidine-1-carboxylate, and N-(5-formylthiazol-2-yl)acetamide. LCMS (ESI): [M+H] 374. $^1$HNMR: (400 MHz, METHANOL-d$_4$) δ 8.45 (s, 1H), 7.79 (d, J=2.0 Hz, 1H), 7.27 (s, 1H), 6.95 (d, J=2.0 Hz, 1H), 5.58-5.59 (m, 1H), 4.14-4.17 (m, 1H), 3.56-3.59 (m, 1H), 3.20-3.22 (m, 1H), 2.60-2.70 (m, 3H), 2.18 (s, 3H), 1.73-1.74 (m, 1H), 1.27 (d, J=6.0 Hz, 3H).

Example 47

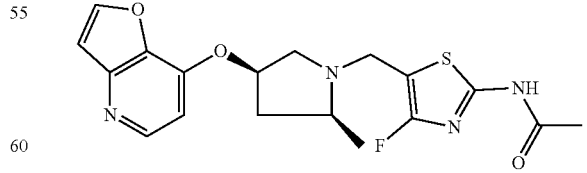

N-(4-fluoro-5-(((2S,4R)-4-(furo[3,2-b]pyridin-7-yloxy)-2-methylpyrrolidin-1-yl)methyl)thiazol-2-yl)acetamide: The title compound was prepared in an analogous manner of that in scheme 2 from 7-chlorofuro[3,2-b]pyridine, tert-butyl (2S,4R)-4-hydroxy-2-methylpyrrolidine-1-carboxylate, and N-(4-fluoro-5-formylthiazol-2-yl)acetamide. LCMS (ESI): [M+H] 391. ¹HNMR: (500 MHz, CDCl₃) δ 10.11 (br. s, 1H), 8.35 (d, J=5.5 Hz, 1H), 7.78 (d, J=2.0 Hz, 1H), 6.94 (d, J=2.0 Hz, 1H), 6.66 (d, J=5.5 Hz, 1H), 5.09-5.11 (m, 1H), 3.96-3.99 (m, 1H), 3.65-3.68 (m, 1H), 3.30-3.32 (m, 1H), 2.73-2.75 (m, 1H), 2.58-2.61 (m, 1H), 2.28 (s, 3H), 1.84-1.85 (m, 1H), 1.28 (d, J=5.5 Hz, 3H).

Example 48

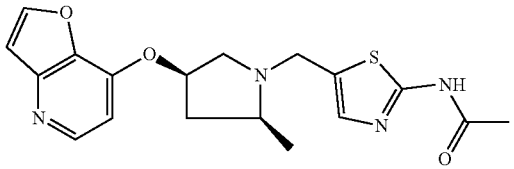 [SMILES: CC(=O)Nc1ncc(CN2C[C@H](Oc3ccnc4ccoc34)C[C@@H]2C)s1]

N-(5-(((2S,4R)-4-(furo[3,2-b]pyridin-7-yloxy)-2-methylpyrrolidin-1-yl)methyl)thiazol-2-yl)acetamide: The title compound was prepared in an analogous manner of that in scheme 2 from 7-chlorofuro[3,2-b]pyridine, tert-butyl (2S,4R)-4-hydroxy-2-methylpyrrolidine-1-carboxylate, and N-(5-formylthiazol-2-yl)acetamide. LCMS (ESI): [M+H] 373. ¹HNMR: (500 MHz, CDCl₃) δ 10.98 (br s, 1H), 8.33 (d, J=5.5 Hz, 1H), 7.76 (d, J=2.0 Hz, 1H), 7.22 (s, 1H), 6.93 (d, J=2.0 Hz, 1H), 6.62 (d, J=5.5 Hz, 1H), 5.07-5.10 (m, 1H), 4.11-4.14 (m, 1H), 3.61-3.64 (m, 1H), 3.27-3.28 (m, 1H), 2.67-2.71 (m, 1H), 2.57-2.61 (m, 1H), 2.28 (s, 3H), 1.84-1.85 (m, 1H), 1.28 (d, J=5.5 Hz, 3H).

Example 49

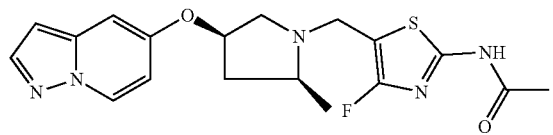 [SMILES: CC(=O)Nc1nc(F)c(CN2C[C@H](Oc3ccn4nccc4c3)C[C@@H]2C)s1]

N-(4-fluoro-5-(((2S,4R)-2-methyl-4-(pyrazolo[1,5-a]pyridin-5-yloxy)pyrrolidin-1-yl)methyl)thiazol-2-yl)acetamide: The title compound was prepared in an analogous manner of that in scheme 2 from 5-bromopyrazolo[1,5-a]pyridine, tert-butyl (2S,4R)-4-hydroxy-2-methylpyrrolidine-1-carboxylate, and N-(4-fluoro-5-formylthiazol-2-yl)acetamide. LCMS (ESI): [M+H] 391. ¹HNMR: (500 MHz, METHANOL-d₄) δ 8.32 (d, J=7.5 Hz, 1H), 7.82 (d, J=2.0 Hz, 1H), 6.84 (d, J=2.5 Hz, 1H), 6.54 (dd, J=2.5, 7.5 Hz, 1H), 6.38 (d, J=2.5 Hz, 1H), 4.80-4.82 (m, 1H), 3.97-3.99 (m, 1H), 3.58-3.61 (m, 1H), 3.20-3.31 (m, 1H), 2.62-2.72 (m, 3H), 2.18 (s, 3H), 1.63-1.67 (m, 1H), 1.25 (d, J=6.0 Hz, 3H).

Example 50

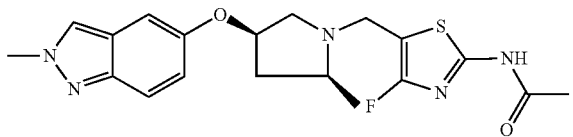 [SMILES: CC(=O)Nc1nc(F)c(CN2C[C@H](Oc3ccc4nn(C)cc4c3)C[C@@H]2C)s1]

N-(4-fluoro-5-(((2S,4R)-2-methyl-4-((2-methyl-2H-indazol-5-yl)oxy)pyrrolidin-1-yl)methyl)thiazol-2-yl)acetamide: The title compound was prepared in an analogous manner of that in scheme 2 from 5-bromo-2-methyl-2H-indazole, tert-butyl (2S,4R)-4-hydroxy-2-methylpyrrolidine-1-carboxylate, and N-(4-fluoro-5-formylthiazol-2-yl)acetamide. LCMS (ESI): [M+H] 404. ¹HNMR: (400 MHz, CDCl₃) δ 9.97 (br. s, 1H), 7.72 (s, 1H), 7.56 (d, J=9.6 Hz, 1H), 6.98 (dd, J=2.4, 9.6 Hz, 1H), 6.71 (s, 1H), 4.61-4.69 (m, 1H), 4.16 (s, 3H), 3.96-4.00 (m, 1H), 3.67-3.71 (m, 1H), 3.24-3.27 (m, 1H), 2.64-2.68 (m, 1H), 2.49-2.54 (m, 2H), 2.28 (s, 3H), 1.71-1.78 (m, 1H), 1.26 (d, J=5.2 Hz, 3H).

Example 51

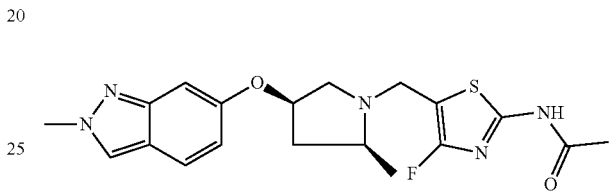

N-(4-fluoro-5-(((2S,4R)-2-methyl-4-((2-methyl-2H-indazol-6-yl)oxy)pyrrolidin-1-yl)methyl)thiazol-2-yl)acetamide: The title compound was prepared in an analogous manner of that in scheme 2 from 6-bromo-2-methyl-2H-indazole, tert-butyl (2S,4R)-4-hydroxy-2-methylpyrrolidine-1-carboxylate, and N-(4-fluoro-5-formylthiazol-2-yl)acetamide. LCMS (ESI): [M+H] 404. ¹HNMR: (500 MHz, CDCl₃) δ 10.33 (br. s, 1H), 7.75 (s, 1H), 7.47 (d, J=9.0 Hz, 1H), 6.76-6.79 (m, 2H), 4.71-4.73 (m, 1H), 4.13 (s, 3H), 3.98-4.01 (m, 1H), 3.66-3.69 (m, 1H), 3.26-3.29 (m, 1H), 2.66-2.69 (m, 1H), 2.52-2.56 (m, 2H), 2.29 (s, 3H), 1.72-1.75 (m, 1H), 1.25 (d, J=5.0 Hz, 3H).

Example 52

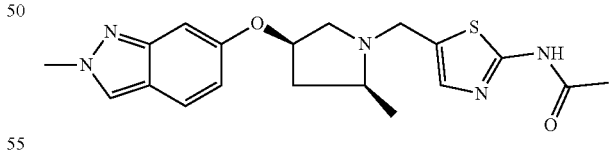

N-(5-(((2S,4R)-2-methyl-4-((2-methyl-2H-indazol-6-yl)oxy)pyrrolidin-1-yl)methyl)thiazol-2-yl)acetamide: The title compound was prepared in an analogous manner of that in scheme 2 from 6-bromo-2-methyl-2H-indazole, tert-butyl (2S,4R)-4-hydroxy-2-methylpyrrolidine-1-carboxylate, and N-(5-formylthiazol-2-yl)acetamide. LCMS (ESI): [M+H] 386. ¹HNMR: (400 MHz, METHANOL-d₄) δ 8.03 (s, 1H), 7.53 (d, J=9.6 Hz, 1H), 7.33 (s, 1H), 6.71-6.74 (m, 2H), 4.46-4.48 (m, 1H), 4.23-4.26 (m, 1H), 4.12 (s, 3H), 3.55-3.80 (m, 1H), 3.18-3.30 (m, 1H), 2.52-2.85 (m, 1H), 2.19 (s, 3H), 1.64-1.84 (m, 1H), 1.30 (d, J=3.6 Hz, 3H).

Intermediate 10

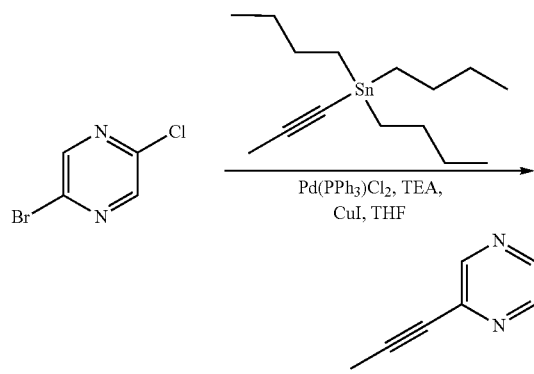

2-chloro-5-(prop-1-yn-1-yl)pyrazine: To a solution of 2-bromo-5-chloropyrazine (1.00 g, 5.17 mmol) and tributyl (prop-1-yn-1-yl)stannane (1.70 g, 5.17 mmol, 1.58 mL) in THF (10 mL) were added CuI (0.197 g, 1.03 mmol), Pd(PPh$_3$)$_2$Cl$_2$ (0.726 g, 1.03 mmol) and TEA (1.05 g, 10.34 mmol, 1.43 mL). The mixture was stirred at 70° C. for 16 hours under N$_2$. The mixture was evaporated to dryness in vacuo and the residue purified by column chromatography over silica gel column (petroleum ether/EtOAc; 10:1) to afford the title compound as a yellow oil (750 mg, 95%). LCMS (ESI): [M+H] 153.0

Intermediate 11

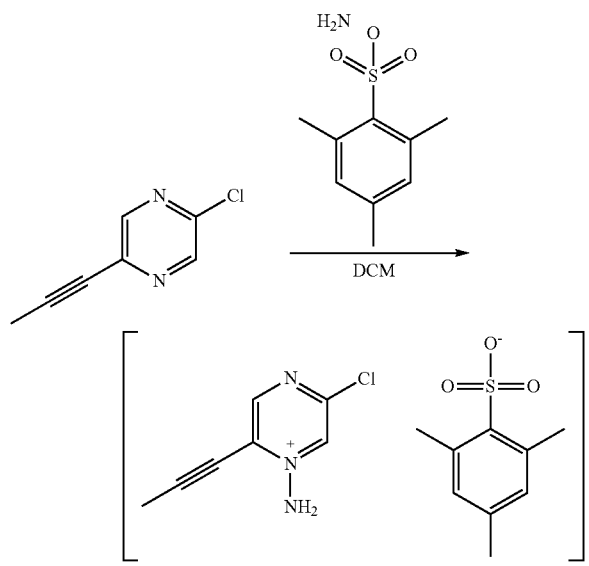

1-amino-5-chloro-2-(prop-1-yn-1-yl)pyrazin-1-ium 2,4,6-trimethylbenzenesulfonate: To a mixture of amino 2,4,6-trimethylbenzenesulfonate (1.83 g, 8.52 mmol) in DCM (30 mL) was added 2-chloro-5-(prop-1-yn-1-yl)pyrazine (650.0 mg, 4.26 mmol). The mixture was stirred at 10° C. for 16 hours. The mixture was quenched with water (50 mL) and extracted with DCM (30 mL). The aqueous was lyophilized to give the title compound as a brown solid (1.00 g, crude) which was used to next step without further purification. LCMS (ESI): [M] 168.0.

Intermediate 12

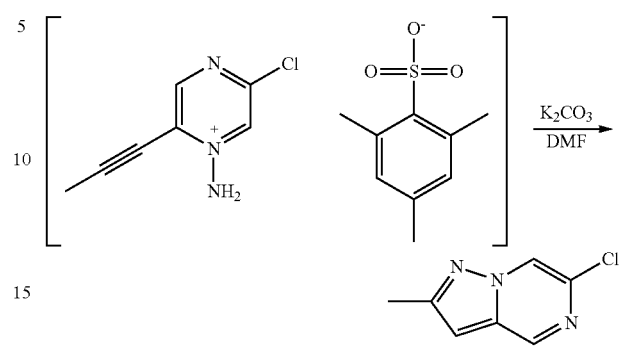

6-chloro-2-methylpyrazolo[1,5-a]pyrazine: To a solution of 1-amino-5-chloro-2-(prop-1-yn-1-yl)pyrazin-1-ium 2,4,6-trimethylbenzenesulfonate (1.00 g, 5.93 mmol) in DMF (30 mL) was added K$_2$CO$_3$ (2.46 g, 17.79 mmol) and stirred at 60° C. for 5 hours. The reaction mixture was diluted with water (50 mL) and extracted with EtOAc (2×40 mL). The combined organics were washed with water (2×40 mL), brine (40 mL), dried (Na$_2$SO$_4$) and evaporated to dryness in vacuo. The residue was purified by prep-TLC (petroleum ether/EtOAc: 3/1) to afford the title compound as a white solid (130.0 mg, 13%).

Example 53

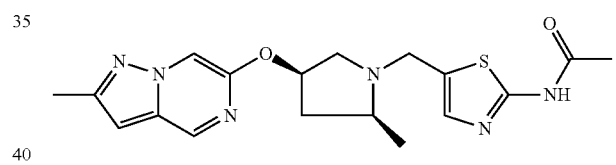

N-(5-(((2S,4R)-2-methyl-4-((2-methylpyrazolo[1,5-a] pyrazin-6-yl)oxy)pyrrolidin-1-yl)methyl)thiazol-2-yl)acetamide: The title compound was prepared in an analogous manner of that in scheme 2 from 6-chloro-2-methylpyrazolo [1,5-a]pyrazine, tert-butyl (2S,4R)-4-hydroxy-2-methylpyrrolidine-1-carboxylate and N-(5-formylthiazol-2-yl)acetamide. LCMS (ESI): [M+H]=374.0. $^1$HNMR: (500 MHz, CDCl$_3$) δ 10.79 (brs, 1H), 8.57 (s, 1H), 7.93 (s, 1H), 7.22 (s, 1H), 6.45 (s, 1H), 5.19-5.22 (m, 1H), 4.11-4.14 (m, 1H), 3.60-3.63 (m, 1H), 3.18-3.20 (m, 1H), 2.57-2.63 (m, 1H), 2.53-2.55 (m, 2H), 2.28 (s, 3H), 1.73-1.75 (m, 1H), 1.26 (d, J=5.5 Hz, 3H).

Example 54

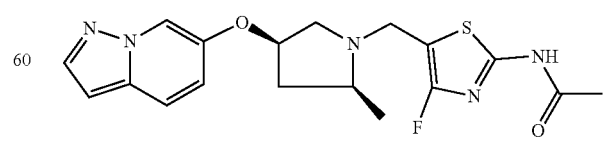

N-(4-fluoro-5-(((2S,4R)-2-methyl-4-(pyrazolo[1,5-a]pyridin-6-yloxy)pyrrolidin-1-yl)methyl)thiazol-2-yl)acetamide: The title compound was prepared in an analogous manner of that in scheme 2 from pyrazolo[1,5-a]pyridin-6-ol, tert-butyl (2S,4S)-4-hydroxy-2-methylpyrrolidine-1-carboxylate and N-(4-fluoro-5-formylthiazol-2-yl)acetamide. LCMS (ESI): [M+H]=390.0 ¹HNMR (500 MHz, MeOH-d₄) δ: 8.28 (brs, 1H), 8.09 (s, 1H), 7.83 (d, J=2.5 Hz, 1H), 7.56 (d, J=9.0 Hz, 1H), 7.02 (dd, J=9.5, 2.0 Hz, 1H), 6.53 (s, 1H), 4.85-4.87 (m, 1H), 4.19-4.23 (m, 1H), 3.86-3.89 (m, 1H), 3.41-3.44 (m, 1H), 2.93-2.99 (m, 2H), 2.69-2.74 (m, 1H), 2.19 (s, 3H), 1.75-1.80 (m, 1H), 1.35 (d, J=6.0 Hz, 3H).

Example 55

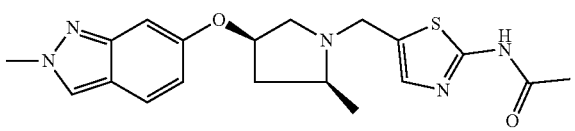

N-(5-(((2S,4R)-2-methyl-4-((2-methyl-2H-indazol-6-yl)oxy)pyrrolidin-1-yl)methyl)thiazol-2-yl)acetamide: The title compound was prepared in an analogous manner of that in scheme 2 from 6-bromo-2-methyl-2H-indazole, tert-butyl (2S,4R)-4-hydroxy-2-methylpyrrolidine-1-carboxylate and N-(5-formylthiazol-2-yl)acetamide. LCMS (ESI): [M+H]=386.0 ¹HNMR (400 MHz, MeOH-d₄) δ: 8.03 (s, 1H), 7.53 (d, J=9.6 Hz, 1H), 7.33 (s, 1H), 6.71-6.74 (m, 2H), 4.46-4.48 (m, 1H), 4.23-4.26 (m, 1H), 4.12 (s, 3H), 3.55-3.80 (m, 1H), 3.18-3.30 (m, 1H), 2.52-2.85 (m, 1H), 2.19 (s, 3H), 1.64-1.84 (m, 1H), 1.30 (d, J=3.6 Hz, 3H).

Example 56

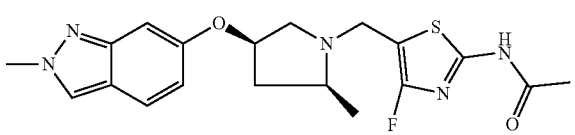

N-(4-fluoro-5-(((2S,4R)-2-methyl-4-((2-methyl-2H-indazol-6-yl)oxy)pyrrolidin-1-yl)methyl)thiazol-2-yl)acetamide: The title compound was prepared in an analogous manner of that in scheme 2 from 6-bromo-2-methyl-2H-indazole, tert-butyl (2S,4R)-4-hydroxy-2-methylpyrrolidine-1-carboxylate and N-(4-fluoro-5-formylthiazol-2-yl)acetamide. LCMS (ESI): [M+H]=404.1; ¹HNMR (500 MHz, CDCl₃) δ: 10.33 (br. s, 1H), 7.75 (s, 1H), 7.47 (d, J=9.0 Hz, 1H), 6.76-6.79 (m, 2H), 4.71-4.73 (m, 1H), 4.13 (s, 3H), 3.98-4.01 (m, 1H), 3.66-3.69 (m, 1H), 3.26-3.29 (m, 1H), 2.66-2.69 (m, 1H), 2.52-2.56 (m, 2H), 2.29 (s, 3H), 1.72-1.75 (m, 1H), 1.25 (d, J=5.0 Hz, 3H).

Example 57

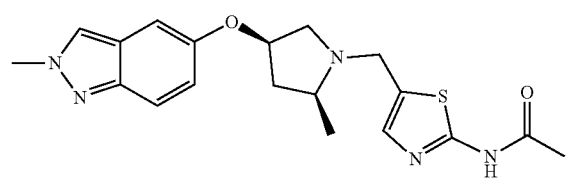 [SMILES: CC(=O)Nc1ncc(CN2C[C@H](Oc3ccc4nn(C)cc4c3)C[C@@H]2C)s1]

N-(5-(((2S,4R)-2-methyl-4-((2-methyl-2H-indazol-5-yl)oxy)pyrrolidin-1-yl)methyl)thiazol-2-yl)acetamide: The title compound was prepared in an analogous manner of that in scheme 2 from 5-bromo-2-methyl-2H-indazole, tert-butyl (2S,4R)-4-hydroxy-2-methylpyrrolidine-1-carboxylate and N-(5-formylthiazol-2-yl)acetamide. LCMS (ESI): [M+H] =386.0; ¹HNMR (400 MHz, CDCl₃) δ: 10.79-10.75 (m, 1H), 7.72 (s, 1H), 7.58-7.55 (m, 1H), 7.28-7.26 (m, 1H), 7.00-6.96 (m, 1H), 6.77-6.67 (m, 1H), 4.71-4.70 (m, 1H), 4.16-4.12 (m, 4H), 3.70-3.60 (m, 1H), 3.28-3.26 (m, 1H), 2.67-2.58 (m, 3H), 2.29 (s, 3H), 1.59-1.48 (m, 1H), 1.24-1.23 (m, 3H).

Example 58

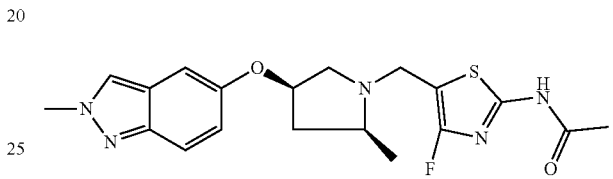

N-(4-fluoro-5-(((2S,4R)-2-methyl-4-((2-methyl-2H-indazol-5-yl)oxy)pyrrolidin-1-yl)methyl)thiazol-2-yl)acetamide: The title compound was prepared in an analogous manner of that in scheme 2 from 5-bromo-2-methyl-2H-indazole, tert-butyl (2S,4R)-4-hydroxy-2-methylpyrrolidine-1-carboxylate and N-(4-fluoro-5-formylthiazol-2-yl)acetamide. LCMS (ESI): [M+H]=404.0; ¹HNMR (400 MHz, CDCl₃) δ: 9.97 (br. s, 1H), 7.72 (s, 1H), 7.56 (d, J=9.6 Hz, 1H), 6.98 (dd, J=2.4, 9.6 Hz, 1H), 6.71 (s, 1H), 4.61-4.69 (m, 1H), 4.16 (s, 3H), 3.96-4.00 (m, 1H), 3.67-3.71 (m, 1H), 3.24-3.27 (m, 1H), 2.64-2.68 (m, 1H), 2.49-2.54 (m, 2H), 2.28 (s, 3H), 1.71-1.78 (m, 1H), 1.26 (d, J=5.2 Hz, 3H).

Example 59

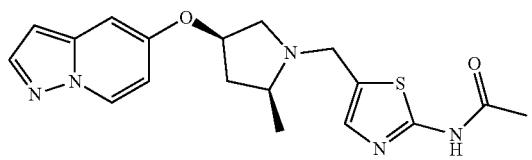 [SMILES: CC(=O)Nc1ncc(CN2C[C@H](Oc3ccn4nccc4c3)C[C@@H]2C)s1]

N-(5-(((2S,4R)-2-methyl-4-(pyrazolo[1,5-a]pyridin-5-yloxy)pyrrolidin-1-yl)methyl)thiazol-2-yl)acetamide: The title compound was prepared in an analogous manner of that in scheme 2 from 5-bromopyrazolo[1,5-a]pyridine, tert-butyl (2S,4R)-4-hydroxy-2-methylpyrrolidine-1-carboxylate and N-(5-formylthiazol-2-yl)acetamide. LCMS (ESI): [M+H]=372.0; ¹HNMR (500 MHz, MeOH-d₄) δ: 8.31 (d, J=7.5 Hz, 1H), 7.81 (d, J=2.0 Hz, 1H), 7.28 (s, 1H), 6.83 (d, J=2.0 Hz, 1H), 6.54 (dd, J=7.5, 2.5 Hz, 1H), 6.36 (d, J=2.0 Hz, 1H), 4.80-4.83 (m, 1H), 4.15 (d, J=14.0 Hz, 1H), 3.58 (d, J=14.0 Hz, 1H), 3.17 (d, J=11.5 Hz, 1H), 2.58-2.68 (m, 3H), 2.19 (s, 3H), 1.64-1.69 (m, 1H), 1.26 (d, J=6.0 Hz, 3H).

Example 60

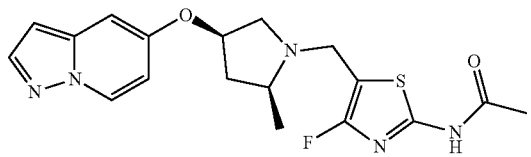 [SMILES: CC(=O)Nc1nc(F)c(CN2C[C@H](Oc3ccn4nccc4c3)C[C@@H]2C)s1]

N-(4-fluoro-5-(((2S,4R)-2-methyl-4-(pyrazolo[1,5-a]pyridin-5-yloxy)pyrrolidin-1-yl)methyl)thiazol-2-yl)acetamide: The title compound was prepared in an analogous manner of that in scheme 2 from 5-bromopyrazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=390.1; $^1$HNMR (500 MHz, MeOH-d$_4$) δ: 8.32 (d, J=7.5 Hz, 1H), 7.82 (d, J=2.0 Hz, 1H), 6.84 (d, J=2.5 Hz, 1H), 6.54 (dd, J=2.5, 7.5 Hz, 1H), 6.38 (d, J=2.5 Hz, 1H), 4.80-4.82 (m, 1H), 3.97-3.99 (m, 1H), 3.58-3.61 (m, 1H), 3.20-3.31 (m, 1H), 2.62-2.72 (m, 3H), 2.18 (s, 3H), 1.63-1.67 (m, 1H), 1.25 (d, J=6.0 Hz, 3H).

Example 61

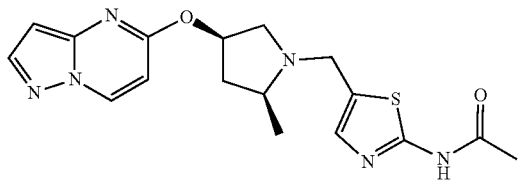 [SMILES: CC(=O)Nc1ncc(CN2C[C@H](Oc3ccn4nccc4n3)C[C@@H]2C)s1]

N-(5-(((2S,4R)-2-methyl-4-(pyrazolo[1,5-a]pyrimidin-5-yloxy)pyrrolidin-1-yl)methyl)thiazol-2-yl)acetamide: The title compound was prepared in an analogous manner of that in scheme 2 from 5-chloropyrazolo[1,5-a]pyrimidine, tert-butyl (2S,4R)-4-hydroxy-2-methylpyrrolidine-1-carboxylate and N-(5-formylthiazol-2-yl)acetamide. LCMS (ESI): [M+H]=373.0; $^1$HNMR (500 MHz, MeOH-d$_4$) δ: 8.57 (d, J=7.5 Hz, 1H), 7.94 (d, J=2.0 Hz, 1H), 7.28 (s, 1H), 6.44 (d, J=7.5 Hz, 1H), 6.29 (d, J=2.0 Hz, 1H), 5.39-5.43 (m, 1H), 4.15-4.18 (m, 1H), 3.58-3.61 (m, 1H), 3.16-3.19 (m, 1H), 2.62-2.71 (m, 3H), 2.19 (s, 3H), 1.67-1.72 (m, 1H), 1.26 (d, J=5.5 Hz, 3H).

Example 62

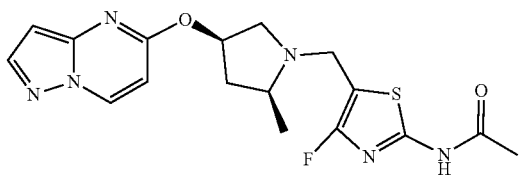 [SMILES: CC(=O)Nc1nc(F)c(CN2C[C@H](Oc3ccn4nccc4n3)C[C@@H]2C)s1]

N-(4-fluoro-5-(((2S,4R)-2-methyl-4-(pyrazolo[1,5-a]pyrimidin-5-yloxy)pyrrolidin-1-yl)methyl)thiazol-2-yl)acetamide: The title compound was prepared in an analogous manner of that in scheme 2 from 5-chloropyrazolo[1,5-a]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (400 MHz, MeOH-d$_4$) δ: 8.58 (d, J=7.6 Hz, 1H), 7.94 (d, J=1.6 Hz, 1H), 6.45 (d, J=7.2 Hz, 1H), 6.30 (d, J=1.6 Hz, 1H), 5.38-5.42 (m, 1H), 3.98 (d, J=14.8 Hz, 1H), 3.58 (d, J=14.8 Hz, 1H), 3.18-3.21 (m, 1H), 2.55-2.73 (m, 3H), 2.17 (s, 3H), 1.64-1.70 (m, 1H), 1.25 (d, J=5.6 Hz, 3H).

Intermediate 13

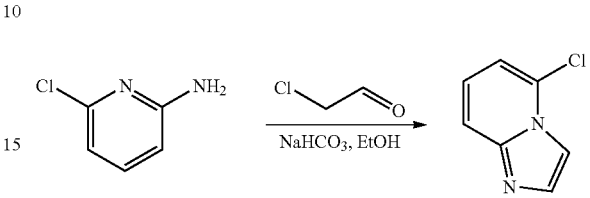

5-chloroimidazo[1,2-a]pyridine: NaHCO$_3$ (980.4 mg, 11.67 mmol) and 2-chloroacetaldehyde (1.22 g, 15.56 mmol) were added to a solution of 6-chloropyridin-2-amine (1.0 g, 7.78 mmol) in EtOH (15 mL) and the mixture stirred at 90° C. for 16 hours. The reaction mixture was evaporated to dryness in vacuo and the residue extracted with EtOAc (2×20 mL). The organic phase was washed with brine (2×10 mL), dried (Na$_2$SO$_4$) and evaporated to dryness in vacuo. The residue was purified by column chromatography (petroleum ether/EtOAc; 1:1) to afford the title compound as a yellow oil (524 mg, 44%). LCMS (ESI): [M+H]=153.0; $^1$HNMR (500 MHz, MeOH-d$_4$) δ: 7.97-7.99 (m, 1H), 7.70-7.73 (m, 1H), 7.59 (d, J=9.0 Hz, 1H), 7.34-7.36 (m, 1H), 7.13 (d, J=7.0 Hz, 1H).

Example 63

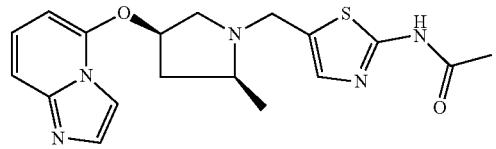 [SMILES: CC(=O)Nc1ncc(CN2C[C@H](Oc3cccc4nccn34)C[C@@H]2C)s1]

N-(5-(((2S,4R)-4-(imidazo[1,2-a]pyridin-5-yloxy)-2-methylpyrrolidin-1-yl)methyl)thiazol-2-yl)acetamide: The title compound was prepared in an analogous manner of that in scheme 2 from 5-chloroimidazo[1,2-a]pyridine, tert-butyl (2S,4R)-4-hydroxy-2-methylpyrrolidine-1-carboxylate and N-(5-formylthiazol-2-yl)acetamide. LCMS (ESI): [M+H]=372.0; $^1$HNMR (500 MHz, MeOH-d$_4$) δ: 7.81 (d, J=1.0 Hz, 1H), 7.51 (d, J=1.0 Hz, 1H), 7.18-7.31 (m, 2H), 7.16 (d, J=9.5 Hz, 1H), 6.21 (d, J=7.5 Hz, 1H), 5.07-5.11 (m, 1H), 4.18 (d, J=14.0 Hz, 1H), 3.63 (d, J=14.5 Hz, 1H), 3.29-3.30 (m, 1H), 2.69-2.75 (m, 3H), 2.19 (s, 3H), 1.76-1.81 (m, 1H), 1.28 (d, J=6.0 Hz, 3H).

Example 64

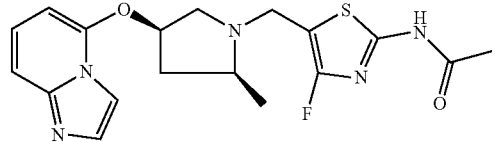 [SMILES: CC(=O)Nc1nc(F)c(CN2C[C@H](Oc3cccc4nccn34)C[C@@H]2C)s1]

N-(4-fluoro-5-(((2S,4R)-4-(imidazo[1,2-a]pyridin-5-yloxy)-2-methylpyrrolidin-1-yl)methyl)thiazol-2-yl)acetamide: The title compound was prepared in an analogous manner of that in scheme 2 from 5-chloroimidazo[1,2-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=390.1; $^1$HNMR (400 MHz, MeOH-d$_4$) δ: 7.84 (d, J=1.2 Hz, 1H), 7.53 (d, J=1.2 Hz, 1H), 7.30-7.35 (m, 1H), 7.18 (d, J=8.8 Hz, 1H), 6.24 (d, J=6.8 Hz, 1H), 5.10-5.11 (m, 1H), 4.03 (d, J=14.0 Hz, 1H), 3.65 (d, J=14.4 Hz, 1H), 3.34 (d, J=12.0 Hz, 1H), 2.63-2.80 (m, 3H), 2.18 (s, 3H), 1.75-1.80 (m, 1H), 1.28 (d, J=6.8 Hz, 3H).

Example 65

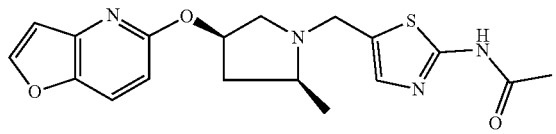 [SMILES: CC(=O)Nc1ncc(CN2C[C@H](Oc3ccc4occc4n3)C[C@@H]2C)s1]

N-(5-(((2S,4R)-4-(furo[3,2-b]pyridin-5-yloxy)-2-methylpyrrolidin-1-yl)methyl)thiazol-2-yl)acetamide: The title compound was prepared in an analogous manner of that in scheme 2 from 5-chlorofuro[3,2-b]pyridine, tert-butyl (2S, 4R)-4-hydroxy-2-methylpyrrolidine-1-carboxylate and N-(5-formylthiazol-2-yl)acetamide. LCMS (ESI): [M+H]=373.0; $^1$HNMR (400 MHz, MeOH-d$_4$) δ: 7.91 (d, J=1.6 Hz, 1H), 7.76 (d, J=8.8 Hz, 1H), 7.28 (s, 1H), 6.81 (d, J=1.6 Hz, 1H), 6.68 (d, J=8.8 Hz, 1H), 5.32-5.35 (m, 1H), 4.14-4.17 (m, 1H), 3.57-3.61 (m, 1H), 3.13-3.16 (m, 1H), 2.61-2.71 (m, 3H), 2.20 (s, 3H), 1.67-1.71 (m, 1H), 1.26 (d, J=6.0 Hz, 3H).

Example 66

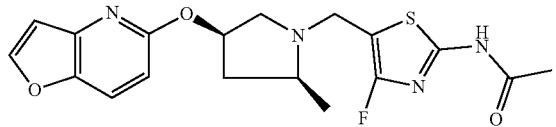 [SMILES: CC(=O)Nc1nc(F)c(CN2C[C@H](Oc3ccc4occc4n3)C[C@@H]2C)s1]

N-(4-fluoro-5-(((2S,4R)-4-(furo[3,2-b]pyridin-5-yloxy)-2-methylpyrrolidin-1-yl)methyl)thiazol-2-yl)acetamide: The title compound was prepared in an analogous manner of that in scheme 2 from 5-chlorofuro[3,2-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.1; $^1$HNMR (400 MHz, MeOH-d$_4$) δ: 7.91 (d, J=2.4 Hz, 1H), 7.77 (d, J=8.8 Hz, 1H), 6.82 (d, J=2.4 Hz, 1H), 6.68 (d, J=8.8 Hz, 1H), 5.31-5.36 (m, 1H), 3.97 (d, J=14.0 Hz, 1H), 3.57 (d, J=14.0 Hz, 1H), 3.15-3.18 (m, 1H), 2.72-2.74 (m, 1H), 2.58-2.61 (m, 2H), 2.17 (s, 3H), 1.63-1.68 (m, 1H), 1.25 (d, J=6.0 Hz, 3H).

Example 67

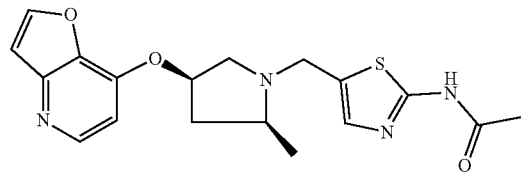 [SMILES: CC(=O)Nc1ncc(CN2C[C@H](Oc3ccnc4ccoc34)C[C@@H]2C)s1]

N-(5-(((2S,4R)-4-(furo[3,2-b]pyridin-7-yloxy)-2-methylpyrrolidin-1-yl)methyl)thiazol-2-yl)acetamide: The title compound was prepared in an analogous manner of that in scheme 2 from 7-chlorofuro[3,2-b]pyridine, tert-butyl (2S, 4R)-4-hydroxy-2-methylpyrrolidine-1-carboxylate and N-(5-formylthiazol-2-yl)acetamide. LCMS (ESI): [M+H]=373.0; $^1$HNMR (500 MHz, CDCl$_3$) δ: 10.98 (br s, 1H), 8.33 (d, J=5.5 Hz, 1H), 7.76 (s, 1H), 7.22 (s, 1H), 6.93 (s, 1H), 6.62 (d, J=5.5 Hz, 1H), 5.07-5.10 (m, 1H), 4.11-4.14 (m, 1H), 3.61-3.64 (m, 1H), 3.27-3.28 (m, 1H), 2.67-2.70 (m, 1H), 2.57-2.61 (m, 1H), 2.28 (s, 3H), 1.84-1.85 (m, 1H), 1.28 (d, J=5.5 Hz, 3H).

Example 68

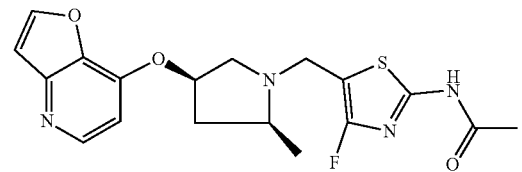 [SMILES: CC(=O)Nc1nc(F)c(CN2C[C@H](Oc3ccnc4ccoc34)C[C@@H]2C)s1]

N-(4-fluoro-5-(((2S,4R)-4-(furo[3,2-b]pyridin-7-yloxy)-2-methylpyrrolidin-1-yl)methyl)thiazol-2-yl)acetamide: The title compound was prepared in an analogous manner of that in scheme 2 from 7-chlorofuro[3,2-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (500 MHz, CDCl$_3$) δ: 10.11 (br s, 1H), 8.35 (d, J=5.5 Hz, 1H), 7.78 (d, J=2.0 Hz, 1H), 6.94 (d, J=2.0 Hz, 1H), 6.66 (d, J=5.5 Hz, 1H), 5.09-5.11 (m, 1H), 3.96-3.99 (m, 1H), 3.65-3.68 (m, 1H), 3.30-3.32 (m, 1H), 2.73-2.75 (m, 1H), 2.58-2.61 (m, 1H), 2.28 (s, 3H), 1.84-1.85 (m, 1H), 1.28 (d, J=5.5 Hz, 3H).

Example 69

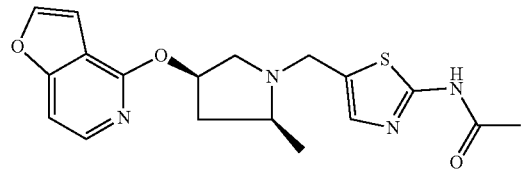

N-(5-(((2S,4R)-4-(furo[3,2-c]pyridin-4-yloxy)-2-methylpyrrolidin-1-yl)methyl)thiazol-2-yl)acetamide: The title compound was prepared in an analogous manner of that in scheme 2 from 4-chlorofuro[3,2-c]pyridine, tert-butyl (2S, 4R)-4-hydroxy-2-methylpyrrolidine-1-carboxylate and N-(5-formylthiazol-2-yl)acetamide. LCMS (ESI): [M+H]=373.0; ¹HNMR (500 MHz, CDCl₃) δ: 12.90 (brs, 1H), 7.91 (d, J=6.0 Hz, 1H), 7.52 (d, J=2.0 Hz, 1H), 7.21 (s, 1H), 7.04 (d, J=6.0 Hz, 1H), 6.86 (d, J=2.0 Hz, 1H), 5.40-5.48 (m, 1H), 4.14 (d, J=14.5 Hz, 1H), 3.58 (d, J=14.5 Hz, 1H), 3.23 (d, J=11.5 Hz, 1H), 2.68-2.72 (m, 1H), 2.53-2.62 (m, 2H), 2.29 (s, 3H), 1.77-1.82 (m, 1H), 1.28 (d, J=5.5 Hz, 3H).

Example 70

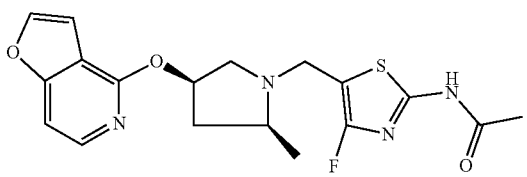 [SMILES: CC(=O)Nc1nc(F)c(CN2C[C@H](Oc3nccc4occc34)C[C@@H]2C)s1]

N-(4-fluoro-5-(((2S,4R)-4-(furo[3,2-c]pyridin-4-yloxy)-2-methylpyrrolidin-1-yl)methyl)thiazol-2-yl)acetamide: The title compound was prepared in an analogous manner of that in scheme 2 from 4-chlorofuro[3,2-c]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; ¹HNMR (500 MHz, CDCl₃) δ: 10.47 (brs, 1H), 7.93 (d, J=6.0 Hz, 1H), 7.53 (d, J=2.5 Hz, 1H), 7.21 (s, 1H), 7.05 (d, J=5.5 Hz, 1H), 6.88 (s, 1H), 5.45-5.48 (m, 1H), 3.98 (d, J=14.5 Hz, 1H), 3.64 (d, J=14.5 Hz, 1H), 3.26 (d, J=10.5 Hz, 1H), 2.73-2.79 (m, 1H), 2.51-2.63 (m, 2H), 2.26 (s, 3H), 1.77-1.78 (m, 1H), 1.27 (d, J=7.2 Hz, 3H).

Example 71

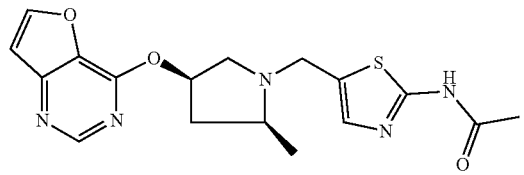 [SMILES: CC(=O)Nc1ncc(CN2C[C@H](Oc3ncnc4ccoc34)C[C@@H]2C)s1]

N-(5-(((2S,4R)-4-(furo[3,2-d]pyrimidin-4-yloxy)-2-methylpyrrolidin-1-yl)methyl)thiazol-2-yl)acetamide: The title compound was prepared in an analogous manner of that in scheme 2 from 4-chlorofuro[3,2-d]pyrimidine, tert-butyl (2S,4R)-4-hydroxy-2-methylpyrrolidine-1-carboxylate and N-(5-formylthiazol-2-yl)acetamide. LCMS (ESI): [M+H]=374.0; ¹HNMR (500 MHz, CDCl₃) δ: 11.40 (brs, 1H), 8.56 (s, 1H), 7.84 (d, J=2.0 Hz, 1H), 7.22 (s, 1H), 6.91 (d, J=2.0 Hz, 1H), 5.55-5.59 (m, 1H), 4.13 (d, J=14.0 Hz, 1H), 3.58 (d, J=14.0 Hz, 1H), 3.25-3.27 (m, 1H), 2.70-2.73 (m, 1H), 2.60-2.63 (m, 2H), 2.28 (s, 3H), 1.84-1.85 (m, 1H), 1.28 (d, J=5.5 Hz, 3H).

Example 72

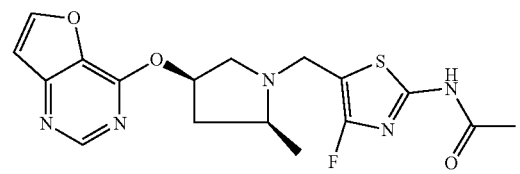 [SMILES: CC(=O)Nc1nc(F)c(CN2C[C@H](Oc3ncnc4ccoc34)C[C@@H]2C)s1]

N-(4-fluoro-5-(((2S,4R)-4-(furo[3,2-d]pyrimidin-4-yloxy)-2-methylpyrrolidin-1-yl)methyl)thiazol-2-yl)acetamide: The title compound was prepared in an analogous manner of that in scheme 2 from 4-chlorofuro[3,2-d]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=392.0; ¹HNMR (500 MHz, CDCl₃) δ: 10.88 (brs, 1H), 8.58 (s, 1H), 7.84 (d, J=2.0 Hz, 1H), 6.91 (d, J=2.0 Hz, 1H), 5.55-5.58 (m, 1H), 3.98 (d, J=14.0 Hz, 1H), 3.64 (d, J=14.0 Hz, 1H), 3.28-3.30 (m, 1H), 2.75-2.78 (m, 1H), 2.57-2.63 (m, 2H), 2.30 (s, 3H), 1.81-1.83 (m, 1H), 1.27 (d, J=5.5 Hz, 3H).

Example 73

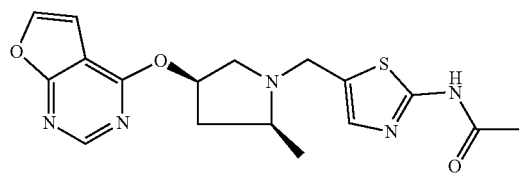 [SMILES: CC(=O)Nc1ncc(CN2C[C@H](Oc3ncnc4occc34)C[C@@H]2C)s1]

N-(5-(((2S,4R)-4-(furo[2,3-d]pyrimidin-4-yloxy)-2-methylpyrrolidin-1-yl)methyl)thiazol-2-yl)acetamide: The title compound was prepared in an analogous manner of that in scheme 2 from 4-chlorofuro[2,3-d]pyrimidine, tert-butyl (2S,4R)-4-hydroxy-2-methylpyrrolidine-1-carboxylate and N-(5-formylthiazol-2-yl)acetamide. LCMS (ESI): [M+H]=374.0; ¹HNMR (400 MHz, MeOH-d₄) δ: 8.45 (s, 1H), 7.79 (d, J=2.5 Hz, 1H), 7.27 (s, 1H), 6.95 (d, J=2.5 Hz, 1H), 5.58-5.59 (m, 1H), 4.16 (d, J=12.0 Hz, 1H), 3.58 (d, J=14.0 Hz, 1H), 3.21 (d, J=9.6 Hz, 1H), 2.60-2.70 (m, 3H), 2.18 (s, 3H), 1.73-1.74 (m, 1H), 1.27 (d, J=6.5 Hz, 3H).

Example 74

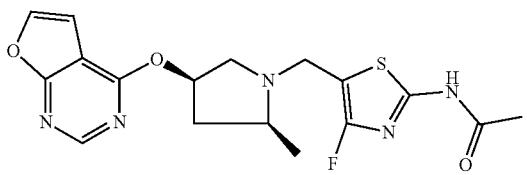 [SMILES: CC(=O)Nc1nc(F)c(CN2C[C@H](Oc3ncnc4occc34)C[C@@H]2C)s1]

N-(4-fluoro-5-(((2S,4R)-4-(furo[2,3-d]pyrimidin-4-yloxy)-2-methylpyrrolidin-1-yl)methyl)thiazol-2-yl)acetamide: The title compound was prepared in an analogous manner of that in scheme 2 from 4-chlorofuro[2,3-d]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=392.0; ¹HNMR (500 MHz, MeOH-d₄) δ: 8.47 (s, 1H), 7.80 (d, J=2.0 Hz, 1H), 6.96 (d, J=2.5 Hz, 1H), 5.58-5.62 (m, 1H), 4.00 (d, J=14.5 Hz, 1H), 3.60 (d, J=14.5 Hz, 1H), 3.23-3.26 (m, 1H), 2.59-2.78 (m, 3H), 2.17 (s, 3H), 1.73-1.76 (m, 1H), 1.27 (d, J=5.5 Hz, 3H).

Example 75

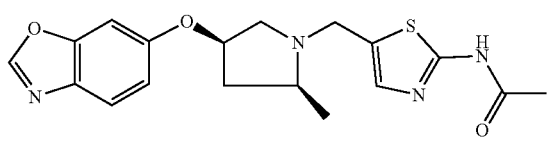 [SMILES: CC(=O)Nc1ncc(CN2C[C@H](Oc3ccc4ncoc4c3)C[C@@H]2C)s1]

N-(5-(((2S,4R)-4-(benzo[d]oxazol-6-yloxy)-2-methylpyrrolidin-1-yl)methyl)thiazol-2-yl)acetamide: The title compound was prepared in an analogous manner of that in scheme 2 from 6-chlorobenzo[d]oxazole, tert-butyl (2S,4R)-4-hydroxy-2-methylpyrrolidine-1-carboxylate and N-(5-formylthiazol-2-yl)acetamide. LCMS (ESI): [M+H]=373.0; $^1$HNMR (400 MHz, MeOH-d$_4$) δ: 8.32 (s, 1H), 7.58 (d, J=8.8 Hz, 1H), 7.28 (s, 1H), 7.16 (d, J=2.4 Hz, 1H), 6.97 (dd, J=2.4, 8.8 Hz, 1H), 4.81-4.84 (m, 1H), 4.13-4.17 (m, 1H), 3.56-3.60 (m, 1H), 3.15-3.18 (m, 1H), 2.60-2.68 (m, 3H), 2.19 (s, 3H), 1.64-1.70 (m, 1H), 1.26 (d, J=6.0 Hz, 3H).

Example 76

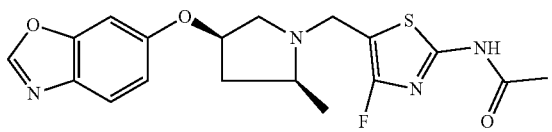 [SMILES: CC(=O)Nc1nc(F)c(CN2C[C@H](Oc3ccc4ncoc4c3)C[C@@H]2C)s1]

N-(5-(((2S,4R)-4-(benzo[d]oxazol-6-yloxy)-2-methylpyrrolidin-1-yl)methyl)-4-fluorothiazol-2-yl)acetamide: The title compound was prepared in an analogous manner of that in scheme 2 from 6-chlorobenzo[d]oxazole, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (500 MHz, MeOH-d$_4$) δ: 8.33 (s, 1H), 7.59 (d, J=9.0 Hz, 1H), 7.17 (d, J=2.0 Hz, 1H), 6.98 (dd, J=9.0, 2.0 Hz, 1H), 4.83-4.85 (m, 1H), 3.97-4.01 (m, 1H), 3.58-3.61 (m, 1H), 3.18-3.21 (m, 1H), 2.60-2.71 (m, 3H), 2.18 (s, 3H), 1.63-1.67 (m, 1H), 1.25 (d, J=6.0 Hz, 3H).

Example 77

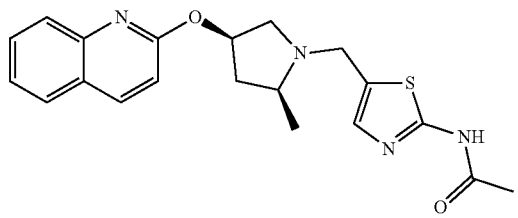 [SMILES: CC(=O)Nc1ncc(CN2C[C@H](Oc3ccc4ccccc4n3)C[C@@H]2C)s1]

N-(5-(((2S,4R)-2-methyl-4-(quinolin-2-yloxy)pyrrolidin-1-yl)methyl)thiazol-2-yl)acetamide: The title compound was prepared in an analogous manner of that in scheme 2 from 2-chloroquinoline, tert-butyl (2S,4R)-4-hydroxy-2-methylpyrrolidine-1-carboxylate and N-(5-formylthiazol-2-yl)acetamide. LCMS (ESI): [M+H]=383.0; $^1$HNMR (400 MHz, MeOH-d$_4$) δ: 8.42-8.43 (brs, 1H), 8.09-8.11 (m, 1H), 7.74-7.77 (m, 2H), 7.59-7.63 (m, 1H), 7.39-7.43 (m, 2H), 6.92-6.94 (m, 1H), 5.61-5.65 (m, 1H), 4.40-4.43 (m, 1H), 3.95-3.99 (m, 1H), 3.40-3.43 (m, 1H), 3.06-3.31 (m, 2H), 2.78-2.81 (m, 1H), 2.19 (s, 3H), 1.84-1.89 (m, 1H), 1.37 (d, J=6.0 Hz, 3H).

Example 78

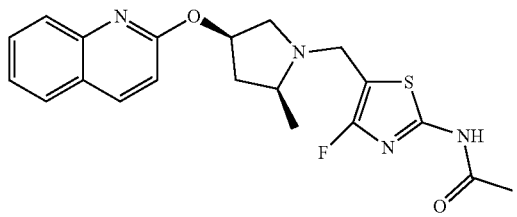 [SMILES: CC(=O)Nc1nc(F)c(CN2C[C@H](Oc3ccc4ccccc4n3)C[C@@H]2C)s1]

N-(4-fluoro-5-(((2S,4R)-2-methyl-4-(quinolin-2-yloxy)pyrrolidin-1-yl)methyl)thiazol-2-yl)acetamide: The title compound was prepared in an analogous manner of that in scheme 2 from 2-chloroquinoline, tert-butyl (2S,4R)-4-hydroxy-2-methylpyrrolidine-1-carboxylate and N-(4-fluoro-5-formylthiazol-2-yl)acetamide. LCMS (ESI): [M+H]=401.0; $^1$HNMR (500 MHz, MeOH-d$_4$) δ: 15.21 (brs, 1H), 8.20-8.22 (m, 1H), 7.85-7.87 (m, 1H), 7.72-7.73 (m, 1H), 7.65-7.66 (m, 1H), 7.41-7.44 (m, 1H), 6.98-7.00 (m, 1H), 5.45-5.49 (m, 1H), 3.92 (d, J=14.5 Hz, 1H), 3.46 (d, J=14.5 Hz, 1H), 3.05-3.07 (m, 1H), 2.59-2.68 (m, 2H), 2.57 (s, 3H), 1.55-1.56 (m, 1H), 1.17 (d, J=6.0 Hz, 3H).

Intermediate 14

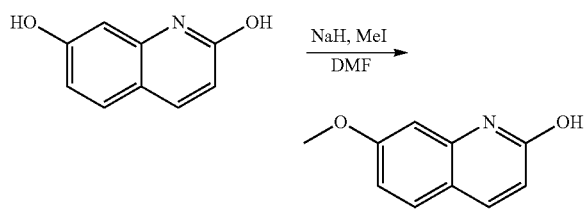

7-methoxyquinolin-2-ol: K$_2$CO$_3$ (514.6 mg, 3.72 mmol) and iodomethane (528.4 mg, 3.72 mmol) were added to a solution of quinoline-2,7-diol (300 mg, 1.86 mmol) in DMF (8 mL) and the mixture stirred at 18° C. for 2 hours. The mixture was evaporated to dryness in vacuo and the residue partitioned between EtOAc (15 mL) and H$_2$O (15 mL). The combined organics were dried and evaporated to dryness to afford the title compound as a white solid (273 mg, 84% yield). LCMS (ESI): [M+H]=176.0; $^1$HNMR (400 MHz, DMSO-d$_6$) δ: 11.58-11.61 (m, 1H), 7.78 (d, J=10.0 Hz, 1H), 7.54 (d, J=8.8 Hz, 1H), 6.75-6.78 (m, 2H), 6.28 (d, J=9.2 Hz, 1H), 3.78 (s, 3H).

Intermediate 15

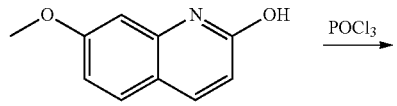

-continued

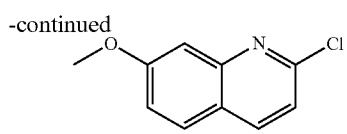

2-chloro-7-methoxyquinoline: A solution of 7-methoxyquinolin-2-ol (50 mg, 0.285 mmol) in DMF (1 mL) was added to phosphoryl trichloride (219 mg, 1.43 mmol) and the mixture stirred at 70° C. for 15 hours. The mixture was quenched with H₂O (20 mL) and the pH adjusted to pH 7 with solid Na₂CO₃ and then extracted with EtOAc (3×10 mL). The combined organics were evaporated to dryness in vacuo to afford the title compound as a yellow solid (51 mg) which was used without further purification. LCMS (ESI): [M+H]=194.0

Example 79

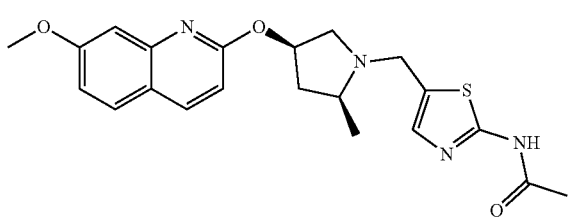 [SMILES: COc1ccc2ccc(O[C@@H]3C[C@H](C)N(Cc4cnc(NC(C)=O)s4)C3)nc2c1]

N-(5-(((2S,4R)-4-((7-methoxyquinolin-2-yl)oxy)-2-methylpyrrolidin-1-yl)methyl)thiazol-2-yl)acetamide: The title compound was prepared in an analogous manner of that in scheme 2 from 2-chloro-7-methoxyquinoline, tert-butyl (2S,4R)-4-hydroxy-2-methylpyrrolidine-1-carboxylate and N-(5-formylthiazol-2-yl)acetamide. LCMS (ESI): [M+H]=413.1; $^1$HNMR (500 MHz, DMSO-$d_6$) δ: 11.95 (brs, 1H), 8.10 (d, J=9.0 Hz, 1H), 7.73 (d, J=8.5 Hz, 1H), 7.28 (s, 1H), 7.03-7.10 (m, 2H), 6.80 (d, J=9.0 Hz, 1H), 5.43-5.47 (m, 1H), 3.90 (d, J=14.0 Hz, 1H), 3.48 (s, 3H), 3.45 (d, J=14.0 Hz, 1H), 2.63-2.99 (m, 1H), 2.59-2.62 (m, 2H), 2.46-2.51 (m, 1H), 2.09 (s, 3H), 1.56-1.57 (m, 1H), 1.18 (d, J=5.5 Hz, 3H).

Example 80

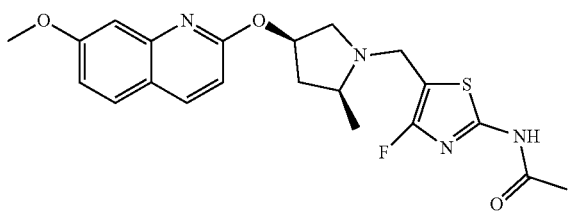 [SMILES: COc1ccc2ccc(O[C@@H]3C[C@H](C)N(Cc4sc(NC(C)=O)nc4F)C3)nc2c1]

N-(4-fluoro-5-(((2S,4R)-4-((7-methoxyquinolin-2-yl)oxy)-2-methylpyrrolidin-1-yl)methyl)thiazol-2-yl)acetamide: The title compound was prepared in an analogous manner of that in scheme 2 from 2-chloro-7-methoxyquinoline, tert-butyl (2S,4R)-4-hydroxy-2-methylpyrrolidine-1-carboxylate and N-(4-fluoro-5-formylthiazol-2-yl)acetamide. LCMS (ESI): [M+H]=431.0; $^1$HNMR (400 MHz, DMSO-$d_6$) δ: 8.08 (d, J=8.8 Hz, 1H), 7.72 (d, J=8.8 Hz, 1H), 7.01-7.09 (m, 2H), 6.78 (d, J=8.4 Hz, 1H), 5.43-5.44 (m, 1H), 3.86-3.87 (m, 1H), 3.89 (s, 3H), 3.43-3.46 (m, 1H), 3.01-3.04 (m, 1H), 2.56-2.66 (m, 3H), 2.09 (s, 3H), 1.53-1.54 (m, 1H), 1.15 (d, J=5.6 Hz, 3H).

Example 81

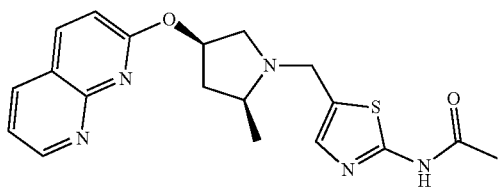 [SMILES: CC(=O)Nc1ncc(CN2C[C@H](Oc3ccc4cccnc4n3)C[C@@H]2C)s1]

N-(5-(((2S,4R)-4-((1,8-naphthyridin-2-yl)oxy)-2-methylpyrrolidin-1-yl)methyl)thiazol-2-yl)acetamide: The title compound was prepared in an analogous manner of that in scheme 2 from 2-chloro-1,8-naphthyridine, tert-butyl (2S,4R)-4-hydroxy-2-methylpyrrolidine-1-carboxylate and N-(5-formylthiazol-2-yl)acetamide. LCMS (ESI): [M+H]=384.0; $^1$HNMR (400 MHz, MeOH-$d_4$) δ: 8.85 (dd, J=4.4, 1.6 Hz, 1H), 8.32 (dd, J=8.0, 2.0 Hz, 1H), 8.22 (d, J=8.8 Hz, 1H), 7.47 (dd, J=8.4, 4.8 Hz, 1H), 7.35 (s, 1H), 7.08 (d, J=8.8 Hz, 1H), 5.66-5.68 (m, 1H), 4.28 (d, J=14.4 Hz, 1H), 3.75 (d, J=13.6 Hz, 1H), 3.31-3.32 (m, 1H), 2.96 (d, J=5.6 Hz, 1H), 2.75-2.81 (m, 2H), 2.18 (s, 3H), 1.77-1.81 (m, 1H), 1.33 (d, J=5.6 Hz, 3H).

Example 82

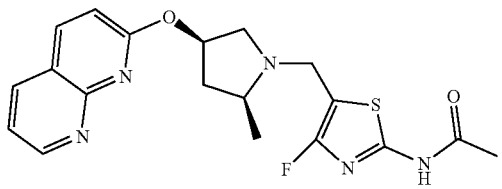 [SMILES: CC(=O)Nc1nc(F)c(CN2C[C@H](Oc3ccc4cccnc4n3)C[C@@H]2C)s1]

N-(5-(((2S,4R)-4-((1,8-naphthyridin-2-yl)oxy)-2-methylpyrrolidin-1-yl)methyl)-4-fluorothiazol-2-yl)acetamide: The title compound was prepared in an analogous manner of that in scheme 2 from 2-chloro-1,8-naphthyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=402.1; $^1$HNMR (400 MHz, MeOH-$d_4$) δ: 8.84 (dd, J=4.8, 2.0 Hz, 1H), 8.32 (dd, J=8.0, 1.6 Hz, 1H), 8.21 (d, J=9.2 Hz, 1H), 7.47 (dd, J=8.0, 4.8 Hz, 1H), 7.08 (d, J=8.8 Hz, 1H), 5.60-5.65 (m, 1H), 4.00 (d, J=14.8 Hz, 1H), 3.60 (d, J=14.4 Hz, 1H), 3.25 (d, J=11.2 Hz, 1H), 2.60-2.83 (m, 3H), 2.17 (s, 3H), 1.70-1.75 (m, 1H), 1.27 (d, J=6.4 Hz, 3H).

Example 83

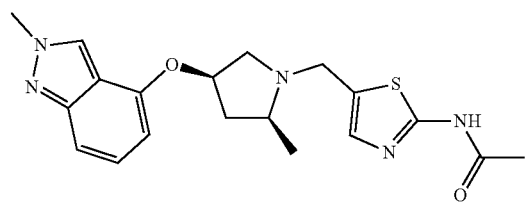

N-(5-(((2S,4R)-2-methyl-4-((2-methyl-2H-indazol-4-yl)oxy)pyrrolidin-1-yl)methyl)thiazol-2-yl)acetamide: The title compound was prepared in an analogous manner of that in scheme 2 from 4-bromo-2-methyl-2H-indazole, tert-butyl (2S,4S)-4-hydroxy-2-methylpyrrolidine-1-carboxylate and N-(5-formylthiazol-2-yl)acetamide. LCMS (ESI): [M+H]=386.1; $^{1}$HNMR (400 MHz, MeOH-d$_4$) δ: 8.17 (s, 1H), 7.28 (s, 1H), 7.09-7.17 (m, 2H), 6.26 (d, J=7.2 Hz, 1H), 4.92-4.93 (m, 1H), 4.18-4.21 (m, 1H), 4.15 (s, 3H), 3.56-3.60 (m, 1H), 3.22-3.25 (m, 1H), 2.62-2.70 (m, 3H), 2.19 (s, 3H), 1.73-1.77 (m, 1H), 1.27 (d, J=5.6 Hz, 3H).

Example 84

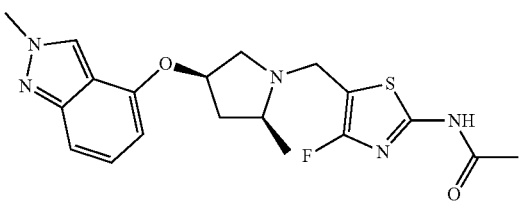

N-(4-fluoro-5-(((2S,4R)-2-methyl-4-((2-methyl-2H-indazol-4-yl)oxy)pyrrolidin-1-yl)methyl)thiazol-2-yl)acetamide: The title compound was prepared in an analogous manner of that in scheme 2 from 4-bromo-2-methyl-2H-indazole, tert-butyl (2S,4S)-4-hydroxy-2-methylpyrrolidine-1-carboxylate and N-(5-(chloromethyl)-4-fluorothiazol-2-yl)acetamide. LCMS (ESI): [M+H]=404.0; $^{1}$HNMR (500 MHz, MeOH-d$_4$) δ: 8.23 (s, 1H), 7.17-7.21 (m, 1H), 7.13 (d, J=8.5 Hz, 1H), 6.30 (d, J=7.0 Hz, 1H), 4.93-4.94 (m, 1H), 4.19 (s, 3H), 4.02-4.05 (m, 1H), 3.61-3.64 (m, 1H), 3.28-3.34 (m, 1H), 2.73-2.76 (m, 1H), 2.65-2.69 (m, 2H), 2.21 (s, 3H), 1.73-1.77 (m, 1H), 1.29 (d, J=6.0 Hz, 3H).

Intermediate 16

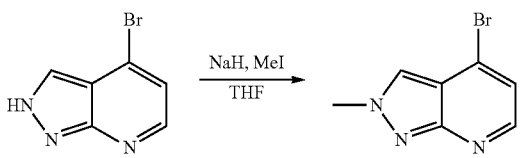

4-bromo-2-methyl-2H-pyrazolo[3,4-b]pyridine: To a solution of 4-bromo-2H-pyrazolo[3,4-b]pyridine (800 mg, 4.04 mmol) in THF (10 mL) was added NaH (323.2 mg, 8.08 mmol, 60% purity) at 0° C. and the mixture was stirred at 20° C. for 1 hour. CH$_3$I (860 mg, 6.06 mmol) was added and the mixture stirred at 20° C. for 3 hours. The mixture was quenched with MeOH (4 mL) and H$_2$O (1 mL) and purified by prep-HPLC (Welch Xtimate C18 100×25 mm 3 □m; Water-MeCN; Gradient 20-60%) to give the title compound as a yellow solid (612 mg, 71%). LCMS (ESI): [M+H]=213.9; $^{1}$HNMR (500 MHz, CDCl$_3$) δ: 8.48 (d, J=4.5 Hz, 1H), 7.96 (s, 1H), 7.25 (d, J=4.5 Hz, 1H), 4.28 (s, 3H).

Example 85

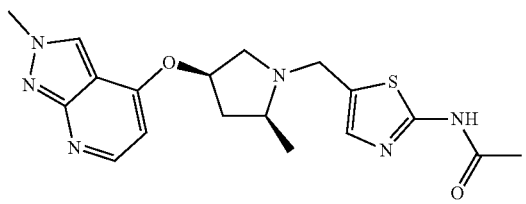 [SMILES: CC(=O)Nc1ncc(CN2C[C@H](Oc3ccnc4nn(C)cc34)C[C@@H]2C)s1]

N-(5-(((2S,4R)-2-methyl-4-((2-methyl-2H-pyrazolo[3,4-b]pyridin-4-yl)oxy)pyrrolidin-1-yl)methyl)thiazol-2-yl)acetamide: The title compound was prepared in an analogous manner of that in scheme 2 from 4-bromo-2H-pyrazolo[3,4-b]pyridine, tert-butyl (2S,4S)-4-hydroxy-2-methylpyrrolidine-1-carboxylate and N-(5-formylthiazol-2-yl)acetamide. LCMS (ESI): [M+H]=387.0; $^{1}$HNMR (400 MHz, MeOH-d$_4$) δ: 8.36 (d, J=5.2 Hz, 1H), 8.31 (s, 1H), 7.28 (s, 1H), 6.45 (d, J=5.6 Hz, 1H), 5.02-5.06 (m, 1H), 4.19 (s, 3H), 4.16-4.18 (m, 1H), 3.57-3.61 (m, 1H), 3.23-3.26 (m, 1H), 2.64-2.73 (m, 3H), 2.19 (s, 3H), 1.73-1.74 (m, 1H), 1.27 (d, J=6.4 Hz, 3H).

Example 86

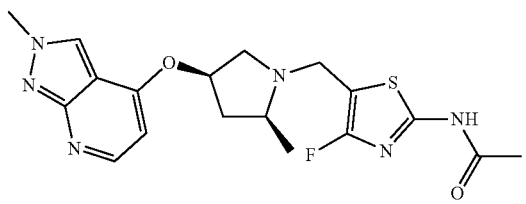

N-(4-fluoro-5-(((2S,4R)-2-methyl-4-((2-methyl-2H-pyrazolo[3,4-b]pyridin-4-yl)oxy)pyrrolidin-1-yl)methyl)thiazol-2-yl)acetamide: The title compound was prepared in an analogous manner of that in scheme 2 from 4-bromo-2H-pyrazolo[3,4-b]pyridine, tert-butyl (2S,4S)-4-hydroxy-2-methylpyrrolidine-1-carboxylate and N-(4-fluoro-5-formylthiazol-2-yl)acetamide. LCMS (ESI): [M+H]=404.0; $^{1}$HNMR (400 MHz, MeOH-d$_4$) δ: 8.39 (d, J=5.2 Hz, 1H), 8.33 (s, 1H), 6.49 (d, J=5.2 Hz, 1H), 5.10-5.12 (m, 1H), 4.20 (s, 3H), 4.12-4.18 (m, 1H), 3.77-3.78 (m, 1H), 3.38-3.41 (m, 1H), 2.74-2.94 (m, 3H), 2.17 (s, 3H), 1.75-1.80 (m, 1H), 1.30 (d, J=6.0 Hz, 3H).

Example 87

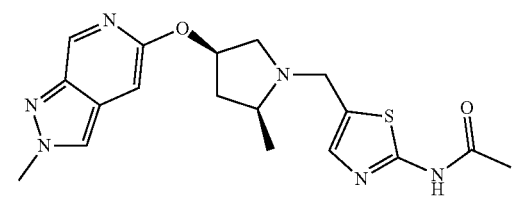 [SMILES: CC(=O)Nc1ncc(CN2C[C@H](Oc3cc4cn(C)nc4cn3)C[C@@H]2C)s1]

N-(5-(((2S,4R)-2-methyl-4-((2-methyl-2H-pyrazolo[3,4-c]pyridin-5-yl)oxy)pyrrolidin-1-yl)methyl)thiazol-2-yl)acetamide: The title compound was prepared in an analogous manner of that in scheme 2 from 5-chloro-2-methyl-2H-pyrazolo[3,4-c]pyridine, tert-butyl (2S,4S)-4-hydroxy-2-methylpyrrolidine-1-carboxylate and N-(5-formylthiazol-2-yl)acetamide. LCMS (ESI): [M+H]=387.0; ¹HNMR (500 MHz, MeOH-d₄) δ: 8.77 (s, 1H), 8.12 (s, 1H), 7.27 (s, 1H), 6.85 (s, 1H), 5.09-5.12 (m, 1H), 4.24 (s, 3H), 4.15 (d, J=14.0 Hz, 1H), 3.57 (d, J=14.5 Hz, 1H), 3.17 (d, J=11.5 Hz, 1H), 2.65-2.68 (m, 1H), 2.57-2.62 (m, 2H), 2.18 (s, 3H), 1.67-1.73 (m, 1H), 1.27 (d, J=5.5 Hz, 3H).

Example 88

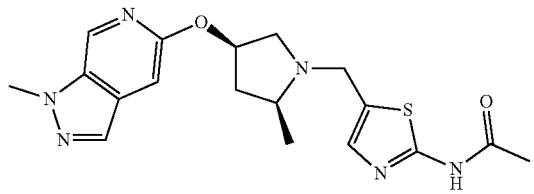 [SMILES: CC(=O)Nc1ncc(CN2C[C@H](Oc3cc4cnn(C)c4cn3)C[C@@H]2C)s1]

N-(5-(((2S,4R)-2-methyl-4-((1-methyl-1H-pyrazolo[3,4-c]pyridin-5-yl)oxy)pyrrolidin-1-yl)methyl)thiazol-2-yl)acetamide: The title compound was prepared in an analogous manner of that in scheme 2 from 5-chloro-1-methyl-1H-pyrazolo[3,4-c]pyridine, tert-butyl (2S,4S)-4-hydroxy-2-methylpyrrolidine-1-carboxylate and N-(5-formylthiazol-2-yl)acetamide. LCMS (ESI): [M+H]=387.0; ¹HNMR (500 MHz, MeOH-d₄) δ: 8.63 (s, 1H), 7.94 (s, 1H), 7.29 (s, 1H), 7.00 (s, 1H), 5.24-5.25 (m, 1H), 4.17-4.20 (m, 1H), 4.11 (s, 3H), 3.61-3.64 (m, 1H), 3.17-3.20 (m, 1H), 2.59-2.72 (m, 3H), 2.19 (s, 3H), 1.69-1.74 (m, 1H), 1.28 (d, J=6.0 Hz, 3H).

Example 89

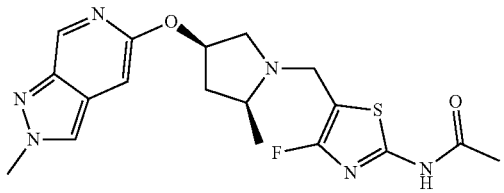 [SMILES: CC(=O)Nc1nc(F)c(CN2C[C@H](Oc3cc4cn(C)nc4cn3)C[C@@H]2C)s1]

N-(4-fluoro-5-(((2S,4R)-2-methyl-4-((2-methyl-2H-pyrazolo[3,4-c]pyridin-5-yl)oxy)pyrrolidin-1-yl)methyl)thiazol-2-yl)acetamide: The title compound was prepared in an analogous manner of that in scheme 2 from 5-chloro-2-methyl-2H-pyrazolo[3,4-c]pyridine, tert-butyl (2S,4S)-4-hydroxy-2-methylpyrrolidine-1-carboxylate and N-(4-fluoro-5-formylthiazol-2-yl)acetamide. LCMS (ESI): [M+H]=405.0; ¹HNMR (500 MHz, MeOH-d₄) δ: 8.79 (s, 1H), 8.14 (s, 1H), 6.87 (s, 1H), 5.09-5.12 (m, 1H), 4.24 (s, 3H), 3.97-4.00 (m, 1H), 3.57-3.60 (m, 1H), 3.17-3.21 (m, 1H), 2.68-2.70 (m, 1H), 2.59-2.60 (m, 2H), 2.17 (s, 3H), 1.69-1.70 (m, 1H), 1.27 (d, J=5.0 Hz, 3H).

Example 90

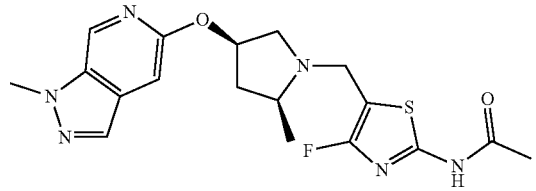 [SMILES: CC(=O)Nc1nc(F)c(CN2C[C@H](Oc3cc4cnn(C)c4cn3)C[C@@H]2C)s1]

N-(4-fluoro-5-(((2S,4R)-2-methyl-4-((1-methyl-1H-pyrazolo[3,4-c]pyridin-5-yl)oxy)pyrrolidin-1-yl)methyl)thiazol-2-yl)acetamide: The title compound was prepared in an analogous manner of that in scheme 2 from 5-chloro-1-methyl-1H-pyrazolo[3,4-c]pyridine, tert-butyl (2S,4S)-4-hydroxy-2-methylpyrrolidine-1-carboxylate and N-(4-fluoro-5-formylthiazol-2-yl)acetamide. LCMS (ESI): [M+H]=405.0; ¹HNMR (500 MHz, MeOH-d₄) δ: 8.65 (s, 1H), 7.94 (s, 1H), 7.00 (s, 1H), 5.23-5.25 (m, 1H), 4.11 (s, 3H), 3.97-4.00 (m, 1H), 3.57-3.60 (m, 1H), 3.18-3.20 (m, 1H), 2.58-2.74 (m, 3H), 2.17 (s, 3H), 1.66-1.72 (m, 1H), 1.26 (d, J=5.5 Hz, 3H).

Intermediate 17

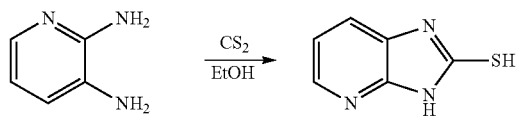 [SMILES: "EtOH" ; Nc1cccnc1N ; "CS2" ; Sc1nc2cccnc2[nH]1]

3H-imidazo[4,5-b]pyridine-2-thiol: CS₂ (9.77 g, 128 mmol) was added to a solution of 2,3-diaminopyridine (7 g, 64.1 mmol) in EtOH (100 mL) and the reaction mixture stirred at 40° C. for 16 hours. The yellow solid was collected by filtration and the filter cake washed with EtOAc (3×25 mL) to give the title compound as a yellow solid (2.5 g, 25%). ¹HNMR (500 MHz, DMSO-d₆) δ: 13.17 (brs, 1H), 12.71 (brs, 1H), 8.10 (d, J=5.0 Hz, 1H), 7.46 (d, J=7.5 Hz, 1H), 7.13 (dd, J=7.5, 5.0 Hz, 1H).

Intermediate 18

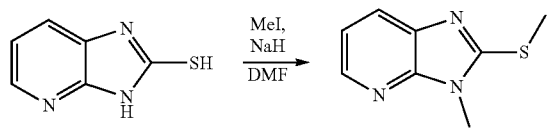

3-methyl-2-(methylthio)-3H-imidazo[4,5-b]pyridine: NaH (635 mg, 15.88 mmol, 60% purity) was added to a solution of 3H-imidazo[4,5-b]pyridine-2-thiol (1.20 g, 7.94 mmol) in DMF (15 mL) at 0° C. and the reaction mixture stirred at 20° C. for 0.5 h. MeI (2.59 g, 18.26 mmol) was added and stirring continued for 2 hours. The reaction mixture was quenched with H₂O (25 mL) and extracted with EtOAc (3×25 mL). The combined organics were dried (Na₂SO₄) and evaporated to dryness in vacuo. The residue was purified by column chromatography on silica gel (DCM/MeOH; 20:1) to give the title compound as a yellow oil (455 mg, 32%). ¹HNMR (500 MHz, MeOH-d₄) δ: 8.24 (dd, J=5.0, 1.5 Hz, 1H), 7.92 (dd, J=8.0, 1.5 Hz, 1H), 7.26 (dd, J=8.0, 5.0 Hz, 1H), 3.76 (s, 3H), 2.79 (s, 3H).

Intermediate 19

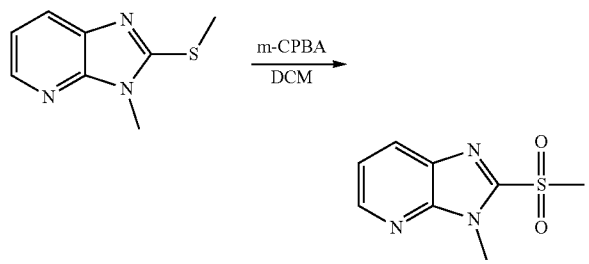

3-methyl-2-(methylsulfonyl)-3H-imidazo[4,5-b]pyridine: To a solution 3-methyl-2-(methylthio)-3H-imidazo[4,5-b]pyridine (100 mg, 0.558 mmol) in DCM (5 mL) was added m-CPBA (249 mg, 1.23 mmol, 85% purity) and the reaction mixture stirred at 25° C. for 10 hours. The reaction mixture was quenched with saturated Na₂CO₃ (20 mL) and extracted with DCM (3×15 mL). The combined organics were dried (Na₂SO₄) and evaporated to dryness in vacuo. The residue was purified by prep-TLC (DCM/MeOH; 20:1) to give the title compound as a white solid (51 mg, 43%). ¹HNMR (500 MHz, CDCl₃) δ: 8.58 (dd, J=4.5, 1.0 Hz, 1H), 8.15 (dd, J=8.0, 1.0 Hz, 1H), 7.37-7.40 (m, 1H), 4.21 (s, 3H), 3.55 (s, 3H).

Example 91

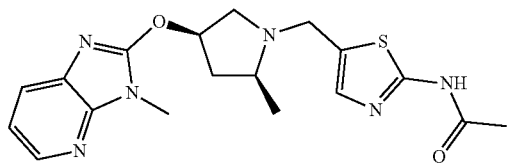 [SMILES: CC(=O)Nc1ncc(CN2C[C@H](Oc3nc4cccnc4n3C)C[C@@H]2C)s1]

N-(5-(((2S,4R)-2-methyl-4-((3-methyl-3H-imidazo[4,5-b]pyridin-2-yl)oxy)pyrrolidin-1-yl)methyl)thiazol-2-yl)acetamide: The title compound was prepared in an analogous manner of that in scheme 2 from 3-methyl-2-(methylsulfonyl)-3H-imidazo[4,5-b]pyridine, tert-butyl (2S,4S)-4-hydroxy-2-methylpyrrolidine-1-carboxylate and N-(5-formylthiazol-2-yl)acetamide. LCMS (ESI): [M+H]=387.0; ¹HNMR (500 MHz, MeOH-d₄) δ: 8.11 (d, J=4.5 Hz, 1H), 7.74 (d, J=8.0 Hz, 1H), 7.28 (s, 1H), 7.17 (dd, J=8.0, 5.0 Hz, 1H), 5.39-5.40 (m, 1H), 4.16-4.19 (m, 1H), 3.64 (s, 3H), 3.59-3.62 (m, 1H), 3.27-3.30 (m, 1H), 2.62-2.73 (m, 3H), 2.18 (s, 3H), 1.79-1.82 (m, 1H), 1.29 (d, J=6.0 Hz, 3H).

Intermediate 20

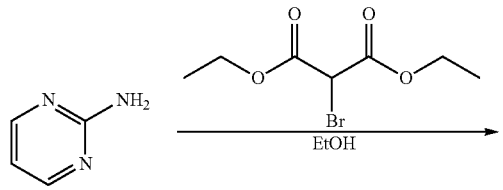

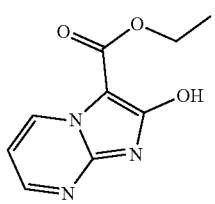

ethyl 2-hydroxyimidazo[1,2-a]pyrimidine-3-carboxylate: To a solution of 2-aminopyrimidine (5 g, 52.6 mmol) in EtOH (50 mL) was added diethyl 2-bromomalonate (15.08 g, 63.1 mmol) and the resulting mixture refluxed for 12 hours. The reaction mixture was concentrated under reduced pressure and the residue purified by column chromatography (DCM/MeOH; 10:1) to afford the title compound as a yellow solid (8.7 g, 80%). ¹HNMR (500 MHz, MeOH-d₄) δ: 9.62 (d, J=6.0 Hz, 1H), 8.54 (d, J=6.0 Hz, 1H), 7.36 (t, J=6.0 Hz, 1H), 4.36 (q, J=7.0 Hz, 2H), 1.34 (t, J=7.0 Hz, 3H).

Intermediate 21

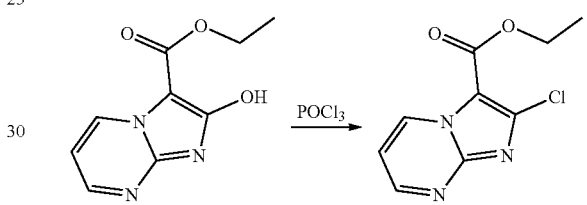

ethyl 2-chloroimidazo[1,2-a]pyrimidine-3-carboxylate: A mixture of ethyl 2-hydroxyimidazo[1,2-a]pyrimidine-3-carboxylate (5.0 g, 24.13 mmol) in POCl₃ (37.0 g, 0.241 mol) was refluxed for 8 hours. The mixture was cooled to room temperature and poured into ice water and extracted with EtOAc (3×50 mL). The combined extracts were dried (Na₂SO₄) and evaporated to dryness in vacuo to give the title compound as a yellow solid (2.3 g, 42%). ¹HNMR (500 MHz, MeOH-d₄) δ: 9.64-9.67 (m, 1H), 8.76-8.79 (m, 1H), 7.34-7.37 (m, 1H), 4.48 (q, J=7.0 Hz, 2H), 1.46 (t, J=6.0 Hz, 3H).

Intermediate 22

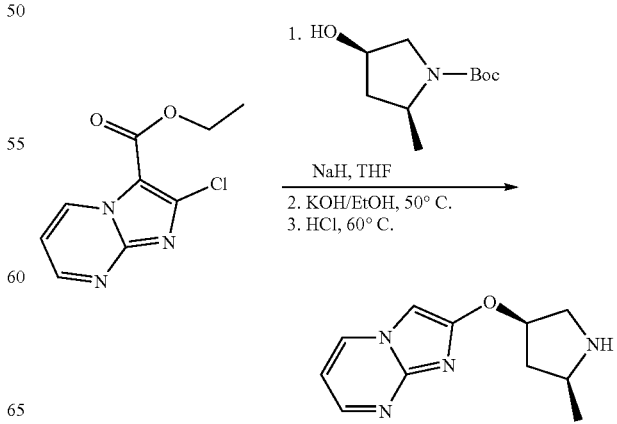

2-(((3R,5S)-5-methylpyrrolidin-3-yl)oxy)imidazo[1,2-a]pyrimidine: Part 1, to a solution of tert-butyl (2S,4R)-4-hydroxy-2-methylpyrrolidine-1-carboxylate (446 mg, 2.22 mmol) in THF (10 mL) was added NaH (106 mg, 2.66 mmol, 60% purity) and then ethyl 2-chloroimidazo[1,2-a]pyrimidine-3-carboxylate (500 mg, 2.22 mmol) and the resulting mixture stirred at 90° C. for 12 hours. The reaction was concentrated under reduced pressure and the residue purified by column chromatography (PE/EtOAc; 3:1) to give ethyl 2-(((3R,5S)-1-(tert-butoxycarbonyl)-5-methylpyrrolidin-3-yl)oxy)imidazo[1,2-a]pyrimidine-3-carboxylate as a yellow solid (352 mg, 40%).

Part 2, to a solution of ethyl 2-(((3R,5S)-1-(tert-butoxycarbonyl)-5-methylpyrrolidin-3-yl)oxy)imidazo[1,2-a]pyrimidine-3-carboxylate (352 mg, 0.902 mmol) in EtOH (3 mL) and H$_2$O (1 mL) was added KOH (50.59 mg, 0.902 mmol) and the resulting mixture stirred at 50° C. for 2 hours. The reaction mixture was concentrated under reduced pressure to give 2-(((3R,5S)-1-(tert-butoxycarbonyl)-5-methylpyrrolidin-3-yl)oxy)imidazo[1,2-a]pyrimidine-3-carboxylic acid which was used without further purification.

Part 3, to a solution of 2-(((3R,5S)-1-(tert-butoxycarbonyl)-5-methylpyrrolidin-3-yl)oxy)imidazo[1,2-a]pyrimidine-3-carboxylic acid (233 mg, 0.643 mmol) in EtOH (4 mL) was added HCl (2 mL, 6M) and the resulting mixture was stirred at 60° C. for 3 hours. The mixture was adjusted pH to 8-9 with NH$_4$OH and the mixture purified by prep-HPLC (Welch Xtimate C18 150×30 mm 5um; H$_2$O (10 mM NH$_4$HCO$_3$)-MeCN; 8-32%) to give the title compound as a yellow solid (50 mg, 36%). $^1$HNMR (400 MHz, MeOH-d$_4$) δ: 8.76 (dd, J=2.0, 6.8 Hz, 1H), 8.46 (dd, J=2.0, 4.8 Hz, 1H), 7.33 (s, 1H), 7.06 (dd, J=4.4, 6.8 Hz, 1H), 5.36-5.39 (m, 1H), 3.84-3.86 (m, 1H), 3.66-3.69 (m, 1H), 3.58-3.62 (m, 1H), 2.76-2.79 (m, 1H), 2.00-2.04 (m, 1H), 1.49 (d, J=6.8 Hz, 3H).

Example 92

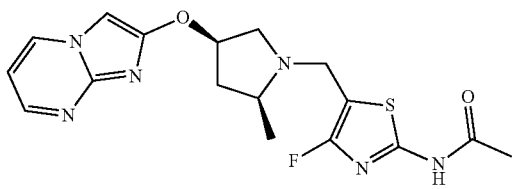 [SMILES: CC(=O)Nc1nc(F)c(CN2C[C@H](Oc3cn4cccnc4n3)C[C@@H]2C)s1]

N-(4-fluoro-5-(((2S,4R)-4-(imidazo[1,2-a]pyrimidin-2-yloxy)-2-methylpyrrolidin-1-yl)methyl)thiazol-2-yl)acetamide: The title compound was prepared in an analogous manner of that in scheme 2 from 2-(((3R,5S)-5-methylpyrrolidin-3-yl)oxy)imidazo[1,2-a]pyrimidine and N-(4-fluoro-5-formylthiazol-2-yl)acetamide. LCMS (ESI): [M+H]= 391.0; HNMR (500 MHz, MeOH-d$_4$) δ: 8.69 (dd, J=2.0, 6.0 Hz, 1H), 8.39 (dd, J=2.0, 4.5 Hz, 1H), 7.21 (s, 1H), 7.00 (dd, J=4.5, 6.5 Hz, 1H), 4.98-5.00 (m, 1H), 4.00 (d, J=15.0 Hz, 1H), 3.60 (d, J=14.5 Hz, 1H), 3.25-3.28 (m, 1H), 2.62-2.73 (m, 3H), 2.17 (s, 3H), 1.69-1.75 (m, 1H), 1.27 (d, J=5.5 Hz, 3H).

Example 93

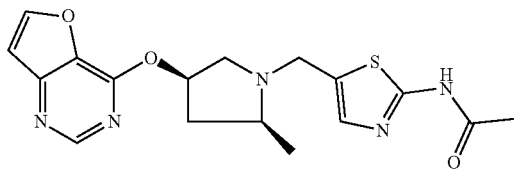 [SMILES: CC(=O)Nc1ncc(CN2C[C@H](Oc3ncnc4ccoc34)C[C@@H]2C)s1]

N-(5-(((2S,4R)-4-(furo[3,2-d]pyrimidin-4-yloxy)-2-methylpyrrolidin-1-yl)methyl)thiazol-2-yl)acetamide: The title compound was prepared in an analogous manner of that in scheme 2 from 4-chlorofuro[3,2-d]pyrimidine, tert-butyl (2S,4R)-4-hydroxy-2-methylpyrrolidine-1-carboxylate and N-(5-formylthiazol-2-yl)acetamide. LCMS (ESI): [M+H]= 374.0; $^1$HNMR (500 MHz, CDCl$_3$) δ: 12.31 (brs, 1H), 8.56 (s, 1H), 7.83 (d, J=2.0 Hz, 1H), 7.22 (s, 1H), 6.91 (d, J=2.0 Hz, 1H), 5.56-5.58 (m, 1H), 4.13 (d, J=14.5 Hz, 1H), 3.57 (d, J=14.5 Hz, 1H), 3.25-3.27 (m, 1H), 2.71-2.73 (m, 1H), 2.59-2.63 (m, 2H), 2.29 (s, 3H), 1.84-1.85 (m, 1H), 1.28 (d, J=5.5 Hz, 3H).

Example 94

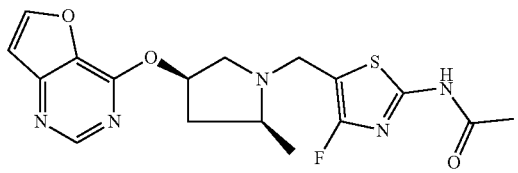 [SMILES: CC(=O)Nc1nc(F)c(CN2C[C@H](Oc3ncnc4ccoc34)C[C@@H]2C)s1]

N-(4-fluoro-5-(((2S,4R)-4-(furo[3,2-d]pyrimidin-4-yloxy)-2-methylpyrrolidin-1-yl)methyl)thiazol-2-yl)acetamide: The title compound was prepared in an analogous manner of that in scheme 2 from 4-chlorofuro[3,2-d]pyrimidine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=392.0; $^1$HNMR (500 MHz, CDCl$_3$) δ: 10.82 (brs, 1H), 8.58 (s, 1H), 7.84 (d, J=2.0 Hz, 1H), 6.91 (d, J=2.0 Hz, 1H), 5.56-5.58 (m, 1H), 3.96-3.99 (d, J=14.5 Hz, 1H), 3.62-3.65 (d, J=14.5 Hz, 1H), 3.28-3.30 (m, 1H), 2.75-2.79 (m, 1H), 2.57-2.63 (m, 2H), 2.29 (s, 3H), 1.81-1.83 (m, 1H), 1.27 (d, J=6.0 Hz, 3H).

Example 95

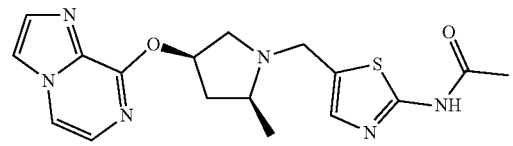 [SMILES: CC(=O)Nc1ncc(CN2C[C@H](Oc3nccn4ccnc34)C[C@@H]2C)s1]

N-(5-(((2S,4R)-4-(imidazo[1,2-a]pyrazin-8-yloxy)-2-methylpyrrolidin-1-yl)methyl)thiazol-2-yl)acetamide: The title compound was prepared in an analogous manner of that in scheme 2 from 8-chloroimidazo[1,2-a]pyrazine, tert-butyl (2S,4R)-4-hydroxy-2-methylpyrrolidine-1-carboxylate and N-(5-formylthiazol-2-yl). LCMS (ESI): [M+H]=373.1; $^1$HNMR (500 MHz, MeOH-d$_4$) δ: 8.02 (d, J=4.5 Hz, 1H), 7.89 (s, 1H), 7.59 (s, 1H), 7.36 (d, J=4.5 Hz, 1H), 7.26 (s, 1H), 5.49-5.51 (m, 1H), 4.13-4.15 (m, 1H), 3.56-3.58 (m, 1H), 3.26-3.28 (m, 1H), 2.75-2.78 (m, 1H), 2.65-2.69 (m, 2H), 2.18 (s, 3H), 1.85-1.88 (m, 1H), 1.29 (d, J=6.0 Hz, 3H).

Example 96

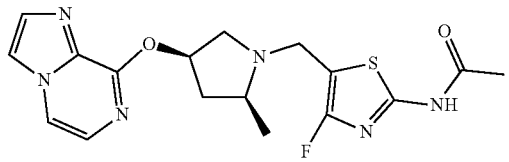 [SMILES: CC(=O)Nc1nc(F)c(CN2C[C@H](Oc3nccn4ccnc34)C[C@@H]2C)s1]

N-(4-fluoro-5-(((2S,4R)-4-(imidazo[1,2-a]pyrazin-8-yloxy)-2-methylpyrrolidin-1-yl)methyl)thiazol-2-yl)acetamide: The title compound was prepared in an analogous manner of that in scheme 2 from 8-chloroimidazo[1,2-a]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=390.0; $^1$HNMR (400 MHz, MeOH-d$_4$) δ: 8.03 (d, J=4.8 Hz, 1H), 7.90 (s, 1H), 7.59 (s, 1H), 7.37 (d, J=4.8 Hz, 1H), 5.47-5.52 (m, 1H), 3.96 (d, J=14.4 Hz, 1H), 3.56 (d, J=14.4 Hz, 1H), 3.27-3.28 (m, 1H), 2.75-2.80 (m, 1H), 2.59-2.68 (m, 2H), 2.16 (s, 3H), 1.84-1.88 (m, 1H), 1.27 (d, J=5.6 Hz, 3H).

Intermediate 24

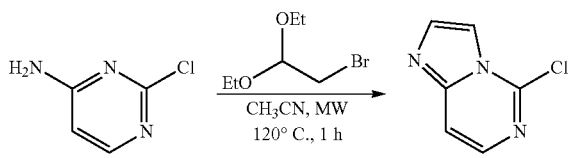

5-chloroimidazo[1,2-c]pyrimidine: 2-bromo-1,1-diethoxyethane (3.04 g, 15.44 mmol) was added to a solution of 2-chloropyrimidin-4-amine (500 mg, 3.86 mmol) in CH$_3$CN (7 mL) and the mixture stirred at 120° C. for 1 hour under microwave conditions. The mixture was filtered to afford the title compound as a yellow solid (560 mg). LCMS (ESI): [M+H]=153.9; $^1$HNMR (500 MHz, DMSO-d$_6$) δ: 8.44-8.46 (m, 1H), 8.32 (d, J=6.0 Hz, 1H), 8.25-8.26 (m, 1H), 8.01 (d, J=7.0 Hz, 1H).

Example 97

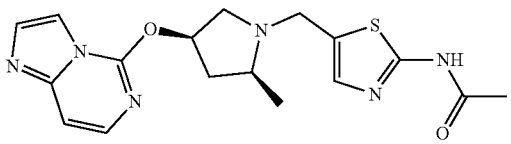 [SMILES: CC(=O)Nc1ncc(CN2C[C@H](Oc3nccc4nccn34)C[C@@H]2C)s1]

N-(5-(((2S,4R)-4-(imidazo[1,2-c]pyrimidin-5-yloxy)-2-methylpyrrolidin-1-yl)methyl)thiazol-2-yl)acetamide: The title compound was prepared in an analogous manner of that in scheme 2 from 5-chloroimidazo[1,2-c]pyrimidine, tert-butyl (2S,4R)-4-hydroxy-2-methylpyrrolidine-1-carboxylate and N-(5-formylthiazol-2-yl)acetamide. LCMS (ESI): [M+H]=373.0; $^1$HNMR (400 MHz, MeOH-d$_4$) δ: 7.80-7.81 (m, 1H), 7.68 (d, J=6.4 Hz, 1H), 7.53 (d, J=1.6 Hz, 1H), 7.28 (s, 1H), 7.11 (d, J=6.4 Hz, 1H), 5.59-5.63 (m, 1H), 4.16-4.20 (m, 1H), 3.61-3.64 (m, 1H), 3.28-3.29 (m, 1H), 2.62-2.76 (m, 3H), 2.19 (s, 3H), 1.78-1.82 (m, 1H), 1.29 (d, J=6.0 Hz, 3H).

Example 98

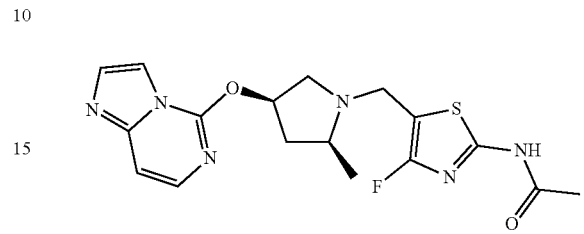

N-(4-fluoro-5-(((2S,4R)-4-(imidazo[1,2-c]pyrimidin-5-yloxy)-2-methylpyrrolidin-1-yl)methyl)thiazol-2-yl)acetamide: The title compound was prepared in an analogous manner of that in scheme 2 from 5-chloroimidazo[1,2-c]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (400 MHz, MeOH-d$_4$) δ: 7.82 (s, 1H), 7.70 (d, J=6.0 Hz, 1H), 7.54 (s, 1H), 7.12 (d, J=6.4 Hz, 1H), 5.59-5.63 (m, 1H), 4.01-4.05 (m, 1H), 3.62-3.66 (m, 1H), 3.35-3.36 (m, 1H), 2.64-2.80 (m, 3H), 2.19 (s, 3H), 1.78-1.83 (m, 1H), 1.29 (d, J=6.0 Hz, 3H).

Intermediate 25

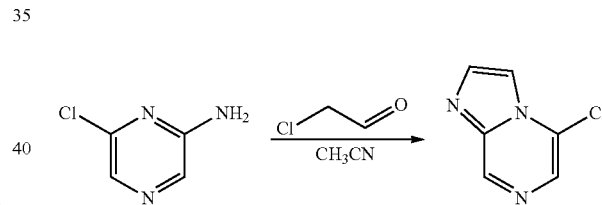

5-chloroimidazo[1,2-a]pyrazine: A solution of 6-chloropyrazin-2-amine (2 g, 15.44 mmol) and 2-chloroacetaldehyde (12.1 g, 61.76 mmol) in CH$_3$CN (20 mL) was stirred at 90° C. for 16 hours in the absence of light. The reaction mixture was evaporated to dryness and the residue was purified by chromatography on silica gel (petroleum ether/EtOAc) to give the title compound as a yellow solid (720 mg, 30%).

Example 99

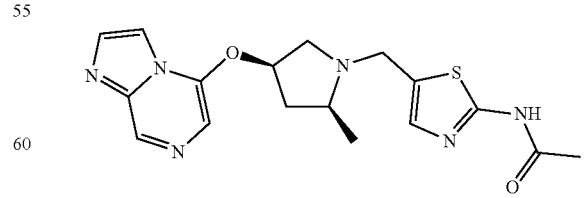

N-(5-(((2S,4R)-4-(imidazo[1,2-a]pyrazin-5-yloxy)-2-methylpyrrolidin-1-yl)methyl)thiazol-2-yl)acetamide: The title compound was prepared in an analogous manner of that in scheme 2 from 5-chloroimidazo[1,2-a]pyrazine, tert-butyl (2S,4R)-4-hydroxy-2-methylpyrrolidine-1-carboxylate and N-(5-formylthiazol-2-yl)acetamide. LCMS (ESI): [M+H]=373.0; ¹HNMR (500 MHz, CDCl₃) δ: 11.0 (s, 1H), 8.77 (s, 1H), 7.81 (s, 1H), 7.75 (d, J=1.0 Hz, 1H), 7.22 (s, 2H), 4.96-5.02 (m, 1H), 4.15 (d, J=14.0 Hz, 1H), 3.58 (d, J=15.0 Hz, 1H), 3.34 (d, J=11.5 Hz, 1H), 2.59-2.71 (m, 3H), 2.29 (s, 3H), 2.30 (s, 3H), 1.84-1.91 (m, 1H), 1.29 (d, J=5.5 Hz, 3H).

Example 100

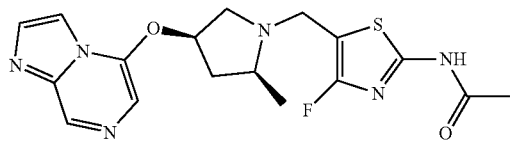 [SMILES: CC(=O)Nc1nc(F)c(CN2C[C@H](Oc3cncc4nccn34)C[C@@H]2C)s1]

N-(4-fluoro-5-(((2S,4R)-4-(imidazo[1,2-a]pyrazin-5-yloxy)-2-methylpyrrolidin-1-yl)methyl)thiazol-2-yl)acetamide: The title compound was prepared in an analogous manner of that in scheme 2 from 5-chloroimidazo[1,2-a]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; ¹HNMR (500 MHz, CDCl₃) δ: 10.3 (brs, 1H), 8.77 (s, 1H), 7.82 (s, 1H), 7.75 (d, J=1.0 Hz, 1H), 7.28 (s, 1H), 4.96-5.02 (m, 1H), 4.00 (d, J=14.5 Hz, 1H), 3.62 (d, J=14.5 Hz, 1H), 3.35-3.40 (m, 1H), 2.57-2.77 (m, 3H), 2.29 (s, 3H), 1.83-1.91 (m, 1H), 1.29 (d, J=5.0 Hz, 3H).

Example 101

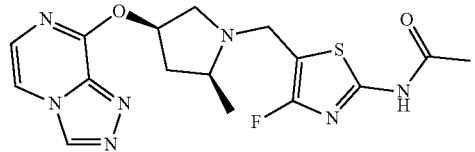 [SMILES: CC(=O)Nc1nc(F)c(CN2C[C@H](Oc3nccn4cnnc34)C[C@@H]2C)s1]

N-(5-(((2S,4R)-4-([1,2,4]triazolo[4,3-a]pyrazin-8-yloxy)-2-methylpyrrolidin-1-yl)methyl)-4-fluorothiazol-2-yl)acetamide: The title compound was prepared in an analogous manner of that in scheme 2 from 8-chloro-[1,2,4]triazolo[4,3-a]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=392.1; ¹HNMR (400 MHz, MeOH-d₄) δ: 9.21 (s, 1H), 8.04 (d, J=4.8 Hz, 1H), 7.42 (d, J=4.4 Hz, 1H), 5.56-5.57 (m, 1H), 3.95-3.99 (m, 1H), 3.55-3.59 (m, 1H), 3.31-3.34 (m, 1H), 2.65-2.80 (m, 3H), 2.16 (s, 3H), 1.83-1.86 (m, 1H), 1.28 (d, J=5.6 Hz, 3H).

Example 102

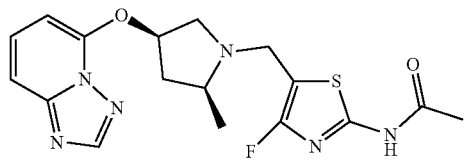 [SMILES: CC(=O)Nc1nc(F)c(CN2C[C@H](Oc3cccc4ncnn34)C[C@@H]2C)s1]

N-(5-(((2S,4R)-4-([1,2,4]triazolo[1,5-a]pyridin-5-yloxy)-2-methylpyrrolidin-1-yl)methyl)-4-fluorothiazol-2-yl)acetamide: The title compound was prepared in an analogous manner of that in scheme 2 from 5-chloro-[1,2,4]triazolo[1,5-a]pyridine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=391.0; ¹HNMR (500 MHz, MeOH-d₄) δ: 8.41 (s, 1H), 7.70 (t, J=8.0 Hz 1H), 7.39 (d, J=9.0 Hz, 1H), 6.58 (d, J=8.0 Hz, 1H), 5.19-5.22 (m, 1H), 4.01-4.04 (m, 1H), 3.63-3.65 (m, 1H), 3.39-3.42 (m, 1H), 2.66-2.84 (m, 3H), 2.20 (s, 3H), 1.89-1.92 (m, 1H), 1.30 (d, J=6.0 Hz, 3H).

Example 103

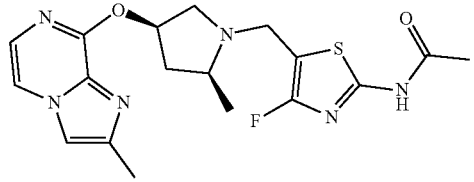 [SMILES: CC(=O)Nc1nc(F)c(CN2C[C@H](Oc3nccn4cc(C)nc34)C[C@@H]2C)s1]

N-(4-fluoro-5-(((2S,4R)-2-methyl-4-((2-methylimidazo[1,2-a]pyrazin-8-yl)oxy)pyrrolidin-1-yl)methyl)thiazol-2-yl)acetamide: The title compound was prepared in an analogous manner of that in scheme 2 from 8-chloro-2-methylimidazo[1,2-a]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.1; ¹HNMR (400 MHz, MeOH-d₄) δ: 7.91 (d, J=4.4 Hz, 1H), 7.62 (s, 1H), 7.31 (d, J=4.4 Hz, 1H), 5.44-5.48 (m, 1H), 3.95 (d, J=14.4 Hz, 1H), 3.53 (d, J=14.4 Hz, 1H), 3.26-3.29 (m, 1H), 2.73-2.77 (m, 1H), 2.57-2.66 (m, 2H), 2.39 (s, 3H), 2.16 (s, 3H), 1.81-1.84 (m, 1H), 1.26 (d, J=6.0 Hz, 3H).

Example 104

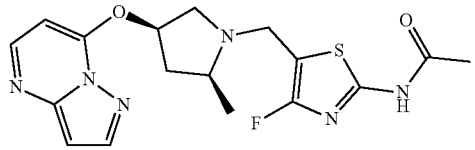 [SMILES: CC(=O)Nc1nc(F)c(CN2C[C@H](Oc3ccnc4ccnn34)C[C@@H]2C)s1]

N-(4-fluoro-5-(((2S,4R)-2-methyl-4-(pyrazolo[1,5-a]pyrimidin-7-yloxy)pyrrolidin-1-yl)methyl)thiazol-2-yl)acetamide: The title compound was prepared in an analogous manner of that in scheme 2 from 7-chloropyrazolo[1,5-a]pyrimidine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=391.0; ¹HNMR (400 MHz, MeOH-d₄) δ: 8.36 (d, J=4.8 Hz, 1H), 8.11 (d, J=2.0 Hz, 1H), 6.59 (d, J=2.4 Hz, 1H), 6.43 (d, J=5.2 Hz, 1H), 5.21-5.25 (m, 1H), 3.95-3.99 (m, 1H), 3.57-3.62 (m, 1H), 3.38-3.41 (m, 1H), 2.61-2.82 (m, 3H), 2.15 (s, 3H), 1.87-1.93 (m, 1H), 1.26 (d, J=6.0 Hz, 3H).

Example 105

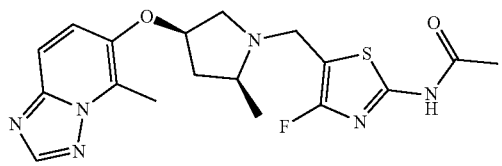 [SMILES: CC(=O)Nc1nc(F)c(CN2C[C@H](Oc3ccc4ncnn4c3C)C[C@@H]2C)s1]

N-(4-fluoro-5-(((2S,4R)-2-methyl-4-((5-methyl-[1,2,4]triazolo[1,5-a]pyridin-6-yl)oxy)pyrrolidin-1-yl)methyl)thiazol-2-yl)acetamide: The title compound was prepared in an analogous manner of that in scheme 2 from 6-chloro-5-methyl-[1,2,4]triazolo[1,5-a]pyridine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=405.0; $^1$HNMR (400 MHz, MeOH-$d_4$) δ: 8.36 (s, 1H), 7.60-7.62 (m, 2H), 4.84-4.85 (m, 1H), 3.97-4.00 (m, 1H), 3.54-3.58 (m, 1H), 3.17-3.20 (m, 1H), 2.73 (s, 3H), 2.55-2.59 (m, 3H), 2.18 (s, 3H), 1.71-1.72 (m, 1H), 1.28 (d, J=6.0 Hz, 3H).

Intermediate 26

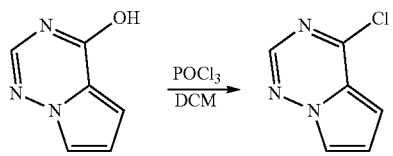

4-chloropyrrolo[2,1-f][1,2,4]triazine: A solution of pyrrolo[2,1-f][1,2,4]triazin-4-ol (200 mg, 1.48 mmol) in phosphoryl trichloride (5.0 g, 32.28 mmol, 3.0 mL) was stirred at 100° C. for 3 hours. The reaction was diluted with H$_2$O (10 mL) and extracted with DCM (3×10 mL). The combined organics was dried (Na$_2$SO$_4$) and evaporated to dryness in vacuo to afford to give the title compound as a yellow solid (83.0 mg, 37%). $^1$HNMR (500 MHz, CDCl$_3$) δ: 8.22 (s, 1H), 7.86-7.87 (m, 1H), 6.99-7.00 (m, 1H), 6.97-6.99 (m, 1H).

Example 106

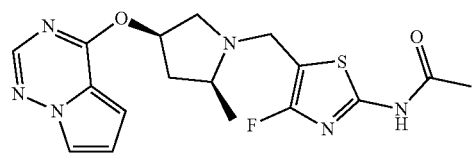 [SMILES: CC(=O)Nc1nc(F)c(CN2C[C@H](Oc3ncnn4cccc34)C[C@@H]2C)s1]

N-(4-fluoro-5-(((2S,4R)-2-methyl-4-(pyrrolo[2,1-f][1,2,4]triazin-4-yloxy)pyrrolidin-1-yl)methyl)thiazol-2-yl)acetamide: The title compound was prepared in an analogous manner of that in scheme 2 from 4-chloropyrrolo[2,1-f][1,2,4]triazine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (400 MHz, MeOH-$d_4$) δ: 7.98 (s, 1H), 7.70-7.71 (m, 1H), 6.84-6.86 (m, 1H), 6.76-6.77 (m, 1H), 5.56-5.60 (m, 1H), 3.95-4.01 (m, 1H), 3.59-3.63 (m, 1H), 3.24-3.27 (m, 1H), 2.74-2.78 (m, 1H), 2.63-2.68 (m, 2H), 2.18 (s, 3H), 1.72-1.77 (m, 1H), 1.27 (d, J=5.6 Hz, 3H).

Example 107

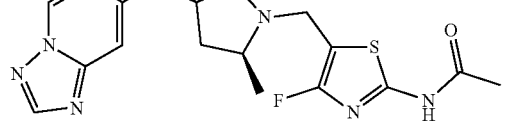

N-(5-(((2S,4R)-4-([1,2,4]triazolo[1,5-a]pyridin-7-yloxy)-2-methylpyrrolidin-1-yl)methyl)-4-fluorothiazol-2-yl)acetamide: The title compound was prepared in an analogous manner of that in scheme 2 from 7-chloro-[1,2,4]triazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (400 MHz, MeOH-$d_4$) δ: 8.60 (d, J=7.6 Hz, 1H), 8.26 (s, 1H), 6.99 (d, J=2.4 Hz, 1H), 6.86 (dd, J=7.6, 2.8 Hz, 1H), 4.93-4.98 (m, 1H), 4.03 (d, J=14.8 Hz, 1H), 3.63 (d, J=14.8 Hz, 1H), 3.25-3.28 (m, 1H), 2.63-2.78 (m, 3H), 2.20 (s, 3H), 1.68-1.72 (m, 1H), 1.29 (d, J=6.0 Hz, 3H).

Example 108

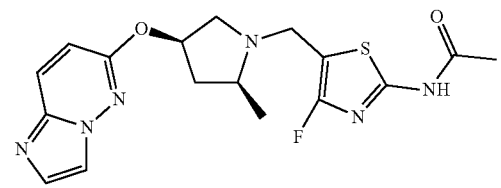 [SMILES: CC(=O)Nc1nc(F)c(CN2C[C@H](Oc3ccc4nccn4n3)C[C@@H]2C)s1]

N-(4-fluoro-5-(((2S,4R)-4-(imidazo[1,2-b]pyridazin-6-yloxy)-2-methylpyrrolidin-1-yl)methyl)thiazol-2-yl)acetamide: The title compound was prepared in an analogous manner of that in scheme 2 from 6-chloroimidazo[1,2-b]pyridazine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (500 MHz, MeOH-$d_4$) δ: 7.91 (s, 1H), 7.85 (d, J=10.0 Hz, 1H), 7.57 (s, 1H), 6.87 (d, J=10.0 Hz, 1H), 5.31-5.32 (m, 1H), 4.00-4.03 (d, J=14.5 Hz, 1H), 3.62 (d, J=14.5 Hz, 1H), 3.25-3.27 (m, 1H), 2.66-2.76 (m, 3H), 2.20 (s, 3H), 1.70-1.74 (m, 1H), 1.28 (d, J=6.0 Hz, 3H).

Intermediate 27

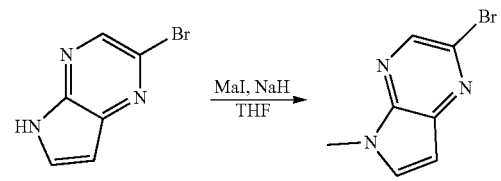

2-bromo-5-methyl-5H-pyrrolo[2,3-b]pyrazine: NaH (20.2 mg, 0.505 mmol, 60% purity) was added to a solution of 2-bromo-5H-pyrrolo[2,3-b]pyrazine (50 mg, 0.253 mmol) in THF (6 mL) at 0° C. and the mixture stirred at 18° C. for 0.5 h. Iodomethane (53.8 mg, 0.379 mmol) was added and the mixture was stirred at 18° C. for 2 h. The reaction was quenched by sat. aq.NH₄Cl (2 mL), diluted with H₂O (10 mL) and extracted with EtOAc (3×20 mL). The combined organics were washed with brine, dried (Na₂SO₄) and evaporated to dryness in vacuo. The residue was purified by prep-TLC (petroleum ether/EtOAc; 15:1 to 5:1) to give the title compound as a yellow solid (38.9 mg, 72%). ¹HNMR (400 MHz, CDCl₃) δ: 8.31 (s, 1H), 7.47 (d, J=3.2 Hz, 1H), 6.62 (d, J=4.0 Hz, 1H) 3.90 (s, 3H).

Example 109

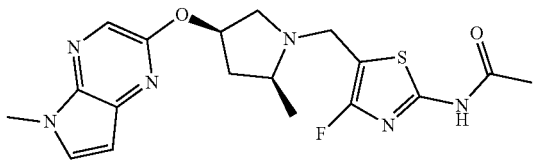 [SMILES: CC(=O)Nc1nc(F)c(CN2C[C@H](Oc3cnc4c(ccn4C)n3)C[C@@H]2C)s1]

N-(4-fluoro-5-(((2S,4R)-2-methyl-4-((5-methyl-5H-pyrrolo[2,3-b]pyrazin-2-yl)oxy)pyrrolidin-1-yl)methyl)thiazol-2-yl)acetamide: The title compound was prepared in an analogous manner of that in scheme 2 from 2-bromo-5-methyl-5H-pyrrolo[2,3-b]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.0; ¹HNMR (500 MHz, MeOH-d₄) δ: 7.84 (s, 1H), 7.53 (d, J=3.5 Hz, 1H), 6.43 (d, J=3.5 Hz, 1H), 5.35-5.37 (m, 1H), 3.98-4.01 (m, 1H), 3.85 (s, 3H), 3.60-3.63 (m, 1H), 3.20-3.22 (m, 1H), 2.62-2.76 (m, 3H), 2.19 (s, 3H), 1.68-1.70 (m, 1H), 1.27 (d, J=6.0 Hz, 3H).

Example 110

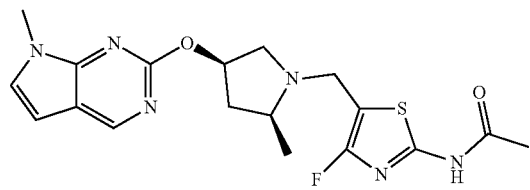 [SMILES: CC(=O)Nc1nc(F)c(CN2C[C@H](Oc3ncc4ccn(C)c4n3)C[C@@H]2C)s1]

N-(4-fluoro-5-(((2S,4R)-2-methyl-4-((7-methyl-7H-pyrrolo[2,3-d]pyrimidin-2-yl)oxy)pyrrolidin-1-yl)methyl)thiazol-2-yl)acetamide: The title compound was prepared in an analogous manner of that in scheme 2 from 2-chloro-7-methyl-7H-pyrrolo[2,3-d]pyrimidine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=405.0; ¹HNMR (400 MHz, MeOH-d₄) δ: 8.61 (s, 1H), 7.19 (d, J=3.6 Hz, 1H), 7.50 (d, J=3.6 Hz, 1H), 5.36-5.41 (m, 1H), 3.95-3.99 (m, 1H), 3.75 (s, 3H), 3.55-3.59 (m, 1H), 3.22-3.25 (m, 1H), 2.62-2.82 (m, 3H), 2.17 (s, 3H), 1.72-1.76 (m, 1H), 1.25 (d, J=5.6 Hz, 3H).

Example 111

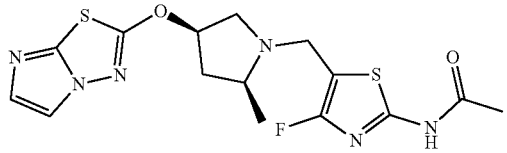 [SMILES: CC(=O)Nc1nc(F)c(CN2C[C@H](Oc3nn4ccnc4s3)C[C@@H]2C)s1]

N-(4-fluoro-5-(((2S,4R)-4-(imidazo[2,1-b][1,3,4]thiadiazol-2-yloxy)-2-methylpyrrolidin-1-yl)methyl)thiazol-2-yl)acetamide: The title compound was prepared in an analogous manner of that in scheme 2 from 2-bromoimidazo[2,1-b][1,3,4]thiadiazole, tert-butyl (2S,4R)-4-hydroxy-2-methylpyrrolidine-1-carboxylate and N-(4-fluoro-5-formylthiazol-2-yl)acetamide. LCMS (ESI): [M+H]=397.0; ¹HNMR (400 MHz, MeOH-d₄) δ: 7.73 (d, J=1.5 Hz, 1H), 7.16 (d, J=1.5 Hz, 1H), 5.40-5.41 (m, 1H), 4.02-4.05 (m, 1H), 3.64-3.67 (m, 1H), 3.36-3.39 (m, 1H), 2.68-2.73 (m, 3H), 2.18 (s, 3H), 1.78-1.79 (m, 1H), 1.28 (d, J=6.0 Hz, 3H).

Example 112

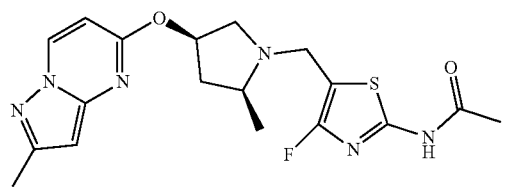 [SMILES: CC(=O)Nc1nc(F)c(CN2C[C@H](Oc3ccn4nc(C)cc4n3)C[C@@H]2C)s1]

N-(4-fluoro-5-(((2S,4R)-2-methyl-4-((2-methylpyrazolo[1,5-a]pyrimidin-5-yl)oxy)pyrrolidin-1-yl)methyl)thiazol-2-yl)acetamide: The title compound was prepared in an analogous manner of that in scheme 2 from 5-chloro-2-methylpyrazolo[1,5-a]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.1; ¹HNMR (400 MHz, CDCl₃) δ: 11.15 (brs, 1H), 8.26 (d, J=7.2 Hz, 1H), 6.23 (d, J=7.2 Hz, 1H), 6.07 (s, 1H), 5.38-5.39 (m, 1H), 3.97-4.00 (m, 1H), 3.61-3.65 (m, 1H), 3.19-3.21 (m, 1H), 2.53-2.68 (m, 3H), 2.41 (s, 3H), 2.31 (s, 3H), 1.69-1.71 (m, 1H), 1.25 (d, J=5.6 Hz, 3H).

Example 113

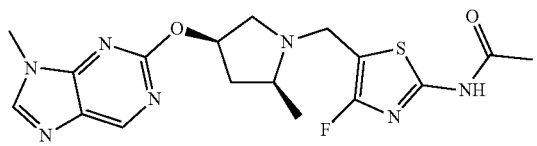 [SMILES: CC(=O)Nc1nc(F)c(CN2C[C@H](Oc3ncc4ncn(C)c4n3)C[C@@H]2C)s1]

N-(4-fluoro-5-(((2S,4R)-2-methyl-4-((9-methyl-9H-purin-2-yl)oxy)pyrrolidin-1-yl)methyl)thiazol-2-yl)acetamide: The title compound was prepared in an analogous manner of that in scheme 2 from 2-chloro-9-methyl-9H-purine, tert-butyl (2S,4R)-4-hydroxy-2-methylpyrrolidine-1-carboxylate and N-(4-fluoro-5-formylthiazol-2-yl)acetamide. LCMS (ESI): [M+H]=406.0; ¹HNMR (500 MHz, CDCl₃) δ: 10.58 (s, 1H), 8.82 (s, 1H), 7.87 (s, 1H), 5.33-5.38 (m, 1H), 3.94 (d, J=14.5 Hz, 1H), 3.79 (s, 3H), 3.62 (d, J=14.5 Hz, 1H), 3.25 (d, J=11.0 Hz, 1H), 2.74-2.79 (m, 1H), 2.52-2.61 (m, 2H), 2.29 (s, 3H), 1.76-1.85 (m, 1H), 1.25 (d, J=5.5 Hz, 3H).

Example 114

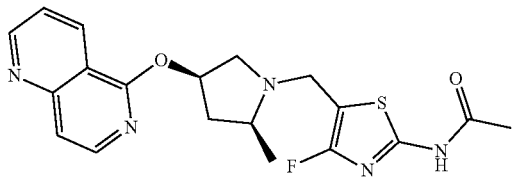 [SMILES: CC(=O)Nc1nc(F)c(CN2C[C@H](Oc3nccc4ncccc34)C[C@@H]2C)s1]

N-(5-(((2S,4R)-4-((1,6-naphthyridin-5-yl)oxy)-2-methylpyrrolidin-1-yl)methyl)-4-fluorothiazol-2-yl)acetamide: The title compound was prepared in an analogous manner of that in scheme 2 from 5-chloro-1,6-naphthyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=402.0; ¹HNMR (500 MHz, CDCl₃) δ: 10.58 (brs, 1H), 9.00 (dd, J=4.0, 1.5 Hz 1H), 8.60 (dd, J=8.0, 1.0 Hz, 1H), 8.15 (d, J=6.0 Hz, 1H), 7.43-7.47 (m, 2H), 5.52-5.56 (m, 1H), 3.97-4.00 (m, 1H), 3.61-3.64 (m, 1H), 3.29-3.31 (m, 1H), 2.76-2.79 (m, 1H), 2.57-2.66 (m, 2H), 2.29 (s, 3H), 1.79-1.83 (m, 1H), 1.28 (d, J=6.0 Hz, 3H).

Example 115

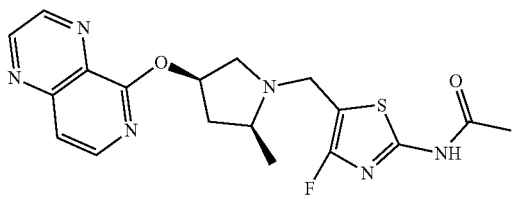 [SMILES: CC(=O)Nc1nc(F)c(CN2C[C@H](Oc3nccc4nccnc34)C[C@@H]2C)s1]

N-(4-fluoro-5-(((2S,4R)-2-methyl-4-(pyrido[3,4-b]pyrazin-5-yloxy)pyrrolidin-1-yl)methyl)thiazol-2-yl)acetamide: The title compound was prepared in an analogous manner of that in scheme 2 from 5-chloropyrido[3,4-b]pyrazine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=403.0; ¹HNMR (400 MHz, MeOH-d₄) δ: 9.03 (d, J=2.0 Hz, 1H), 8.90 (d, J=2.0 Hz, 1H), 8.27 (d, J=5.6 Hz, 1H), 7.48 (d, J=6.0 Hz, 1H), 5.55-5.60 (m, 1H), 3.96-4.00 (m, 1H), 3.56-3.61 (m, 1H), 3.32-3.35 (m, 1H), 2.80-2.85 (m, 1H), 2.61-2.72 (m, 2H), 2.16 (s, 3H), 1.88-1.92 (m, 1H), 1.29 (d, J=5.6 Hz, 3H).

Example 116

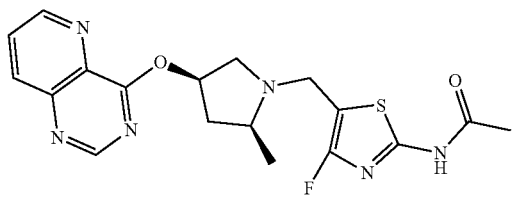 [SMILES: CC(=O)Nc1nc(F)c(CN2C[C@H](Oc3ncnc4cccnc34)C[C@@H]2C)s1]

N-(4-fluoro-5-(((2S,4R)-2-methyl-4-(pyrido[3,2-d]pyrimidin-4-yloxy)pyrrolidin-1-yl)methyl)thiazol-2-yl)acetamide: The title compound was prepared in an analogous manner of that in scheme 2 from 4-chloropyrido[3,2-d]pyrimidine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=403.0; ¹HNMR (500 MHz, MeOH-d₄) δ: 8.80-8.95 (m, 1H), 8.80 (s, 1H), 8.31-8.33 (m, 1H), 7.93-7.95 (m, 1H), 5.65-5.69 (m, 1H), 3.97-4.00 (m, 1H), 3.57-3.60 (m, 1H), 3.35-3.39 (m, 1H), 2.63-2.85 (m, 3H), 2.16 (s, 3H), 1.94-1.96 (m, 1H), 1.29 (d, J=6.0 Hz, 3H).

Example 117

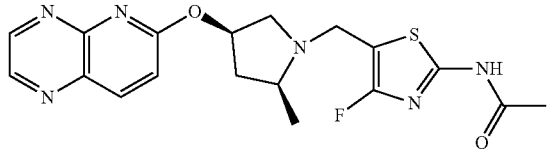 [SMILES: CC(=O)Nc1nc(F)c(CN2C[C@H](Oc3ccc4nccnc4n3)C[C@@H]2C)s1]

N-(4-fluoro-5-(((2S,4R)-2-methyl-4-(pyrido[2,3-b]pyrazin-6-yloxy)pyrrolidin-1-yl)methyl)thiazol-2-yl)acetamide: The title compound was prepared in an analogous manner of that in scheme 2 from 6-chloropyrido[2,3-b]pyrazine, tert-butyl (2S,4R)-4-hydroxy-2-methylpyrrolidine-1-carboxylate and N-(4-fluoro-5-formylthiazol-2-yl)acetamide. LCMS (ESI): [M+H]=403.0; ¹HNMR (500 MHz, MeOH-d₄) δ: 8.91 (d, J=2.0 Hz, 1H), 8.84 (d, J=2.0 Hz, 1H), 8.36 (d, J=9.0 Hz, 1H), 7.37 (d, J=9.0 Hz, 1H), 5.64-5.67 (m, 1H), 4.02-4.05 (m, 1H), 3.62-3.65 (m, 1H), 3.29-3.31 (m, 1H), 2.76-2.85 (m, 2H), 2.65-2.67 (m, 1H), 2.20 (s, 3H), 1.75-1.79 (m, 1H), 1.31 (d, J=6.5 Hz, 3H).

Intermediate 28

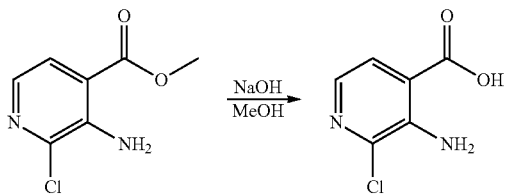

3-amino-2-chloroisonicotinic acid: NaOH (1 M, 14.5 mL) was added to a solution of methyl 3-amino-2-chloroisonicotinate (900 mg, 4.82 mmol) in MeOH (10 mL) and the mixture stirred at 20° C. for 1 h. MeOH was removed by evaporation in vacuo and the remaining aqueous solution acidified to pH 5.5 by addition of 1 M HCl (aq.). The mixture was filtered and the title compound collected as a white solid (767 mg, 92%). ¹HNMR (500 MHz, DMSO-d₆) δ: 7.62 (d, J=5.0 Hz, 1H), 7.59 (d, J=5.5 Hz, 1H), 7.42 (br s, 2H).

Intermediate 29

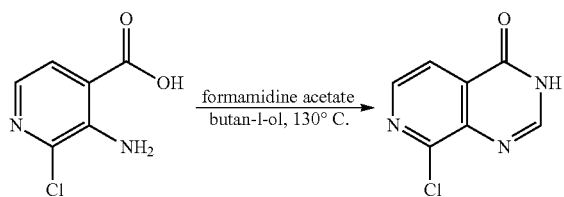

8-chloropyrido[3,4-d]pyrimidin-4(3H)-one: Formamidine acetate (1.75 g, 16.80 mmol) was added to a suspension of 3-amino-2-chloroisonicotinic acid (580 mg, 3.36 mmol) in butan-1-ol (20 mL) and the mixture was stirred at 130° C. for 16 h. The reaction mixture was cooled down and the precipitate was collected by filtration to give the title compound as an off-white solid (520 mg, 85%). $^1$HNMR (400 MHz, DMSO-$d_6$) δ: 12.80 (br s, 1H), 8.42 (d, J=5.2 Hz, 1H), 8.32 (s, 1H), 7.97 (d, J=5.2, Hz, 1H).

Intermediate 30

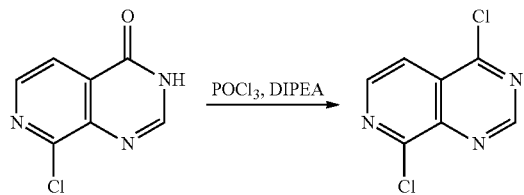

4,8-dichloropyrido[3,4-d]pyrimidine: DIPEA (426.5 mg, 3.3 mmol) was added dropwise to a mixture of 8-chloropyrido[3,4-d]pyrimidin-4(3H)-one (400 mg, 2.20 mmol) in POCl$_3$ (13.20 g, 86.1 mmol) at 0° C. and the mixture was stirred at 110° C. for 2 h. The solvent was removed and water (15 mL) was added slowly and adjusted to pH 8 with sat. aq. NaHCO$_3$ and the mixture extracted with EtOAc (2×30 mL). The combined organics were washed with brine (30 mL), dried (Na$_2$SO$_4$) and evaporated to dryness in vacuo. The residue was purified by silica gel column (petroleum ether/EtOAc; 3:1 to 0:1) to give the title compound as a white solid (50 mg, 11%). $^1$HNMR (500 MHz, DMSO-$d_6$) δ: 9.38 (br s, 1H), 8.70 (d, J=5.5 Hz, 1H), 8.17 (d, J=6.0 Hz, 1H).

Intermediate 31

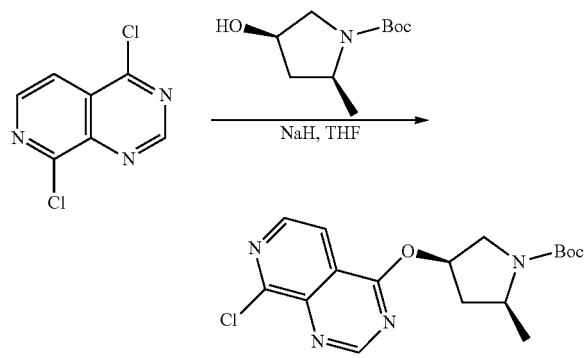

tert-butyl (2S,4R)-4-((8-chloropyrido[3,4-d]pyrimidin-4-yl)oxy)-2-methylpyrrolidine-1-carboxylate: Sodium hydride (31.2 mg, 0.780 mmol, 60% purity) was added to a solution of tert-butyl (2S,4R)-4-hydroxy-2-methylpyrrolidine-1-carboxylate (117.7 mg, 0.585 mmol) in THF (8 mL) at 0° C. and stirred for 20 min. To this was added dropwise a solution of 4,8-dichloropyrido[3,4-d]pyrimidine (130 mg, 0.650 mmol) in THF (1 mL) and the mixture stirred at 20° C. for 3 h. The reaction mixture was slowly poured into cold sat. aq. NH$_4$Cl (20 mL) and extracted with EtOAc (2×20 mL). The combined organics were washed with brine (20 mL), dried (Na$_2$SO$_4$) and evaporated to dryness in vacuo. The residue was purified by silica gel column chromatography (petroleum ether/EtOAc; 3:1) to afford the title compound as a colourless gum (161 mg, 68%). $^1$HNMR (500 MHz, CDCl$_3$) δ: 9.00 (s, 1H), 8.49 (d, J=5.5 Hz, 1H), 7.87 (d, J=5.5 Hz, 1H), 5.85-5.87 (m, 1H), 4.09-4.19 (m, 1H), 3.70-3.76 (m, 2H), 2.50-2.53 (m, 1H), 2.04-2.09 (m, 1H), 1.48 (s, 9H), 1.26 (d, J=7.0 Hz, 3H).

Intermediate 32

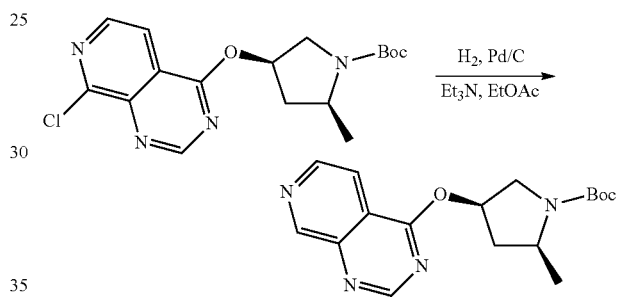

tert-butyl (2S,4R)-2-methyl-4-(pyrido[3,4-d]pyrimidin-4-yloxy)pyrrolidine-1-carboxylate: To a solution of tert-butyl (2S,4R)-4-((8-chloropyrido[3,4-d]pyrimidin-4-yl)oxy)-2-methylpyrrolidine-1-carboxylate (100 mg, 0.274 mmol) in EtOAc (10 mL) were added Pd/C (40 mg, 0.0376 mmol, 10% purity) and Et$_3$N (83.2 mg, 0.822 mmol). The mixture was stirred at 20° C. for 30 min under H$_2$ (15 psi). The reaction mixture was filtered, and the filtrate evaporated to dryness in vacuo. The residue was purified by prep-TLC (petroleum ether/EtOAc; 1:1) to afford the title compound as a colourless gum (75 mg, 83%). $^1$HNMR (500 MHz, CDCl$_3$) δ: 9.42 (s, 1H), 8.91 (s, 1H), 8.75 (d, J=5.5 Hz, 1H), 7.90 (d, J=5.5 Hz, 1H), 5.85-5.86 (m, 1H), 4.08-4.20 (m, 1H), 3.70-3.88 (m, 2H), 2.50-2.53 (m, 1H), 2.04-2.05 (m, 1H), 1.48 (s, 9H), 1.26 (d, J=6.0 Hz, 3H).

Example 118

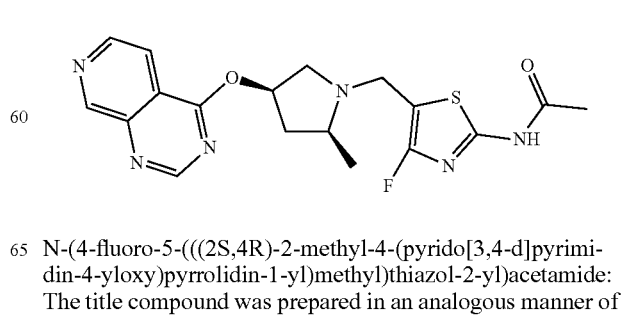

N-(4-fluoro-5-(((2S,4R)-2-methyl-4-(pyrido[3,4-d]pyrimidin-4-yloxy)pyrrolidin-1-yl)methyl)thiazol-2-yl)acetamide: The title compound was prepared in an analogous manner of that in scheme 2 from tert-butyl (2S,4R)-2-methyl-4-(pyrido[3,4-d]pyrimidin-4-yloxy)pyrrolidine-1-carboxylate and N-(4-fluoro-5-formylthiazol-2-yl)acetamide. LCMS (ESI): [M+H]=403.0; ¹HNMR (400 MHz, MeOH-d₄) δ: 9.30 (s, 1H), 8.92 (s, 1H), 8.74 (d, J=5.6 Hz, 1H), 8.12 (d, J=5.6 Hz, 1H), 5.82-5.83 (m, 1H), 4.28-4.29 (m, 1H), 3.96-3.97 (m, 1H), 3.63-3.64 (m, 1H), 3.14-3.32 (m, 2H), 2.88-2.90 (m, 1H), 2.20 (s, 3H), 1.95-2.01 (m, 1H), 1.44 (d, J=5.6 Hz, 3H).

Example 119

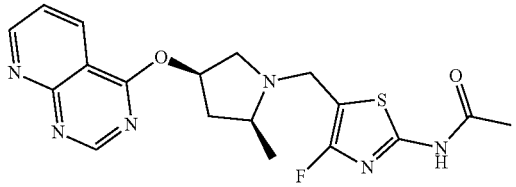 [SMILES: CC(=O)Nc1nc(F)c(CN2C[C@H](Oc3ncnc4ncccc34)C[C@@H]2C)s1]

N-(4-fluoro-5-(((2S,4R)-2-methyl-4-(pyrido[2,3-d]pyrimidin-4-yloxy)pyrrolidin-1-yl)methyl)thiazol-2-yl)acetamide: The title compound was prepared in an analogous manner of that in scheme 2 from 4-chloropyrido[2,3-d]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=403.0; ¹HNMR (400 MHz, MeOH-d₄) δ: 9.13 (dd, J=4.4, 2.0 Hz, 1H), 8.91 (d, J=5.2 Hz, 1H), 8.74 (dd, J=8.4, 2.0 Hz, 1H), 7.72 (dd, J=8.0, 4.4 Hz, 1H), 5.68-5.72 (m, 1H), 4.04-4.08 (m, 1H), 3.65-3.69 (m, 1H), 3.38-3.39 (m, 1H), 2.72-2.85 (m, 3H), 2.18 (s, 3H), 1.80-1.86 (m, 1H), 1.31 (d, J=5.6 Hz, 3H).

Example 120

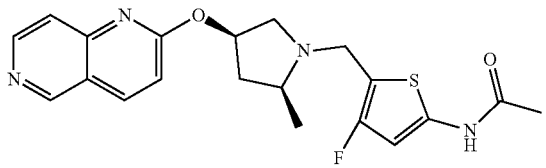 [SMILES: CC(=O)Nc1cc(F)c(CN2C[C@H](Oc3ccc4cnccc4n3)C[C@@H]2C)s1]

N-(5-(((2S,4R)-4-((1,6-naphthyridin-2-yl)oxy)-2-methylpyrrolidin-1-yl)methyl)-4-fluorothiazol-2-yl)acetamide: The title compound was prepared in an analogous manner of that in scheme 2 from 2-chloro-1,6-naphthyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=402.0; ¹HNMR (400 MHz, MeOH-d₄) δ: 9.07 (s, 1H), 8.54 (d, J=6.0 Hz, 1H), 8.30 (d, J=9.6 Hz, 1H), 7.70 (d, J=6.0 Hz, 1H), 7.09 (d, J=8.8 Hz, 1H), 5.58-5.60 (m, 1H), 3.97-4.02 (m, 1H), 3.59-3.62 (m, 1H), 3.22-3.25 (m, 1H), 2.66-2.81 (m, 3H), 2.17 (s, 3H), 1.71-1.74 (m, 1H), 1.27 (d, J=6.0 Hz, 3H).

Intermediate 33

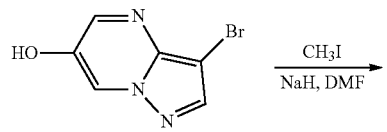

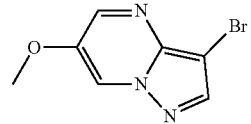

3-bromo-6-methoxypyrazolo[1,5-a]pyrimidine: NaH (67.2 mg, 1.68 mmol, 60% purity) was added to a mixture of 3-bromopyrazolo[1,5-a]pyrimidin-6-ol (300 mg, 1.40 mmol) in DMF (5 mL) at 0° C. followed, after 10 mins, by CH₃I (239 mg, 1.68 mmol) and the mixture was stirred at 20° C. for 2 hours. The mixture was quenched with sat. aq. NH₄Cl (1 mL) and the mixture evaporated to dryness in vacuo. The residue was purified by silica gel chromatography (petroleum ether/EtOAc; 3:1) to give the title compound as a pale yellow solid (301 mg, 94%). ¹HNMR (500 MHz, MeOH-d₄) δ: 8.94 (d, J=2.5 Hz, 1H), 8.54 (d, J=3.0 Hz, 1H), 8.23 (s, 1H), 3.88 (s, 3H).

Example 121

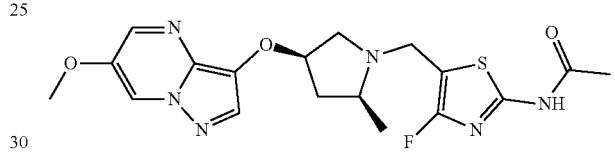

N-(4-fluoro-5-(((2S,4R)-4-((6-methoxypyrazolo[1,5-a]pyrimidin-3-yl)oxy)-2-methylpyrrolidin-1-yl)methyl)thiazol-2-yl)acetamide: The title compound was prepared in an analogous manner of that in scheme 2 from 3-bromo-6-methoxypyrazolo[1,5-a]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=421.1; ¹HNMR (500 MHz, CDCl₃) δ: 9.89 (s, 1H), 8.18 (d, J=2.5 Hz, 1H), 8.04 (d, J=2.0 Hz, 1H), 7.69 (s, 1H), 4.95-4.97 (m, 1H), 3.96 (d, J=15.0 Hz, 1H), 3.84 (s, 3H), 3.63 (d, J=14.5 Hz, 1H), 3.30 (d, J=10.5 Hz, 1H), 2.52-2.56 (m, 2H), 2.46-2.49 (m, 1H), 2.45 (s, 3H), 1.81-1.85 (m, 1H), 1.26 (d, J=6.0 Hz, 3H).

Example 122

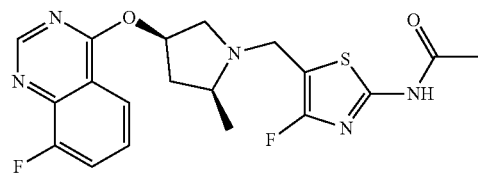 [SMILES: CC(=O)Nc1nc(F)c(CN2C[C@H](Oc3ncnc4c(F)cccc34)C[C@@H]2C)s1]

N-(4-fluoro-5-(((2S,4R)-4-((8-fluoroquinazolin-4-yl)oxy)-2-methylpyrrolidin-1-yl)methyl)thiazol-2-yl)acetamide:
The title compound was prepared in an analogous manner of that in scheme 2 from 4-chloro-8-fluoroquinazoline, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=420.0; ¹HNMR (400 MHz, MeOH-d₄) δ: 8.75 (s, 1H), 8.07-8.09 (m, 1H), 7.63-7.68 (m, 2H), 5.66-5.70 (m, 1H), 4.00 (d, J=14.4 Hz, 1H), 3.61 (d, J=14.8 Hz, 1H), 3.33-3.38 (m, 1H), 2.66-2.83 (m, 3H), 2.18 (s, 3H), 1.75-1.79 (m, 1H), 1.29 (d, J=6.0 Hz, 3H).

Example 123

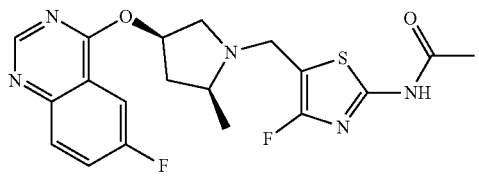 [SMILES: CC(=O)Nc1nc(F)c(CN2C[C@H](Oc3ncnc4ccc(F)cc34)C[C@@H]2C)s1]

N-(4-fluoro-5-(((2S,4R)-4-((6-fluoroquinazolin-4-yl)oxy)-2-methylpyrrolidin-1-yl)methyl)thiazol-2-yl)acetamide: The title compound was prepared in an analogous manner of that in scheme 2 from 4-chloro-6-fluoroquinazoline, tert-butyl (2S,4R)-4-hydroxy-2-methylpyrrolidine-1-carboxylate and N-(4-fluoro-5-formylthiazol-2-yl)acetamide. LCMS (ESI): [M+H]=419.9; $^1$HNMR (500 MHz, MeOH-$d_4$) δ: 8.70 (s, 1H), 7.89-7.95 (m, 2H), 7.74-7.76 (m, 1H), 5.65-5.67 (m, 1H), 4.03-4.07 (m, 1H), 3.67-3.70 (m, 1H), 3.33-3.35 (m, 1H), 2.71-2.87 (m, 3H), 2.17 (s, 3H), 1.79-1.83 (m, 1H), 1.31 (d, J=5.5 Hz, 3H).

Example 124

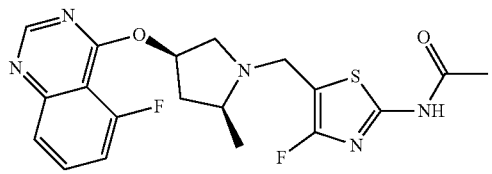 [SMILES: CC(=O)Nc1nc(F)c(CN2C[C@H](Oc3ncnc4cccc(F)c34)C[C@@H]2C)s1]

N-(4-fluoro-5-(((2S,4R)-4-((5-fluoroquinazolin-4-yl)oxy)-2-methylpyrrolidin-1-yl)methyl)thiazol-2-yl)acetamide: The title compound was prepared in an analogous manner of that in scheme 2 from 4-chloro-5-fluoroquinazoline, tert-butyl (2S,4R)-4-hydroxy-2-methylpyrrolidine-1-carboxylate and N-(4-fluoro-5-formylthiazol-2-yl)acetamide. LCMS (ESI): [M+H]=420.0; $^1$HNMR (400 MHz, MeOH-$d_4$) δ: 8.68 (s, 1H), 7.83-7.87 (m, 1H), 7.66-7.68 (m, 1H), 7.29-7.34 (m, 1H), 5.58-5.61 (m, 1H), 3.94-3.97 (m, 1H), 3.59-3.62 (m, 1H), 3.26-3.27 (m, 1H), 2.81-2.85 (m, 1H), 2.63-2.69 (m, 2H), 2.15 (s, 3H), 1.80-1.84 (m, 1H), 1.26 (d, J=5.6 Hz, 3H).

Intermediate 34

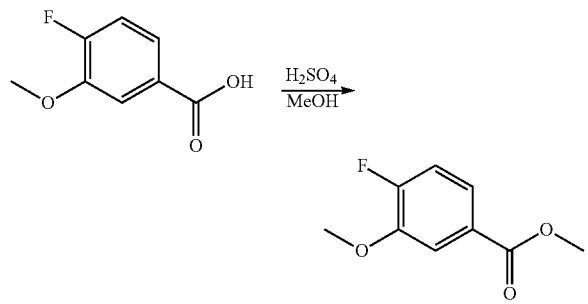

methyl 4-fluoro-3-methoxybenzoate: Sulfuric acid (2 mL) was added to a mixture of 4-fluoro-3-methoxybenzoic acid (2 g, 12.04 mmol) in MeOH (20 mL) at 0° C. and then the mixture was stirred at 70° C. for 10 hours. The mixture was evaporated to dryness and the residue dissolved in water (15 mL) and extracted with EtOAc (3×15 mL). The combined organics were dried (Na$_2$SO$_4$) and evaporated to dryness to afford the title compound as a yellow solid (2.10 g, 97%). $^1$HNMR (400 MHz, CDCl$_3$) δ: 7.61-7.66 (m, 2H), 7.08-7.13 (m, 1H), 3.93 (s, 3H), 3.91 (s, 3H).

Intermediate 35

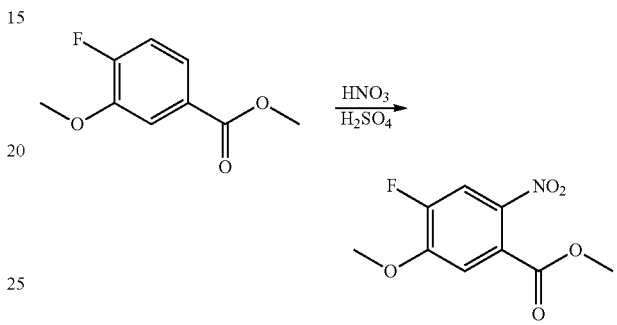

methyl 4-fluoro-5-methoxy-2-nitrobenzoate: Nitric acid (1.38 g, 21.89 mmol) was added dropwise to a mixture of methyl 4-fluoro-3-methoxybenzoate (2.10 g, 11.40 mmol) in sulfuric acid (10 mL) at 0° C. and the mixture stirred at 25° C. for 1 hour. The mixture was poured into water (30 mL) and extracted with DCM (3×10 mL). The combined organics were dried (Na$_2$SO$_4$) and evaporated to dryness in vacuo. The residue was purified by silica gel column chromatography (petroleum ether/EtOAc; 10:1) to give the title compound as a yellow solid (800 mg). $^1$HNMR (500 MHz, CDCl$_3$) δ: 7.79 (d, J=10.0 Hz, 1H), 7.17 (d, J=8.0 Hz, 1H), 4.01 (s, 3H), 3.93 (s, 3H).

Intermediate 36

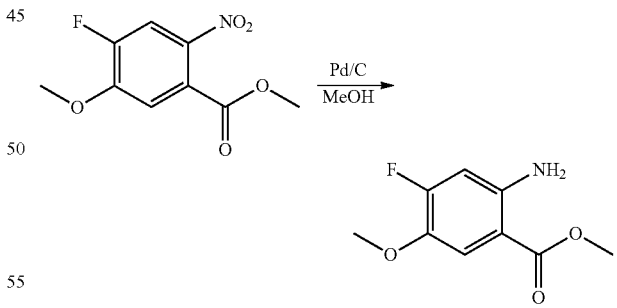

methyl 2-amino-4-fluoro-5-methoxybenzoate: methyl 4-fluoro-5-methoxy-2-nitrobenzoate (800 mg, 3.49 mmol) and Pd/C (111.5 mg, 10% purity) in MeOH (10 mL) was stirred at 25° C. under H$_2$ (15 psi) for 2 hours. The reaction mixture was filtered, and the filtrate evaporated to dryness in vacuo. The residue was purified by prep-TLC (petroleum ether/EtOAc; 5:1) to afford the title compound as a yellow solid (392 mg, 56%). $^1$HNMR (500 MHz, CDCl$_3$) δ: 7.44 (d, J=9.5 Hz, 1H), 6.42 (d, J=12.5 Hz, 1H), 3.87 (s, 3H), 3.83 (s, 3H).

Intermediate 37

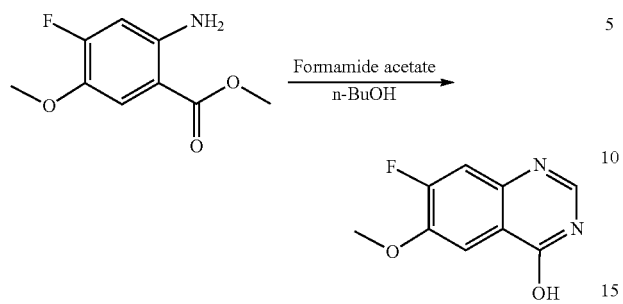

7-fluoro-6-methoxyquinazolin-4-ol: A mixture of methyl 2-amino-4-fluoro-5-methoxybenzoate (392 mg, 1.97 mmol) and formamidine acetate (205.1 mg, 1.97 mmol) in n-butanol (5 mL) was stirred at 110° C. for 2 hours. White solid was precipitated and TLC (Petroleum ether/EtOAc=5/1) showed the starting material was consumed completely. The mixture was cooled to 25° C. and the solid collected by filtration to afford the title compound as a white solid (320 mg, 83%). $^1$HNMR (500 MHz, DMSO-$d_6$) δ: 12.44 (br s, 1H), 8.04 (s, 1H), 7.66 (d, J=9.5 Hz, 1H), 7.52 (d, J=12.0 Hz, 1H), 3.96 (s, 3H).

Intermediate 38

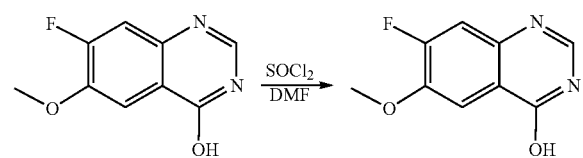

4-chloro-7-fluoro-6-methoxyquinazoline: To a mixture of 7-fluoro-6-methoxyquinazolin-4-ol (320 mg, 1.65 mmol) in SOCl$_2$ (5 mL) was added DMF (0.300 mL) and the mixture stirred at 80° C. for 6 hours. The mixture was evaporated to dryness in vacuo and the residue was washed with DCM (20 mL) and filtered. The filtrate was evaporated to dryness in vacuo to afford the title compound as a yellow solid (380 mg,) which was used directly without further purification.

Example 125

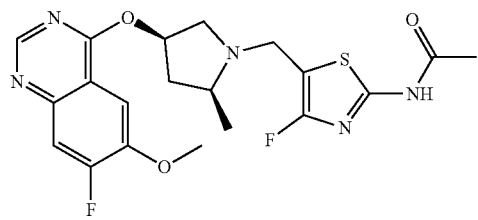 [SMILES: COc1cc2c(O[C@@H]3C[C@H](C)N(Cc4sc(NC(C)=O)nc4F)C3)ncnc2cc1F]

N-(4-fluoro-5-(((2S,4R)-4-((7-fluoro-6-methoxyquinazolin-4-yl)oxy)-2-methylpyrrolidin-1-yl)methyl)thiazol-2-yl)acetamide: The title compound was prepared in an analogous manner of that in scheme 2 from 4-chloro-7-fluoro-6-methoxyquinazoline, tert-butyl (2S,4R)-4-hydroxy-2-methylpyrrolidine-1-carboxylate and N-(4-fluoro-5-formylthiazol-2-yl)acetamide. LCMS (ESI): [M+H]=450.2; $^1$HNMR (500 MHz, CDCl$_3$) δ: 10.54 (br s, 1H), 8.65 (s, 1H), 7.55 (d, J=11.5 Hz, 1H), 7.52 (d, J=9.5 Hz, 1H), 5.57-5.62 (m, 1H), 4.05 (s, 3H), 3.99 (d, J=14.5 Hz, 1H), 3.62 (d, J=14.5 Hz, 1H), 3.30-3.33 (m, 1H), 2.75-2.79 (m, 1H), 2.62-2.67 (m, 2H), 2.28 (s, 3H), 1.82-1.84 (m, 1H), 1.29 (d, J=5.5 Hz, 3H).

Example 126

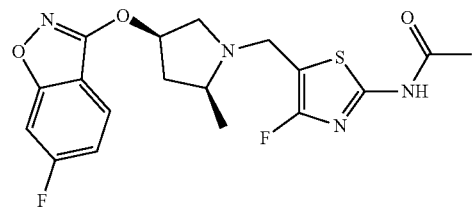 [SMILES: CC(=O)Nc1nc(F)c(CN2C[C@H](Oc3noc4cc(F)ccc34)C[C@@H]2C)s1]

N-(4-fluoro-5-(((2S,4R)-4-((6-fluorobenzo[d]isoxazol-3-yl)oxy)-2-methylpyrrolidin-1-yl)methyl)thiazol-2-yl)acetamide: The title compound was prepared in an analogous manner of that in scheme 2 from 3-chloro-6-fluorobenzo[d]isoxazole, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=409.0; $^1$HNMR (500 MHz, MeOH-$d_4$) δ: 7.70 (dd, J=9.0, 5.5 Hz, 1H), 7.27 (dd, J=9.0, 2.5 Hz, 1H), 7.11-7.14 (m, 1H), 5.18-5.22 (m, 1H), 4.00 (d, J=15.0 Hz, 1H), 3.58 (d, J=15.0 Hz, 1H), 3.31-3.34 (m, 1H), 2.58-2.72 (m, 3H), 2.18 (s, 3H), 1.75-1.79 (m, 1H), 1.27 (d, J=6.0 Hz, 3H).

Example 127

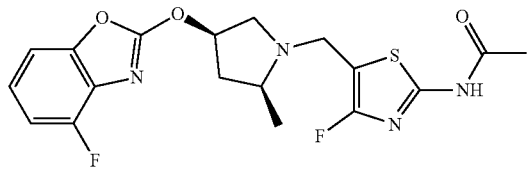 [SMILES: CC(=O)Nc1nc(F)c(CN2C[C@H](Oc3nc4c(F)cccc4o3)C[C@@H]2C)s1]

N-(4-fluoro-5-(((2S,4R)-4-((4-fluorobenzo[d]oxazol-2-yl)oxy)-2-methylpyrrolidin-1-yl)methyl)thiazol-2-yl)acetamide: The title compound was prepared in an analogous manner of that in scheme 2 from 2-chloro-4-fluorobenzo[d]oxazole, tert-butyl (2S,4R)-4-hydroxy-2-methylpyrrolidine-1-carboxylate and N-(4-fluoro-5-formylthiazol-2-yl)acetamide. LCMS (ESI): [M+H]=409.0; $^1$HNMR (500 MHz, CDCl$_3$) δ: 10.77 (s, 1H), 7.11-7.16 (m, 2H), 6.97-7.10 (m, 1H), 5.40-5.44 (m, 1H), 3.97 (d, J=14.5 Hz, 1H), 3.63 (d, J=14.5 Hz, 1H), 3.33-3.36 (m, 1H), 2.56-2.72 (m, 3H), 2.30 (s, 3H), 1.80-1.82 (m, 1H), 1.27 (d, J=6.0 Hz, 3H).

Example 128

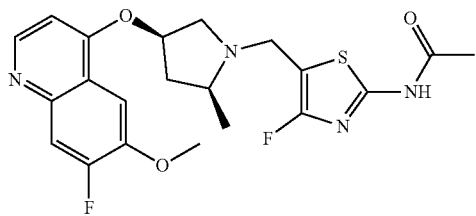 [SMILES: COc1cc2c(O[C@@H]3C[C@H](C)N(Cc4sc(NC(C)=O)nc4F)C3)ccnc2cc1F]

N-(4-fluoro-5-(((2S,4R)-4-((7-fluoro-6-methoxyquinolin-4-yl)oxy)-2-methylpyrrolidin-1-yl)methyl)thiazol-2-yl)acetamide: The title compound was prepared in an analogous manner of that in scheme 2 from 4-chloro-7-fluoro-6-methoxyquinoline, tert-butyl (2S,4R)-4-hydroxy-2-methylpyrrolidine-1-carboxylate and N-(4-fluoro-5-formylthiazol-2-yl)acetamide. LCMS (ESI): [M+H]=449.0; $^1$HNMR (400 MHz, CDCl$_3$) δ: 9.97 (br s, 1H), 8.57 (d, J=5.2 Hz, 1H), 7.65 (d, J=12.0 Hz, 1H), 7.55 (d, J=9.2 Hz, 1H), 6.53 (d, J=5.6 Hz, 1H), 4.88-4.90 (m, 1H), 4.04 (s, 3H), 4.00 (d, J=14.8 Hz, 1H), 3.64 (d, J=14.4 Hz, 1H), 3.35 (d, J=10.8 Hz, 1H), 2.72-2.78 (m, 1H), 2.61-2.65 (m, 2H), 2.27 (s, 3H), 1.81-1.89 (m, 1H), 1.29 (d, J=5.6 Hz, 3H).

Example 129

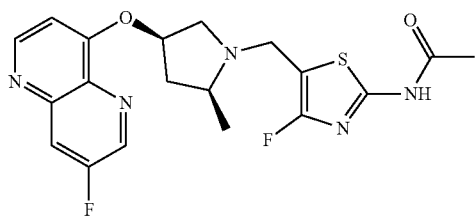 [SMILES: CC(=O)Nc1nc(F)c(CN2C[C@H](Oc3ccnc4cc(F)cnc34)C[C@@H]2C)s1]

N-(4-fluoro-5-(((2S,4R)-4-((7-fluoro-1,5-naphthyridin-4-yl)oxy)-2-methylpyrrolidin-1-yl)methyl)thiazol-2-yl)acetamide: The title compound was prepared in an analogous manner of that in scheme 2 from 8-chloro-3-fluoro-1,5-naphthyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=420.2; $^1$HNMR (400 MHz, CDCl$_3$) δ: 10.73 (s, 1H), 8.81 (d, J=2.8 Hz, 1H), 8.74 (d, J=5.2 Hz, 1H), 7.93 (dd, J=2.4, 8.8 Hz, 1H), 6.79 (d, J=5.2 Hz, 1H), 4.94-5.03 (m, 1H), 3.97 (d, J=14.8 Hz, 1H), 3.64 (d, J=14.8 Hz, 1H), 3.47 (d, J=11.2 Hz, 1H), 2.74-2.82 (m, 1H), 2.58-2.70 (m, 2H), 2.26 (s, 3H), 1.85-1.90 (m, 1H), 1.26 (d, J=5.6 Hz, 3H).

Example 130

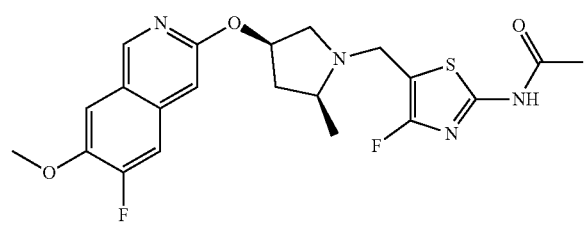 [SMILES: COc1cc2cnc(O[C@@H]3C[C@H](C)N(Cc4sc(NC(C)=O)nc4F)C3)cc2cc1F]

N-(4-fluoro-5-(((2S,4R)-4-((6-fluoro-7-methoxyisoquinolin-3-yl)oxy)-2-methylpyrrolidin-1-yl)methyl)thiazol-2-yl)acetamide: The title compound was prepared in an analogous manner of that in scheme 2 from 3-chloro-6-fluoro-7-methoxyisoquinoline, tert-butyl (2S,4R)-4-hydroxy-2-methylpyrrolidine-1-carboxylate and N-(4-fluoro-5-formylthiazol-2-yl)acetamide. LCMS (ESI): [M+H]=449.0; $^1$HNMR (400 MHz, MeOH-d$_4$) δ: 8.77 (s, 1H), 7.39-7.46 (m, 2H), 6.97 (s, 1H), 5.21-5.25 (m, 1H), 3.97 (s, 3H), 3.94-3.96 (m, 1H), 3.54-3.58 (m, 1H), 3.16-3.19 (m, 1H), 2.57-2.72 (m, 3H), 2.15 (s, 3H), 1.65-1.70 (m, 1H), 1.23 (d, J=6.0 Hz, 3H).

Example 131

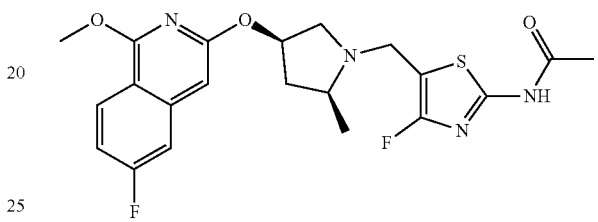

N-(4-fluoro-5-(((2S,4R)-4-((6-fluoro-1-methoxyisoquinolin-3-yl)oxy)-2-methylpyrrolidin-1-yl)methyl)thiazol-2-yl)acetamide: The title compound was prepared in an analogous manner of that in scheme 2 from 3-chloro-6-fluoro-1-methoxyisoquinoline, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=449.0; $^1$HNMR (400 MHz, MeOH-d$_4$) δ: 8.12 (dd, J=9.2, 5.6 Hz, 1H), 7.28 (dd, J=10.4, 2.4 Hz, 1H), 7.07 (dt, J=9.2, 2.4 Hz, 1H), 6.53 (s, 1H), 5.26-5.29 (m, 1H), 4.08 (s, 3H), 3.98 (d, J=14.8 Hz, 1H), 3.59 (d, J=14.4 Hz, 1H), 3.21-3.24 (m, 1H), 2.75-2.79 (m, 1H), 2.60-2.65 (m, 2H), 2.18 (s, 3H), 1.69-1.73 (m, 1H), 1.24 (d, J=6.4 Hz, 3H).

Example 132

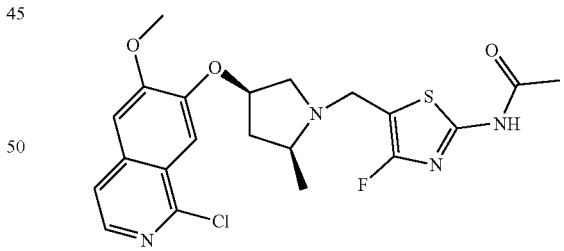

N-(5-(((2S,4R)-4-((1-chloro-6-methoxyisoquinolin-7-yl)oxy)-2-methylpyrrolidin-1-yl)methyl)-4-fluorothiazol-2-yl)acetamide: The title compound was prepared in an analogous manner of that in scheme 2 from 1,7-dichloro-6-methoxyisoquinoline, tert-butyl (2S,4R)-4-hydroxy-2-methylpyrrolidine-1-carboxylate and N-(4-fluoro-5-formylthiazol-2-yl)acetamide. LCMS (ESI): [M+H]=465.0; $^1$HNMR (400 MHz, MeOH-d$_4$) δ: 8.01 (d, J=5.6 Hz, 1H), 7.61 (d, J=5.6 Hz, 1H), 7.41 (s, 1H), 7.33 (s, 1H), 4.94-4.98 (m, 1H), 3.96-4.00 (m, 4H), 3.57-3.61 (m, 1H), 3.26-3.28 (m, 1H), 2.74-2.79 (m, 1H), 2.61-2.71 (m, 2H), 2.16 (s, 3H), 1.71-1.75 (m, 1H), 1.25 (d, J=6.0 Hz, 3H).

Example 133

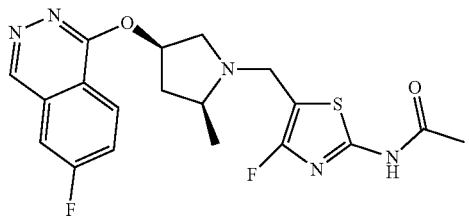 [SMILES: CC(=O)Nc1nc(F)c(CN2C[C@H](Oc3nncc4cc(F)ccc34)C[C@@H]2C)s1]

N-(4-fluoro-5-(((2S,4R)-4-((6-fluorophthalazin-1-yl)oxy)-2-methylpyrrolidin-1-yl)methyl)thiazol-2-yl)acetamide:
The title compound was prepared in an analogous manner of that in scheme 2 from 1-chloro-6-fluorophthalazine, tert-butyl (2S,4R)-4-hydroxy-2-methylpyrrolidine-1-carboxylate and N-(4-fluoro-5-formylthiazol-2-yl)acetamide. LCMS (ESI): [M+H]=420.0; $^1$HNMR (400 MHz, CDCl$_3$) δ: 10.64 (brs, 1H), 9.11 (s, 1H), 8.33 (dd, J=8.8, 5.2 Hz, 1H), 7.58-7.61 (m, 1H), 7.45-7.48 (m, 1H), 5.66-5.73 (m, 1H), 4.00 (d, J=14.8 Hz, 1H), 3.62 (d, J=14.4 Hz, 1H), 3.35-3.39 (m, 1H), 2.77-2.84 (m, 1H), 2.67-2.76 (m, 1H), 2.56-2.65 (m, 1H), 2.29 (s, 3H), 1.78-1.88 (m, 1H), 1.28 (d, J=6.0 Hz, 3H).

Intermediate 39 and 40

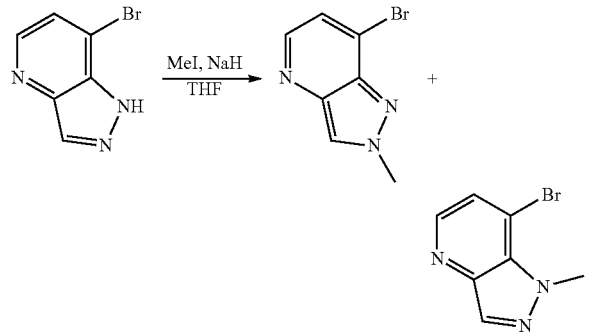

7-bromo-2-methyl-2H-pyrazolo[4,3-b]pyridine and 7-bromo-1-methyl-1H-pyrazolo[4,3-b]pyridine: A solution of 7-bromo-1H-pyrazolo[4,3-b]pyridine (1.0 g, 5.05 mmol) and NaH (303 mg, 7.58 mmol, 60% purity) in THF (15 mL) was stirred at 0° C. for 15 minutes. Iodomethane (788.5 mg, 5.56 mmol) was added and the reaction was stirred at room temperature for 1 hour. The reaction was quenched with water (10 mL), extracted with EtOAc (3×20 mL), dried (Na$_2$SO$_4$) and evaporated to dryness in vacuo. The was purified by column chromatography (petroleum ether/EtOAc; 3:1 to 1:2) to give 7-bromo-1-methyl-1H-pyrazolo[4,3-b]pyridine as a white solid (375 mg, 35%) and 7-bromo-2-methyl-2H-pyrazolo[4,3-b]pyridine as a yellow solid (351 mg, 33%). 7-bromo-1-methyl-1H-pyrazolo[4,3-b]pyridine: $^1$HNMR (500 MHz, MeOH-d$_4$) δ: 8.27 (d, 1H), 8.18 (s, 1H), 7.66 (d, 1H), 4.38 (s, 3H). 7-bromo-2-methyl-2H-pyrazolo[4,3-b]pyridine: $^1$HNMR (500 MHz, MeOH-d$_4$) δ: 8.85 (s, 1H), 8.59-8.61 (m, 1H), 7.98-7.99 (m, 1H), 4.40 (s, 3H).

Example 134

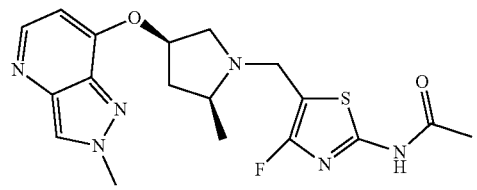 [SMILES: CC(=O)Nc1nc(F)c(CN2C[C@H](Oc3ccnc4cn(C)nc34)C[C@@H]2C)s1]

N-(4-fluoro-5-(((2S,4R)-2-methyl-4-((2-methyl-2H-pyrazolo[4,3-b]pyridin-7-yl)oxy)pyrrolidin-1-yl)methyl)thiazol-2-yl)acetamide: The title compound was prepared in an analogous manner of that in scheme 2 from 7-bromo-2-methyl-2H-pyrazolo[4,3-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.1; $^1$HNMR (400 MHz, MeOH-d$_4$) δ: 8.32 (s, 1H), 8.29 (d, J=5.2 Hz, 1H), 6.63 (d, J=5.2 Hz, 1H), 5.13-5.17 (m, 1H), 4.22 (s, 3H), 3.98 (d, J=14.4 Hz, 1H), 3.57 (d, J=14.4 Hz, 1H), 3.33-3.35 (m, 1H), 2.61-2.79 (m, 3H), 2.17 (s, 3H), 1.78-1.83 (m, 1H), 1.27 (d, J=6.0 Hz, 3H).

Example 135

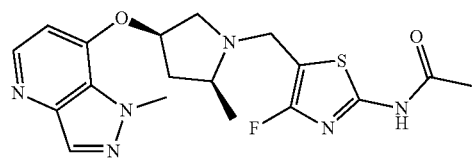 [SMILES: CC(=O)Nc1nc(F)c(CN2C[C@H](Oc3ccnc4cnn(C)c34)C[C@@H]2C)s1]

N-(4-fluoro-5-(((2S,4R)-2-methyl-4-((1-methyl-1H-pyrazolo[4,3-b]pyridin-7-yl)oxy)pyrrolidin-1-yl)methyl)thiazol-2-yl)acetamide: The title compound was prepared in an analogous manner of that in scheme 2 from 7-bromo-1-methyl-1H-pyrazolo[4,3-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.1; $^1$HNMR (500 MHz, CDCl$_3$) δ: 9.58 (br s, 1H), 8.33 (d, J=5.0 Hz, 1H), 8.10 (s, 1H), 6.45 (d, J=5.0 Hz, 1H), 4.88-4.92 (m, 1H), 4.32 (s, 3H), 3.97 (d, J=14.0 Hz, 1H), 3.60 (d, J=15.0 Hz, 1H), 3.33 (d, J=11.5 Hz, 1H), 2.61-2.73 (m, 3H), 2.28 (s, 3H), 1.79-1.81 (m, 1H), 1.27 (d, J=6.0 Hz, 3H).

Intermediate 41 and 42

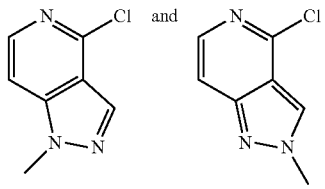

4-chloro-1-methyl-1H-pyrazolo[4,3-c]pyridine and 4-chloro-2-methyl-2H-pyrazolo[4,3-c]pyridine: The title compounds were prepared in an analogous manner to that described for Intermediates 39 and 40 from 4-chloro-2H- pyrazolo[4,3-c]pyridine and iodomethane. 4-chloro-1-methyl-1H-pyrazolo[4,3-c]pyridine, ¹HNMR (500 MHz, CDCl₃) δ: 8.19 (d, J=6.5 Hz, 1H), 8.13 (s, 1H), 7.24 (d, J=5.0 Hz, 1H), 4.10 (s, 3H). 4-chloro-2-methyl-2H-pyrazolo[4,3-c]pyridine, ¹HNMR (500 MHz, CDCl₃) δ: 8.11 (s, 1H), 8.04 (d, J=6.0 Hz, 1H), 7.45 (d, J=6.0 Hz, 1H), 4.27 (s, 3H).

Example 136

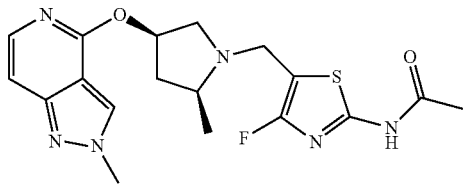 [SMILES: CC(=O)Nc1nc(F)c(CN2C[C@H](Oc3nccc4nn(C)cc34)C[C@@H]2C)s1]

N-(4-fluoro-5-(((2S,4R)-2-methyl-4-((2-methyl-2H-pyrazolo[4,3-c]pyridin-4-yl)oxy)pyrrolidin-1-yl)methyl)thiazol-2-yl)acetamide: The title compound was prepared in an analogous manner of that in scheme 2 from 4-chloro-2-methyl-2H-pyrazolo[4,3-c]pyridine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=405.0; ¹HNMR (400 MHz, MeOH-d₄) δ: 8.39 (s, 1H), 7.71 (d, J=6.4 Hz, 1H), 7.06 (d, J=6.4 Hz, 1H), 5.46-5.48 (m, 1H), 4.20 (s, 3H), 3.99-4.03 (m, 1H), 3.61-3.62 (m, 1H), 3.23-3.26 (m, 1H), 2.73-2.82 (m, 1H), 2.64-2.69 (m, 2H), 2.19 (s, 3H), 1.71-1.77 (m, 1H), 1.28 (d, J=6.0 Hz, 3H).

Example 137

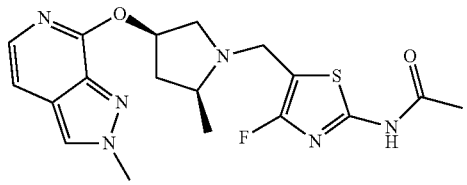 [SMILES: CC(=O)Nc1nc(F)c(CN2C[C@H](Oc3nccc4cn(C)nc34)C[C@@H]2C)s1]

N-(4-fluoro-5-(((2S,4R)-2-methyl-4-((2-methyl-2H-pyrazolo[3,4-c]pyridin-7-yl)oxy)pyrrolidin-1-yl)methyl)thiazol-2-yl)acetamide: The title compound was prepared in an analogous manner of that in scheme 2 from 7-chloro-2-methyl-2H-pyrazolo[3,4-c]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.0; ¹HNMR (500 MHz, MeOH-d₄) δ: 8.18 (s, 1H), 7.55 (d, J=6.0 Hz, 1H), 7.14 (d, J=6.0 Hz, 1H), 5.53-5.55 (m, 1H), 4.23 (s, 3H), 4.03-4.06 (m, 1H), 3.64-3.66 (m, 1H), 3.35-3.38 (m, 1H), 2.86-2.87 (m, 1H), 2.68-2.74 (m, 2H), 2.19 (s, 3H), 1.84-1.90 (m, 1H), 1.31 (d, J=6.0 Hz, 3H).

Example 138

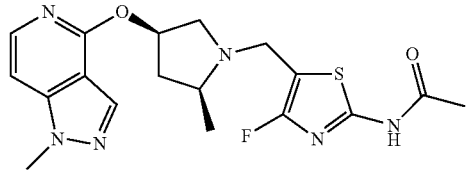 [SMILES: CC(=O)Nc1nc(F)c(CN2C[C@H](Oc3nccc4c3cnn4C)C[C@@H]2C)s1]

N-(4-fluoro-5-(((2S,4R)-2-methyl-4-((1-methyl-1H-pyrazolo[4,3-c]pyridin-4-yl)oxy)pyrrolidin-1-yl)methyl)thiazol-2-yl)acetamide: The title compound was prepared in an analogous manner of that in scheme 2 from 4-chloro-1-methyl-1H-pyrazolo[4,3-c]pyridine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=405.0; ¹HNMR (400 MHz, MeOH-d₄) δ: 8.08 (s, 1H), 7.86 (d, J=6.0 Hz, 1H), 7.10 (d, J=6.4 Hz, 1H), 5.48-5.51 (m, 1H), 4.02 (s, 3H), 3.98-4.01 (m, 1H), 3.59-3.63 (m, 1H), 3.23-3.36 (m, 1H), 2.61-2.80 (m, 3H), 2.17 (s, 3H), 1.73-1.77 (m, 1H), 1.28 (d, J=6.4 Hz, 3H).

Intermediate 43 and 44

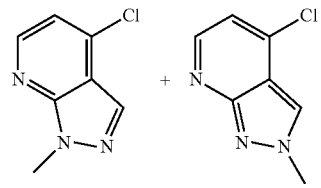

4-chloro-1-methyl-1H-pyrazolo[3,4-b]pyridine and 4-chloro-2-methyl-2H-pyrazolo[3,4-b]pyridine: The title compounds were prepared in an analogous manner to that described for Intermediates 41 and 42 from 4-chloro-1H-pyrazolo[3,4-b]pyridine and iodomethane. 4-chloro-1-methyl-1H-pyrazolo[3,4-b]pyridine, ¹HNMR (500 MHz, CDCl₃) δ: 8.42 (d, J=4.5 Hz, 1H), 8.08 (s, 1H), 7.13 (d, J=5.0 Hz, 1H), 4.16 (s, 3H). 4-chloro-2-methyl-2H-pyrazolo[3,4-b]pyridine, ¹HNMR (500 MHz, CDCl₃) δ: 8.64 (d, J=5.0 Hz, 1H), 8.14 (s, 1H), 7.20 (d, J=5.0 Hz, 1H), 4.31 (s, 3H).

Example 139

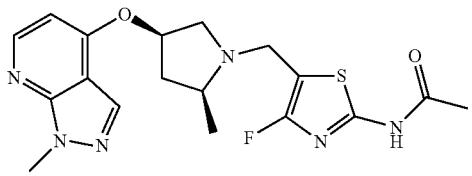 [SMILES: CC(=O)Nc1nc(F)c(CN2C[C@H](Oc3ccnc4c3cnn4C)C[C@@H]2C)s1]

N-(4-fluoro-5-(((2S,4R)-2-methyl-4-((1-methyl-1H-pyrazolo[3,4-b]pyridin-4-yl)oxy)pyrrolidin-1-yl)methyl)thiazol-2-yl)acetamide: The title compound was prepared in an analogous manner of that in scheme 2 from 4-chloro-1-methyl-1H-pyrazolo[3,4-b]pyridine, tert-butyl (2S,4R)-4-hydroxy-2-methylpyrrolidine-1-carboxylate and N-(4- fluoro-5-formylthiazol-2-yl)acetamide. LCMS (ESI): [M+H]=405.1; ¹HNMR (500 MHz, CDCl₃) δ: 9.85 (s, 1H), 8.34 (d, J=5.5 Hz, 1H), 8.04 (s, 1H), 6.32 (d, J=5.5 Hz, 1H), 4.89-4.95 (m, 1H), 4.10 (s, 3H), 3.99 (d, J=15.0 Hz, 1H), 3.67 (d, J=15.0 Hz, 1H), 3.29-3.31 (m, 1H), 2.72-2.77 (m, 1H), 2.56-2.63 (m, 2H), 2.28 (s, 3H), 1.78-1.86 (m, 1H), 1.27 (d, J=5.5 Hz, 3H).

Example 140

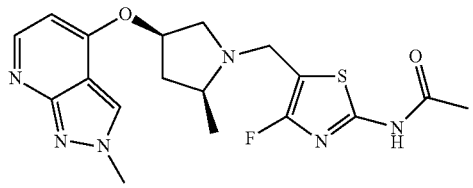 [SMILES: CC(=O)Nc1nc(F)c(CN2C[C@H](Oc3ccnc4nn(C)cc34)C[C@@H]2C)s1]

N-(4-fluoro-5-(((2S,4R)-2-methyl-4-((2-methyl-2H-pyrazolo[3,4-b]pyridin-4-yl)oxy)pyrrolidin-1-yl)methyl)thiazol-2-yl)acetamide: The title compound was prepared in an analogous manner of that in scheme 2 from 4-chloro-2-methyl-2H-pyrazolo[3,4-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.0; ¹HNMR (500 MHz, MeOH-d₄) δ: 8.41 (d, J=5.0 Hz, 1H), 8.34 (s, 1H), 6.48 (d, J=5.0 Hz, 1H), 5.04-5.10 (m, 1H), 4.22 (s, 3H), 4.03 (d, J=14.5 Hz, 1H), 3.62 (d, J=14.5 Hz, 1H), 3.29-3.34 (m, 1H), 2.62-2.80 (m, 3H), 2.20 (s, 3H), 1.70-1.77 (m, 1H), 1.29 (d, J=6.0 Hz, 3H).

Example 141

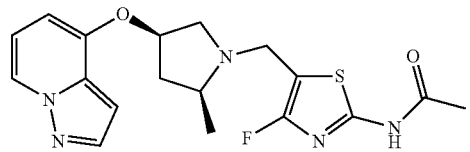 [SMILES: CC(=O)Nc1nc(F)c(CN2C[C@H](Oc3cccn4nccc34)C[C@@H]2C)s1]

N-(4-fluoro-5-(((2S,4R)-2-methyl-4-(pyrazolo[1,5-a]pyridin-4-yloxy)pyrrolidin-1-yl)methyl)thiazol-2-yl)acetamide: The title compound was prepared in an analogous manner of that in scheme 2 from 4-bromopyrazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=389.9; ¹HNMR (500 MHz, CDCl₃) δ: 10.29 (br s, 1H), 8.11 (d, J=7.0 Hz, 1H), 7.85 (d, J=2.0 Hz, 1H), 6.66 (d, J=2.0 Hz, 1H), 6.60 (t, J=7.0 Hz, 1H), 6.18 (d, J=7.5 Hz, 1H), 4.77-4.80 (m, 1H), 3.98 (d, J=14.5 Hz, 1H), 3.66 (d, J=14.5 Hz, 1H), 3.27-3.30 (m, 1H), 2.70-2.74 (m, 1H), 2.51-2.62 (m, 2H), 2.29 (s, 3H), 1.78-1.83 (m, 1H), 1.27 (d, J=5.5 Hz, 3H).

Intermediate 45

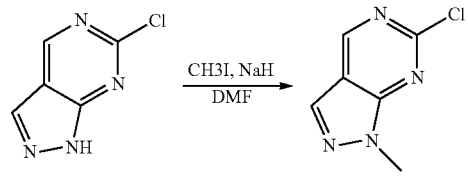

6-chloro-1-methyl-1H-pyrazolo[3,4-d]pyrimidine: To a solution of 6-chloro-1H-pyrazolo[3,4-d]pyrimidine (500 mg, 3.23 mmol) in DMF (20 mL) was added NaH (258 mg, 6.46 mmol, 60% purity) at 0° C. and the mixture stirred at 20° C. for 0.5 hour. CH₃I (596 mg, 4.20 mmol) was added and the mixture was stirred at 20° C. for 2 hours. The reaction was quenched with sat. aq. NH₄Cl (20 mL) and extracted with EtOAc (30 mL×3). The mixture was evaporated to dryness in vacuo and the residue was purified by column chromatography on silica gel (petroleum ether/EtOAc; 1:0 to 0:1) to afford the title compound as a yellow solid (130 mg, 24%). ¹HNMR (500 MHz, CDCl₃) δ: 9.03 (s, 1H), 8.14 (s, 1H), 4.15 (s, 3H).

Example 142

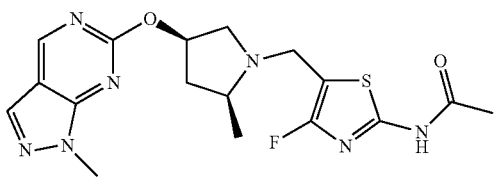 [SMILES: CC(=O)Nc1nc(F)c(CN2C[C@H](Oc3ncc4cnn(C)c4n3)C[C@@H]2C)s1]

N-(4-fluoro-5-(((2S,4R)-2-methyl-4-((1-methyl-1H-pyrazolo[3,4-d]pyrimidin-6-yl)oxy)pyrrolidin-1-yl)methyl)thiazol-2-yl)acetamide: The title compound was prepared in an analogous manner of that in scheme 2 from 6-chloro-1-methyl-1H-pyrazolo[3,4-d]pyrimidine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=406.0; ¹HNMR (400 MHz, CDCl₃) δ: 10.29 (s, 1H), 8.89 (s, 1H), 7.97 (s, 1H), 5.38-5.39 (m, 1H), 3.99 (s, 3H), 3.94 (d, J=14.4 Hz, 1H), 3.63 (d, J=14.4 Hz, 1H), 3.26 (d, J=10.8 Hz, 1H), 2.76-2.80 (m, 1H), 2.55-2.59 (m, 2H), 2.28 (s, 3H), 1.80-1.82 (m, 1H), 1.25 (d, J=5.6 Hz, 3H).

Example 143

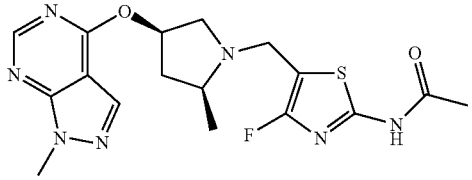 [SMILES: CC(=O)Nc1nc(F)c(CN2C[C@H](Oc3ncnc4c3cnn4C)C[C@@H]2C)s1]

N-(4-fluoro-5-(((2S,4R)-2-methyl-4-((1-methyl-1H-pyrazolo[3,4-d]pyrimidin-4-yl)oxy)pyrrolidin-1-yl)methyl)thiazol-2-yl)acetamide: The title compound was prepared in an analogous manner of that in scheme 2 from 4-chloro-1H-pyrazolo[3,4-d]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=406.0; (400 MHz, CHLOROFORM-d) δ: 9.84 (brs, 1H), 8.48 (s, 1H), 8.04 (s, 1H), 5.55-5.58 (m, 1H), 4.05 (s, 3H), 3.98 (d, J=14.4 Hz, 1H), 3.63 (d, J=14.8 Hz, 1H), 3.27 (d, J=10.8 Hz, 1H), 2.74 (dd, J=11.6, 6.4 Hz, 1H), 2.58-2.62 (m, 2H), 2.26 (s, 3H), 1.76-1.78 (m, 1H), 1.26 (d, J=6.0 Hz, 3H).

Example 144

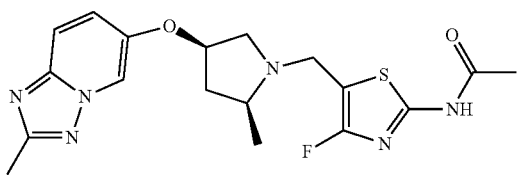 [SMILES: CC(=O)Nc1nc(F)c(CN2C[C@H](Oc3ccc4nc(C)nn4c3)C[C@@H]2C)s1]

N-(4-fluoro-5-((((2S,4R)-2-methyl-4-((2-methyl-[1,2,4]triazolo[1,5-a]pyridin-6-yl)oxy)pyrrolidin-1-yl)methyl)thiazol-2-yl)acetamide: The title compound was prepared in an analogous manner of that in scheme 2 from 6-bromo-2-methyl-[1,2,4]triazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=405.0; $^1$HNMR (400 MHz, MeOH-$d_4$) δ: 8.27 (s, 1H), 7.56 (d, J=9.6 Hz, 1H), 7.42 (dd, J=9.2, 2.0 Hz, 1H), 5.22-5.24 (m, 1H), 4.16-4.17 (m, 1H), 3.71-3.81 (m, 1H), 3.38-3.48 (m, 1H), 2.71-2.92 (m, 3H), 2.50 (s, 3H), 2.19 (s, 3H), 1.74-1.75 (m, 1H), 1.37 (d, J=6.0 Hz, 3H).

Example 145

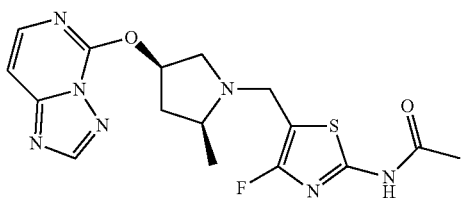 [SMILES: CC(=O)Nc1nc(F)c(CN2C[C@H](Oc3nccc4ncnn34)C[C@@H]2C)s1]

N-(5-((((2S,4R)-4-([1,2,4]triazolo[1,5-c]pyrimidin-5-yloxy)-2-methylpyrrolidin-1-yl)methyl)-4-fluorothiazol-2-yl)acetamide: The title compound was prepared in an analogous manner of that in scheme 2 from 5-chloro-[1,2,4]triazolo[1,5-c]pyrimidine, tert-butyl (2S,4R)-4-hydroxy-2-methylpyrrolidine-1-carboxylate and N-(4-fluoro-5-formylthiazol-2-yl)acetamide. LCMS (ESI): [M+H]=392.0; $^1$HNMR (500 MHz, CDCl$_3$) δ: 10.21 (br s, 1H), 8.33 (s, 1H), 7.88 (d, J=6.0 Hz, 1H), 7.28 (d, J=6.5 Hz, 1H), 5.59-5.60 (m, 1H), 3.50 (d, J=15.0 Hz, 1H), 3.63 (d, J=14.5 Hz, 1H), 3.38-3.41 (m, 1H), 2.77-2.80 (m, 1H), 2.61-2.65 (m, 2H), 2.27 (s, 3H), 1.92-1.94 (m, 1H), 1.28 (d, J=5.5 Hz, 3H).

Example 146

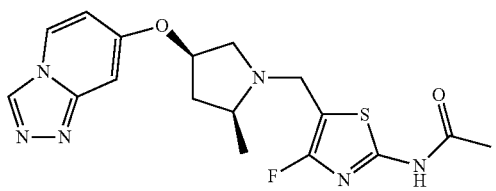 [SMILES: CC(=O)Nc1nc(F)c(CN2C[C@H](Oc3ccn4cnnc4c3)C[C@@H]2C)s1]

N-(5-((((2S,4R)-4-([1,2,4]triazolo[4,3-a]pyridin-7-yloxy)-2-methylpyrrolidin-1-yl)methyl)-4-fluorothiazol-2-yl)acetamide: The title compound was prepared in an analogous manner of that in scheme 2 from 7-bromo-[1,2,4]triazolo[4,3-a]pyridine, tert-butyl (2S,4R)-4-hydroxy-2-methylpyrrolidine-1-carboxylate and N-(5-(chloromethyl)-4-fluorothiazol-2-yl)acetamide. LCMS (ESI): [M+H]=391.2; $^1$HNMR (500 MHz, MeOH-$d_4$) δ: 8.39 (s, 1H), 7.68 (t, J=8.5 Hz, 1H), 7.37 (d, J=8.5 Hz, 1H), 6.57 (d, J=8.0 Hz, 1H), 5.16-5.20 (m, 1H), 4.00 (d, J=14.5 Hz, 1H), 3.62 (d, J=14.5 Hz, 1H), 3.37-3.40 (m, 1H), 2.63-2.82 (m, 3H), 2.17 (s, 3H), 1.86-1.90 (m, 1H), 1.29 (d, J=6.0 Hz, 3H).

Example 147

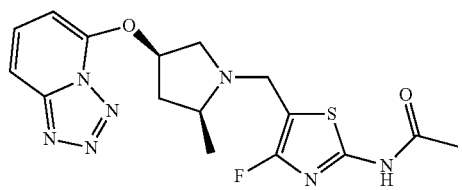 [SMILES: CC(=O)Nc1nc(F)c(CN2C[C@H](Oc3cccc4nnnn34)C[C@@H]2C)s1]

N-(4-fluoro-5-((((2S,4R)-2-methyl-4-(tetrazolo[1,5-a]pyridin-5-yloxy)pyrrolidin-1-yl)methyl)thiazol-2-yl)acetamide: The title compound was prepared in an analogous manner of that in scheme 2 from 5-chlorotetrazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=392.0; $^1$HNMR (500 MHz, MeOH-$d_4$) δ: 7.64 (t, J=8.0 Hz, 1H), 6.57 (d, J=8.0 Hz, 1H), 6.47 (d, J=7.5 Hz, 1H), 5.44-5.47 (m, 1H), 4.36 (d, J=14.5 Hz, 1H), 4.04 (d, J=14.5 Hz, 1H), 3.50-3.53 (m, 1H), 3.20-3.26 (m, 2H), 2.78-2.82 (m, 1H), 2.20 (s, 3H), 1.85-1.89 (m, 1H), 1.41 (d, J=6.5 Hz, 3H).

Intermediate 46

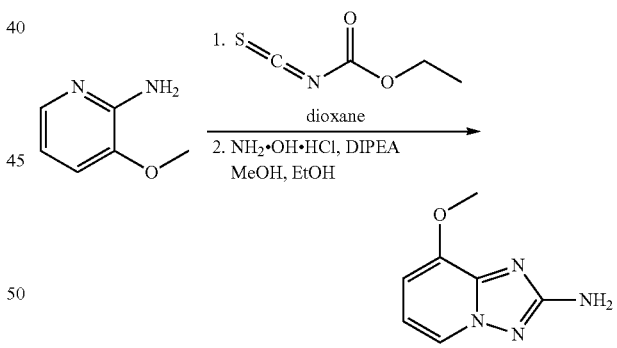

8-methoxy-[1,2,4]triazolo[1,5-a]pyridin-2-amine: Part 1; O-ethyl carbonisothiocyanatidate (5.28 g, 40.28 mmol) was added to a solution of 3-methoxypyridin-2-amine (5.0 g, 40.28 mmol) in dioxane (100 mL) and the mixture stirred at 25° C. for 16 hours. The mixture was evaporated to dryness to afford a yellow solid (10 g) as a yellow solid which was used in Part 2 without further purification.

Part 2; To a suspension of the compound of Part 1 (10 g, 39.2 mmol) in MeOH (60 mL) and EtOH (60 mL) was added hydroxylamine hydrochloride (13.61 g, 0.196 mmol) followed by DIPEA (15.19 g, 117.5 mmol) and the resulting mixture stirred at 60° C. for 16 hours. The solvent was removed in vacuo and the residue was treated with sat. aq. NaHCO$_3$ (100 mL). The resulting precipitate was collected by filtration and dried to afford the title compound as an off-white solid (5.50 g, 85%).

Intermediate 47

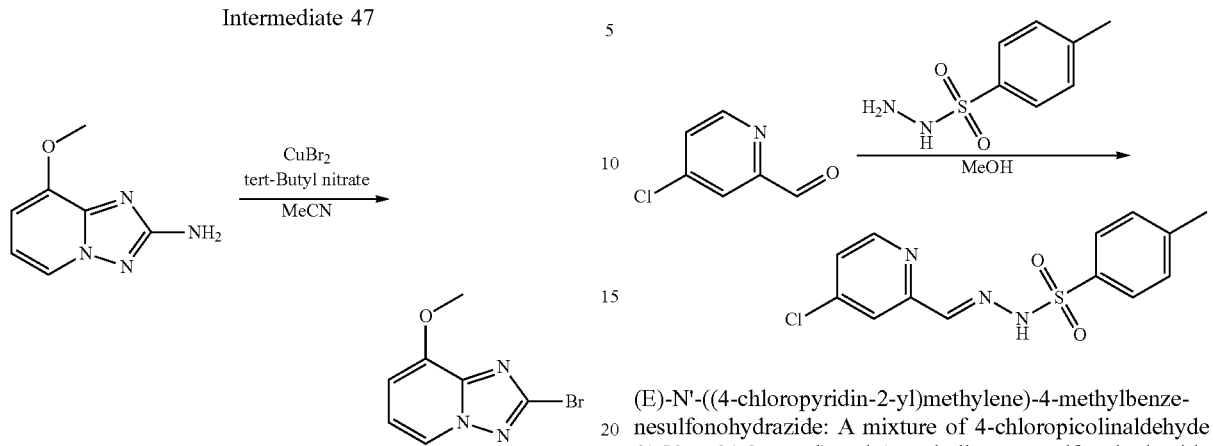

2-bromo-8-methoxy-[1,2,4]triazolo[1,5-a]pyridine: CuBr₂ (2.04 g, 9.14 mmol) and tert-butyl nitrite (942 mg, 9.14 mmol) were dissolved in MeCN (20 mL) and the mixture was stirred at 60° C. 8-methoxy-[1,2,4]triazolo[1,5-a]pyridin-2-amine (1.0 g, 6.09 mmol) was added portion wise and the mixture stirred at 60° C. for 16 hours. The reaction mixture was quenched with sat. aq. NaHCO₃ (50 mL) and extracted with EtOAc (2×150 mL). The combined organics were washed with brine (150 mL), dried (Na₂SO₄) and evaporated to dryness in vacuo. The residue was purified by silica gel column chromatography (petroleum ether/EtOAc; 1:1 to 0:1) to afford the title compound as a white solid (556 mg, 40%). ¹HNMR (500 MHz, CDCl₃) δ: 8.17 (d, J=6.5 Hz, 1H), 6.94-6.97 (m, 1H), 6.83 (d, J=8.0 Hz, 1H), 4.05 (s, 3H).

Example 148

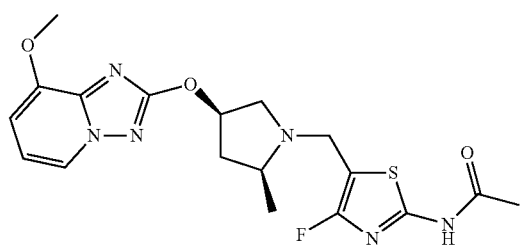 [SMILES: COc1cccn2nc(O[C@@H]3C[C@H](C)N(Cc4sc(NC(C)=O)nc4F)C3)nc12]

N-(4-fluoro-5-(((2S,4R)-4-((8-methoxy-[1,2,4]triazolo[1,5-a]pyridin-2-yl)oxy)-2-methylpyrrolidin-1-yl)methyl)thiazol-2-yl)acetamide: The title compound was prepared in an analogous manner of that in scheme 2 from 2-bromo-8-methoxy-[1,2,4]triazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=421.0; ¹HNMR (500 MHz, CDCl₃) δ: 10.42 (br s, 1H), 8.02 (d, J=6.5 Hz, 1H), 6.74-6.82 (m, 2H), 5.32-5.33 (m, 1H), 4.00 (s, 3H), 3.94 (d, J=15.0 Hz, 1H), 3.64 (d, J=15.0 Hz, 1H), 3.27-3.29 (m, 1H), 2.74-2.76 (m, 1H), 2.55-2.58 (m, 2H), 2.28 (s, 3H), 1.78-1.80 (m, 1H), 1.24 (d, J=5.5 Hz, 3H).

Intermediate 48

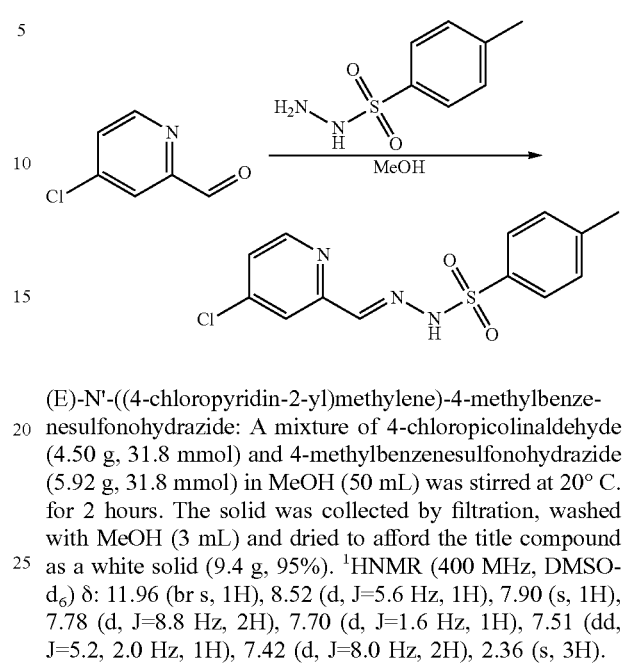

(E)-N'-((4-chloropyridin-2-yl)methylene)-4-methylbenzenesulfonohydrazide: A mixture of 4-chloropicolinaldehyde (4.50 g, 31.8 mmol) and 4-methylbenzenesulfonohydrazide (5.92 g, 31.8 mmol) in MeOH (50 mL) was stirred at 20° C. for 2 hours. The solid was collected by filtration, washed with MeOH (3 mL) and dried to afford the title compound as a white solid (9.4 g, 95%). ¹HNMR (400 MHz, DMSO-d₆) δ: 11.96 (br s, 1H), 8.52 (d, J=5.6 Hz, 1H), 7.90 (s, 1H), 7.78 (d, J=8.8 Hz, 2H), 7.70 (d, J=1.6 Hz, 1H), 7.51 (dd, J=5.2, 2.0 Hz, 1H), 7.42 (d, J=8.0 Hz, 2H), 2.36 (s, 3H).

Intermediate 49

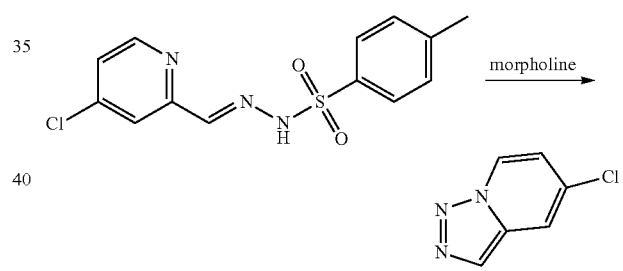

5-chloro-[1,2,3]triazolo[1,5-a]pyridine: A mixture of (E)-N'-((4-chloropyridin-2-yl)methylene)-4-methylbenzenesulfonohydrazide (9.4 g, 30.35 mmol) in morpholine (90 mL) was stirred at 130° C. for 3 hours. The reaction was cooled to room temperature, diluted with EtOAc (100 mL) and washed with H₂O (2×50 mL). The combined organics were dried (Na₂SO₄) and evaporated to dryness in vacuo to afford the title compound as a white solid (2.1 g, 45%). ¹HNMR (500 MHz, CDCl₃) δ: 8.67 (d, J=7.0 Hz, 1H), 8.01 (s, 1H), 7.72 (d, J=1.5 Hz, 1H), 6.94 (dd, J=7.5, 2.0 Hz, 1H).

Example 149

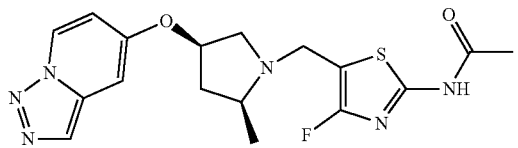 [SMILES: CC(=O)Nc1nc(F)c(CN2C[C@H](Oc3ccn4nncc4c3)C[C@@H]2C)s1]

N-(5-(((2S,4R)-4-([1,2,3]triazolo[1,5-a]pyridin-5-yloxy)-2-methylpyrrolidin-1-yl)methyl)-4-fluorothiazol-2-yl)acetamide: The title compound was prepared in an analogous manner of that in scheme 2 from 5-chloro-[1,2,3]triazolo[1,5-a]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=391.0; $^1$HNMR (500 MHz, MeOH-d$_4$) δ: 8.72 (d, J=7.5 Hz, 1H), 7.88 (s, 1H), 7.06 (d, J=2.5 Hz, 1H), 6.82 (dd, J=7.5, 2.5 Hz, 1H), 4.86-4.87 (m, 1H), 3.99 (d, J=14.5 Hz, 1H), 3.60 (d, J=14.5 Hz, 1H), 3.21-3.24 (m, 1H), 2.60-2.73 (m, 3H), 2.18 (s, 3H), 1.63-1.68 (m, 1H), 1.26 (d, J=5.5 Hz, 3H).

Intermediates 50, 51 and 52

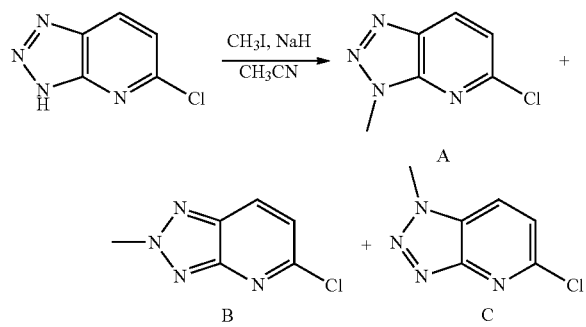

5-chloro-3-methyl-3H-[1,2,3]triazolo[4,5-b]pyridine, 5-chloro-2-methyl-2H-[1,2,3]triazolo[4,5-b]pyridine and 5-chloro-1-methyl-1H-[1,2,3]triazolo[4,5-b]pyridine: NaH (388 mg, 9.70 mmol, 60% purity) was added to a solution of 5-chloro-3H-[1,2,3]triazolo[4,5-b]pyridine (750 mg, 4.85 mmol) in MeCN (20 mL) at 0° C. and the mixture stirred at 20° C. for 0.5 h. CH$_3$I (1.03 g, 7.27 mmol) was added and the mixture stirred at 20° C. for 2 hours. The reaction was quenched with saturated aq. NH$_4$Cl (20 mL) and extracted with EtOAc (3×30 mL). The combined extracts were dried (Na$_2$SO$_4$) and evaporated to dryness in vacuo and the residue purified by column chromatography on silica gel (petroleum ether/EtOAc; 1:0 to 1:1) to afford 5-chloro-1-methyl-1H-[1,2,3]triazolo[4,5-b]pyridine (Intermediate 52) (210 mg, 25%) and a mixture of 5-chloro-3-methyl-3H-[1,2,3]triazolo[4,5-b]pyridine (Intermediate 50) and 5-chloro-2-methyl-2H-[1,2,3]triazolo[4,5-b]pyridine (Intermediate 51) (300 mg, 37%) as a yellow solid.

Intermediate 48 and 49 (Mixture). $^1$HNMR (500 MHz, CDCl$_3$) δ: 8.31 (d, J=8.5 Hz, 1H), 8.16 (d, J=9.0 Hz, 1H), 7.34-7.37 (m, 2H), 4.52 (s, 3H), 4.37 (s, 3H).

Intermediate 50. $^1$HNMR (500 MHz, CDCl$_3$) δ: 7.90 (d, J=8.5 Hz, 1H), 7.47 (d, J=8.5 Hz, 1H), 4.35 (s, 3H).

Example 150 and 151

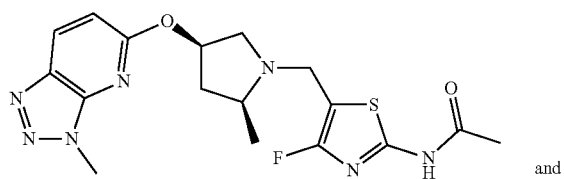
and
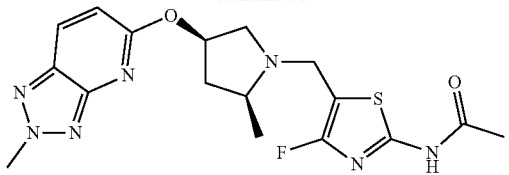

N-(4-fluoro-5-(((2S,4R)-2-methyl-4-((3-methyl-3H-[1,2,3]triazolo[4,5-b]pyridin-5-yl)oxy)pyrrolidin-1-yl)methyl)thiazol-2-yl)acetamide and N-(4-fluoro-5-(((2S,4R)-2-methyl-4-((2-methyl-2H-[1,2,3]triazolo[4,5-b]pyridin-5-yl)oxy)pyrrolidin-1-yl)methyl)thiazol-2-yl)acetamide: The title compound was prepared in an analogous manner of that in scheme 2 from a mixture of 5-chloro-3-methyl-3H-[1,2,3]triazolo[4,5-b]pyridine (Intermediate 50) and 5-chloro-2-methyl-2H-[1,2,3]triazolo[4,5-b]pyridine (Intermediate 49), tert-butyl (2S,4R)-4-hydroxy-2-methylpyrrolidine-1-carboxylate and N-(5-(chloromethyl)-4-fluorothiazol-2-yl)acetamide.

N-(4-fluoro-5-(((2S,4R)-2-methyl-4-((3-methyl-3H-[1,2,3]triazolo[4,5-b]pyridin-5-yl)oxy)pyrrolidin-1-yl)methyl)thiazol-2-yl)acetamide (Example 150). LCMS (ESI): [M+H]=406.0; $^1$HNMR (400 MHz, MeOH-d$_4$) δ: 8.19 (d, J=8.8 Hz, 1H), 6.87 (d, J=8.8 Hz, 1H), 5.47-5.51 (m, 1H), 4.21 (s, 3H), 3.96 (d, J=14.8 Hz, 1H), 3.58 (d, J=14.4 Hz, 1H), 3.21-3.24 (m, 1H), 2.61-2.81 (m, 3H), 2.18 (s, 3H), 1.67-1.73 (m, 1H), 1.26 (d, J=6.0 Hz, 3H). N-(4-fluoro-5-(((2S,4R)-2-methyl-4-((2-methyl-2H-[1,2,3]triazolo[4,5-b]pyridin-5-yl)oxy)pyrrolidin-1-yl)methyl)thiazol-2-yl)acetamide (Example 151). LCMS (ESI): [M+H]=406.0; $^1$HNMR (400 MHz, MeOH-d$_4$) δ: 8.11 (d, J=9.2 Hz, 1H), 6.91 (d, J=9.2 Hz, 1H), 5.41-5.43 (m, 1H), 4.40 (s, 3H), 3.99 (d, J=15.2 Hz, 1H), 3.60 (d, J=14.8 Hz, 1H), 3.21-3.24 (m, 1H), 2.64-2.80 (m, 3H), 2.18 (s, 3H), 1.67-1.72 (m, 1H), 1.27 (d, J=6.0 Hz, 3H).

Example 152

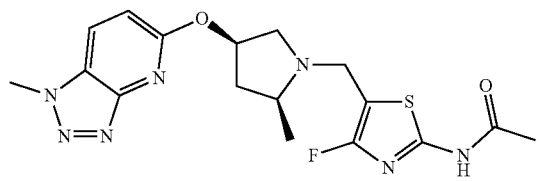 [SMILES: CC(=O)Nc1nc(F)c(CN2C[C@H](Oc3ccc4c(nnn4C)n3)C[C@@H]2C)s1]

N-(4-fluoro-5-(((2S,4R)-2-methyl-4-((1-methyl-1H-[1,2,3]triazolo[4,5-b]pyridin-5-yl)oxy)pyrrolidin-1-yl)methyl)thiazol-2-yl)acetamide: The title compound was prepared in an analogous manner of that in scheme 2 from 5-chloro-1-methyl-1H-[1,2,3]triazolo[4,5-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=406.0; $^1$HNMR (400 MHz, MeCN-d$_3$) δ: 10.10 (br s, 1H), 8.03 (d, J=9.2 Hz, 1H), 6.95 (d, J=9.2 Hz, 1H), 5.59-5.62 (m, 1H), 4.37-4.42 (m, 1H), 4.25 (s, 3H), 4.13-4.15 (m, 1H), 3.65-3.67 (m, 1H), 3.37-3.41 (m, 2H), 2.80-2.87 (m, 1H), 2.16 (s, 3H), 1.90-1.92 (m, 1H), 1.46 (d, J=6.0 Hz, 3H).

Intermediates 52 and 53

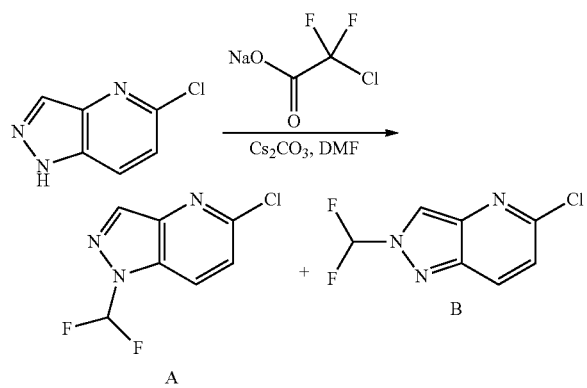

5-chloro-1-(difluoromethyl)-1H-pyrazolo[4,3-b]pyridine and 5-chloro-2-(difluoromethyl)-2H-pyrazolo[4,3-b]pyridine To a solution of 5-chloro-1H-pyrazolo[4,3-b]pyridine (1.5 g, 9.77 mmol) in DMF (20 mL) was added Cs₂CO₃ (9.55 g, 29.31 mmol) and sodium 2-chloro-2,2-difluoroacetate (4.5 g, 29.31 mmol) and the reaction stirred at 120° C. for 6 h. The reaction mixture was filtered and the filtrate diluted with H₂O (20 mL) and extracted with ethyl acetate (20 mL×3). The combined organics were washed with H₂O (20 mL×3), brine (20 mL), dried (Na₂SO₄) and evaporated to dryness in vacuo. The residue was purified by column chromatography (Petroleum ether/Ethyl acetate=10/1) to give 5-chloro-1-(difluoromethyl)-1H-pyrazolo[4,3-b]pyridine (Isomer A; 535 mg, 27%) and 5-chloro-2-(difluoromethyl)-2H-pyrazolo[4,3-b]pyridine (Isomer B; 432 mg, 22%) as white solids.

Intermediate 52. $^1$H NMR (500 MHz, CDCl₃) δ: 8.25 (s, 1H), 8.07 (d, J=9.0 Hz, 1H), 7.45 (t, J=59.5 Hz, 1H), 7.44 (d, J=8.5 Hz, 1H).

Intermediate 53. $^1$H NMR (500 MHz, CDCl₃) δ: 8.48 (s, 1H), 8.01 (d, J=9.5 Hz, 1H), 7.39 (t, J=60.0 Hz, 1H), 7.23 (d, J=9.5 Hz, 1H).

Example 153

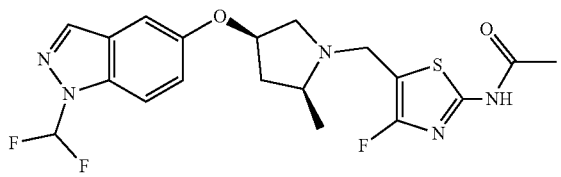 [SMILES: CC(=O)Nc1nc(F)c(CN2C[C@H](Oc3ccc4c(cnn4C(F)F)c3)C[C@@H]2C)s1]

N-(5-(((2S,4R)-4-((1-(difluoromethyl)-1H-pyrazolo[4,3-b]pyridin-5-yl)oxy)-2-methylpyrrolidin-1-yl)methyl)-4-fluorothiazol-2-yl)acetamide. The title compound was prepared in an analogous manner of that in scheme 2 from 5-chloro-1-(difluoromethyl)-1H-pyrazolo[4,3-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=441.0; $^1$HNMR (500 MHz, CDCl₃) δ: 10.67 (br s, 1H), 8.06 (s, 1H), 7.93 (d, J=9.0 Hz, 1H), 7.37 (t, J=59.5 Hz, 1H), 6.93 (d, J=9.5 Hz, 1H), 5.36-5.42 (m, 1H), 3.99 (d, J=14.5 Hz, 1H), 3.66 (d, J=14.5 Hz, 1H), 3.20-3.23 (m, 1H), 2.66-2.74 (m, 1H), 2.50-2.63 (m, 2H), 2.29 (s, 3H), 1.65-1.75 (m, 1H), 1.26 (d, J=5.5 Hz, 3H).

Example 154

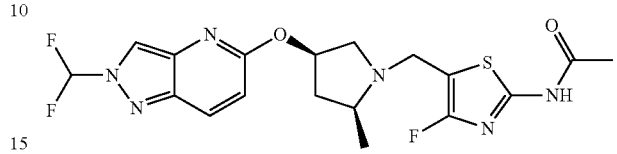

N-(5-(((2S,4R)-4-((2-(difluoromethyl)-2H-pyrazolo[4,3-b]pyridin-5-yl)oxy)-2-methylpyrrolidin-1-yl)methyl)-4-fluorothiazol-2-yl)acetamide. The title compound was prepared in an analogous manner of that in scheme 2 from 5-chloro-2-(difluoromethyl)-2H-pyrazolo[4,3-b]pyridine, tert-butyl (2S,4R)-4-hydroxy-2-methylpyrrolidine-1-carboxylate and N-(4-fluoro-5-formylthiazol-2-yl)acetamide. LCMS (ESI): [M+H]=441.0; $^1$HNMR (500 MHz, CDCl₃) δ: 10.67 (s, 1H), 8.22 (s, 1H), 7.87 (d, J=9.0 Hz, 1H), 7.35 (t, J=60.5 Hz, 1H), 6.86 (d, J=9.5 Hz, 1H), 5.35-5.41 (m, 1H), 3.99 (d, J=15.0 Hz, 1H), 3.65 (d, J=15.0 Hz, 1H), 3.22 (d, J=11.5 Hz, 1H), 2.67-2.72 (m, 1H), 2.49-2.61 (m, 2H), 2.29 (s, 3H), 1.67-1.74 (m, 1H), 1.26 (d, J=5.5 Hz, 3H).

Scheme 3
Intermediate IV may alternatively be prepared using the general chemistry general chemistry described in Scheme 3.

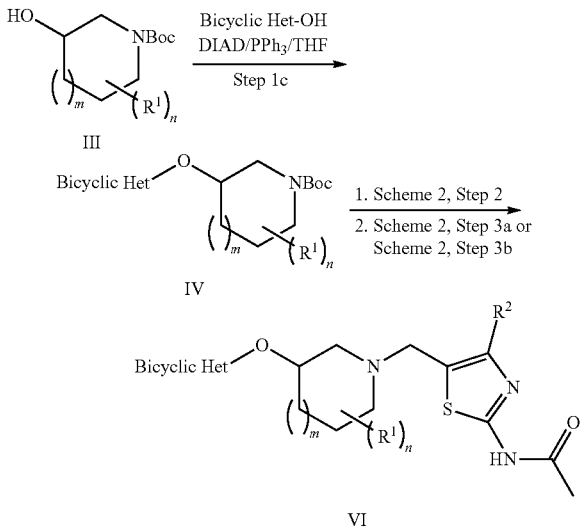

Intermediate 54

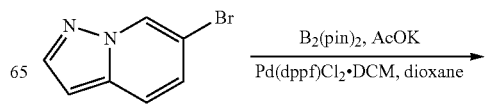

-continued

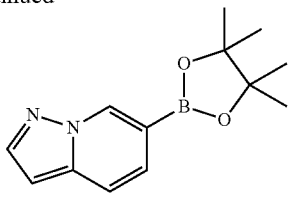

6-(4,4,5,5-tetramethyl-1,3,2-dioxaborolan-2-yl)pyrazolo[1,5-a]pyridine: A mixture of 6-bromopyrazolo[1,5-a]pyridine (0.30 g, 1.52 mmol), potassium acetate (0.373 g, 3.80 mmol), Pd(dppf)Cl$_2$·CH$_2$Cl$_2$ (0.124 g, 0.152 mmol) and bis(pinacolato)diboron (0.463 g, 1.82 mmol) in dioxane (20 mL) was stirred at 100° C. under N$_2$ for 12 hours. The mixture was filtered through celite pad and the filtrate was evaporated to dryness to afford the title compound as a brown oil (400 mg) which was used directly in next step without further purification. LCMS (ESI): [M+H]=245.2

Intermediate 55

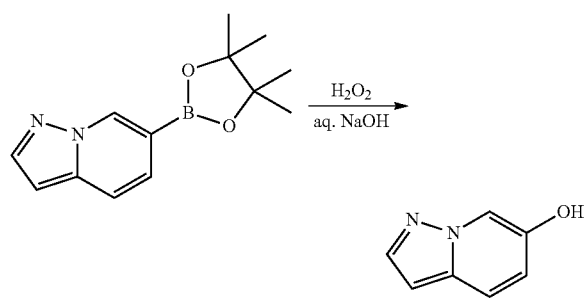

pyrazolo[1,5-a]pyridin-6-ol: A mixture of 6-(4,4,5,5-tetramethyl-1,3,2-dioxaborolan-2-yl)pyrazolo[1,5-a]pyridine (400 mg, 1.64 mmol), hydrogen peroxide (0.558 g, 4.92 mmol, 30% purity) and aq. NaOH (2 M, 2.46 mL) in THF (10 mL) was stirred at 0° C. for 3 hours. The mixture was quenched with Na$_2$SO$_3$ (sat, 5 mL), extracted with DCM (3×5 mL). The combined organics were dried (Na$_2$SO$_4$), evaporated to dryness in vacuo and the residue purified by column chromatography on silica gel (petroleum ether/EtOAc; 1:1) to afford the title compound as a brown solid (105 mg, 47%). $^1$H NMR (500 MHz, MeOH-d$_4$) δ: 8.04 (d, J=1.5 Hz, 1H), 7.76 (d, J=2.5 Hz, 1H), 7.51 (d, J=9.5 Hz, 1H), 6.97 (dd, J=9.5, 2.0 Hz, 1H), 6.49 (d, J=2.5 Hz, 1H).

Intermediate 56

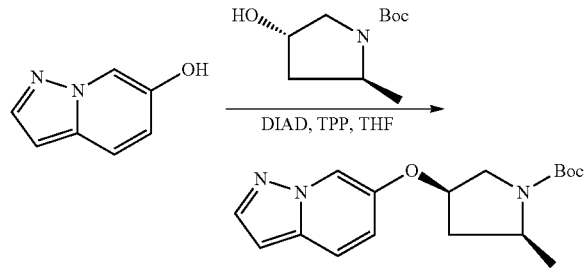

tert-butyl (2S,4R)-2-methyl-4-(pyrazolo[1,5-a]pyridin-6-yloxy)pyrrolidine-1-carboxylate: A mixture of pyrazolo[1,5-a]pyridin-6-ol (240 mg, 1.79 mmol), tert-butyl (2S,4S)-4-hydroxy-2-methylpyrrolidine-1-carboxylate (300 mg, 1.49 mmol), DIAD (603 mg, 2.98 mmol, 585.27 uL) and triphenylphosphine (782 mg, 2.98 mmol) in THF (5 mL) was stirred at 55° C. for 12 hours. The mixture was evaporated to dryness in vacuo and the residue purified by column chromatography on silica gel (petroleum ether/EtOAc; 10:1) to give the title compound as a yellow oil (220 mg, 46%). $^1$H NMR (400 MHz, CDCl$_3$) δ: 8.03 (s, 1H), 7.86 (d, J=2.4 Hz, 1H), 7.45 (d, J=9.6 Hz, 1H), 6.90 (d, J=9.6 Hz, 1H), 6.47 (s, 1H), 4.76-4.79 (m, 1H), 3.95-4.10 (m, 1H), 3.62-3.81 (m, 2H), 2.31-2.37 (m, 1H), 1.97-2.05 (m, 1H), 1.47 (s, 9H), 1.34-1.35 (m, 3H).

Example 155

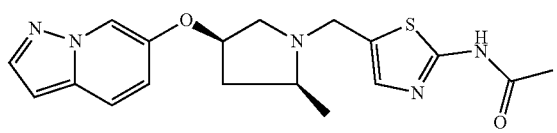 [SMILES: CC(=O)Nc1ncc(CN2C[C@H](Oc3ccc4ccnn4c3)C[C@@H]2C)s1]

N-(5-(((2S,4R)-2-methyl-4-(pyrazolo[1,5-a]pyridin-6-yloxy)pyrrolidin-1-yl)methyl)thiazol-2-yl)acetamide: The title compound was prepared in an analogous manner of that in scheme 3 from pyrazolo[1,5-a]pyridin-6-ol, tert-butyl (2S,4S)-4-hydroxy-2-methylpyrrolidine-1-carboxylate and N-(5-formylthiazol-2-yl)acetamide. LCMS (ESI): [M+Na]=393.8. $^1$HNMR (400 MHz, MeOH-d$_4$) δ: 8.03 (s, 1H), 7.80 (d, J=2.4 Hz, 1H), 7.53 (d, J=9.6 Hz, 1H), 7.28 (s, 1H), 6.99 (dd, J=10.0, 2.0 Hz, 1H), 6.51 (s, 1H), 4.72-4.75 (m, 1H), 4.13-4.18 (m, 1H), 3.56-3.60 (m, 1H), 3.17-3.21 (m, 1H), 2.57-2.67 (m, 3H), 2.19 (s, 3H), 1.65-1.71 (m, 1H), 1.26 (d, J=5.6 Hz, 3H).

Intermediate 57

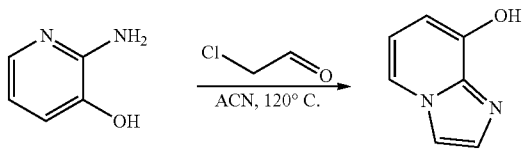

imidazo[1,2-a]pyridin-8-ol: To a solution of 2-aminopyridin-3-ol (5 g, 45.41 mmol) in MeCN (50 mL) was added 2-chloroacetaldehyde (46 g, 234.39 mmol) and the reaction mixture stirred at 120° C. for 6 hours under N$_2$ atmosphere without light. The mixture was evaporated to dryness in vacuo and the residue purified by column chromatography on silica gel (PE/EtOAc; 1/0 to 1/1) to give the title compound as a brown solid (2.73 g, 44%). $^1$H NMR (500 MHz, CDCl$_3$) δ: 8.59 (br s, 1H), 7.59-7.68 (m, 2H), 6.67-6.77 (m, 2H).

Example 156

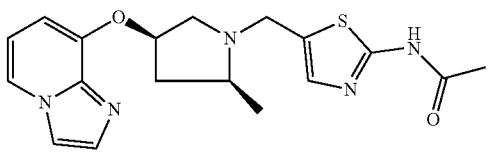 [SMILES: CC(=O)Nc1ncc(CN2C[C@H](Oc3cccn4ccnc34)C[C@@H]2C)s1]

N-(5-(((2S,4R)-4-(imidazo[1,2-a]pyridin-8-yloxy)-2-methylpyrrolidin-1-yl)methyl)thiazol-2-yl)acetamide: The title compound was prepared in an analogous manner of that in scheme 3 from imidazo[1,2-a]pyridin-8-ol, tert-butyl (2S, 4S)-4-hydroxy-2-methylpyrrolidine-1-carboxylate and N-(5-formylthiazol-2-yl)acetamide. LCMS (ESI): [M+H] =372.0; $^1$HNMR (400 MHz, MeOH-$d_4$) δ: 7.86 (d, J=6.5 Hz, 1H), 7.63 (d, J=1.0 Hz, 1H), 7.32 (s, 1H), 7.16 (s, 1H), 6.63 (t, J=7.0 Hz, 1H), 6.42 (d, J=8.0 Hz, 1H), 4.84-4.87 (m, 1H), 4.07-4.11 (m, 1H), 3.51-3.54 (m, 1H), 3.18-3.21 (m, 1H), 266-2.70 (m, 3H), 2.02 (s, 3H), 1.68-1.74 (m, 1H), 1.14 (d, J=6.5 Hz, 3H).

Example 157

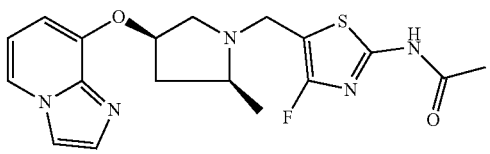 [SMILES: CC(=O)Nc1nc(F)c(CN2C[C@H](Oc3cccn4ccnc34)C[C@@H]2C)s1]

N-(4-fluoro-5-(((2S,4R)-4-(imidazo[1,2-a]pyridin-8-yloxy)-2-methylpyrrolidin-1-yl)methyl)thiazol-2-yl)acetamide: The title compound was prepared in an analogous manner of that in scheme 3 from imidazo[1,2-a]pyridin-8-ol, tert-butyl (2S,4S)-4-hydroxy-2-methylpyrrolidine-1-carboxylate and N-(4-fluoro-5-formylthiazol-2-yl)acetamide. LCMS (ESI): [M+H]=390.0; $^1$HNMR (400 MHz, MeOH-$d_4$) δ: 8.05 (d, J=6.4 Hz, 1H), 7.81 (d, J=1.2 Hz, 1H), 7.50 (s, 1H), 6.79-6.83 (m, 1H), 6.58 (d, J=7.6 Hz, 1H), 4.97-4.99 (m, 1H), 4.01 (d, J=14.8 Hz, 1H), 3.61 (d, J=14.8 Hz, 1H), 3.36-3.38 (m, 1H), 2.76-2.81 (m, 1H), 2.66-2.71 (m, 2H), 2.21 (s, 3H), 1.86-1.88 (m, 1H), 1.30 (d, J=5.6 Hz, 3H).

Example 158

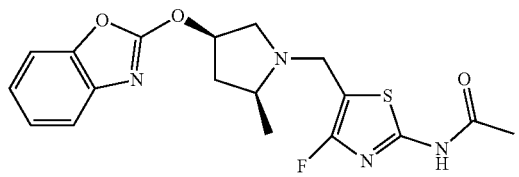 [SMILES: CC(=O)Nc1nc(F)c(CN2C[C@H](Oc3nc4ccccc4o3)C[C@@H]2C)s1]

N-(4-fluoro-5-(((2S,4R)-2-methyl-4-(oxazolo[4,5-b]pyridin-2-yloxy)pyrrolidin-1-yl)methyl)thiazol-2-yl)acetamide: The title compound was prepared in an analogous manner of that in scheme 3 from oxazolo[4,5-b]pyridin-2-ol, tert-butyl (2S,4S)-4-hydroxy-2-methylpyrrolidine-1-carboxylate and N-(5-(chloromethyl)-4-fluorothiazol-2-yl)acetamide. LCMS (ESI): [M+H]=392.0; $^1$HNMR (500 MHz, MeOH-$d_4$) δ: 8.17 (d, J=4.0 Hz, 1H), 7.74 (dd, J=8.0, 1.5 Hz, 1H), 7.15 (dd, J=8.0, 5.0 Hz, 1H), 5.35-5.37 (m, 1H), 3.88-3.91 (m, 1H), 3.50 (d, J=14.5 Hz, 1H), 3.26 (d, J=11.5 Hz, 1H), 2.51-2.65 (m, 3H), 2.07 (s, 3H), 1.68-1.69 (m, 1H) 1.17 (d, J=6.0 Hz, 3H).

Scheme 4 Compounds of Formula IV (A, B, C) may alternativley be prepared using the general chemistry described in Scheme 4.

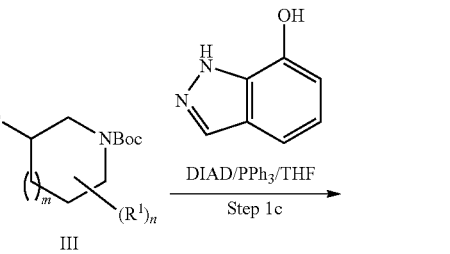

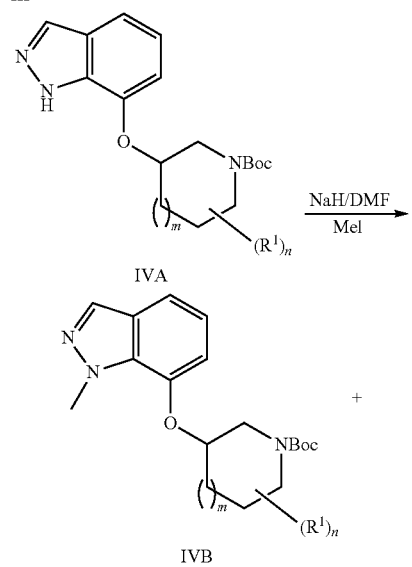

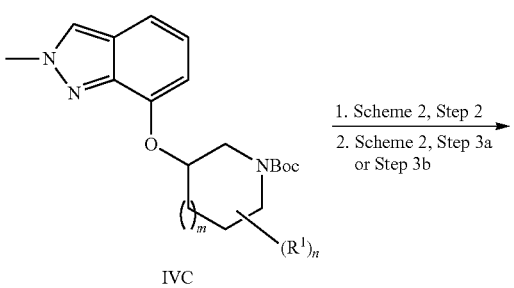

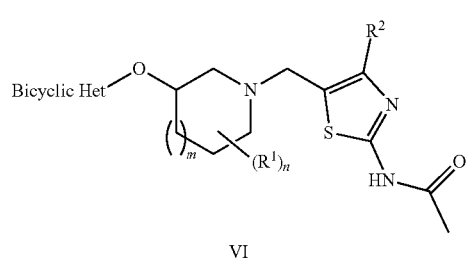

Intermediate 58

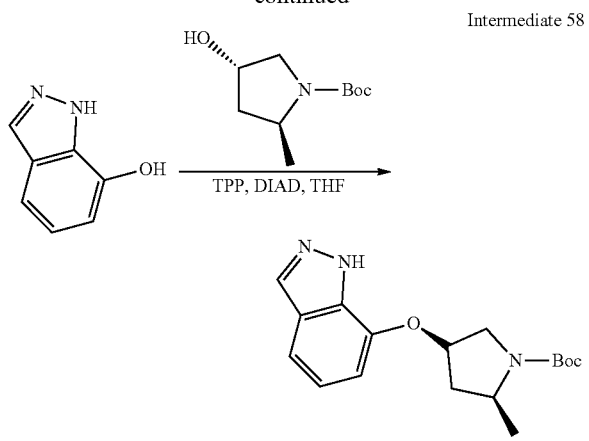

tert-butyl (2S,4R)-4-((1H-indazol-7-yl)oxy)-2-methylpyrrolidine-1-carboxylate: To a solution of 1H-indazol-7-ol (250 mg, 1.86 mmol) and tert-butyl (2S,4S)-4-hydroxy-2-methylpyrrolidine-1-carboxylate (312 mg, 1.55 mmol) in THF (25 mL) was added PPh$_3$ (813 mg, 3.10 mmol) and DIAD (627 mg, 3.10 mmol) and the mixture stirred at 60° C. for 3 h under N$_2$. The solvent was removed in vacuo and the residue purified by column chromatograph on silica gel (petroleum ether/EtOAc; 3:1) to give the title compound as a yellow solid (273 mg, 55%). LCMS (ESI): [M+H]=318.0; $^1$HNMR (400 MHz, CDCl$_4$) δ: 10.53 (brs, 1H), 8.03 (s, 1H), 7.33 (d, J=8.0 Hz, 1H), 7.03-7.07 (m, 1H), 6.66 (d, J=8.0 Hz, 1H), 5.04-5.05 (m, 1H), 4.09-4.14 (m, 1H), 3.79-3.82 (m, 2H), 2.38-2.45 (m, 1H), 2.07-2.11 (m, 1H), 1.47 (s, 9H), 1.36 (d, J=5.6 Hz, 3H).

Intermediate 59 and 60

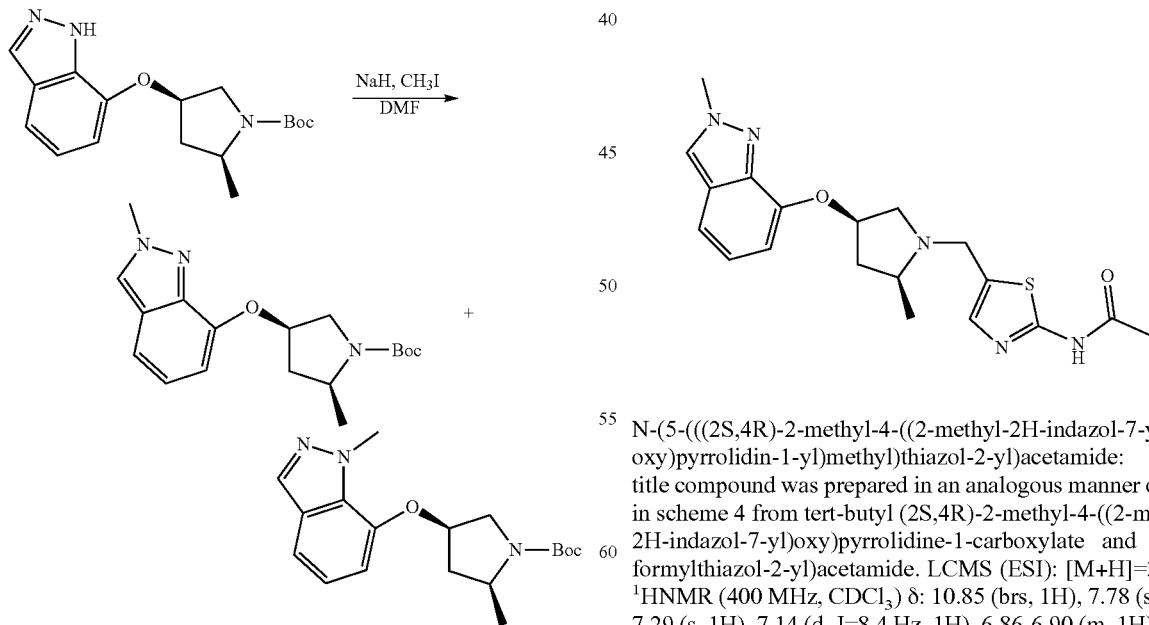

tert-butyl (2S,4R)-2-methyl-4-((2-methyl-2H-indazol-7-yl)oxy)pyrrolidine-1-carboxylate and tert-butyl (2S,4R)-2-methyl-4-((1-methyl-1H-indazol-7-yl)oxy)pyrrolidine-1-carboxylate: To a solution of tert-butyl (2S,4R)-4-((1H-indazol-7-yl)oxy)-2-methylpyrrolidine-1-carboxylate (200 mg, 0.630 mmol) in DMF (2 mL) was added NaH (50.5 mg, 1.26 mmol, 60% purity), the and the mixture stirred at 20° C. for 0.5 hr. CH$_3$I (107.3 mg, 0.756 mmol) was added and the mixture was stirred at 20° C. for 2 hrs, diluted with H$_2$O (5 mL) and extracted with EtOAc (3×5 mL). The combined organics were dried (Na$_2$SO$_4$) and purified by Prep-TLC (petroleum ether/EtOAc; 2:1) to give tert-butyl (2S,4R)-2-methyl-4-((2-methyl-2H-indazol-7-yl)oxy)pyrrolidine-1-carboxylate as a yellow oil (21 mg, 10%) and tert-butyl (2S,4R)-2-methyl-4-((1-methyl-1H-indazol-7-yl)oxy)pyrrolidine-1-carboxylate (120 mg, 57%) as a yellow oil.

Intermediate 58: tert-butyl (2S,4R)-2-methyl-4-((2-methyl-2H-indazol-7-yl)oxy)pyrrolidine-1-carboxylate; $^1$HNMR (400 MHz, CDCl$_4$) δ: 7.86 (s, 1H), 7.23 (d, J=8.8 Hz, 1H), 6.96-7.00 (m, 1H), 6.53 (d, J=7.6 Hz, 1H), 5.11-5.12 (m, 1H), 4.24 (s, 3H), 3.88-3.90 (m, 1H), 3.73-3.78 (m, 1H), 3.64-3.66 (m, 1H), 2.41-2.42 (m, 1H), 2.12-2.15 (m, 1H), 1.47 (s, 9H), 1.39 (d, J=6.4 Hz, 3H).

and

Intermediate 59: tert-butyl (2S,4R)-2-methyl-4-((1-methyl-1H-indazol-7-yl)oxy)pyrrolidine-1-carboxylate; $^1$HNMR (400 MHz, CDCl$_4$) δ: 7.90 (s, 1H), 7.27 (d, J=10.0 Hz, 1H), 6.97-7.01 (m, 1H), 6.58 (d, J=8.0 Hz, 1H), 4.99-5.02 (m, 1H), 4.08-4.13 (m, 1H), 3.76-3.90 (m, 2H), 3.70 (s, 3H), 2.43-2.50 (m, 1H), 2.09-2.12 (m, 1H), 1.48 (s, 9H), 1.35-1.37 (m, 3H).

Example 159

N-(5-(((2S,4R)-2-methyl-4-((2-methyl-2H-indazol-7-yl)oxy)pyrrolidin-1-yl)methyl)thiazol-2-yl)acetamide: The title compound was prepared in an analogous manner of that in scheme 4 from tert-butyl (2S,4R)-2-methyl-4-((2-methyl-2H-indazol-7-yl)oxy)pyrrolidine-1-carboxylate and N-(5-formylthiazol-2-yl)acetamide. LCMS (ESI): [M+H]=386.0; $^1$HNMR (400 MHz, CDCl$_3$) δ: 10.85 (brs, 1H), 7.78 (s, 1H), 7.29 (s, 1H), 7.14 (d, J=8.4 Hz, 1H), 6.86-6.90 (m, 1H), 6.39 (d, J=7.2 Hz, 1H), 4.97-5.01 (m, 1H), 4.18-4.22 (m, 1H), 4.14 (s, 3H), 3.78-3.82 (m, 1H), 3.38-3.41 (m, 1H), 2.84-2.89 (m, 2H), 2.55-2.58 (m, 1H), 2.21 (s, 3H), 1.98-2.00 (m, 1H), 1.26 (d, J=6.0 Hz, 3H).

Example 160

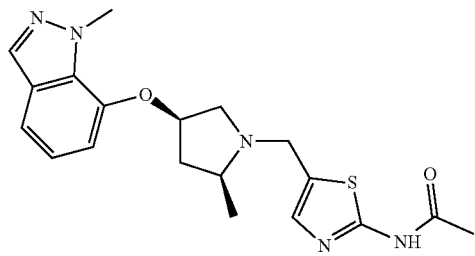 [SMILES: CC(=O)Nc1ncc(CN2C[C@H](Oc3cccc4cnn(C)c34)C[C@@H]2C)s1]

N-(5-(((2S,4R)-2-methyl-4-((1-methyl-1H-indazol-7-yl)oxy)pyrrolidin-1-yl)methyl)thiazol-2-yl)acetamide: The title compound was prepared in an analogous manner of that in scheme 4 from tert-butyl (2S,4R)-2-methyl-4-((1-methyl-1H-indazol-7-yl)oxy)pyrrolidine-1-carboxylate and N-(5-formylthiazol-2-yl)acetamide. LCMS (ESI): [M+H]=386.1; $^1$HNMR (400 MHz, MeOH-$d_4$) δ: 7.96 (s, 1H), 7.74 (s, 1H), 7.35 (d, J=8.0 Hz, 1H), 7.05 (t, J=8.0 Hz, 1H), 6.78 (d, J=7.6 Hz, 1H), 5.29-5.30 (m, 1H), 4.60-4.64 (m, 1H), 4.31 (s, 3H), 3.82-3.84 (m, 3H), 3.07-3.14 (m, 1H), 2.26 (s, 3H), 2.17-2.24 (m, 2H), 1.62 (d, J=6.8 Hz, 3H).

Example 161

N-(4-fluoro-5-(((2S,4R)-2-methyl-4-((2-methyl-2H-indazol-7-yl)oxy)pyrrolidin-1-yl)methyl)thiazol-2-yl)acetamide: The title compound was prepared in an analogous manner of that in scheme 4 from tert-butyl (2S,4R)-2-methyl-4-((2-methyl-2H-indazol-7-yl)oxy)pyrrolidine-1-carboxylate and N-(4-fluoro-5-formylthiazol-2-yl)acetamide. LCMS (ESI): [M+H]=404.1; $^1$HNMR (500 MHz, MeOH-$d_4$) δ: 8.11 (s, 1H), 7.21 (d, J=8.5 Hz, 1H), 6.96 (t, J=7.5 Hz, 1H), 6.53 (d, J=7.5 Hz, 1H), 4.99-5.01 (m, 1H), 4.18 (s, 3H), 4.01-4.03 (m, 1H), 3.60-3.63 (m, 1H), 3.32-3.37 (m, 1H), 2.64-2.81 (m, 3H), 2.20 (s, 3H), 1.85-1.88 (m, 1H), 1.29 (d, J=6.0 Hz, 3H).

Scheme 5
Compounds of Formula IV may alternatively be prepared using the chemistry described in Scheme 4.

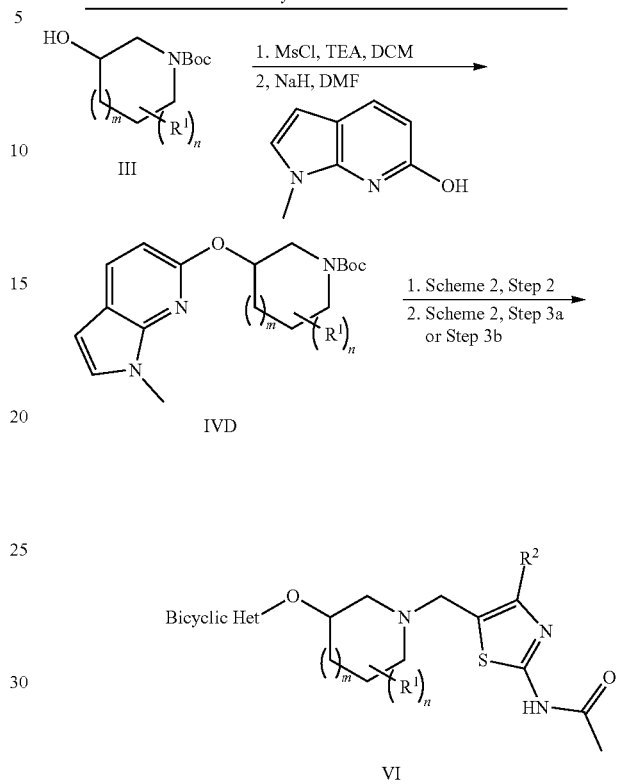

Intermediate 61

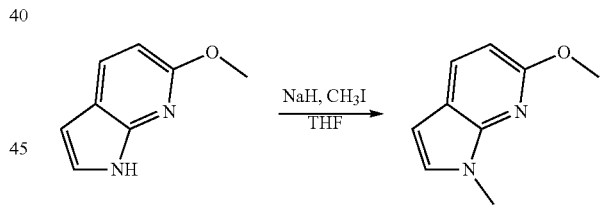

6-methoxy-1-methyl-1H-pyrrolo[2,3-b]pyridine: To a solution of 6-methoxy-1H-pyrrolo[2,3-b]pyridine (500 mg, 3.37 mmol) in THF (15 mL) was added NaH (270 mg, 6.75 mmol, 60% purity) and the mixture stirred at 15° C. for 0.5 hour. CH$_3$I (575 mg, 4.05 mmol) was added and the resulting mixture stirred at 15° C. for 2 hours. The mixture was diluted with water (10 mL) and extracted with DCM (3×10 mL). The combined organics were dried and evaporated to dryness in vacuo to afford the title compound as a yellow oil (633 mg) which was used without further purification. LCMS (ESI): [M+H]=163.0; $^1$HNMR (500 MHz, CDCl$_3$) δ: 7.77 (d, J=8.5 Hz, 1H), 6.96 (d, J=3.0 Hz, 1H), 6.54 (d, J=8.5 Hz, 1H), 6.36 (d, J=3.5 Hz, 1H), 4.00 (s, 3H), 3.81 (s, 3H).

Intermediate 62

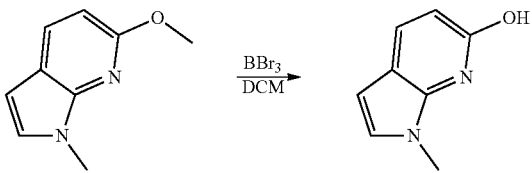

1-methyl-1H-pyrrolo[2,3-b]pyridin-6-ol: To a solution of 6-methoxy-1H-pyrrolo[2,3-b]pyridine (600 mg, 3.70 mmol) in DCM (10 mL) was added BBr₃ (927 mg, 3.70 mmol), the mixture was stirred at 40° C. for 3 hours. The reaction was evaporated to dryness in vacuo and the residue was diluted with water (10 mL) and the pH adjusted to pH 8-9 with K₂CO₃. The mixture was extracted with DCM (3×10 mL) and the combined organics were dried (Na₂SO₄) and evaporated to dryness in vacuo to give the title compound as a yellow solid (364.5 mg, 66%). ¹HNMR (400 MHz, MeOH-d₄) δ: 7.74 (d, J=8.4 Hz, 1H), 6.89 (d, J=3.6 Hz, 1H), 6.32 (d, J=8.8 Hz, 1H), 6.29 (d, J=3.6 Hz, 1H), 3.71 (s, 3H).

Intermediate 63

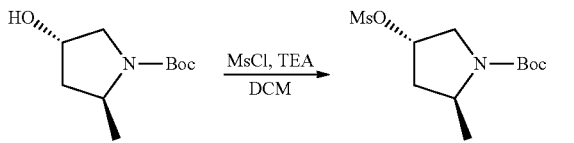 [SMILES: C[C@H]1C[C@H](O)CN1C(=O)OC(C)(C)C ; C[C@H]1C[C@H](OS(C)(=O)=O)CN1C(=O)OC(C)(C)C]

tert-butyl (2S,4S)-2-methyl-4-((methylsulfonyl)oxy)pyrrolidine-1-carboxylate: To a solution of tert-butyl (2S,4S)-4-hydroxy-2-methylpyrrolidine-1-carboxylate (200 mg, 0.994 mmol) and TEA (201 mg, 1.99 mmol) in DCM (10 mL) was added methanesulfonyl chloride (228 mg, 1.99 mmol) at 0° C. After addition, the mixture was stirred at 18° C. for 2 h. The reaction was quenched with aq. NaHCO₃ (8 mL) and extracted with DCM (10 mL×3). The combined organics were dried (Na₂SO₄) and evaporated Scheme to dryness to give the title compound as a yellow oil (243 mg, 87%) which was used without further purification. LCMS: ([M-Boc+H]= 163.0).

Intermediate 64

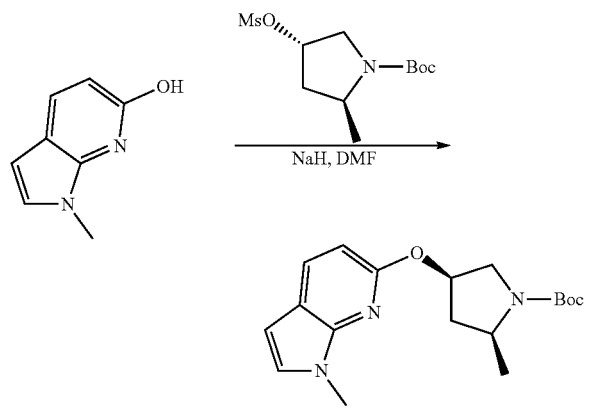

tert-butyl (2S,4R)-2-methyl-4-((1-methyl-1H-pyrrolo[2,3-b]pyridin-6-yl)oxy)pyrrolidine-1-carboxylate: A solution of 1-methyl-1H-pyrrolo[2,3-b]pyridin-6-ol (250 mg, 0.895 mmol) and NaH (71.6 mg, 1.79 mmol, 60% purity) in DMF (10 mL) stirred at 90° C. for 0.5 hour. To this was added tert-butyl (2S,4S)-2-methyl-4-((methylsulfonyl)oxy)pyrrolidine-1-carboxylate (146 mg, 0.984 mmol) and the mixture was stirred at 90° C. for 2 hours. The reaction was quenched with H₂O (10 mL) and extracted with DCM (3×10 mL). The combined organics were dried (Na₂SO₄) and evaporated to dryness in vacuo and the residue purified by column chromatograph on silica gel (petroleum ether/EtOAc; 2:1) to give the title compound as a red oil (312 mg). ¹HNMR (500 MHz, CDCl₃) δ: 7.76 (d, J=8.0 Hz, 1H), 6.96 (d, J=3.5 Hz, 1H), 6.51 (d, J=8.0 Hz, 1H), 6.35 (d, J=3.0 Hz, 1H), 5.56-5.57 (m, 1H), 4.04-4.10 (m, 1H), 3.87-3.99 (m, 1H), 3.77 (s, 3H), 3.58-3.66 (m, 1H), 2.40-2.41 (m, 1H), 1.97-2.03 (m, 1H), 1.47 (s, 9H), 1.35-1.37 (m, 3H).

Example 162

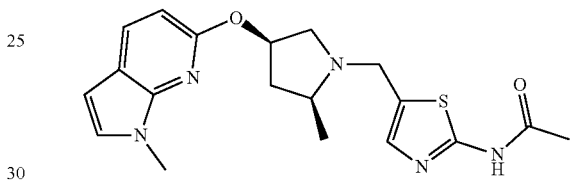

N-(5-(((2S,4R)-2-methyl-4-((1-methyl-1H-pyrrolo[2,3-b]pyridin-6-yl)oxy)pyrrolidin-1-yl)methyl)thiazol-2-yl)acetamide: The title compound was prepared in an analogous manner of that in scheme 5 from tert-butyl (2S,4R)-2-methyl-4-((1-methyl-1H-pyrrolo[2,3-b]pyridin-6-yl)oxy)pyrrolidine-1-carboxylate and N-(5-formylthiazol-2-yl)acetamide. LCMS (ESI): [M+H]=386.0; ¹HNMR (500 MHz, MeOH-d₄) δ: 7.74 (d, J=8.5 Hz, 1H), 7.29 (s, 1H), 7.05 (d, J=3.0 Hz, 1H), 6.47 (d, J=8.5 Hz, 1H), 6.31 (d, J=3.5 Hz, 1H), 5.38-5.42 (m, 1H), 4.14-4.17 (m, 1H), 3.75 (s, 3H), 3.57-3.60 (m, 1H), 3.17-3.19 (m, 1H), 2.74-2.77 (m, 1H), 2.60-2.66 (m, 2H), 2.19 (s, 3H), 1.69-1.73 (m, 1H), 1.27 (d, J=6.0 Hz, 3H).

Example 163

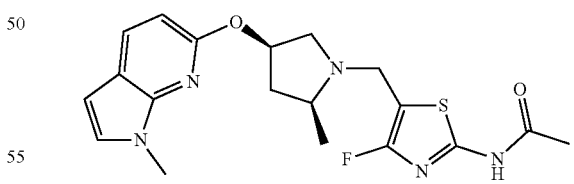

N-(4-fluoro-5-(((2S,4R)-2-methyl-4-((1-methyl-1H-pyrrolo[2,3-b]pyridin-6-yl)oxy)pyrrolidin-1-yl)methyl)thiazol-2-yl)acetamide: The title compound was prepared in an analogous manner of that in scheme 5 from tert-butyl (2S,4R)-2-methyl-4-((1-methyl-1H-pyrrolo[2,3-b]pyridin-6-yl)oxy)pyrrolidine-1-carboxylate and N-(4-fluoro-5-formylthiazol-2-yl)acetamide. LCMS (ESI): [M+H]=404.0; ¹HNMR (400 MHz, MeOH-d₄) δ: 7.75 (d, J=8.4 Hz, 1H), 7.06 (d, J=3.2 Hz, 1H), 6.48 (d, J=8.0 Hz, 1H), 6.32 (d, J=3.6 Hz, 1H), 5.37-5.41 (m, 1H), 3.97-4.00 (m, 1H), 3.76 (s, 3H), 3.58-

3.62 (m, 1H), 3.20-3.23 (m, 1H), 2.78-2.82 (m, 1H), 2.61-2.65 (m, 2H), 2.19 (s, 3H), 1.68-1.72 (m, 1H), 1.26 (d, J=6.0 Hz, 3H).

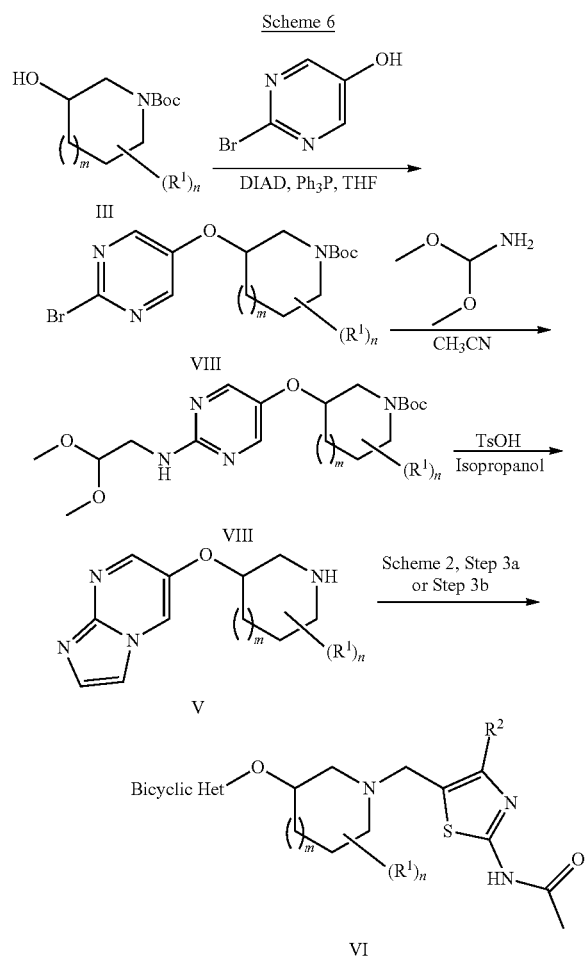

Intermediate 65

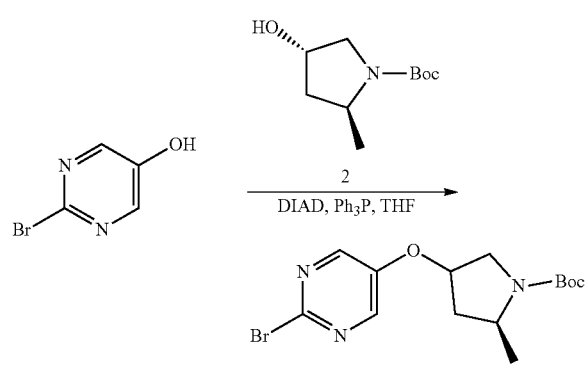

tert-butyl (2S,4R)-4-((2-bromopyrimidin-5-yl)oxy)-2-methylpyrrolidine-1-carboxylate: To a solution of tert-butyl (2S,4S)-4-hydroxy-2-methylpyrrolidine-1-carboxylate (200 mg, 0.997 mmol) and 2-bromopyrimidin-5-ol (158.1 mg, 0.903 mmol) in THF (8 mL) were added DIAD (274.01 mg, 1.36 mmol) and PPh₃ (284 mg, 1.08 mmol). The reaction was stirred at 40° C. for 16 hours. The reaction was evaporated to dryness and the residue was purified by column chromatography (petroleum ether/EtOAc; 6:1) to give the title compound as a colourless oil (243 mg, 75%). ¹HNMR (500 MHz, CDCl₃) δ: 8.22 (s, 2H), 4.87-4.92 (m, 1H), 3.97-4.11 (m, 1H), 3.73-3.85 (m, 1H), 3.55-3.70 (m, 1H), 2.35-2.45 (m, 1H), 1.95 (d, J=14.0 Hz, 1H), 1.47 (s, 9H), 1.32 (d, J=6.5 Hz, 3H).

Intermediate 66

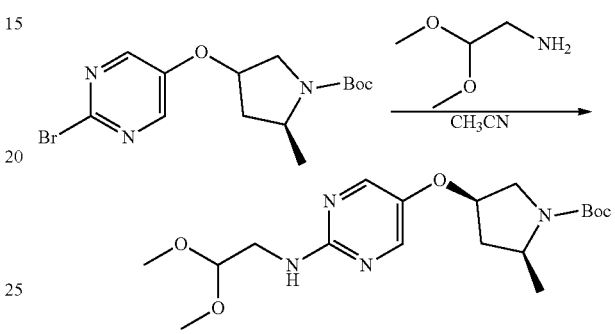

tert-butyl (2S,4R)-4-((2-((2,2-dimethoxyethyl)amino)pyrimidin-5-yl)oxy)-2-methylpyrrolidine-1-carboxylate: 2,2-dimethoxyethan-1-amine (2.91 g, 27.7 mmol) was added to a solution of tert-butyl (2S,4R)-4-((2-bromopyrimidin-5-yl)oxy)-2-methylpyrrolidine-1-carboxylate (150 mg, 0.419 mmol) in MeCN (2 mL) and the reaction was stirred in microwave at 120° C. for 2 hours. The reaction was evaporated to dryness and the residue was purified by column chromatography (petroleum ether/EtOAc; 5:1) to give the title compound as a colourless oil (148 mg, 92%). ¹HNMR (500 MHz, CDCl₃) δ: 8.02 (s, 2H), 5.10 (t, J=5.5 Hz, 1H), 4.66-4.72 (m, 1H), 4.50 (t, J=5.5 Hz, 1H), 3.90-4.10 (m, 1H), 3.57-3.75 (m, 2H), 3.41 (s, 6H), 2.77 (dd, J=17.0, 5.0 Hz, 1H), 2.23-2.32 (m, 1H), 1.92 (d, J=14.0 Hz, 1H), 1.47 (s, 9H), 1.34 (d, J=5.5 Hz, 3H).

Intermediate 67

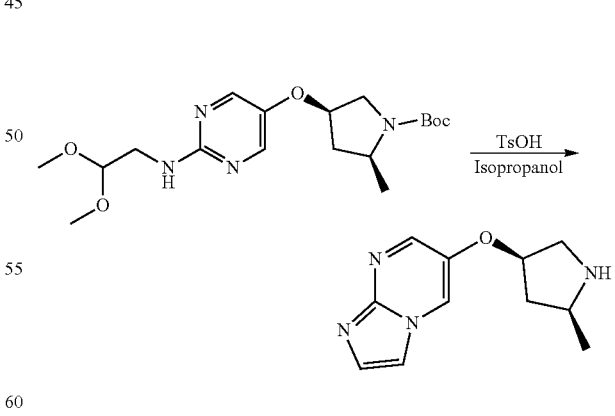

6-(((3R,5S)-5-methylpyrrolidin-3-yl)oxy)imidazo[1,2-a]pyrimidine: To a solution of tert-butyl (2S,4R)-4-((2-((2,2-dimethoxyethyl)amino)pyrimidin-5-yl)oxy)-2-methylpyrrolidine-1-carboxylate (148 mg, 0.387 mmol) in IPA (5 mL) was added 4-methylbenzenesulfonic acid (200 mg, 1.16 mmol) at 20° C. and the resulting mixture was stirred at 100° C. for 16 hours. The reaction mixture was evaporated to dryness in vacuo and the residue was purified by prep-HPLC ((Welch Xtimate C18 150*25 mm*5 um, Condition: water (0.04% NH₃H₂O+10 mM NH₄HCO₃)-ACN, Begin B: 6; End B: 36, Gradient Time (min): 10, 100% B Hold Time (min): 2, Flow Rate (ml/min): 25)) to give the title compound as a colourless oil (24 mg, 28%). LCMS (ESI): [M+H]=218.9

Example 164

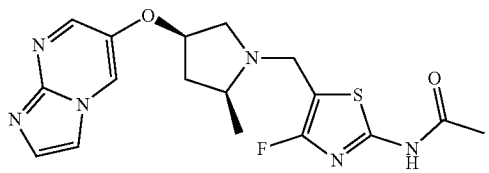 [SMILES: CC(=O)Nc1nc(F)c(CN2C[C@H](Oc3cnc4nccn4c3)C[C@@H]2C)s1]

N-(4-fluoro-5-(((2S,4R)-4-(imidazo[1,2-a]pyrimidin-6-yloxy)-2-methylpyrrolidin-1-yl)methyl)thiazol-2-yl)acetamide: The title compound was prepared in an analogous manner of that in scheme 6 from 6-(((3R,5S)-5-methylpyrrolidin-3-yl)oxy)imidazo[1,2-a]pyrimidine and N-(4-fluoro-5-formylthiazol-2-yl)acetamide. LCMS (ESI): [M+H] =391.0; ¹HNMR (400 MHz, MeOH-d₄) δ: 8.47 (d, J=2.8 Hz, 1H), 8.39 (d, J=2.8 Hz, 1H), 7.73 (d, J=1.6 Hz, 1H), 7.64 (d, J=1.6 Hz, 1H), 4.75-4.82 (m, 1H), 4.06 (d, J=14.8 Hz, 1H), 3.68 (d, J=14.4 Hz, 1H), 3.27-3.30 (m, 1H), 2.74-2.79 (m, 1H), 2.62-2.79 (m, 2H), 2.17 (s, 3H), 1.67-1.76 (m, 1H), 1.29 (d, J=6.0 Hz, 3H).

Intermediate 68

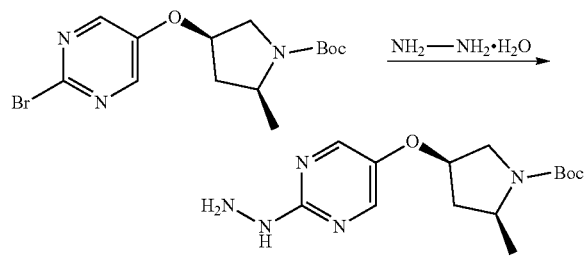

tert-butyl (2S,4R)-4-((2-hydrazineylpyrimidin-5-yl)oxy)-2-methylpyrrolidine-1-carboxylate: tert-butyl (2S,4R)-4-((2-bromopyrimidin-5-yl)oxy)-2-methylpyrrolidine-1-carboxylate (250 mg, 0.698 mmol) in hydrazine hydrate (5 mL, 85% purity) was stirred at 120° C. in a microwave reactor for 1 hour. The mixture was extracted with DCM (3×5 mL) and the combined organics dried (Na₂SO₄) and evaporated to dryness in vacuo to afford the title compound as a colourless oil (120 mg, 55%) which was used without further purification. LCMS (ESI): [M+H]=310.2

Intermediate 69

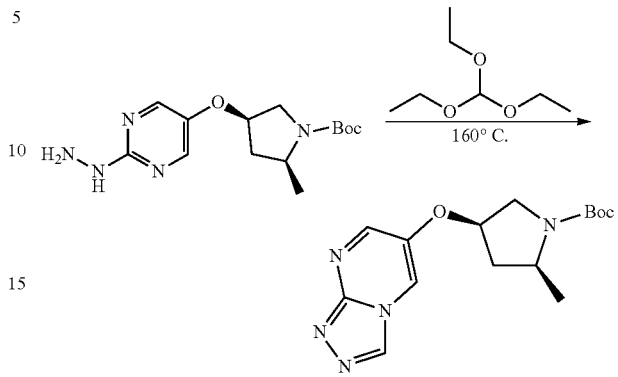

tert-butyl (2S,4R)-4-([1,2,4]triazolo[4,3-a]pyrimidin-6-yloxy)-2-methylpyrrolidine-1-carboxylate: tert-butyl (2S, 4R)-4-((2-hydrazineylpyrimidin-5-yl)oxy)-2-methylpyrrolidine-1-carboxylate (100 mg, 0.323 mmol) in triethoxymethane (6 mL) was stirred at 160° C. for 5 hours. The mixture was evaporated to dryness in vacuo and the residue purified by prep-HPLC (Column: Welch Xtimate C18 150×30 mm Sum; H₂O (10 mM NH₄HCO₃)-MeCN; 25-55%) to afford the title compound as a white solid (10 mg, 9.7%). ¹HNMR (400 MHz, MeOH-d₄) δ: 9.01 (s, 1H), 8.63 (d, J=2.8 Hz, 1H), 8.52 (d, J=2.8 Hz, 1H), 4.97-5.01 (m, 1H), 4.04-4.09 (m, 1H), 3.78-3.83 (m, 1H), 3.66-3.70 (m, 1H), 2.46-2.49 (m, 1H), 2.07-2.11 (m, 1H), 1.48 (s, 9H), 1.36 (d, J=6.4 Hz, 3H).

Example 165

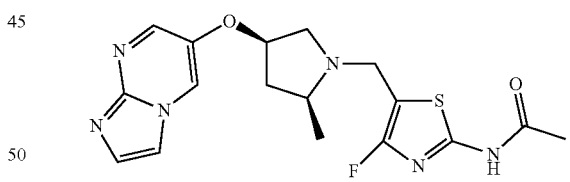

N-(5-(((2S,4R)-4-([1,2,4]triazolo[4,3-a]pyrimidin-6-yloxy)-2-methylpyrrolidin-1-yl)methyl)-4-fluorothiazol-2-yl)acetamide: The title compound was prepared in an analogous manner of that in scheme 6 from tert-butyl (2S,4R)-4-([1,2,4]triazolo[4,3-a]pyrimidin-6-yloxy)-2-methylpyrrolidine-1-carboxylate and N-(4-fluoro-5-formylthiazol-2-yl)acetamide. LCMS (ESI): [M+H]=392.0; ¹HNMR (400 MHz, MeOH-d₄) δ: 8.83 (d, J=3.2 Hz, 1H), 8.72 (d, J=2.8 Hz, 1H), 8.44 (s, 1H), 5.17-5.19 (m, 1H), 4.01 (d, J=14.8 Hz, 1H), 3.62 (d, J=14.4 Hz, 1H), 3.25-3.29 (m, 1H), 2.65-2.73 (m, 3H), 2.18 (s, 3H), 1.67-1.90 (m, 1H), 1.27 (d, J=6.0 Hz, 3H).

Scheme 7

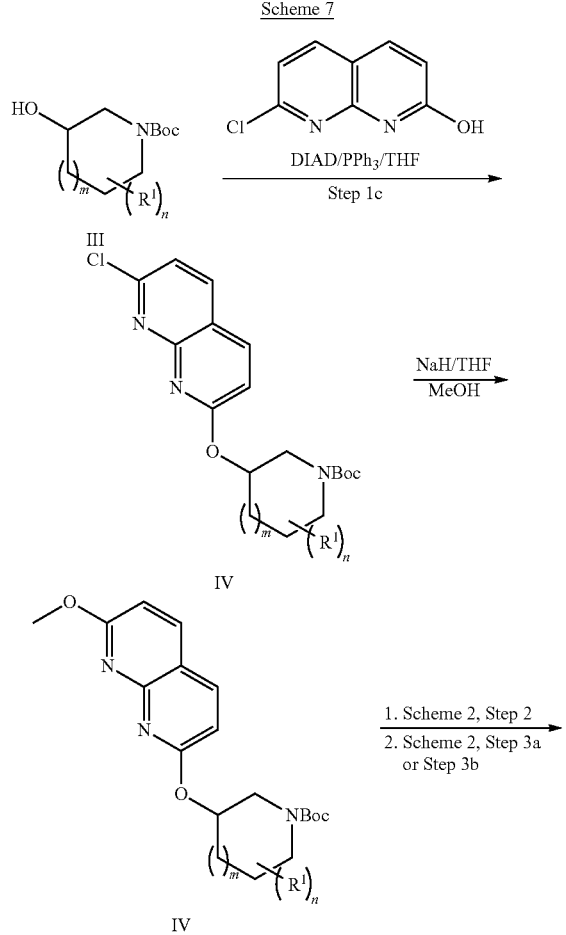

Intermediate 70

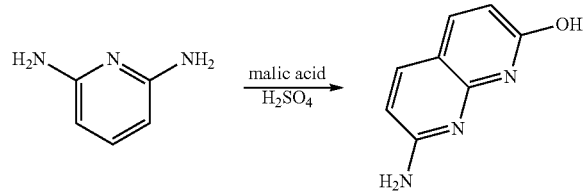

7-amino-1,8-naphthyridin-2-ol: Sulfuric acid (6 mL) was added dropwise to a mixture of 2,6-diaminopyridine (1.0 g, 9.16 mmol) and malic acid (1.35 g, 10.08 mmol) at 0° C. and the mixture stirred at 120° C. for 12 hours. The mixture was added to water (20 mL) dropwise and adjusted to pH 7-8 with NH₄OH and the solids collected by filtration to afford the title compound as a pale yellow solid (1.45 g, 98%). ¹HNMR (400 MHz, DMSO-d₆) δ: 11.72 (brs, 1H), 7.64 (d, J=9.6 Hz, 2H), 6.88 (s, 2H), 6.33 (d, J=8.4 Hz, 1H), 6.10 (d, J=9.2 Hz, 1H).

Intermediate 71

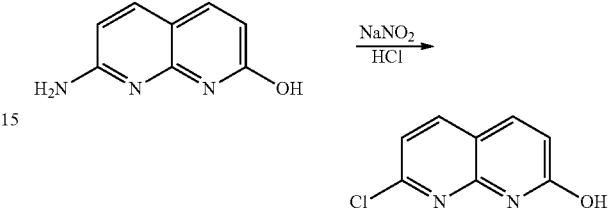

7-chloro-1,8-naphthyridin-2-ol: Sodium nitrite (389.3 mg, 5.64 mmol) in water (1 mL) was added dropwise to a mixture of 7-amino-1,8-naphthyridin-2-ol (700.0 mg, 4.34 mmol) in HCl (5 mL) at 0° C. and the mixture stirred at this temperature for 1 hour. The mixture was adjusted to pH 6~7 with KOH (aq.) and extracted with DCM (3×20 mL). The combined organics were dried (Na₂SO₄) and evaporated to dryness to afford the title compound as a yellow solid (120 mg, 15%). ¹HNMR (500 MHz, DMSO-d₆) δ: 12.37 (brs, 1H), 8.16 (d, J=7.5 Hz, 1H), 7.95 (d, J=9.5 Hz, 1H), 7.32 (d, J=8.0 Hz, 1H), 6.59 (d, J=9.5 Hz, 1H).

Intermediate 72

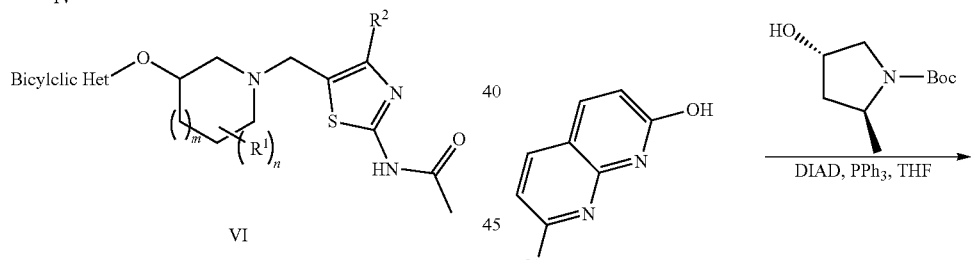

tert-butyl (2S,4R)-4-((7-chloro-1,8-naphthyridin-2-yl)oxy)-2-methylpyrrolidine-1-carboxylate: DIAD (241.1 mg, 1.19 mmol) was added to a mixture of 7-chloro-1,8-naphthyridin-2-ol (107.7 mg, 0.596 mmol), tert-butyl (2S,4S)-4-hydroxy-2-methylpyrrolidine-1-carboxylate (120 mg, 0.596 mmol) and PPh₃ (312.8 mg, 1.19 mmol) in THF (5 mL) and the mixture was stirred at 20° C. for 10 hours. The mixture was evaporated to dryness in vacuo and the residue was purified by column chromatography on silica gel (petroleum ether/EtOAc; 3:1) to give the title compound as a white solid (180 mg). LCMS (ESI): [M+H]=364.1

Intermediate 73

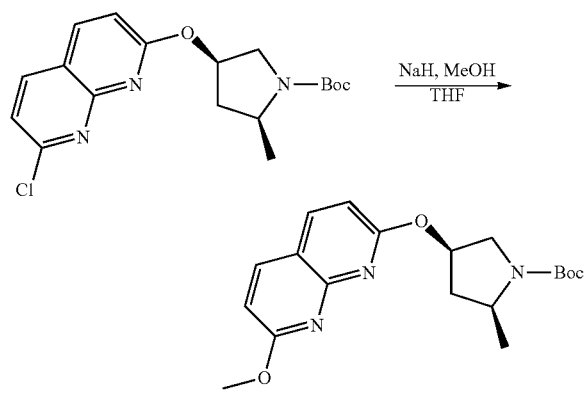

tert-butyl (2S,4R)-4-((7-methoxy-1,8-naphthyridin-2-yl)oxy)-2-methylpyrrolidine-1-carboxylate: NaH (59.4 mg, 1.48 mmol, 60% purity) was added to a mixture of tert-butyl (2S,4R)-4-((7-chloro-1,8-naphthyridin-2-yl)oxy)-2-methylpyrrolidine-1-carboxylate (180.0 mg, 0.495 mmol) and MeOH (47.6 mg, 1.48 mmol) in THF (15 mL) and the mixture stirred at 50° C. for 0.5 hour. The mixture was quenched with NH$_4$Cl (sat, 5 mL) and extracted with EtOAc (3×10 mL) The combined organics were dried (Na$_2$SO$_4$) and evaporated to dryness in vacuo and the residue purified by prep-TLC (petroleum ether/EtOAc; 2:1) to give the title compound as a white solid (99 mg, 55%). LCMS (ESI): [M+H]=360.1; $^1$HNMR (500 MHz, CDCl$_3$) δ: 7.90 (t, J=8.5 Hz, 2H), 6.79-6.84 (m, 2H), 5.98-6.01 (m, 1H), 4.13 (s, 3H), 3.98-4.03 (m, 1H), 3.78-3.88 (m, 1H), 3.57-3.64 (m, 1H), 2.44-2.46 (m, 1H), 1.96-2.01 (m, 1H), 1.47 (s, 9H), 1.35-1.38 (m, 3H).

Example 166

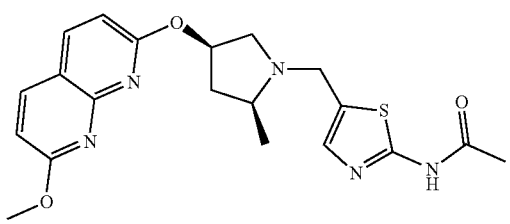 [SMILES: COc1ccc2ccc(O[C@@H]3C[C@H](C)N(Cc4cnc(NC(C)=O)s4)C3)nc2n1]

N-(5-((((2S,4R)-4-((7-methoxy-1,8-naphthyridin-2-yl)oxy)-2-methylpyrrolidin-1-yl)methyl)thiazol-2-yl)acetamide: The title compound was prepared in an analogous manner of that in scheme 7 from tert-butyl (2S,4R)-4-((7-methoxy-1,8-naphthyridin-2-yl)oxy)-2-methylpyrrolidine-1-carboxylate and N-(5-formylthiazol-2-yl)acetamide. LCMS (ESI): [M+H]=414.0; $^1$HNMR (400 MHz, MeOH-d$_4$) δ: 8.05 (d, J=8.4 Hz, 2H), 7.28 (s, 1H), 6.86 (d, J=8.4 Hz, 2H), 5.57-5.61 (m, 1H), 4.14-4.18 (m, 1H), 4.06 (s, 3H), 3.57-3.60 (m, 1H), 3.17-3.19 (m, 1H), 2.59-2.77 (m, 3H), 2.18 (s, 3H), 1.70-1.74 (m, 1H), 1.28 (d, J=6.0 Hz, 3H).

Example 167

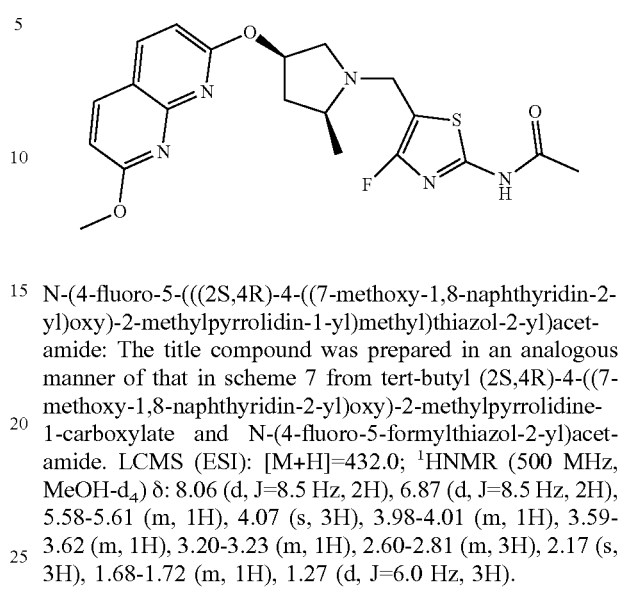

N-(4-fluoro-5-((((2S,4R)-4-((7-methoxy-1,8-naphthyridin-2-yl)oxy)-2-methylpyrrolidin-1-yl)methyl)thiazol-2-yl)acetamide: The title compound was prepared in an analogous manner of that in scheme 7 from tert-butyl (2S,4R)-4-((7-methoxy-1,8-naphthyridin-2-yl)oxy)-2-methylpyrrolidine-1-carboxylate and N-(4-fluoro-5-formylthiazol-2-yl)acetamide. LCMS (ESI): [M+H]=432.0; $^1$HNMR (500 MHz, MeOH-d$_4$) δ: 8.06 (d, J=8.5 Hz, 2H), 6.87 (d, J=8.5 Hz, 2H), 5.58-5.61 (m, 1H), 4.07 (s, 3H), 3.98-4.01 (m, 1H), 3.59-3.62 (m, 1H), 3.20-3.23 (m, 1H), 2.60-2.81 (m, 3H), 2.17 (s, 3H), 1.68-1.72 (m, 1H), 1.27 (d, J=6.0 Hz, 3H).

Scheme 8

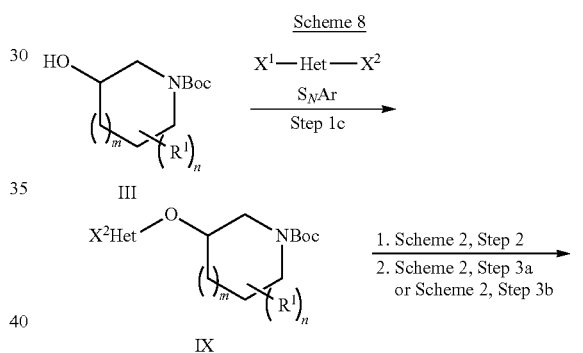

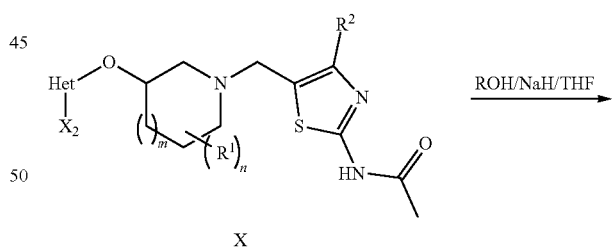

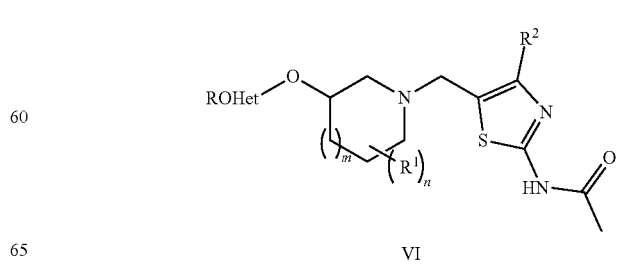

Intermediate 74

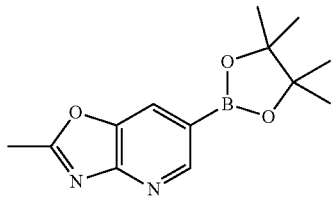

2-Methyl-6-(4,4,5,5-tetramethyl-1,3,2-dioxaborolan-2-yl)oxazolo[4,5-b]pyridine: A mixture of 6-bromo-2-methyl-oxazolo[4,5-b]pyridine (1.0 g, 4.7 mmol) and KOAc (921 mg, 9.4 mmol), Pd(dppf)Cl$_2$ DCM (77 mg, 94 umol) and 4,4,5,5-tetramethyl-2-(4,4,5,5-tetramethyl-1,3,2-dioxaborolan-2-yl)-1,3,2-dioxaborolane (1.79 g, 7.0 mmol) in dioxane (15 mL) was back filled with nitrogen. The reaction was heated at 100° C. for 2 h. Diluted with EtOAc, the mixture was filtered through short silica gel plug. The filtrate was concentrated to give crude title compound (2.6 g) as a brown solid which was used in the next step without further purifications. LCMS (ESI): [M+H] 261; $^1$H NMR (400 MHz, CHLOROFORM-d) δ 8.89 (d, J=1.25 Hz, 1H), 8.12 (d, J=1.25 Hz, 1H), 2.73 (s, 3H), 1.38 (s, 12H).

Intermediate 75

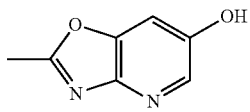

2-Methyloxazolo[4,5-b]pyridin-6-ol: To a solution of 2-methyl-6-(4,4,5,5-tetramethyl-1,3,2-dioxaborolan-2-yl)oxazolo[4,5-b]pyridine (1.0 g, 3.8 mmol) in THF (10 mL) was added hydrogen peroxide (30% in water, 1.0 mL). The reaction was stirred at rt overnight. Remove all the solvent, the residue was diluted with ether, the ppt formed was filtered and dried to give the title compound (448 mg, 78% yield) as a tan color solid. LCMS (ESI): [M+H] 151; H NMR (400 MHz, METHANOL-d$_4$) δ 8.03 (d, J=2.26 Hz, 1H), 7.40 (d, J=2.51 Hz, 1H), 2.63 (s, 3H).

Intermediate 76

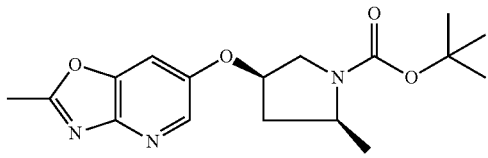 [SMILES: Cc1nc2ncc(O[C@@H]3C[C@H](C)N(C(=O)OC(C)(C)C)C3)cc2o1]

tert-Butyl (2S,4R)-2-methyl-4-((2-methyloxazolo[4,5-b]pyridin-6-yl)oxy)pyrrolidine-1-carboxylate: To a solution of triphenylphosphine (350 mg, 1.33 mmol) in THF (6.0 mL) was dropwise added DIAD (1.33 mmol, 262 uL). Light yellow ppt formed after 5 min. The reaction mixture was stirred at rt for 30 min. A solution of tert-butyl (2S,4S)-4-hydroxy-2-methyl-pyrrolidine-1-carboxylate (223 mg, 1.11 mmol) in THF (2.0 mL) and added dropwise to the reaction, followed by a mixture of 2-methyloxazolo[4,5-b]pyridin-6-ol (200 mg, 1.33 mmol) in THF (2.0 mL). The reaction was then stirred at 40° C. overnight. The reaction mixture was concentrated down and the crude was purified by chromatography on silica gel (0-60% EtOAc-EtOH 3:1 with 2% NH4OH in heptane) to give the title compound (252 mg, 68% yield). LCMS (ESI): [M+H] 334; $^1$H NMR (400 MHz, METHANOL-d$_4$) δ 8.17 (d, J=2.51 Hz, 1H), 7.73 (d, J=2.51 Hz, 1H), 5.05-5.13 (m, 1H), 3.99-4.08 (m, 1H), 3.78 (dd, J=5.02, 12.55 Hz, 1H), 3.57-3.66 (m, 1H), 2.67 (s, 3H), 2.44 (br s, 1H), 1.94-2.02 (m, 1H), 1.48 (s, 9H), 1.35 (d, J=6.27 Hz, 3H).

Intermediate 77

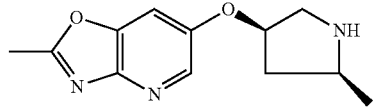

2-Methyl-6-(((3R,5S)-5-methylpyrrolidin-3-yl)oxy)oxazolo[4,5-b]pyridine: To a solution of tert-butyl (2S,4R)-2-methyl-4-(2-methyloxazolo[4,5-b]pyridin-6-yl)oxy-pyrrolidine-1-carboxylate (150 mg, 450 umol) in DCM (4.0 mL) was added TFA (344 uL, 4.50 mmol). The reaction was stirred at rt overnight. Remove all the solvent to give the title compound (278 mg) as a colorless oil which was used in the next step without further purifications. LCMS (ESI): [M+H] 234.

Example 168

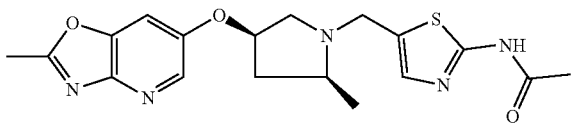 [SMILES: CC(=O)Nc1ncc(CN2C[C@H](Oc3cnc4nc(C)oc4c3)C[C@@H]2C)s1]

N-(5-(((2S,4R)-2-Methyl-4-((2-methyloxazolo[4,5-b]pyridin-6-yl)oxy)pyrrolidin-1-yl)methyl)thiazol-2-yl)acetamide: To a mixture of 2-methyl-6-[(3R,5S)-5-methylpyrrolidin-3-yl]oxy-oxazolo[4,5-b]pyridine (50 mg, 108.4 umol, TFA salt) and N-[5-(chloromethyl)thiazol-2-yl]acetamide (41.3 mg, 216.8 umol) in acetonitrile (1.00 mL) and DMF (200 uL) was added Hunigs base (114 uL 650 umol). The reaction was stirred at rt for 1 h. Diluted with EtOAc, washed with water (3×), then brine. The organic layer was then separated, dried and concentrated. The crude was purified by chromatography on silica gel (solvent A: EtOAc, solvent B: 0-60% EtOAc-EtOH 3:1 with 2% NH$_4$OH) to give the title compound (29 mg, 69% yield) as a white powder. LCMS (ESI): [M+H] 388; $^1$H NMR (400 MHz, METHANOL-d$_4$) δ 8.12 (d, J=2.51 Hz, 1H), 7.62 (d, J=2.51 Hz, 1H), 7.32 (s, 1H), 4.91 (br d, J=8.53 Hz, 1H), 4.24 (br d, J=13.55 Hz, 1H), 3.68 (br s, 1H), 3.18-3.29 (m, 1H), 2.67-2.84 (m, 2H), 2.65 (s, 3H), 2.19 (s, 3H), 1.72 (br t, J=9.79 Hz, 1H), 1.30 (d, J=5.77 Hz, 4H).

Example 169

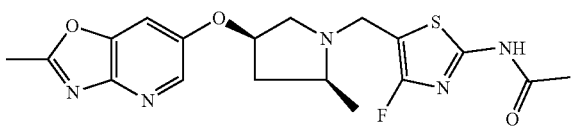 [SMILES: CC(=O)Nc1nc(F)c(CN2C[C@H](Oc3cnc4nc(C)oc4c3)C[C@@H]2C)s1]

N-(4-Fluoro-5-(((2S,4R)-2-methyl-4-((2-methyloxazolo[4,5-b]pyridin-6-yl)oxy)pyrrolidin-1-yl)methyl)thiazol-2-yl)acetamide: To a solution of 2-methyl-6-[(3R,5S)-5-methylpyrrolidin-3-yl]oxy-oxazolo[4,5-b]pyridine (80 mg, 139 umol, TFA salt) in EtOAc (2.0 mL) was added Hunigs base (48.57 uL 278.10 umol). Stirred for 5 min. Sodium triacetoxyborohydride (88 mg, 417 umol) was added, followed by N-(4-fluoro-5-formyl-thiazol-2-yl) acetamide (52 mg, 278 umol). The reaction was heated at 60° C. for 2 h. Cooled down, the reaction mixture was washed with aq. NaHCO$_3$, the organic layer was separated, dried and concentrated. The crude was purified by chromatography on silica gel (0-80% EtOAc-EtOH 3:1 with 2% NH$_4$OH in heptane) to give the title compound (11 mg, 20% yield) as a white powder. LCMS (ESI): [M+H] 406; $^1$H NMR (400 MHz, METHANOL-d$_4$) δ 8.12 (d, J=2.51 Hz, 1H), 7.61 (d, J=2.51 Hz, 1H), 4.87-4.92 (m, 1H), 4.02 (d, J=14.56 Hz, 1H), 3.63 (d, J=14.56 Hz, 1H), 3.23 (d, J=11.04 Hz, 1H), 2.73 (dd, J=5.90, 11.17 Hz, 1H), 2.63-2.66 (m, 4H), 2.18 (s, 3H), 1.61-1.73 (m, 1H), 1.18-1.37 (m, 4H); $^{19}$F NMR (376 MHz, METHANOL-d$_4$) 6-78.50 (s, 1F, TFA), −119.01 (s, 1F).

Intermediate 78

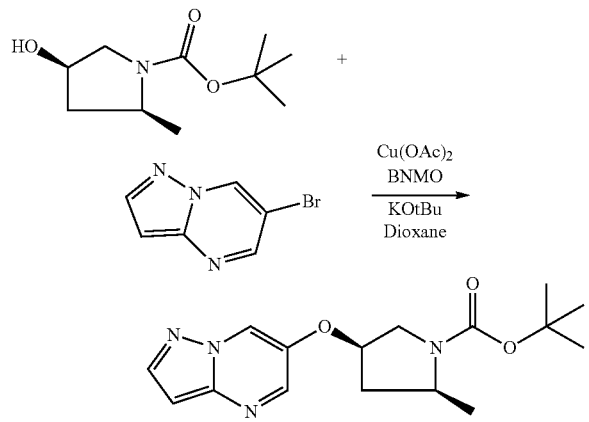

tert-butyl (2S,4R)-2-methyl-4-(pyrazolo[1,5-a]pyrimidin-6-yloxy)pyrrolidine-1-carboxylate: A mixture of tert-butyl (2S,4R)-4-hydroxy-2-methyl-pyrrolidine-1-carboxylate (3 g, 15 mmol), 6-bromopyrazolo[1,5-a]pyrimidine (983 mg, 5 mmol), KOtBu (836 mg, 7.5 mmol), N$^1$,N$^2$-bis(naphthalen-1-ylmethyl)oxalamide (BNMO) (183 mg, 497 umol), and Cu(OAc)$_2$ (45 mg, 248 umol) in Dioxane (20 mL) was sparged with N$_2$. The reaction was heated at 90° C. overnight. The reaction was diluted (EtOAc) and washed (NaHCO$_3$ (sat)). The organic layer was evaporated to dryness in vacuo and the residue purified by column chromatography over silica gel column (heptane to 3:1 EtOAc:EtOH) to afford the title compound (109 mg). LCMS (ESI): [M+H] 319

Intermediate 79

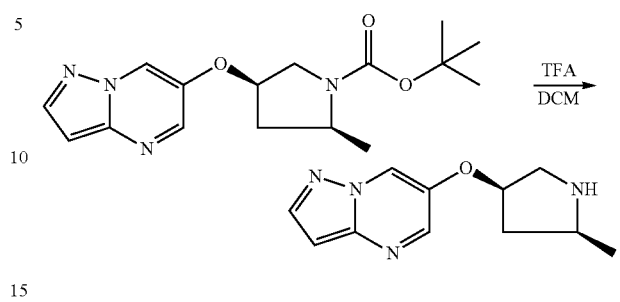

6-(((3R,5S)-5-methylpyrrolidin-3-yl)oxy)pyrazolo[1,5-a]pyrimidine: A solution of tert-butyl (2S,4R)-2-methyl-4-pyrazolo[1,5-a]pyrimidin-6-yloxy-pyrrolidine-1-carboxylate (109 mg, 342 umol), TFA (6.5 mmol, 500 uL), and DCM (500 uL) was stirred at rt. After 3 h, the solvent was removed to afford the title compound. LCMS (ESI): [M+H] 219.

Example 170

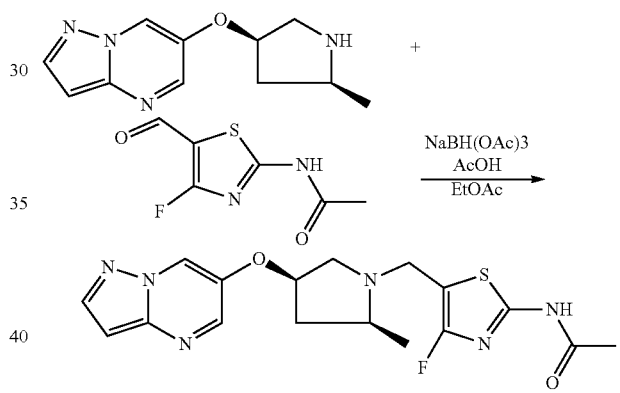

N-(4-fluoro-5-(((2S,4R)-2-methyl-4-(pyrazolo[1,5-a]pyrimidin-6-yloxy)pyrrolidin-1-yl)methyl)thiazol-2-yl)acetamide: N-(4-fluoro-5-formyl-thiazol-2-yl)acetamide (15.5 mg, 82.5 umol) was added to a mixture of 6-[(3R,5S)-5-methylpyrrolidin-3-yl]oxypyrazolo[1,5-a]pyrimidine (15 mg, 69 umol), Acetic acid (4 uL), and NaBH(OAc)$_3$ (44 mg, 206 umol) in EtOAc (3 mL). The mixture was heated (40 C) for 3 h. The reaction was extracted (1 N HCL). The combined aqueous layer was neutralized with 50% NaOH. The product was extracted with DCM and the organic layer was evaporated. The product was purified by prep HPLC 0.1% TFA to afford the title compound (12 mg). LCMS (ESI): [M+H] 391; $^1$H NMR (500 MHz, METHANOL-d$_4$) δ 8.68 (d, J=7.48 Hz, 1H), 8.00 (d, J=2.29 Hz, 1H), 6.50 (d, J=7.48 Hz, 1H), 6.37 (dd, J=0.69, 2.21 Hz, 1H), 5.67-5.73 (m, 1H), 4.70 (br d, J=14.80 Hz, 1H), 4.48 (d, J=14.80 Hz, 1H), 3.86 (br d, J=12.66 Hz, 1H), 3.68-3.80 (m, 2H), 3.00 (td, J=7.61, 14.84 Hz, 1H), 2.21 (s, 3H), 2.00-2.13 (m, 1H), 1.57 (d, J=6.56 Hz, 3H).

Intermediate 80

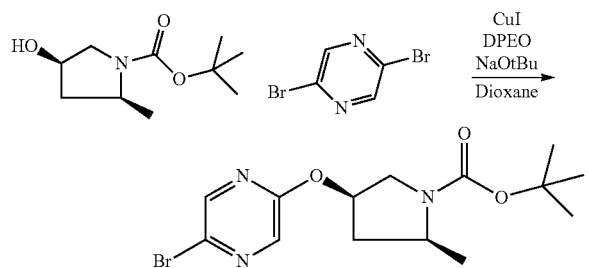

(2S,4R)-4-((5-bromopyrazin-2-yl)oxy)-2-methylpyrrolidine-1-carboxylic acid: Dioxane (5 mL) was added to vial containing tert-butyl (2S,4R)-4-hydroxy-2-methyl-pyrrolidine-1-carboxylate (1 g, 5 mmol), 2,5-dibromopyrazine (1.2 g, 5 mmol), Sodium tert-butoxide (573 mg, 5.96 mmol), $N^1,N^2$-diphenethyloxalamide (DPEO) (147 mg, 497 umol), CuI (96 mg, 497 umol) and activated 3A MS (500 mg). After the mixture was sparged $N_2$ for 10 min, the reaction was heated (90 C) overnight. The reaction was diluted (EtOAc) and filtered. The organic layer was evaporated to dryness in vacuo and the residue purified by column chromatography over silica gel column (heptane to 3:1 EtOAc:EtOH) to afford the title compound (700 mg, 39%). LCMS (ESI): [M-tBu] 304.

Intermediate 81

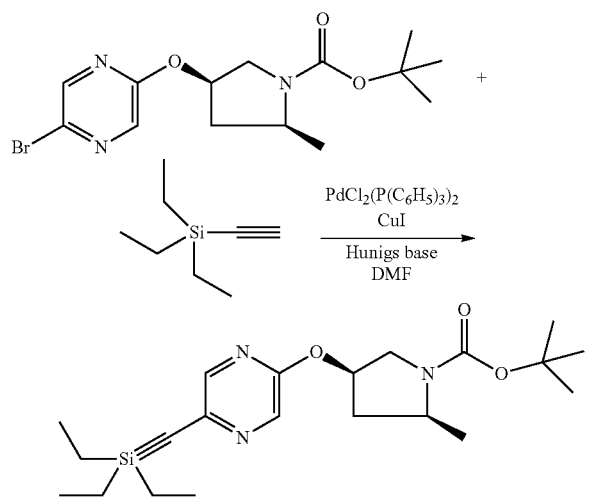

tert-butyl (2S,4R)-2-methyl-4-((5-((triethylsilyl)ethynyl)pyrazin-2-yl)oxy)pyrrolidine-1-carboxylate: DMF (8.8 mL) was added to a round bottom containing tert-butyl (2S,4R)-4-(5-bromopyrazin-2-yl)oxy-2-methyl-pyrrolidine-1-carboxylate (1.6 g, 4.4 mmol), CuI (84 mg, 441 umol) and trans-Dichlorobis(triphenylphosphine)palladium (155 mg, 221 umol). The reaction was sparged with $N_2$ for 15 min. triethyl(ethynyl)silane (5.3 mmol, 952 uL) and Hunigs base (5.3 mmol, 924 uL) were added to the reaction. The reaction was sparged with $N_2$ for an additional 10 min and then the reaction was stirred overnight at rt. The reaction was diluted (EtOAc), washed (water then brine) and the organic layer was dried ($Na_2SO_4$). The organic layer was evaporated to dryness in vacuo and the residue purified by column chromatography over silica gel column (heptane to EtOAc) to afford the title compound (1.29 mg, 70%) as a brown oil. LCMS (ESI): [M+H] 418. $^1$H NMR (500 MHz, CHLOROFORM-d) δ 8.24 (s, 1H), 8.17 (s, 1H), 5.47-5.54 (m, 1H), 3.98-4.17 (m, 1H), 3.81 (br s, 1H), 3.58 (br s, 1H), 2.36-2.49 (m, 1H), 1.94 (br d, J=14.04 Hz, 1H), 1.49 (s, 9H), 1.36 (br d, J=5.19 Hz, 3H), 1.01-1.12 (m, 9H), 0.73 (q, J=7.88 Hz, 6H).

Intermediate 82

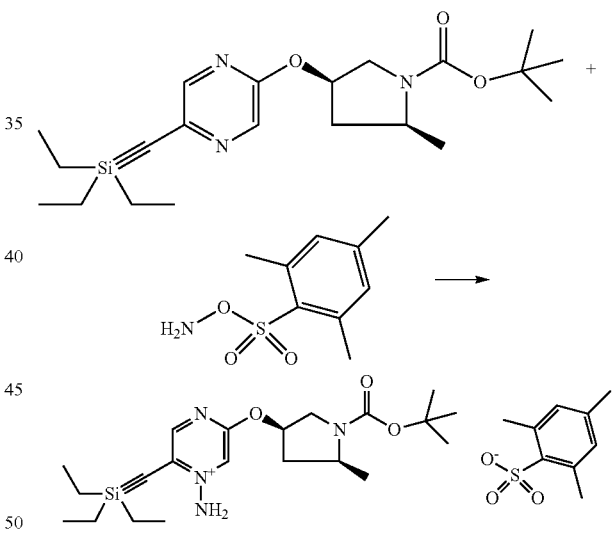

1-amino-5-(((3R,5S)-1-(tert-butoxycarbonyl)-5-methylpyrrolidin-3-yl)oxy)-2-((triethylsilyl)ethynyl)pyrazin-1-ium 2,4,6-trimethylbenzenesulfonate: A solution of tert-butyl (2S,4R)-2-methyl-4-[5-(2-triethylsilylethynyl)pyrazin-2-yl]oxy-pyrrolidine-1-carboxylate (1.29 g, 3.1 mmol) in DCM (3 mL) was added dropwise to a solution of amino 2,4,6-trimethylbenzenesulfonate (1.13 g, 5.3 mmol) in DCM (5.25 ml). After the reaction was stirred overnight at rt, the solvent was removed in vacuo. The solid was suspended in MTBE and sonicated. The resulting solid was filtered was dried at 60° C. under vacuum. LCMS (ESI): [M] 433.

Intermediate 83

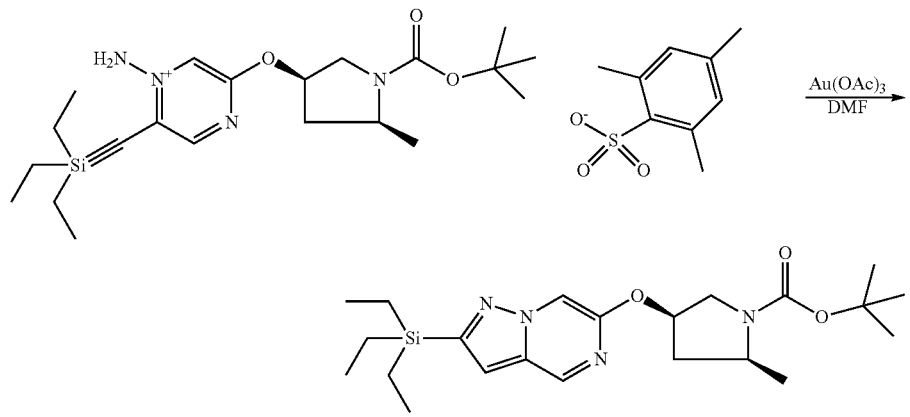

tert-butyl (2S,4R)-2-methyl-4-((2-(triethylsilyl)pyrazolo[1,5-a]pyrazin-6-yl)oxy)pyrrolidine-1-carboxylate: A mixture of 1-amino-5-(((3R,5S)-1-(tert-butoxycarbonyl)-5-methylpyrrolidin-3-yl)oxy)-2-((triethylsilyl)ethynyl)pyrazin-1-ium 2,4,6-trimethylbenzenesulfonate (1.30 g), and Au(OAc)₃ (56 mg, 150 umol) in DMF (10 mL) was stirred at rt overnight. The reaction was diluted (EtOAc) and washed (water). The organic layer was evaporated to dryness in vacuo and the residue purified by column chromatography over silica gel column (heptane to EtOAc) to afford the title compound (361 mg, 28%) as a clear oil. LCMS (ESI): [M+H] 433. ¹H NMR (500 MHz, CHLOROFORM-d) δ 8.76 (s, 1H), 8.10 (d, J=1.07 Hz, 1H), 6.89 (s, 1H), 5.39 (br t, J=5.34 Hz, 1H), 3.94-4.18 (m, 1H), 3.78 (br s, 1H), 3.65 (br s, 1H), 2.37 (br s, 1H), 1.97 (br d, J=13.43 Hz, 1H), 1.49 (s, 9H), 1.39 (br d, J=4.88 Hz, 3H), 0.99-1.08 (m, 9H), 0.83-0.94 (m, 6H).

Intermediate 84

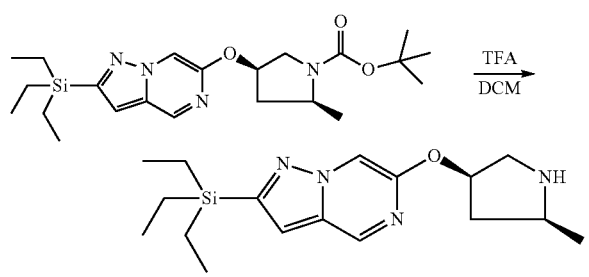

6-(((3R,5S)-5-methylpyrrolidin-3-yl)oxy)-2-(triethylsilyl)pyrazolo[1,5-a]pyrazine: TFA (1.00 mL) was added to a solution of tert-butyl (2S,4R)-2-methyl-4-(2-triethylsilylpyrazolo[1,5-a]pyrazin-6-yl)oxy-pyrrolidine-1-carboxylate (361 mg, 834 umol) in DCM (1 mL). After 3 h, the solvent was removed to afford the title compound. LCMS (ESI): [M+1] 333.

Intermediate 85

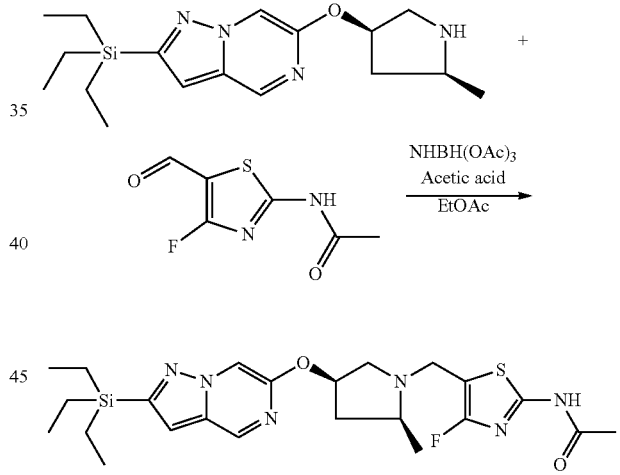

N-(4-fluoro-5-(((2S,4R)-2-methyl-4-((2-(triethylsilyl)pyrazolo[1,5-a]pyrazin-6-yl)oxy)pyrrolidin-1-yl)methyl)thiazol-2-yl)acetamide: N-(4-fluoro-5-formyl-thiazol-2-yl)acetamide (157 mg, 834 umol) was added to a mixture of triethyl-[6-[(3R,5S)-5-methylpyrrolidin-3-yl]oxypyrazolo[1,5-a]pyrazin-2-yl]silane (277 mg, 834 umol) NaBH(OAc)₃ (530 mg, 2.5 mmol) Acetic acid (48 uL) in EtOAc (3 mL). The mixture was stirred overnight. The product was extracted with 1N HCL The acid layer was neutralized 50% NaOH, extracted (DCM) and then the organic layer was evaporated to afford the title compound. LCMS (ESI): [M+1] 505.

Example 171

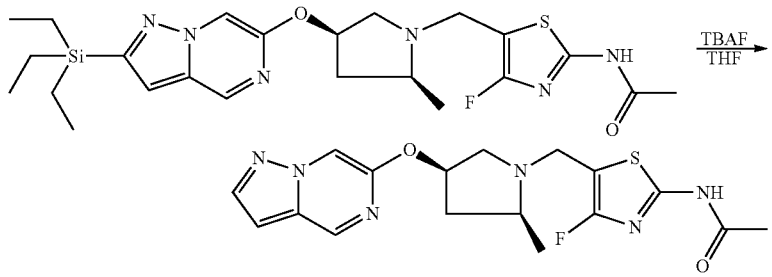

N-(4-fluoro-5-(((2S,4R)-2-methyl-4-(pyrazolo[1,5-a]pyrazin-6-yloxy)pyrrolidin-1-yl)methyl)thiazol-2-yl)acetamide: A solution of crude N-[4-fluoro-5-[[(2S,4R)-2-methyl-4-(2-triethylsilylpyrazolo[1,5-a]pyrazin-6-yl)oxy-pyrrolidin-1-yl]methyl]thiazol-2-yl]acetamide (420.91 mg, 834.00 umol) and 1M TBAF in THF (1 M, 4.17 mL) was heated at 90° C. After 2 h, the solvent was removed. The residue was taken up in 1N HCl and washed with ether. The aqueous layer was neutralized with 50% NaOH and extracted with EtOAc. The organic layer was evaporated to dryness in vacuo and the residue purified by column chromatography over silica gel column (heptane to 3:1 EtOAc:EtOH 2% NH₄OH). The residue was then repurified by HPLC 5%→20% 0.1% TFA to afford 60 mg of the title compound at the TFA salt. LCMS (ESI): [M+1] 391. $^1$H NMR (500 MHz, METHANOL-d4) δ 8.89 (d, J=1.37 Hz, 1H), 8.25 (d, J=0.92 Hz, 1H), 7.95-8.02 (m, 1H), 6.90-6.96 (m, 1H), 5.54-5.61 (m, 1H), 4.71 (br d, J=14.80 Hz, 1H), 4.49 (d, J=14.80 Hz, 1H), 3.87 (br d, J=12.66 Hz, 1H), 3.77 (br d, J=6.71 Hz, 1H), 3.66 (br d, J=7.78 Hz, 1H), 2.87-2.99 (m, 1H), 2.21 (s, 3H), 2.02-2.14 (m, 1H), 1.58 (d, J=6.71 Hz, 3H). $^{19}$F NMR (471 MHz, METHANOL-d₄) 6-110.87 (s, 1F)

Intermediate 86

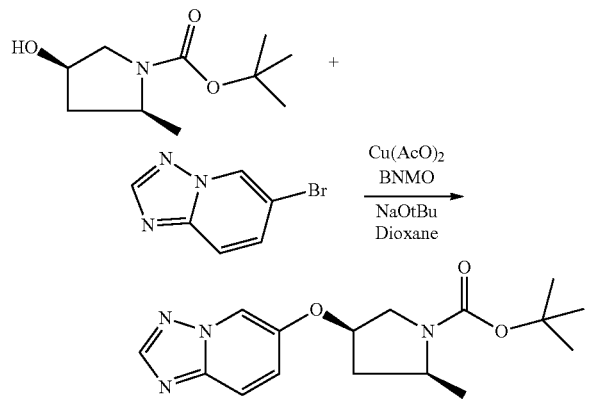

tert-butyl (2S,4R)-4-([1,2,4]triazolo[1,5-a]pyridin-6-yloxy)-2-methylpyrrolidine-1-carboxylate: A mixture of tert-butyl (2S,4R)-4-hydroxy-2-methyl-pyrrolidine-1-carboxylate (300 mg, 1.5 mmol), 6-bromo-[1,2,4]triazolo[1,5-a]pyridine (98.35 mg, 496.67 umol), N¹,N²-bis(naphthalen-1-yl-methyl)oxalamide (BNMO) (18 mg, 50 umol), diacetoxycopper (4.5 mg, 24.83 umol), Sodium tert-butoxide (71.62 mg, 745.00 umol), and 3A molecular sieves in Dioxane (3 mL) was sparged with N₂. The mixture was heated at 90° C. overnight. The reaction was diluted with EtOAc and filtered. The organic layer was evaporated to dryness in vacuo and the residue purified by column chromatography over silica gel column (heptane to 3:1 EtOAc:EtOH) to afford the title compound (31 mg). LCMS (ESI): [M+1] 319; $^1$H NMR (500 MHz, CHLOROFORM-d) δ 8.25-8.36 (m, 1H), 8.14 (br s, 1H), 7.64-7.76 (m, 1H), 7.29 (br s, 1H), 4.82 (m, 1H), 3.62-3.91 (m, 2H), 2.40 (br s, 1H), 1.75 (m, 1H), 1.42-1.56 (m, 9H), 1.20-1.33 (m, 6H)

Intermediate 87

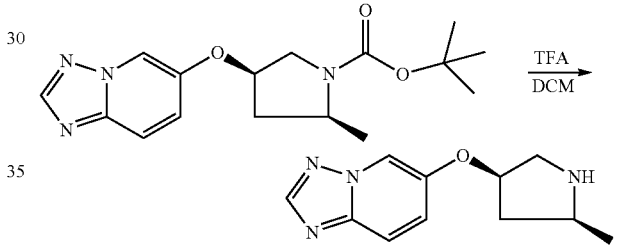

6-(((3R,5S)-5-methylpyrrolidin-3-yl)oxy)-[1,2,4]triazolo[1,5-a]pyridine: TFA (200 uL) was added to a solution of tert-butyl (2S,4R)-2-methyl-4-([1,2,4]triazolo[1,5-a]pyridin-6-yloxy)pyrrolidine-1-carboxylate (31 mg, 97 umol) in DCM (200 uL). After 2 h, the solvent was removed to afford the title compound. LCMS (ESI): [M+1] 219.

Example 172

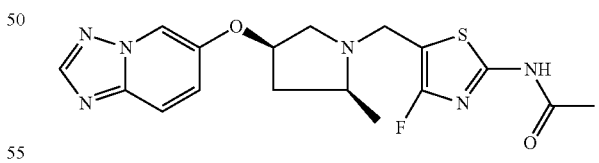

N-(5-(((2S,4R)-4-([1,2,4]triazolo[1,5-a]pyridin-6-yloxy)-2-methylpyrrolidin-1-yl)methyl)-4-fluorothiazol-2-yl)acetamide: N-(4-fluoro-5-formyl-thiazol-2-yl)acetamide (21.90 mg, 116.40 umol) was added to a mixture of 6-[(3R,5S)-5-methylpyrrolidin-3-yl]oxy-[1,2,4]triazolo[1,5-a]pyridine (21.17 mg, 97.00 umol), and sodium triacetoxyborohydride (61.67 mg, 291.00 umol) in EtOAc (3.81 g, 43.25 mmol, 4.23 mL). The mixture was stirred overnight. 1 N HCL was added and stirred for 20 min. The HCl was neutralized with 50% NaOH and extracted with EtOAc. The organic layer was evaporated to dryness in vacuo and the residue purified by HPLC (10→100 2% NH4OH) to afford the title compound as 8 mg of clear solid. LCMS (ESI): [M+H] 391; $^1$H NMR (500 MHz, CHLOROFORM-d) δ 10.76 (br s, 1H), 8.28 (s, 1H), 8.04 (d, J=2.14 Hz, 1H), 7.66 (d, J=9.77 Hz, 1H), 7.32 (dd, J=2.29, 9.61 Hz, 1H), 4.58-4.67 (m, 1H), 4.02 (d, J=14.65 Hz, 1H), 3.67 (d, J=14.65 Hz, 1H), 3.30 (d, J=10.83 Hz, 1H), 2.66 (dd, J=5.87, 10.91 Hz, 1H), 2.53-2.63 (m, 2H), 2.33 (s, 3H), 1.71-1.83 (m, 1H), 1.27-1.31 (m, 3H). $^{19}$F NMR (471 MHz, CHLOROFORM-d) δ −116.07 (br s, 1F).

Example 173

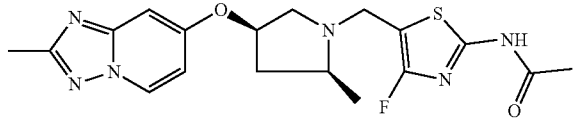 [SMILES: CC(=O)Nc1nc(F)c(CN2C[C@H](Oc3ccn4nc(C)nc4c3)C[C@@H]2C)s1]

N-(4-fluoro-5-(((2S,4R)-2-methyl-4-((2-methyl-[1,2,4]triazolo[1,5-a]pyridin-7-yl)oxy)pyrrolidin-1-yl)methyl)thiazol-2-yl)acetamide: The title compound was prepared in an analogous manner as Example 172 from 7-bromo-2-methyl-[1,2,4]triazolo[1,5-a]pyridine. LCMS (ESI): [M+H] 405. $^1$H NMR (600 MHz, CHLOROFORM-d) δ 11.79 (s, 1H), 8.26 (d, J=7.52 Hz, 1H), 6.74 (d, J=2.38 Hz, 1H), 6.63 (dd, J=2.57, 7.52 Hz, 1H), 4.67-4.75 (m, 1H), 3.99 (d, J=14.67 Hz, 1H), 3.70 (d, J=14.86 Hz, 1H), 3.27 (d, J=11.00 Hz, 1H), 2.67 (dd, J=5.96, 11.10 Hz, 1H), 2.54-2.60 (m, 2H), 2.53 (s, 3H), 2.34 (s, 3H), 1.65-1.78 (m, 1H), 1.27 (d, J=5.32 Hz, 3H). $^{19}$F NMR (565 MHz, CHLOROFORM-d) δ-115.83 (br s, 1F).

Example 174

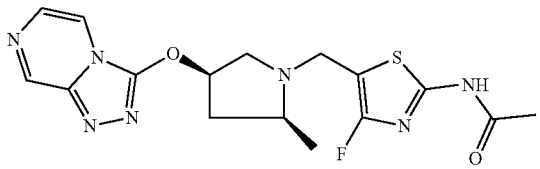 [SMILES: CC(=O)Nc1nc(F)c(CN2C[C@H](Oc3nnc4cnccn34)C[C@@H]2C)s1]

N-(5-(((2S,4R)-4-([1,2,4]triazolo[4,3-a]pyrazin-3-yloxy)-2-methylpyrrolidin-1-yl)methyl)-4-fluorothiazol-2-yl)acetamide: The title compound was prepared in an analogous manner as Example 172 from 3-bromo-[1,2,4]triazolo[4,3-a]pyrazine. LCMS (ESI): [M+H] 392. $^1$H NMR (600 MHz, CHLOROFORM-d) δ 10.75 (br s, 1H), 9.04 (s, 1H), 9.03 (s, 1H), 7.24 (s, 1H), 4.99-5.06 (m, 1H), 4.01 (d, J=14.49 Hz, 1H), 3.64 (d, J=14.67 Hz, 1H), 3.40 (d, J=11.55 Hz, 1H), 2.75 (dd, J=5.78, 11.46 Hz, 1H), 2.61-2.72 (m, 2H), 2.32 (s, 4H), 1.84-1.92 (m, 1H), 1.30 (d, J=5.87 Hz, 4H). $^{19}$F NMR (565 MHz, CHLOROFORM-d) δ-115.92 (br s, 1F).

OGA Enzyme Inhibition Biochemical Assay

Recombinant full length human OGA enzyme was purchased from Origene. 4-MUGlcNAc substrate was purchased from Sigma. All other reagents were purchased from Sigma or Fisher. Assay buffer consists of the McIlvaine buffer system, pH 6.4 (0.2M $Na_2HPO_4$ mixed with 0.1M citric acid) and 0.01% BSA. Reactions consist of 1 nM OGA, 100 μM 4-MUGlcNAc ($K_m$), and compound in a final volume of 10 μl. Reactions were incubated for 90 minutes at room temperature and quenched with 40 μl of 3M glycine, pH 10 and read on a Perkin Elmer Envision plate reader (Ex: 355 nm/Em: 460 nm). Compounds were tested with a 10-point dose-response starting from 20 μM with a 4-fold dilution. Data, as presented in Table 1 below, was fit using GraphPad Prism using a 4-parameter fit with variable slope.

TABLE 1

OGA enzyme inhibition activity of the compounds of the invention

| | OGA Biochemical $IC_{50}$ (nM) |
|---|---|
| Example 1 | <1.0 |
| Example 2 | <1.0 |
| Example 3 | <1.0 |
| Example 4 | <1.0 |
| Example 5 | <1.0 |
| Example 6 | <1.0 |
| Example 7 | <1.0 |
| Example 8 | <1.0 |
| Example 9 | <1.0 |
| Example 10 | <1.0 |
| Example 11 | <1.0 |
| Example 12 | <1.0 |
| Example 13 | <1.0 |
| Example 14 | <1.0 |
| Example 15 | <1.0 |
| Example 16 | <1.0 |
| Example 17 | <1.0 |
| Example 18 | <1.0 |
| Example 19 | 1.3 |
| Example 20 | 1.6 |
| Example 21 | 1.9 |
| Example 22 | 2.1 |
| Example 23 | 2.4 |
| Example 24 | 2.5 |
| Example 25 | 2.8 |
| Example 26 | 4.5 |
| Example 27 | 4 |
| Example 28 | 5.4 |
| Example 29 | 5.5 |
| Example 30 | 7.9 |
| Example 31 | 9.7 |
| Example 32 | 11 |
| Example 33 | 16 |
| Example 34 | 22 |
| Example 35 | 110 |
| Example 36 | 780 |
| Example 37 | 16 |
| Example 38 | <1.0 |
| Example 39 | <1.0 |
| Example 40 | <1.0 |
| Example 41 | TBD |
| Example 42 | <1.0 |
| Example 43 | <1.0 |
| Example 44 | <1.0 |
| Example 45 | <1.0 |
| Example 46 | 1.1 |
| Example 47 | <1.0 |
| Example 48 | <1.0 |
| Example 49 | <1.0 |
| Example 50 | <1.0 |
| Example 51 | <1.0 |
| Example 52 | <1.0 |
| Example 53 | <1.0 |
| Example 54 | <1.0 |
| Example 55 | <1.0 |
| Example 56 | <1.0 |
| Example 57 | <1.0 |
| Example 58 | <1.0 |
| Example 59 | <1.0 |
| Example 60 | <1.0 |
| Example 61 | <1.0 |
| Example 62 | <1.0 |
| Example 63 | <1.0 |
| Example 64 | <1.0 |
| Example 65 | <1.0 |

TABLE 1-continued

OGA enzyme inhibition activity of the compounds of the invention

| | OGA Biochemical IC$_{50}$ (nM) |
|---|---|
| Example 66 | <1.0 |
| Example 67 | <1.0 |
| Example 68 | <1.0 |
| Example 69 | 2.7 |
| Example 70 | 1.2 |
| Example 71 | <1.0 |
| Example 72 | <1.0 |
| Example 73 | <1.0 |
| Example 74 | <1.0 |
| Example 75 | <1.0 |
| Example 76 | <1.0 |
| Example 77 | <1.0 |
| Example 78 | <1.0 |
| Example 79 | <1.0 |
| Example 80 | <1.0 |
| Example 81 | <1.0 |
| Example 82 | <1.0 |
| Example 83 | 1.1 |
| Example 84 | <1.0 |
| Example 85 | <1.0 |
| Example 86 | <1.0 |
| Example 87 | <1.0 |
| Example 88 | <1.0 |
| Example 89 | <1.0 |
| Example 90 | <1.0 |
| Example 91 | 5 |
| Example 92 | <1.0 |
| Example 93 | <1.0 |
| Example 94 | <1.0 |
| Example 95 | 5.3 |
| Example 96 | <1.0 |
| Example 97 | <1.0 |
| Example 98 | <1.0 |
| Example 99 | <1.0 |
| Example 100 | <1.0 |
| Example 101 | <1.0 |
| Example 102 | <1.0 |
| Example 103 | <1.0 |
| Example 104 | 3.8 |
| Example 105 | <1.0 |
| Example 106 | <1.0 |
| Example 107 | <1.0 |
| Example 108 | <1.0 |
| Example 109 | <1.0 |
| Example 110 | <1.0 |
| Example 111 | <1.0 |
| Example 112 | <1.0 |
| Example 113 | <1.0 |
| Example 114 | <1.0 |
| Example 115 | 3.8 |
| Example 116 | 2.6 |
| Example 117 | <1.0 |
| Example 118 | <1.0 |
| Example 119 | 1.1 |
| Example 120 | <1.0 |
| Example 121 | <1.0 |
| Example 122 | <1.0 |
| Example 123 | 4.1 |
| Example 124 | <1.0 |
| Example 125 | 1.8 |
| Example 126 | 3.1 |
| Example 127 | <1.0 |
| Example 128 | <1.0 |
| Example 129 | <1.0 |
| Example 130 | <1.0 |
| Example 131 | <1.0 |
| Example 132 | <1.0 |
| Example 133 | <1.0 |
| Example 134 | <1.0 |
| Example 135 | <1.0 |
| Example 136 | <1.0 |
| Example 137 | 4.3 |
| Example 138 | <1.0 |
| Example 139 | <1.0 |
| Example 140 | <1.0 |
| Example 141 | <1.0 |
| Example 142 | <1.0 |
| Example 143 | <1.0 |
| Example 144 | <1.0 |
| Example 145 | <1.0 |
| Example 146 | <1.0 |
| Example 147 | <1.0 |
| Example 148 | <1.0 |
| Example 149 | <1.0 |
| Example 150 | <1.0 |
| Example 151 | <1.0 |
| Example 152 | <1.0 |
| Example 153 | <1.0 |
| Example 154 | <1.0 |
| Example 155 | <1.0 |
| Example 156 | <1.0 |
| Example 157 | <1.0 |
| Example 158 | <1.0 |
| Example 159 | <1.0 |
| Example 160 | 2.4 |
| Example 161 | <1.0 |
| Example 162 | <1.0 |
| Example 163 | <1.0 |
| Example 164 | <1.0 |
| Example 165 | <1.0 |
| Example 166 | <1.0 |
| Example 167 | <1.0 |
| Example 168 | <1.0 |
| Example 169 | <1.0 |
| Example 170 | <1.0 |
| Example 171 | <1.0 |
| Example 172 | <1.0 |
| Example 173 | <1.0 |
| Example 174 | 2.6 |

While we have described a number of embodiments of this, it is apparent that our basic examples may be altered to provide other embodiments that utilize the compounds and methods of this disclosure. Therefore, it will be appreciated that the scope of this disclosure is to be defined by the appended claims rather than by the specific embodiments that have been represented by way of example.

The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

What is claimed is:

1. A compound represented by structural formula (IVB) or (V):

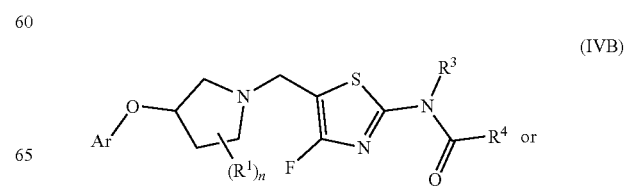

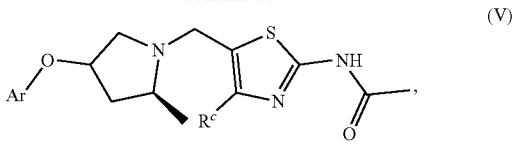

(V)

or a pharmaceutically acceptable salt thereof, wherein:

Ar is an optionally substituted bicyclic aryl, an optionally substituted bicyclic heteroaryl, an optionally substituted bicyclic cycloaliphatic, or an optionally substituted bicyclic heterocyclyl; wherein said bicyclic aryl, bicyclic heteroaryl, bicyclic cycloaliphatic, or bicyclic heterocyclyl represented by Ar is optionally substituted with one or more substituents selected from $C_1$-$C_4$ alkyl, $C_1$-$C_4$ haloalkyl, $C_3$-$C_6$ cycloalkyl, $C_3$-$C_6$ heterocyclyl, halo, —CN, —NO$_2$, —OR$^z$, —SR$^z$, —NR$^x$R$^y$, —S(O)$_i$R$^x$, —NR$^x$S(O)$_i$R$^y$, —S(O)$_i$NR$^x$R$^y$, —C(=O) OR$^x$, —OC(=O)OR$^x$, —C(=S)OR$^y$, —O(C=S)R$^x$, —C(=O)NR$^x$R$^y$, —NR$^x$C(=O)R$^y$, —C(=S)NR$^x$R$^y$, —NR$^x$C(=S)R$^y$, —NR(C=O)OR$^y$, —O(C=O) NR$^x$R$^y$, —NR$^x$(C=S)OR$^y$, —O(C=S)NR$^x$R$^y$, —NR$^x$ (C=O)NR$^x$R$^y$, —NR$^x$(C=S)NR$^x$R$^y$, —C(=S)R$^x$, —C(=O)R$^x$, phenyl and monocyclic heteroaryl; wherein:

the $C_1$-$C_4$ alkyl substituent on Ar is optionally substituted with —CN, —NO$_2$, —OR$^z$, —NR$^x$R$^y$, —S(O)$_i$ R$^x$, —NR$^x$S(O)$_i$R$^y$, —S(O)$_i$NR$^x$R$^y$, —C(=O)OR$^x$, —OC(=O)OR$^x$, —C(=S)OR$^x$, —O(C=S)R$^x$, —C(=O)NR$^x$R$^y$, —NR$^x$C(=O)R$^y$, —C(=S) NR$^x$R$^y$—NR$^x$C(=S)R$^y$, —NR$^x$(C=O)OR$^y$, —O(C=O)NR$^x$R$^y$, —NR$^x$(C=S)OR$^y$, —O(C=S) NR$^x$R$^y$, —NR$^x$(C=O)NR$^x$R$^y$, —NR$^x$(C=S)NR$^x$R$^y$, —C(=S)R$^x$, —C(=O)R$^y$, $C_3$-$C_6$ cycloalkyl (optionally substituted with one or more groups selected from —CH$_3$, halomethyl, halo, methoxy and halomethoxy), monocyclic heteroaryl (optionally substituted with one or more groups selected from —CH$_3$, halomethyl, halo, methoxy and halomethoxy) or phenyl (optionally substituted with one or more groups selected from —CH$_3$, halomethyl, halo, methoxy and halomethoxy);

the $C_3$-$C_6$ cycloalkyl, $C_3$-$C_6$ heterocyclyl, phenyl or monocyclic heteroaryl substituent on Ar is optionally and independently substituted with $C_1$-$C_4$ alkyl, $C_1$-$C_4$ haloalkyl, halo, —CN, —NO$_2$, —OR$^z$, —NR$^x$R$^y$, —S(O)$_i$R$^x$, —NR$^x$S(O)$_i$R$^y$, —S(O)$_i$NR$^x$R$^y$, —C(=O)OR$^x$, —OC(=O)OR$^x$, —C(=S)OR$^x$, —O(C=S) R$^y$, —C(=O)NR$^x$R$^y$, —NR$^x$C(=O)R$^y$, —C(=S)NR$^x$R$^y$, —NR$^x$C(=S)R$^y$, —NR$^x$(C=O)OR$^y$, —O(C=O)NR$^x$R$^y$, —NR$^x$(C=S)OR$^y$, —O(C=S)NR$^x$R$^y$, —NR$^x$(C=O)NR$^x$R$^y$, —NR$^x$ (C=S)NR$^x$R$^y$, —C(=S)R$^x$, or —C(=O)R$^x$;

each R$^x$ and each R$^y$ is independently —H, $C_1$-$C_4$ alkyl, or $C_3$-$C_8$ cycloalkyl; wherein the $C_1$-$C_4$ alkyl or $C_3$-$C_8$ cycloalkyl represented by R$^x$ or R$^y$ is optionally substituted with one or more substituents selected from halo, hydroxyl, $C_3$-$C_6$ cycloalkyl and phenyl (optionally substituted with one or more groups selected from —CH$_3$, halomethyl, halo, methoxy and halomethoxy);

R$^z$ is —H, $C_1$-$C_4$ alkyl, $C_1$-$C_4$ alkoxy, $C_3$-$C_8$ cycloalkyl, or $C_3$-$C_8$ heterocyclyl; wherein the $C_1$-$C_4$ alkyl or $C_3$-$C_8$ cycloalkyl group represented by R$^z$ is optionally substituted with one or more substituents selected from —CN, halo, hydroxyl, $C_1$-$C_4$ alkyl, $C_1$-$C_4$ alkoxy, $C_3$-$C_6$ cycloalkyl and phenyl (optionally substituted with one or more groups selected from —CH$_3$, halomethyl, halo, methoxy and halomethoxy); and i is 0, 1, or 2;

R$^c$ is —H or halo;

n is 0 or an integer from 1 to 8;

when n is other than 0, R$^1$, for each occurrence, is independently halo or $C_1$-$C_4$ alkyl;

R$^3$ is —H or $C_1$-$C_4$ alkyl; and

R$^4$ is —H or $C_1$-$C_4$ alkyl.

2. The compound according to claim 1, wherein the compound is represented by the following structural formula:

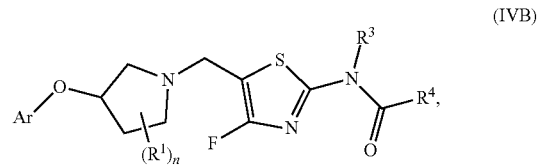

(IVB)

or a pharmaceutically acceptable salt thereof.

3. The compound according to claim 1, wherein the compound is represented by the following structural formula:

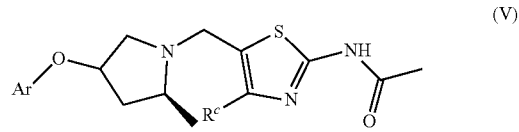

(V)

or a pharmaceutically acceptable salt thereof.

4. The compound according to claim 3, wherein the compound is represented by one of the following structural formula:

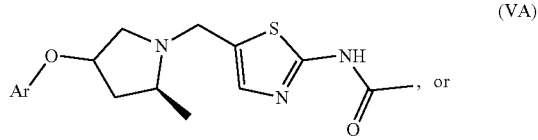

(VA)

, or

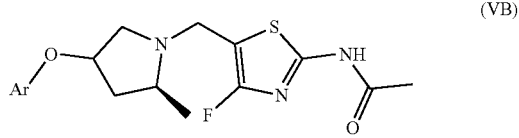

(VB)

or a pharmaceutically acceptable salt thereof.

5. The compound according to claim 1, wherein the compound is represented by the following structural formulas:

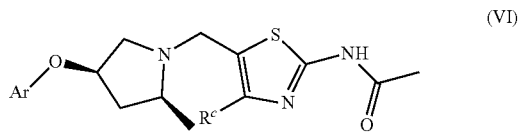

(VI)

or a pharmaceutically acceptable salt thereof.

6. The compound according to claim 5, wherein the compound is represented by one of the following structural formulas:

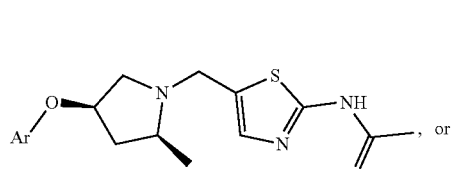
(VIA)
, or

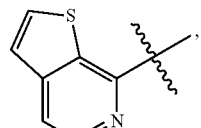
,

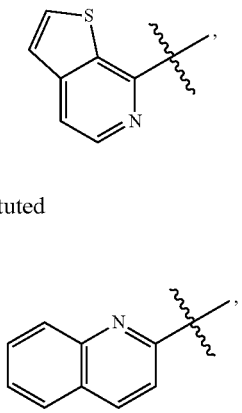
(VIB)
, or a pharmaceutically acceptable salt thereof.

7. The compound according to claim 1, or a pharmaceutically acceptable salt thereof, wherein:
Ar is optionally substituted thienopyridinyl, optionally substituted quinolinyl, optionally substituted imidazopyridinyl, optionally substituted imidazopyrimidinyl, optionally substituted furopyridinyl, optionally substituted pyrazolopyrazinyl, optionally substituted isoquinolinyl, optionally substituted thienopyrimidinyl, optionally substituted quinoxalinyl, optionally substituted tetrahydroquinazolinyl, optionally substituted pyrazolopyridinyl, triazolopyridazinyl, tetrahydroquinolinyl, triazolopyrimidinyl, optionally substituted quinazolinyl, optionally substituted indazolyl, optionally substituted benzo[d]oxazolyl, optionally substituted furopyrimidinyl, optionally substituted pyrazolopyrimidinyl, optionally substituted triazolopyridinyl, optionally substituted triazolopyrazinyl, optionally substituted naphthyridinyl, optionally substituted tetrazolopyridinyl, optionally substituted phthalazinyl, optionally substituted benzo[d]isoxazole, optionally substituted oxazolopyridinyl, optionally substituted imidazothiadiazolyl, optionally substituted imidazopyrazinyl, optionally substituted imidazopyridazinyl, optionally substituted pyridopyrimidinyl, optionally substituted pyridopyrazinyl, optionally substituted pyrrolopyrimidinyl, optionally substituted pyrrolopyridinyl, optionally substituted pyrrolotriazinyl, optionally substituted purinyl, optionally substituted furopyrimidinyl, optionally substituted quinolinyl, or optionally substituted thiazolopyrimidinyl.

8. The compound according to claim 1, or a pharmaceutically acceptable salt thereof, wherein:
(i) Ar is optionally substituted

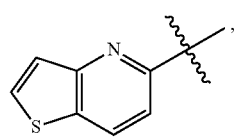 [SMILES: *c1ccc2sccc2n1]

optionally substituted

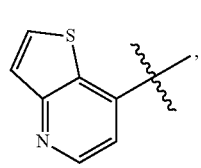 [SMILES: *c1ccnc2ccsc12]

optionally substituted

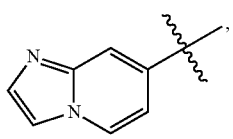 [SMILES: *c1ccn2ccnc2c1]
, optionally substituted

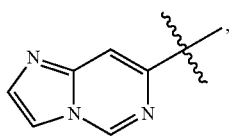 [SMILES: *c1cc2nccn2cn1]
, optionally substituted

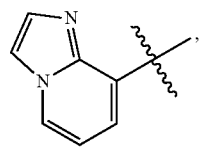 [SMILES: *c1cccn2ccnc12]
, optionally substituted

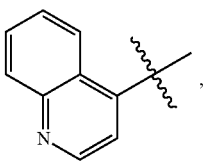 [SMILES: *c1ccnc2ccccc12 ; ","]
,

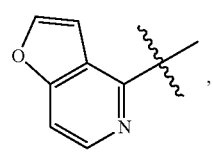 [SMILES: *c1nccc2occc12 ; ","],
optionally substituted
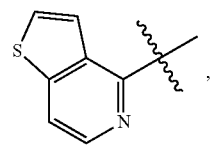 [SMILES: *c1nccc2sccc12 ; ","],
optionally substituted
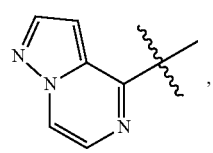 [SMILES: *c1nccn2nccc12 ; ","],
optionally substituted
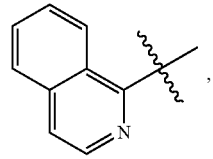 [SMILES: *c1nccc2ccccc12 ; ","],
optionally substituted
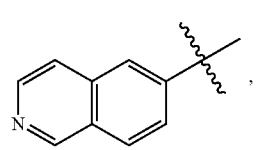 [SMILES: *c1ccc2cnccc2c1 ; ","],
optionally substituted
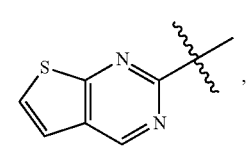 [SMILES: *c1ncc2ccsc2n1 ; ","],
optionally substituted
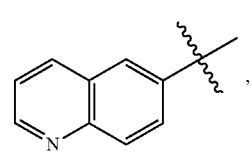 [SMILES: *c1ccc2ncccc2c1 ; ","],
optionally substituted
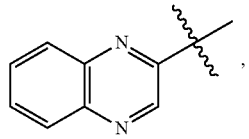 [SMILES: *c1cnc2ccccc2n1 ; ","],
optionally substituted
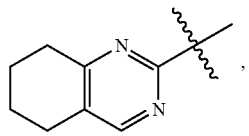 [SMILES: *c1ncc2c(n1)CCCC2 ; ","],
optionally substituted
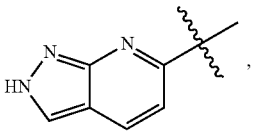 [SMILES: *c1ccc2c[nH]nc2n1 ; ","],
optionally substituted
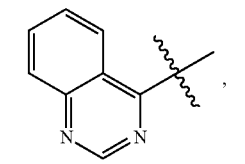 [SMILES: *c1ncnc2ccccc12 ; ","],
optionally substituted
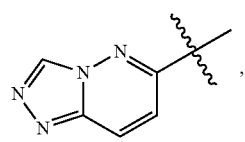 [SMILES: *c1ccc2nncn2n1 ; ","],
optionally substituted
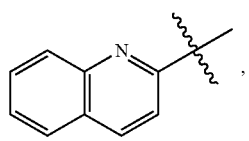 [SMILES: *c1ccc2ccccc2n1 ; ","],
optionally substituted
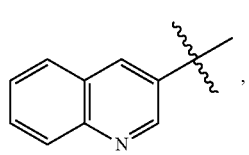 [SMILES: *c1cnc2ccccc2c1 ; ","], optionally substituted
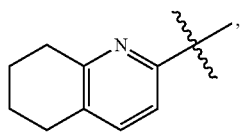 [SMILES: *c1ccc2c(n1)CCCC2]
optionally substituted
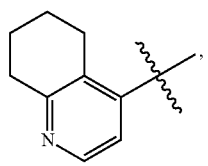 [SMILES: *c1ccnc2c1CCCC2]
optionally substituted
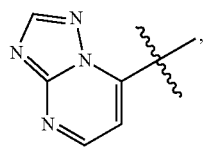
optionally substituted
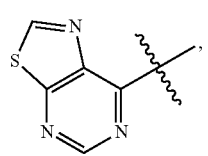 [SMILES: *c1ncnc2scnc12]
optionally substituted
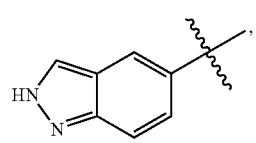 [SMILES: *c1ccc2n[nH]cc2c1]
optionally substituted
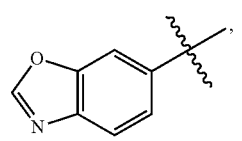 [SMILES: *c1ccc2ncoc2c1]
optionally substituted
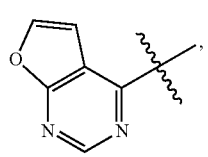 [SMILES: *c1ncnc2occc12]
optionally substitute
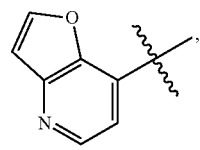 [SMILES: *c1ccnc2ccoc12]
optionally substituted
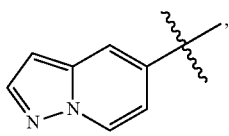 [SMILES: *c1ccn2nccc2c1]
or optionally substituted
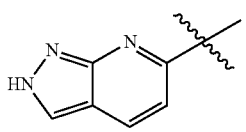
or
(ii) Ar is optionally substituted
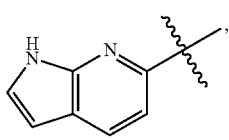 [SMILES: *c1ccc2cc[nH]c2n1]
optionally substituted
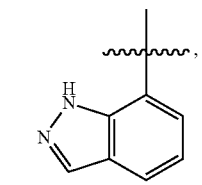 [SMILES: *c1cccc2cn[nH]c12]
optionally substituted
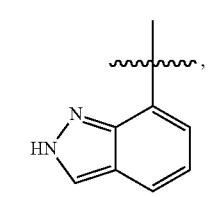

optionally substituted
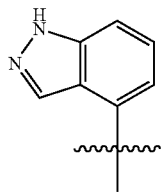
optionally substituted
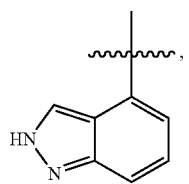
optionally substituted
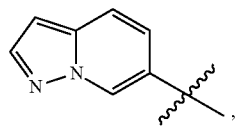 [SMILES: *c1ccc2ccnn2c1],
optionally substituted
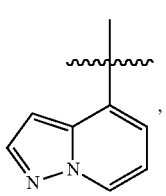 [SMILES: *c1cccn2nccc12],
optionally substituted
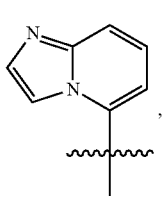 [SMILES: *c1cccc2nccn12],
optionally substituted
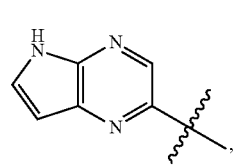 [SMILES: *c1cnc2[nH]ccc2n1],
optionally substituted
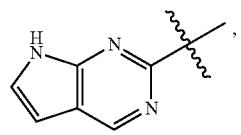 [SMILES: *c1ncc2cc[nH]c2n1],
optionally substituted
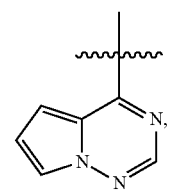 [SMILES: *c1ncnn2cccc12],
optionally substituted
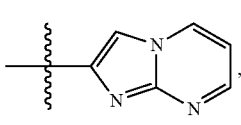,
substituted optionally
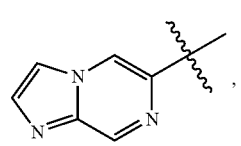 [SMILES: *c1cn2ccnc2cn1],
optionally substituted
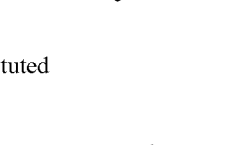,
optionally substituted
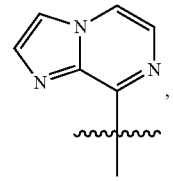 [SMILES: *c1nccn2ccnc12],
optionally substituted
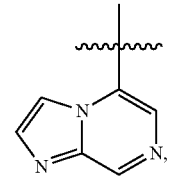 [SMILES: *c1cncc2nccn12], optionally substituted
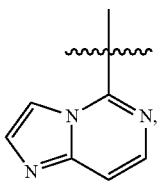 [SMILES: *c1nccc2nccn12]
optionally substituted
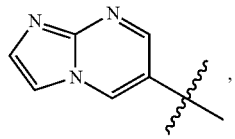 [SMILES: *c1cnc2nccn2c1]
optionally substituted
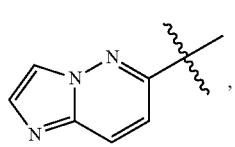 [SMILES: *c1ccc2nccn2n1]
optionally substituted substituted
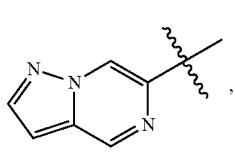
optionally substituted
optionally substituted
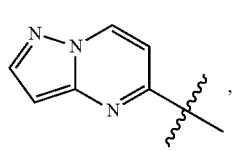 [SMILES: *c1ccn2nccc2n1]
optionally substituted
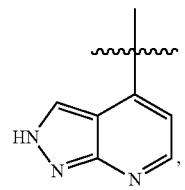 [SMILES: *c1ccnc2n[nH]cc12]
optionally substituted
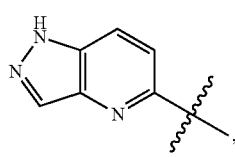 [SMILES: *c1ccc2[nH]ncc2n1]
optionally substituted
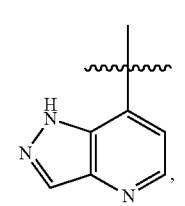 [SMILES: *c1ccnc2cn[nH]c12]
optionally substituted
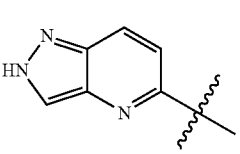
optionally substituted
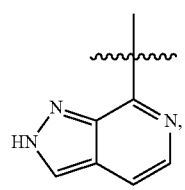 [SMILES: *c1nccc2c[nH]nc12]
optionally substituted
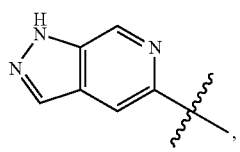 [SMILES: *c1cc2cn[nH]c2cn1]

optionally substituted
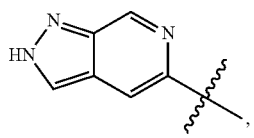 [SMILES: *c1cc2c[nH]nc2cn1]
optionally substituted
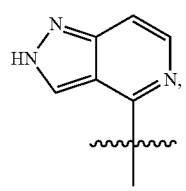
optionally substituted
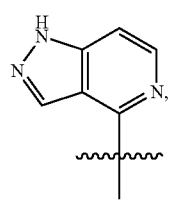
optionally substituted
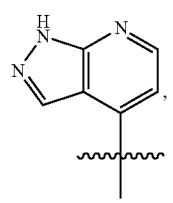 [SMILES: *c1ccnc2[nH]ncc12]
optionally substituted
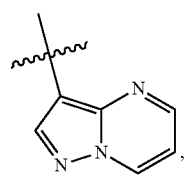 [SMILES: *c1cnn2cccnc12]
optionally substituted
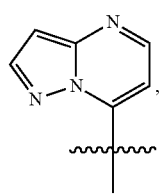 [SMILES: *c1ccnc2ccnn12]
optionally substituted
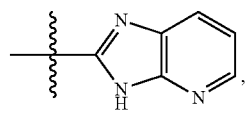
optionally substituted
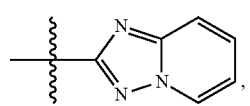 [SMILES: *c1nc2ccccn2n1]
optionally substituted
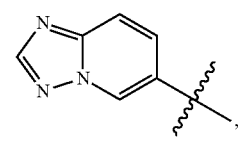 [SMILES: *c1ccc2ncnn2c1]
optionally substituted
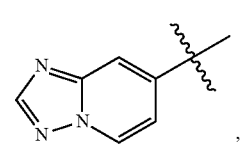 [SMILES: *c1ccn2ncnc2c1]
optionally substituted
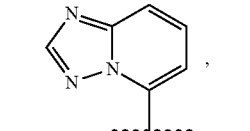
optionally substituted
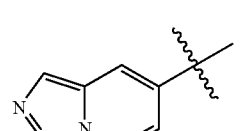
optionally substituted
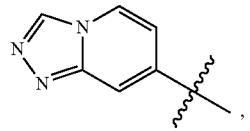 [SMILES: *c1ccn2cnnc2c1]

optionally substituted
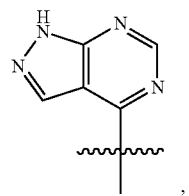
optionally substituted
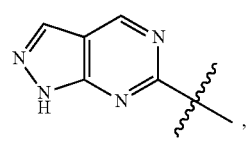
optionally substituted
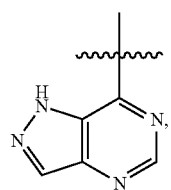
optionally substituted
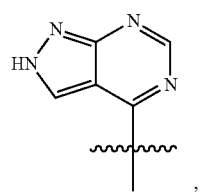
optionally substituted
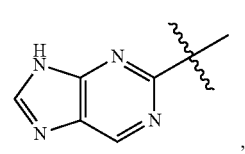 [SMILES: *c1ncc2nc[nH]c2n1]
optionally substituted
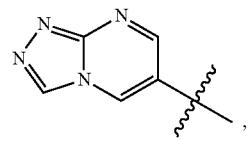
optionally substituted
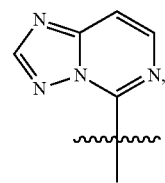 [SMILES: *c1nccc2ncnn12]
optionally substituted
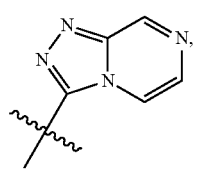 [SMILES: *c1nnc2cnccn12]
optionally substituted
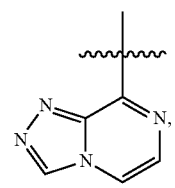 [SMILES: *c1nccn2cnnc12]
optionally substituted
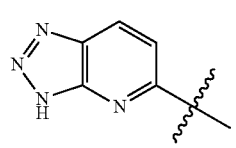
optionally substituted
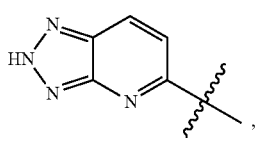 [SMILES: *c1ccc2n[nH]nc2n1]
optionally substituted
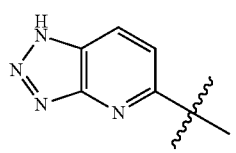

optionally substituted
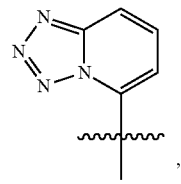 [SMILES: *c1cccc2nnnn12]
optionally substituted
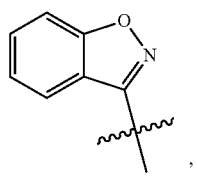 [SMILES: *c1noc2ccccc12]
optionally substituted
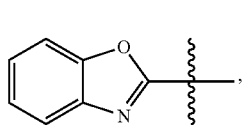 [SMILES: *c1nc2ccccc2o1]
optionally substituted
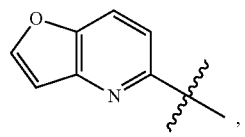 [SMILES: *c1ccc2occc2n1]
optionally substituted
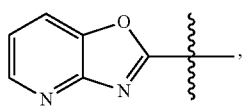 [SMILES: *c1nc2ncccc2o1]
optionally substituted
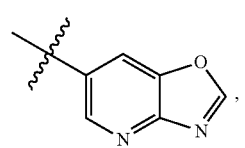 [SMILES: *c1cnc2ncoc2c1]
optionally substituted
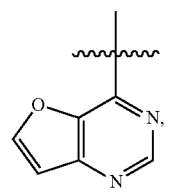 [SMILES: *c1ncnc2ccoc12]
optionally substituted
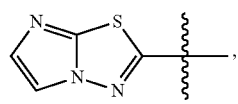 [SMILES: *c1nn2ccnc2s1]
optionally substituted
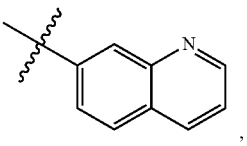 [SMILES: *c1ccc2cccnc2c1]
optionally substituted
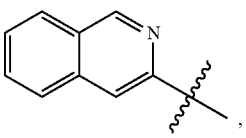 [SMILES: *c1cc2ccccc2cn1]
optionally substituted
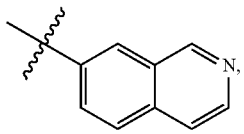 [SMILES: *c1ccc2ccncc2c1]
optionally substitute
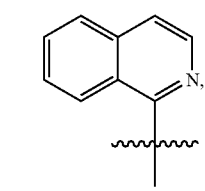 [SMILES: *c1nccc2ccccc12]
optionally substituted
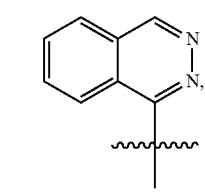 [SMILES: *c1nncc2ccccc12]

optionally substituted

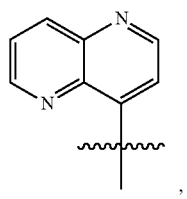 [SMILES: *c1ccnc2cccnc12]

optionally substituted

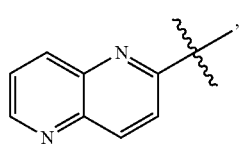

optionally substituted

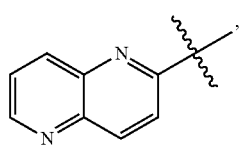 [SMILES: *c1ccc2ncccc2n1]

optionally substituted

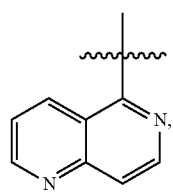 [SMILES: *c1nccc2ncccc12]

optionally substituted

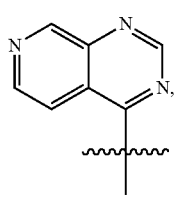

optionally substituted

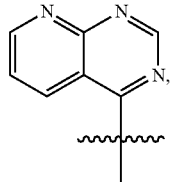 [SMILES: *c1ncnc2ncccc12]

optionally substituted

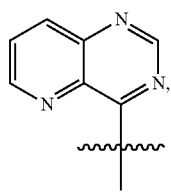 [SMILES: *c1ncnc2cccnc12]

optionally substituted

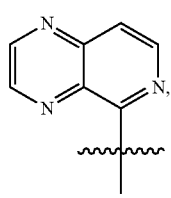 [SMILES: *c1nccc2nccnc12]

or optionally substituted

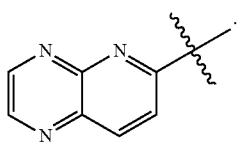 [SMILES: *c1ccc2nccnc2n1]

9. The compound according to claim 1, or a pharmaceutically acceptable salt thereof, wherein:
Ar is optionally substituted with one or more substituents selected from $C_1$-$C_4$ alkyl, $C_1$-$C_4$ haloalkyl, halo, —CN, —OR$^z$, and —C(=O)NR$^x$R$^y$.

10. The compound of claim 9, or a pharmaceutically acceptable salt thereof, wherein: Ar is optionally substituted with one or more substituents selected from —CH$_3$, —CH$_2$CH$_3$, —CF$_3$, —CHF$_2$, —F, —Cl, —OCHF$_2$, —CONH$_2$, —CN, and OCH$_3$.

11. A pharmaceutical composition comprising the compound according to claim 1, or a pharmaceutically acceptable salt thereof and a pharmaceutically acceptable carrier or diluent.

* * * * *